US006974928B2

(12) United States Patent
Bloom

(10) Patent No.: US 6,974,928 B2
(45) Date of Patent: Dec. 13, 2005

(54) METHOD AND APPARATUS FOR EFFICIENT PACKAGE DELIVERY AND STORAGE

(75) Inventor: Gregg Bloom, Lauderdale by the Sea, FL (US)

(73) Assignee: Breakthrough Logistics Corporation, Boca Raton, FL (US)

( * ) Notice: Subject to any disclaimer, the term of this patent is extended or adjusted under 35 U.S.C. 154(b) by 9 days.

(21) Appl. No.: 09/810,903

(22) Filed: Mar. 16, 2001

(65) Prior Publication Data

US 2002/0130065 A1 Sep. 19, 2002

(51) Int. Cl.$^7$ .............................................. G06F 17/00
(52) U.S. Cl. ..................... 209/583; 700/215; 700/242; 700/243
(58) Field of Search ................. 209/583, 563, 209/564, 933; 700/216, 240, 241

(56) References Cited

U.S. PATENT DOCUMENTS

| | | | | |
|---|---|---|---|---|
| 4,894,717 A | * | 1/1990 | Komei | 348/150 |
| 5,060,165 A | * | 10/1991 | Schumacher et al. | 700/213 |
| 5,572,442 A | * | 11/1996 | Schulhof et al. | 709/219 |
| 5,774,053 A | * | 6/1998 | Porter | 340/568.1 |
| 6,085,170 A | | 7/2000 | Tsukuda | 705/26 |
| 6,300,873 B1 | * | 10/2001 | Kucharczyk et al. | 340/568.1 |
| 6,323,782 B1 | * | 11/2001 | Stephens et al. | 340/10.31 |
| 6,344,796 B1 | * | 2/2002 | Ogilvie et al. | 340/568.1 |
| 6,456,900 B1 | * | 9/2002 | Kakuta | 700/233 |
| 6,522,945 B2 | * | 2/2003 | Sleep et al. | 700/225 |
| 2001/0042024 A1 | | 11/2001 | Rogers | |

* cited by examiner

Primary Examiner—Donald P. Walsh
Assistant Examiner—Jonathan R. Miller
(74) Attorney, Agent, or Firm—Akerman Senterfitt

(57) ABSTRACT

A method and system for the efficient bulk package delivery for recipients. Items ordered by different customers from different retailers, suppliers or manufacturers can be organized by common item identifiers and shipped in bulk from retailers or manufacturers, to an origination regional distribution center. The items can be sorted at the origination regional distribution center in bulk based on the location of destination regional distribution centers that can serve destination centralized pickup locations chosen by the customers placing the orders for those items. Ordered items can be sorted by recipient and the destination centralized pickup location specified in the customer's order and packed into recipient-specific packages at the destination regional distribution center. The packages can be transported in bulk to the destination centralized pickup locations where they can be randomly loaded into any available locker bins in an automated system of stationary and moveable, configurable storage locker bins. During loading, an association can be made between an identifier of the locker bin and an identifier of the bulk delivered package for subsequent self service identification and retrieval. An electronic notification of the delivery can be automatically dispatched to the recipient by the automated system of storage locker bins to alert the recipient of the delivery.

45 Claims, 25 Drawing Sheets

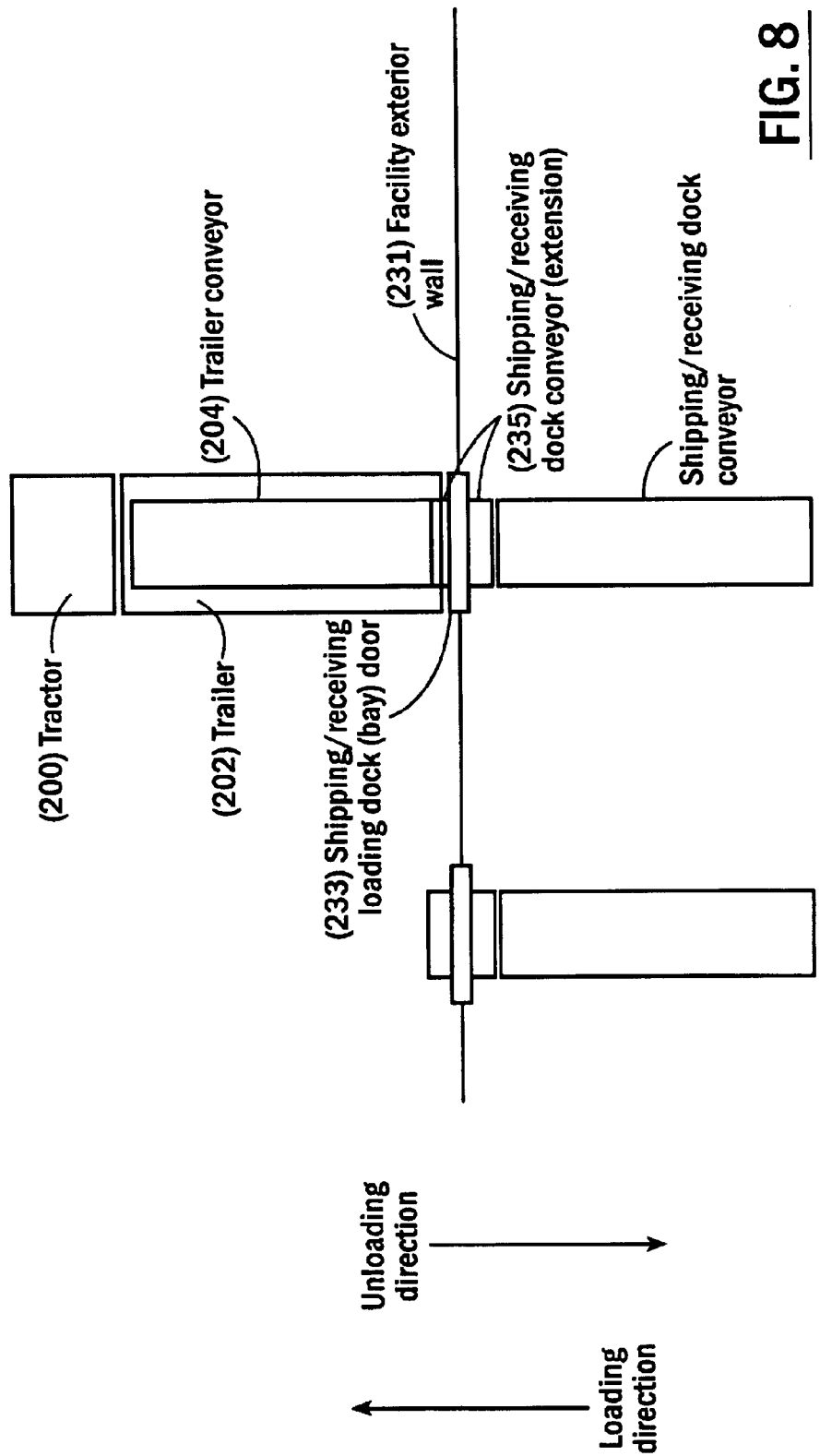

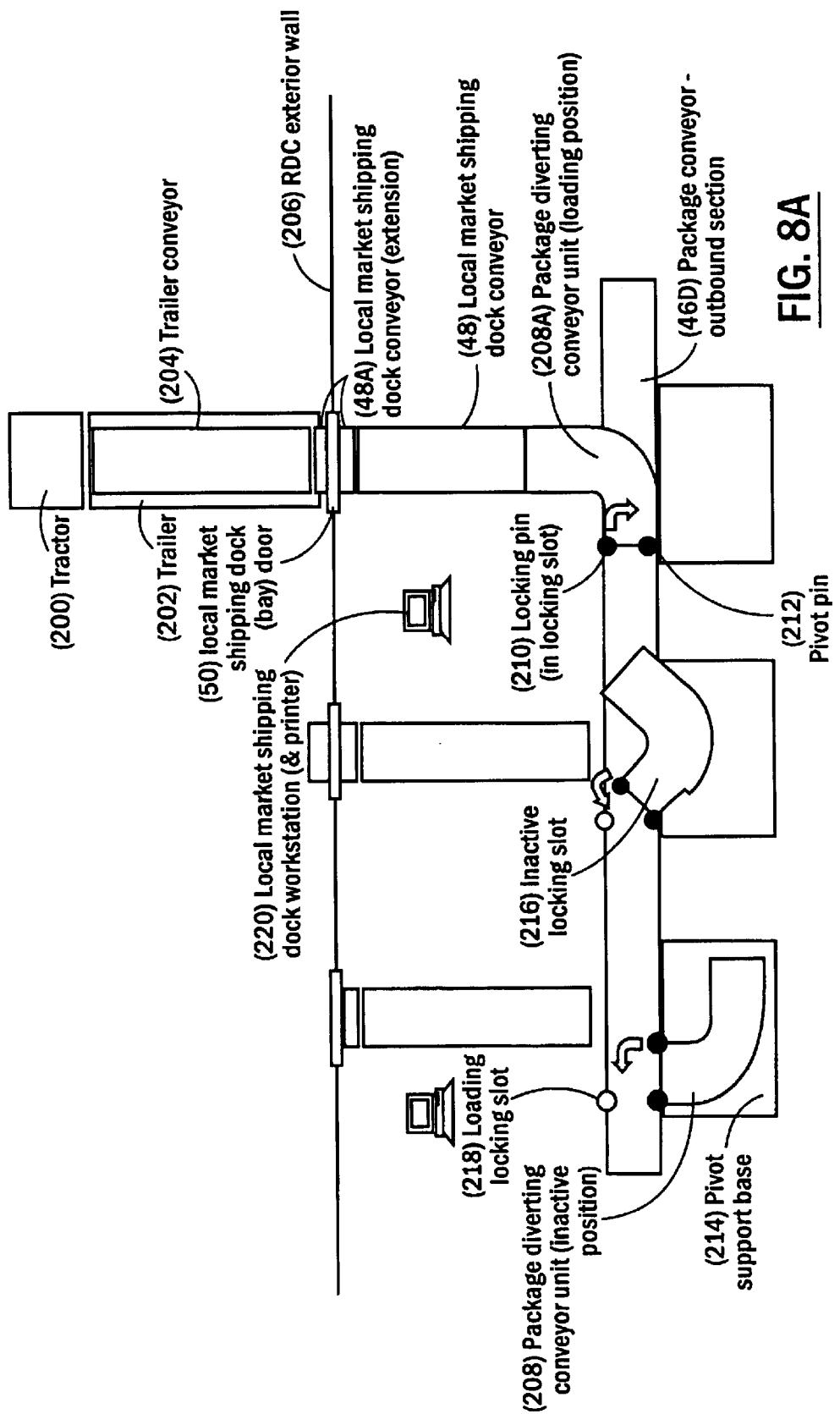

Retailer Shipment table (1212)

| Retailer Shipment Id | Status | ePO Retailer Id | ePO Shipper Id | Origination RDC Id | Retailer Employee Id | Trailer Id | Retailer Shipping Date/Time | Receiving Employee Id | Retailer Shipment Arrival Date/Time |
|---|---|---|---|---|---|---|---|---|---|
| amazo001-080300-001 | in-transit | amazo001 | epd | CH001 | 333-22-4444 | t-detr-4321 | 08-03-00 12:15:35 | 121-34-6565 | 08-03-00 17:25:08 |

Retailer Shipment Receiving table (1214)

| Retailer Shipment Id | Status | Employee Id | Trailer Id | ePO Shipper Id |
|---|---|---|---|---|
| amazo001-080300-001 | replicated | 121-34-6565 | t-detr-4321 | epd |

RDC Shipment table

| RDC Shipment Id | Status | ePO Shipper Id | Origination RDC Id | RDC Shipment Dock Id | RDC Shipment Prep Date/Time | RDC Shipment Trailer | RDC Shipment Train Date/Time | RDC Shipment Arrival Date/Time | Destination RDC Id | Employee Id #1 | Employee Id #2 | Employee Id #3 | Employee Id #4 | Employee Id #5 | Trailer Loading Employee Id | Train Loading Employee Id | Receiving Employee Id | Trailer Id | Carrier Id |
|---|---|---|---|---|---|---|---|---|---|---|---|---|---|---|---|---|---|---|---|
| CH001-080300-00081 | received | epd | CH001 | CH001-R01 | 08-03-00 22:21:35 | | 08-04-00 07:01:43 | 08-04-00 12:30:39 | AT001 | 333-22-4441 | 333-22-4441 | 333-22-4443 | | | 333-22-4442 | 220-22-0002 | 454-66-7887 | nwb99-1234 | rai-12345 |

(1216)

RDC Shipment Receiving table

| RDC Shipment Id | Status | ePO Shipper Id | Origination RDC Id | Destination RDC Id | Trailer Id | Receiving Employee Id | Case Id |
|---|---|---|---|---|---|---|---|
| CH001-080300-00081 | new | epd | CH001 | AT001 | nwb9-1234 | 454-66-7887 | amazo001-080300-12345 |

(1218)

Local Market Case Inventory List data view (1220)

| ePO Retailer ID | SKU | Quantity (Needed) |
|---|---|---|
| amazo001 | 0123456789 / 01234567 | 80 | store

Local Market Order data view (1222)

| ePO Retailer ID | SKU | Quantity |
|---|---|---|
| amazo001 | 0123456789 / 01234567 | 48 | store

CDC Order List data view (1224)

| ePO Retailer ID | SKU | Quantity (Needed) |
|---|---|---|
| sfltr-019 | 0123456789 / 01234567 | 8 |

1250 — SKU table

| SKU | Status | Standard Case Quantity | SKU Size | Temperature Code | Product Description |
|---|---|---|---|---|---|
| 0123456789123456 7 | active | 20 | small | standard | Miami Hurricanes baseball cap |

CDC table

| CDC Id | Status | CDC Description | Local Market Id | Type | ODC Server Connection Script | Address 1 | Address 2 | City | State | Zip | Primary Contact Number | Secondary Contact Number | Temp Code Reservation Override |
|---|---|---|---|---|---|---|---|---|---|---|---|---|---|
| sfor-019 | active | Commercial Blvd Location | sfor | CDC | "connection string" | 1510 E Commercial Blvd | | Fort Lauderdale | FL | 33333 | 954-321-4321 | 954-987-9876 | 40 |

1252 / Zip Code CDC table

| CDC #1 | Distance | CDC #2 | Distance #2 | CDC #3 | Distance #3 | CDC #4 | Distance #4 | CDC #5 | Distance #5 |
|---|---|---|---|---|---|---|---|---|---|
| Zip | | | | | | | | | |
| 33333 sfor-019 | 0 | sfor-018 | 5 | sfor-020 | 5 | sfor-021 | 10 | sfor-017 | 11 |

1254 — Customer table

| Customer Id | PIN | Last Name | First Name | CDC Preference | Previous CDC | Zip Code | Primary Contact Type | Primary Contact Number/Address | Primary Contact Frequency | Primary Calling Window Start Time | Primary Calling Window End Time | Secondary Contact Type | Secondary Contact Number/Address | Secondary Contact Frequency | Secondary Calling Window Start | Secondary Calling Window End Time | Dual Notification Indicator | ePD Account Balance |
|---|---|---|---|---|---|---|---|---|---|---|---|---|---|---|---|---|---|---|
| 9876 | 123-45-6789 | Seinfeld | Jerome | sfor-019 | sfor-019 | 33333 | phone | 954-565-4444 | 24 | 8:00 | 21:00 | e-mail | jerome@ initialracing.com | | | | yes | 0 |

1256 — RDC table

| RDC Id | Status | RDC Server Connection Script | Address 1 | Address 2 | City | State | Zip |
|---|---|---|---|---|---|---|---|
| ATI01 | active | "connection string" | 1700 W. Dolphin St. | | Atlanta | GA | 22314 |

1258 — Shipper table / Packing Material

| ePD Shipper Id | Status |
|---|---|
| epd | active |

1262 — Counter table / Restocking

| CDC Id | Time | Quantity |
|---|---|---|
| sfor-019 | cargo cafe | 5 |

1264 — Market table / RDC-Local

| RDC Id | Local Market Id |
|---|---|
| ATI01 | epd |

Item Return Header table

| Item Return Id | Status | ePD Shipper Id | Customer Id | | | CDC Id | ePD Retailer Id | RDC Id | Returns Local Market Id | Item Return Creation Date/Time | CDC Reverse Shipment Id | Original Order Delivery Type | Original Order CDC Id | RDC Shipment Id | RDC Returns Shipment Id | Item Return Retailer Receipt Date/Time |
|---|---|---|---|---|---|---|---|---|---|---|---|---|---|---|---|---|
| amazon001-183623085-122800-IR001 | in CDC | epd | 183-52-3865 | | | sfbr-019 | amazon001 | CH001 | ncalf | 12-06-00 8:11:19 | sfbr-019-120600-RS001 | ePD | sfbr-019 | CH001-120600-000001 | CH001-amazon001-120700-0001 | 12-07-00 13:26:03 |

Item Return Detail table — 1266

| Item Return Id | SKU | Package Id | Order Id | Return Quantity | Return Reason Code | Return Reason Comment | Retailer Order Number | Order Date/Time |
|---|---|---|---|---|---|---|---|---|
| amazon001-183623085-122800-IR001 | 0123456789-012345678 | 111221234-AT001-120400-001 | amazon001-183623085-120400-001 | 2 | | item was the wrong size | 9876543211 | 12-03-00 14:23:02 |

1268

CDC Outbound Package table

| CDC Outbound Package | Status | ePD Shipper Id | Shipping Customer Id | Delivery Type | Origination CDC Id | Recipient Customer Id | Destination CDC Id | RDC Id | Local Market Id | Temperature Code | Weight | Cost | Delivery Name | Delivery Address 1 | Delivery Address 2 | Delivery City | Delivery State | Delivery Zip |
|---|---|---|---|---|---|---|---|---|---|---|---|---|---|---|---|---|---|---|
| 88822424-4-sfbr-019-080400-001 | in origination CDC | epd | 111-22-1234 | ePD | sfbr-019 | | 888-22-4244 | ncalf-005 | AT001 | standard | 5.75 | $3.00 | | | | | | |

1270

CDC Outbound Package table (continued)

| Payment Method | Payment Card Number | Payment Authorization | Payment Reverse Shipment ID | RDC Shipment Id | Package Size | Delivery Shipment Id | Delivery Date/Time | Notification Date/Time | Pickup Date/Time |
|---|---|---|---|---|---|---|---|---|---|
| credit card | 2345424346 4234566000 | 79876756 | sfbr-019-120600-RS001 | CH001-120600-000001 | 1 | CH001-001-080500 | | 12/12/2000 8:10:56 PM | 12/13/2000 5:54:25 PM |

CDC Reverse Shipment table — 1274

| CDC Reverse Shipment Id | Status | CDC Id | ePD Shipper Id | Origination RDC Id | Shipment Creation Employee Id | Loading Employee Id | Trailer Id | CDC Reverse Shipment Date/Time | Receiving Employee Id | CDC Reverse Shipment Arrival Date/Time |
|---|---|---|---|---|---|---|---|---|---|---|
| sfbr-019-120600-RS001 | in-transit | sfbr-019 | epd | CH001 | 333-22-4444 | 444-33-5555 | l-4stm-4321 | 12-06-00 12:15:35 | 121-34-6565 | 12-06-00 17:25:08 |

Configuration Adjustments Log table — 1306

| Configuration Adjustment Id | Configuration Type | Bin Id 1 | Bin Id 2 | Bin Id 3 | Bin Id 4 | Configuration Code 1 | Configuration Code 2 | Configuration Code 3 | Configuration Code 4 | Employee Id | Configuration Date/Time |
|---|---|---|---|---|---|---|---|---|---|---|---|
| A01-01-0234-121300 | dividing | A01-01-0234 | | | | 2 | 34 | | | 103-62-3085 | 12/13/2000 6:59:17 PM |

High-availability Bins data view — 1307

| SBU Id | Temperature Code | Available Quantity |
|---|---|---|
| A01 | standard | 32 |

Employee table — 1308

| Employee Id | Local Market Id | Shipper Id |
|---|---|---|
| 432-47-0926 | | ecd |

Notification on Check table — 1310

| Customer Id |
|---|
| 12345-6789 |

Master Bin by Movement table (c) — 1316

| Load Position Master Bin Id | Master Bin After Movement 0 | Master Bin After Movement 1 | Master Bin After Movement 1 | Master Bin After Movement 2 | Master Bin After Movement 2 | ... | Master Bin After Movement (t) |
|---|---|---|---|---|---|---|---|
| 16 | 16 | 15 | 17 | 14 | 18 | ... | b1 |

CDC Outbound Package Cost Calculation table — 1317

| Shipper Id | Origination CDC Id | Destination CDC Id | Starting Weight Range | Ending Weight Range | Package Size | Cost |
|---|---|---|---|---|---|---|
| cdn1 | shfw-019 | ncash-005 | . | 0 | 3 | 1 | $3.00 |

Application listing

|  | Application Name | Application Server(s) |
|---|---|---|
|  | ePD Billing and Maintenance Application | Corporate |
|  | ePD Shipping Application | Retailer, RDC |
|  | ePD Delivery Application | RDC, CDC |
|  | ePD SBU Application | CDC |

Program listing

| Ref # | Program Name | Application |
|---|---|---|
| (310) | Pick List Report Program | ePD Shipping Application (retailer's instance) |
| (311) | Receive RDC Returns Shipment Data | ePD Shipping Application (retailer's instance) |
| (312) | Retailer Shipment Program | ePD Shipping Application (retailer's instance) |
| (313) | Receive RDC Returns Shipment Program | ePD Shipping Application (retailer's instance) |
| (314) | Retailer Shipment Adjustments Program | ePD Shipping Application (retailer's instance) |
| (315) | Retailer Package Creation Program | ePD Shipping Application (retailer's instance) |
| (316) | Receive Retailer Shipment Program | ePD Shipping Application (shipper's instance, origination RDC) |
| (317) | Receive RDC Reverse Shipment Data Program | ePD Shipping Application (shipper's instance, destination RDC) |
| (318) | RDC Shipment Program | ePD Shipping Application (shipper's instance, origination RDC) |
| (319) | Receive RDC Reverse Shipment Program | ePD Shipping Application (shipper's instance, destination RDC) |
| (320) | RDC Shipment Loading Program | ePD Shipping Application (shipper's instance, origination RDC) |
| (322) | Train Loading Program | ePD Shipping Application (shipper's instance, origination RDC) |
| (324) | Receive RDC Shipment Program | ePD Shipping Application (shipper's instance, destination RDC) |
| (326) | Local Market Sort Program | ePD Shipping Application (shipper's instance, destination RDC) |
| (328) | CDC Sort Program | ePD Shipping Application (shipper's instance, destination RDC) |
| (330) | Package Creation Program | ePD Delivery Application (shipper's instance, destination RDC) |
| (332) | Packing List Report Program | ePD Delivery Application (shipper's instance, destination RDC) |
| (334) | RDC Package Inspection Report Program | ePD Delivery Application (shipper's instance, destination RDC) |
| (336) | CDC Package Inspection Report Program | ePD Delivery Application (shipper's instance, destination RDC) |
| (338) | Packing Adjustment Program | ePD Delivery Application (shipper's instance, destination RDC) |
| (340) | Delivery Shipment Creation Program | ePD Delivery Application (shipper's instance, destination RDC) |

FIG. 11A

| Ref # | Program Name | Application |
|---|---|---|
| (341) | RDC Returns Shipment Creation Program | ePD Delivery Application (shipper's instance, destination RDC) |
| (342) | Delivery Shipment Program | ePD Delivery Application (shipper's instance, destination RDC) |
| (343) | RDC Returns Shipment Data Transfer Program | ePD Delivery Application (shipper's instance, destination RDC) |
| (344) | Configuration Adjustments Report Program | ePD Delivery Application (shipper's instance, destination RDC) |
| (345) | Shipment Adjustments Report Program | ePD Delivery Application (shipper's instance, destination RDC) |
| (346) | Packing Materials Supply Program | ePD Delivery Application (shipper's instance, destination RDC) |
| (347) | Notification Update Program | ePD Delivery Application (shipper's instance, destination RDC) |
| (348) | Pickup Update Program | ePD Delivery Application (shipper's instance, destination RDC) |
| (349) | Billing Program | ePD Delivery Application (shipper's instance, destination RDC) |
| (350) | CDC Package Adjustment Program | ePD SBU Application |
| (352) | SBU Configuration Program | ePD SBU Application |
| (354) | Loading Guide Report Program | ePD SBU Application |
| (356) | Loading Program | ePD SBU Application |
| (358) | New Package Notification Program | ePD SBU Application |
| (360) | Notification Program | ePD SBU Application |
| (362) | Auto-Call Program | ePD SBU Application |
| (364) | Auto-e-mail Program | ePD SBU Application |
| (366) | E-mail Error Checking Program | ePD SBU Application |
| (368) | Package Location Report Program | ePD SBU Application |
| (370) | Unloading Program | ePD SBU Application |
| (372) | Bin Positioning Program | ePD SBU Application |
| (374) | Re-open Program | ePD SBU Application |
| (376) | Quick Code Reset Program | ePD SBU Application |
| (378) | CDC Returns Program | ePD SBU Application |
| (380) | CDC Outbound Package Creation Program | ePD SBU Application |
| (382) | CDC Reverse Shipment Creation Program | ePD SBU Application |
| (384) | CDC Reverse Shipment Program | ePD SBU Application |
| (386) | CDC Reverse Shipment Maintenance Program | ePD SBU Application |
| (388) | RDC Returns Shipment Update Program | ePD Delivery Application (shipper's instance, destination RDC) |

FIG. 11B

SmartBin Unit (front external view)

METHOD AND APPARATUS FOR EFFICIENT PACKAGE DELIVERY AND STORAGE

BACKGROUND OF THE INVENTION

1. Field of the Invention

The invention pertains to the general field of storage and delivery of ordered items. More particularly, the invention pertains to an efficient method for handling the bulk delivery of articles from a depot into an automated article storage and retrieval system at a centralized article pickup location.

2. Description of the Related Art

The Internet has provided tremendous opportunities for the sales of products in the retail business. Consumers can easily go online using a computer, personal digital assistant (PDA), or even a cellular phone, and readily access a plethora of web sites that offer a wide range of products. Notwithstanding the fact that online businesses can offer lower prices to consumers because of lower overhead costs, consumers and retailers can be disadvantaged by the cost associated with shipping and handling. For example, the effective cost of ordering a bottle of shampoo and a toothbrush which might cost $4.00 could be $9.00 due to the cost of shipping and handling. As a result of the added cost of shipping and handling, it is currently impractical to order low cost items unless the cost of shipping and handling can be significantly reduced. Even for higher priced items, the shipping and handling costs associated with each order can be tolerable for an occasional purchase, but are prohibitive when added up across the frequency of purchase a consumer normally makes.

In order to reduce the cost of shipping and handling, more efficient methods and systems of delivery are required. In current delivery methods and systems, ordered items may be picked at a retailer's fulfillment site in batches, but each order is handled in a singular manner. A recipient of a product may place an order to a retailer. The retailer accepts the order, packages the ordered item and then ships the package along with other packages via a package delivery service. Once the package delivery service picks up the package from the retailer, the package is usually taken to an initial distribution center where it is sorted according to the destination address of the recipient. It will then be shipped by air, land or sea to one or more distribution centers where it is resorted every time. Once the package reaches the distribution center that services the recipient locale, the package will be transported on a delivery truck, along with other packages to be delivered in that local area, to the customer-specified address of each package on the delivery truck, until the delivery truck reaches the customer-specified address of the recipient's package for final delivery.

Inherent in these delivery and handling processes are numerous inefficiencies that in the end, result in increased cost. Firstly, the packages of ordered items are packed inefficiently for the entire distance that they are transported. This is due to the nature of trying to pack items of different shapes and sizes into a box or container that is large enough to hold all the items, with added packing materials to prevent the differently shaped items from damaging each other during transport. Secondly, packages are moved from cargo-carrying vehicles and packages sorting facilities a numerous amount of times as packages are distributed. The packages are moved from a delivery vehicle to a facility and vice-versa. At each point that a package changes hands when being routed through a package shipper's distribution network, it is resorted and grouped with other packages to fit onto the next cargo-carrying vehicle. This translates to an increased shipping and handling cost. Thirdly, each package delivered to its final distribution center has to be carried on an individual basis to the recipient's delivery address. The packages are delivered to recipient addresses on smaller cargo-carrying vehicles and can only be delivered during reasonably acceptable business hours. If the recipient is not available at the time of the attempted delivery, a package may either be left outside of a recipient's home where it is susceptible to theft, mischief, or weather damage, or it may remain undelivered until a further delivery attempt is made. The shipping cost is further compounded in instances where several attempts have to be made to finalize the delivery.

Analysts have predicted that the buying habits of mainstream consumers will change, in the near future, to one that is heavily dependent on the Internet. In addition to the inefficiencies described above, if and when this growth occurs, the current delivery methods and infrastructure will be vastly inadequate to accommodate this growth.

Given these inefficiencies, there exists a need to achieve more efficient methods and systems for delivering packages.

SUMMARY OF THE INVENTION

The invention discloses a method and system for efficient bulk package delivery for recipients. The method for efficient bulk package delivery for recipients can include the steps of delivering the packages in bulk for a plurality of recipients in a single delivery stop to a destination centralized pickup location and loading the bulk delivered packages randomly into an automated system of storage locker bins. The step of delivering the packages in bulk for a plurality of recipients can further include, delivering items destined for recipients of the packages. The step of delivering the packages in bulk can include the step of sorting at an central location, for example an origination regional distribution center (RDC), items received from a plurality of retailers delivered to the origination RDC location, the items being organized by a common item identifier and destined for a plurality of recipients.

The step of sorting the received items at the origination RDC location can be further comprised of the steps of identifying the received items based on their destination centralized pickup location, or their destination local distribution hub. Additionally, the received items can be identified to a destination RDC location. The identified items which are organized by a common item identifier can be sorted and grouped based on the identified destination RDC.

In one aspect of the invention, the step of delivering packages in bulk can include transporting the sorted and grouped items to the identified destination RDC, sorting the transported items by either the destination centralized pickup location or a destination local distribution hub, and creating the bulk delivered package by organizing the sorted items for a specific recipient. The sorted items can be sorted by either a destination centralized pickup location or a destination local distribution hub. The created bulk delivered package having items organized for a specific recipient can then be transported in bulk to the destination centralized pickup location selected when the customer placed the order or to the destination local distribution hub serving the area in which the customer specified address is located, if a customer specified address was entered.

In a further aspect of the invention, the step of creating the bulk delivered package at the destination RDC location can further include locating items destined to a specific recipient from items organized by the common item identifier. The method can further include consolidating items originating from more than one retailer, destined to the specific recipient. The method can further include receiving the located items associated with a single order from more than one fulfillment location, the fulfillment location being at least one of a retailer, a manufacturer, a merchant and a supplier.

The step of randomly loading the bulk delivered package into an automated system of storage locker bins can further include capturing electronically, an identifier for the bulk delivered package, and associating the electronically captured identifier of the bulk delivered package with an electronically captured identifier of one of the storage locker bins within the automated system of storage locker bins. The bulk delivered package created for a specific recipient can be retrieved from a storage locker bin. Suitable electronics and circuitry can be used to facilitate authenticating an identity of the recipient prior to revealing the identity of the storage locker bin and/or providing access to that storage locker bin.

In a further aspect of the invention, the method for efficient bulk package delivery can further include creating a returns package having one or more items from either the bulk delivered package retrieved by a recipient and or packages delivered to a customer specified address, wherein the returns package can be destined for a retailer associated with the items of the returns package. Sorted and grouped created returns packages can be delivered in bulk to returns facility of the associated retailer. The invention can further include submitting the returns package for pickup at a destination centralized pickup location.

A further aspect of the invention can include creating a returns package that can consist of at least one item from either a bulk delivered package retrieved by a recipient and a package delivered to a customer specified address, the returns package destined for the retailer associated with the items of the returns package. A returns facility identifier and a returns local market identifier can be identified based upon an identifier of the retailer. An origination RDC identifier associated with the identified returns local market identifier can also be identified. The returns package can be submitted for pickup at a destination centralized pickup location. The submitted returns package can be transported from the destination centralized pickup location of the returns package submission, to a destination RDC associated with the destination centralized pickup location of returns package submission. At the associated destination RDC, the transported returns package can be sorted and grouped by the RDC identifier associated with the returns local market identifier identified for the returns package for bulk delivery to an origination RDC associated with the identified RDC identifier. The sorted and grouped returns package can be transported from the associated destination RDC to the associated origination RDC. At the associated origination RDC, the transported returns package can be sorted by the identified returns local market identifier of the returns package. At the associated origination RDC, the sorted returns package can be sorted and grouped according to the identified returns facility identifier of the sorted returns package for bulk delivery to a returns facility associated with the returns facility identifier. The sorted and grouped returns package can be delivered to the associated returns facility.

In a further aspect of the invention, the step of randomly loading the bulk delivered package into the automated system of storage locker bins can include automatically triggering the dispatch of an electronic notification to the recipient of the bulk delivered package, the electronic notification having at least an identifier of the destination centralized pickup location. Suitable electronic circuitry and software can be used to facilitate the triggering and dispatch functions.

The step of automatically triggering the dispatch of the electronic notification can further include recording information necessary for billing at least one of the retailer shipping the ordered items of the bulk delivered package, a customer who ordered the item of the bulk delivered package, and the recipient of the bulk delivered package. The information can include at least one of an order identifier, an ordering customer identifier, a recipient identifier or a customer identifier, a package identifier, a delivery date, a delivery time, a delivery notification date, a delivery notification time, a retrieval date and a retrieval time, or any combination thereof. The electronic notification to the recipient can be a facsimile, an email, a telephone call, and a page or any combination thereof.

In a further aspect of the invention, the delivery method can further include retrieving the bulk delivered package by the recipient through self-service. Prior to retrieval, the package must be delivered and loaded into the storage bin. The step of loading the bulk delivered package randomly into the automated system of configurable storage locker bins can include the step of loading the bulk delivered package into any unoccupied storage locker bin within the automated system of configurable storage locker bins, having dimensions that are large enough to accept the bulk delivered package. The temperature within the bins of the automated system of storage locker bins can also be controlled by locating the bins in a temperature-controlled environment.

The step of delivering the package in bulk to a destination centralized pickup location can further include accommodating the delivery of the package in bulk to the destination centralized pickup location from a plurality of different shippers. The loading of the bulk delivered package randomly into the automated system of storage locker bins can further include accommodating the loading of the delivered package into the automated system of storage locker bins from a plurality of different shippers.

Alternately, the step of delivering the package in bulk to the destination centralized pickup location can further include, creating the bulk delivered package at a retailer fulfillment site, the bulk delivered package containing at least one ordered item organized for a specific recipient. In a further aspect of the invention, either a specified destination centralized pickup location or a destination local distribution hub can be determined for the bulk delivery of the package. Similarly, a destination RDC for the bulk delivered package can also be determined. The bulk delivered package can then be transported from the retailer fulfillment site to an origination RDC, where the transported bulk delivered package can be sorted and grouped based on its determined destination RDC. The bulk delivered package can be transported from the origination RDC to the determined destination RDC. At the destination RDC, the transported bulk delivered package can then be sorted and grouped for bulk delivery by its previously determined destination centralized pickup location or destination local distribution hub. The bulk delivered package can be delivered to the previously determined pickup location and or the local distribution hub in bulk with the other bulk delivered packages with which it has been grouped.

In another aspect of the invention, the step of delivering the bulk delivered package to the destination centralized pickup location can further include creating the bulk delivered package at a retailer fulfillment site, with the bulk delivered package containing at least one item organized for a specific recipient. The specified destination centralized pickup location or the destination local distribution hub can be determined for the bulk delivery of the created bulk delivered package. Based on the determined specified destination, the bulk delivered packages can be sorted and grouped at the retailer fulfillment site for bulk delivery. The packages can be delivered in bulk from the retailer fulfillment site to the determined specified destination.

The method for efficient bulk package delivery can further include creating a bulk delivered CDC outbound package consisting of at least one item destined for a recipient at a specified destination centralized pickup location or a specified address, submitting the bulk delivered CDC outbound package for pickup at a destination centralized pickup location, and delivering the CDC outbound package in bulk to either the specified destination centralized pickup location or a destination local distribution hub.

In yet another aspect of the invention, the method for efficient package delivery can also include a method for efficient package creation. The method for efficient package creation can include determining either a specified destination centralized pickup location or a destination local distribution hub for delivery of at least one item destined for a recipient. Items can be located for a specific recipient and the specified destination centralized pickup location or the local distribution hub from said items within a destination RDC, with the items being organized by a common item identifier. The located items can be consolidated into a package to be delivered to either the destination centralized pickup location or the destination local distribution hub for a recipient. The located items can originate from one or more retailers.

The method for efficient package creation can further include delivering in bulk items that can be organized by a common item identifier from a retailer to an origination RDC to fill an order destined for the recipient. A destination RDC can be determined for the items based on a predefined relationship between a series of local markets served by a destination RDC and a local market of the determined one of a specified pickup location and a local distribution hub. The items can be transported from the origination RDC to the determined destination RDC.

In yet another aspect of the invention, a method for efficient package creation can include delivering items organized by a common item identifier in bulk from a retailer to an origination RDC to fill an order destined for a recipient. A destination RDC can be determined for the delivered items based upon the destination delivery location of the order destined for the recipient, and the items can be transported from the origination RDC to the destination RDC. At the destination RDC, items destined for a specific recipient can be located from the items organized by a common item identifier, and the located items can be consolidated into a package destined for that recipient. The located items, which can be consolidated into a package for a recipient, can originate from more than one retailer if items for more than one order destined for the recipient have been received into the destination RDC.

In a further embodiment of the invention, a system for efficient bulk package delivery for recipients is disclosed. The system can include a delivery means for delivering of the packages in bulk for recipients by using a single delivery stop to a destination that can be a centralized pickup location and a means for randomly loading bulk delivered packages into an automated system of storage locker bins. The delivery means for delivering of the packages in bulk can include a means for sorting at a RDC location, items received from suppliers, which can include but are not limited to, retailers, manufacturers, wholesalers, and distributors, delivered to the origination RDC location. The items can be destined for recipients and can be organized by a common item identifier or SKU.

The means for sorting the received items at the origination RDC location can include identification means for identifying the received items according to a destination centralized pickup location or a destination local distribution hub, and a destination RDC for the received items. The means for sorting the received items can also include means for sorting and grouping the identified received items by the identified destination RDC, the grouped items being organized by a common item identifier.

The means for delivering the packages in bulk can include a transportation means for shipping sorted and grouped items to the destination RDC, means for sorting at the destination RDC, the received items by either a destination centralized pickup location or a destination local distribution hub. The means for delivering the packages in bulk can also include means for creating at the destination RDC, the bulk delivered package by organizing the items sorted by the destination centralized pickup location or the destination local distribution hub for a specific recipient and a transportation means for shipping the created bulk delivered package to either the destination centralized pickup location or the destination local distribution hub.

In a further aspect of the invention, the means for randomly loading the bulk delivered package into the automated system of storage locker bins can comprise means for capturing electronically, an identifier or SKU for the bulk delivered package and means for associating the electronically captured identifier of the bulk delivered package with an electronically captured identifier of one of the storage locker bins within the automated system of storage locker bins. The means for randomly loading the bulk delivered package into the automated system of storage locker bins can also include suitable electronic circuitry and software for automatically triggering the dispatch of an electronic notification to a recipient of the bulk delivered package. The electronic notification can have at least an identifier of the destination centralized pickup location. The circuitry and associated software can record information necessary for billing customers, retailers, suppliers and or recipients.

BRIEF DESCRIPTION OF THE DRAWINGS

There are presently shown in the drawings embodiments of which are presently preferred, it being understood, however, that the invention is not so limited to the precise arrangements and instrumentalities shown, wherein:

FIG. 8 is a view of an exemplary tractor-trailer parked at an exemplary shipping or receiving dock area.

FIG. 8A is a detailed layout of an exemplary local market shipping dock area within a RDC.

FIG. 9A shows various illustrative embodiments of exemplary tables and data views for the distribution system and method.

FIG. 9B is a continuation of the exemplary data tables and data views of FIG. 9A.

FIG. 9C is a continuation of the exemplary data tables and data views of FIG. 9A.

FIG. 9D is a continuation of the exemplary data tables and data views of FIG. 9A.

FIG. 9E is a continuation of the exemplary data tables and data views of FIG. 9A.

FIG. 9F is a continuation of the exemplary data tables and data views of FIG. 9A.

FIG. 9G is a continuation of the exemplary data tables and data views of FIG. 9A.

FIG. 10A is an illustrative embodiment of exemplary data tables and data views used in conjunction with the automated system of storage locker bins.

FIG. 10B is a continuation of the exemplary data tables and data views of FIG. 10A.

FIG. 10C is a continuation of the exemplary data tables and data views of FIG. A.

FIG. 10D is a continuation of the exemplary data tables and data views of FIG. 10A.

FIG. 11A is a list of exemplary application and programs of the distribution method and system disclosed in FIG. 1.

FIG. 11B is a continuation of the exemplary list of FIG. 11A.

DETAILED DESCRIPTION OF THE INVENTION

Figure 1:
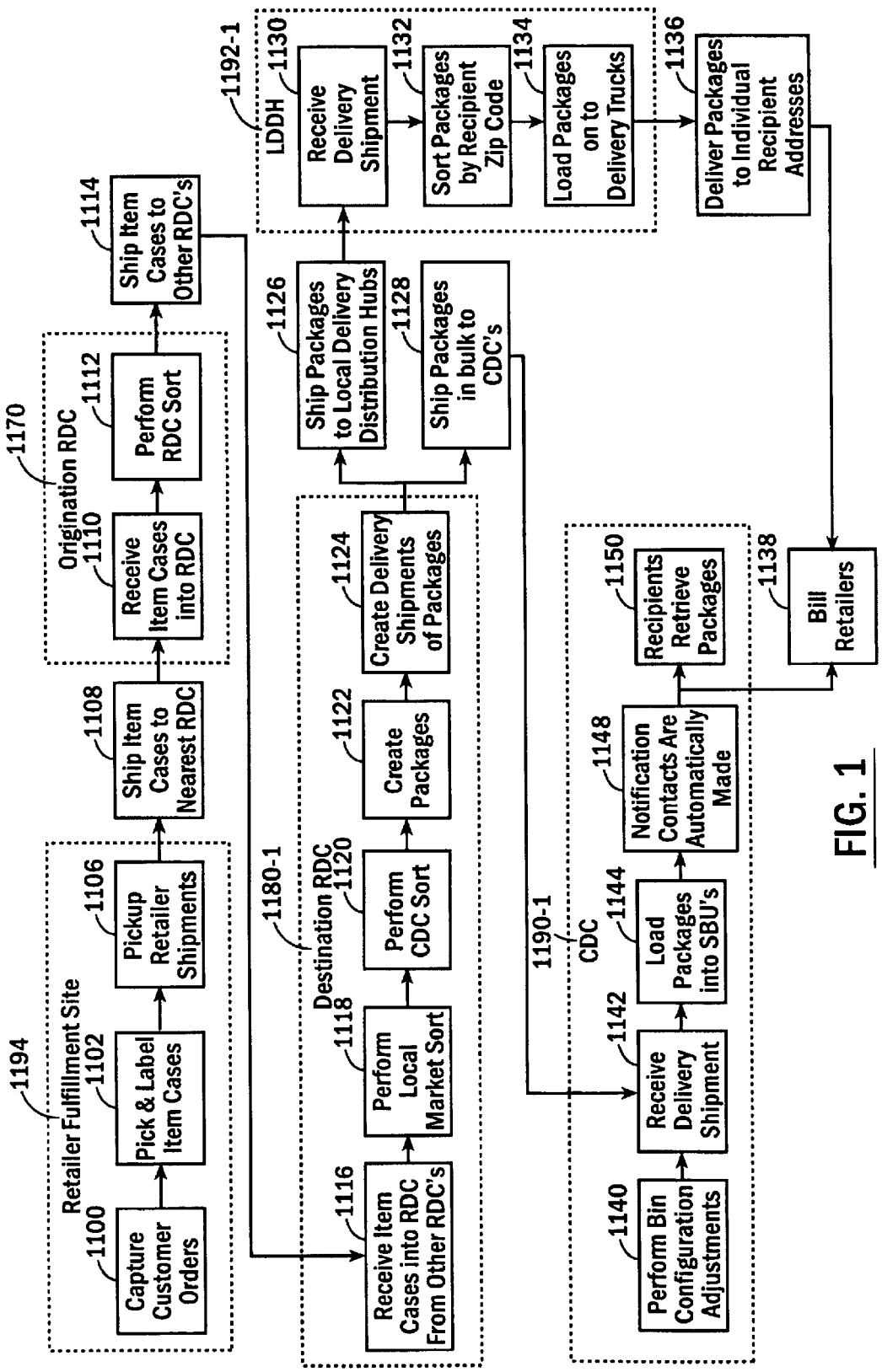
FIG. 1 is an illustrative flow diagram of the processing that occurs at the various distribution centers from the moment of capturing a customer order to the point of a recipient retrieving a delivered package containing the ordered items from a Customer Distribution Center (CDC), wherein the ordered items are distributed through two separate distribution facilities before being delivered to the CDC or a local delivery distribution hub (LDDH)—an origination regional distribution center (RDC) and a destination RDC.

There is shown in FIG. 1, an embodiment of the instant invention depicting illustrative steps that can be used to efficiently deliver packages in bulk, wherein ordered items of that bulk delivered package are processed in two separate distribution facilities before being delivered to a customer distribution center (CDC) or a local delivery distribution hub (LDDH)—an Origination regional distribution center (RDC) and a Destination RDC. Customers can place orders with retailers or manufactures. In step 1100, these orders can be captured by the retailer. Following capture of the orders, in step 1102, retailers can fill the orders by picking cases of the ordered items to meet the total ordered quantity of each item across all unfilled orders. As cases of ordered items get picked from the inventory in their fulfillment operations, the retailer's workers can label each case with a package label. The cases of ordered items can be organized into one or more retailer shipments on shipping docks of a retailer's fulfillment site. In step 1106, the shipments of items prepared by the retailer can be loaded onto a carrier, such as, a tractor-trailer via a system of dock and trailer conveyors. Steps 1100, 1102 and 1106 can be carried out at a retailer fulfillment center 1194.

In step 1108, the cases of items can then be then shipped to the nearest regional distribution center which serves as an origination Regional Distribution Center (RDC) 1170 for all items received from retailers. In step 1110, the cases of shipped items can be received at the origination RDC 1170 and sorted by a RDC identifier (RDC Id) in step 1112. After the items are sorted, they can be shipped in cases to the destination RDC's identified on their case labels, for example RDC 1180-1, as shown in step 1114. The item cases can then be received into a destination RDC as shown in step 1116, where a local market sort can be performed as shown in step 1118. Following the local market sort 1118, a CDC sort, step 1120, can be performed at the destination RDC 1180-1. This sorting leads to the creation of packages, step 1122, consisting of items for a common recipient that are destined to be delivered to an identified common customer distribution center (CDC) 1190-1 (FIG. 2) or a common local delivery distribution hub (LDDH) 1192-1. The resulting packages, which are already organized by a CDC identifier (CDC Id), can then be grouped and loaded into special crates in order to create a delivery shipment of packages, step 1124, which can be shipped from the destination RDC 1180-1. The delivery shipment of packages can be shipped in bulk to a local delivery distribution hub (LDDH) 1192-1, step 1126, or to a CDC 1190-1, step 1128. Packages can be shipped to a LDDH 1192-1, whenever the packages are to be delivered to a customer-specified location. Packages can be shipped in bulk to a CDC 1190-1 whenever the recipient can be expected to pickup the package at a destination centralized pickup location (or CDC) 1190-1. If the packages are received into the local delivery distribution hub 1192-1, step 1130, they can be sorted by, for example, recipient zip code, step 1132. The sorted packages can then be loaded onto delivery trucks, step 1134, where they can be delivered to the individual recipient addresses as shown in step 1136. The retailers can then be billed for the orders they shipped, step 1138, following the delivery step 1136. Also shown in FIG. 2, is a customer distribution center (CDC) 1190-4 and a local delivery distribution hub (LDDH) (1192-4).

If the packages are destined to a destination centralized pickup location (or CDC) 1190-1 being served by the destination RDC 1180-1, then, following the shipment step 1128, the packages can be received in bulk at the CDC 1190-1, step 1142. Following the receipt of delivery step 1142, the bulk delivered packages can be loaded into an automated system of storage lockers such as SmartBin units (SBU's), step 1144. The loading step 1144 can trigger automatic notifications of the delivery to the recipients, step 1148. Following the notification step 1148, the retailers can then be billed as shown in step 1138, and the recipients can then retrieve their packages from the automated system of storage lockers, step 1150. Returning to the receipt of delivery shipment step 1142 at the CDC 1190-1, in addition to receiving packages shipped in bulk from the destination RDC 1180-1, step 1142, bin configuration adjustments can be performed, step 1140, prior to step 1142.

Figure 1A:
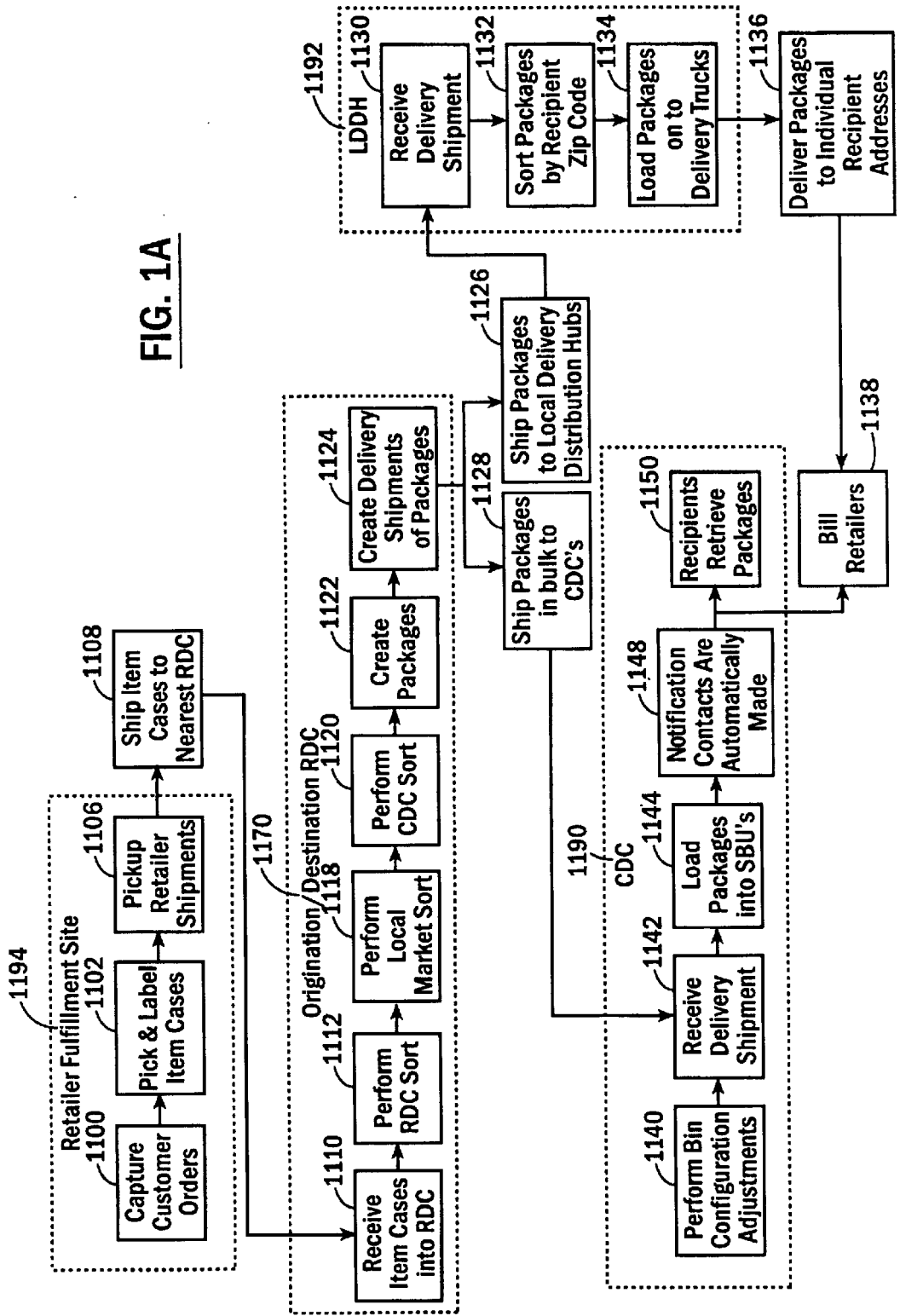
FIG. 1A is an alternate illustrative flow of the embodiment of the processing described in FIG. 1, wherein the ordered items are distributed through only one distribution facility before being delivered to the CDC or LDDH—a RDC which serves as both the origination RDC and the destination RDC for those ordered items.

There is shown in FIG. 1A, a different illustrative example of the embodiment depicted in FIG. 1. The illustrative example shown in FIG. 1A depicts the steps that can be used to efficiently deliver in bulk packages of items, which are ordered from a retailer having a fulfillment site 1194 in a local market served by one of a shipper's RDC's 1170, for delivery to a CDC 1190 or customer specified address located in a local market served by that same RDC 1170. In this illustrative example, the cases of items can be received into an origination RDC 1170 using the same steps as depicted in FIG. 1, steps 1100 through 1110. Some of those cases of items—the ones containing items to be processed into one or more packages to fill orders to be delivered to CDC's 1190 or customer-specified addresses in a local market served by the origination RDC 1170—can be moved into the local market sort step 1118 from the RDC sort step 1112, within the RDC 1170, which serves as both an origination RDC and a destination RDC for those cases of items. The local market sort step 1118 and all the steps that follow it in this illustrative example of the process, steps 1120 to 1150, can be performed in the illustrative example of FIG. 1A consistent with the way they are performed in the illustrative example of FIG. 1.

Figure 2:
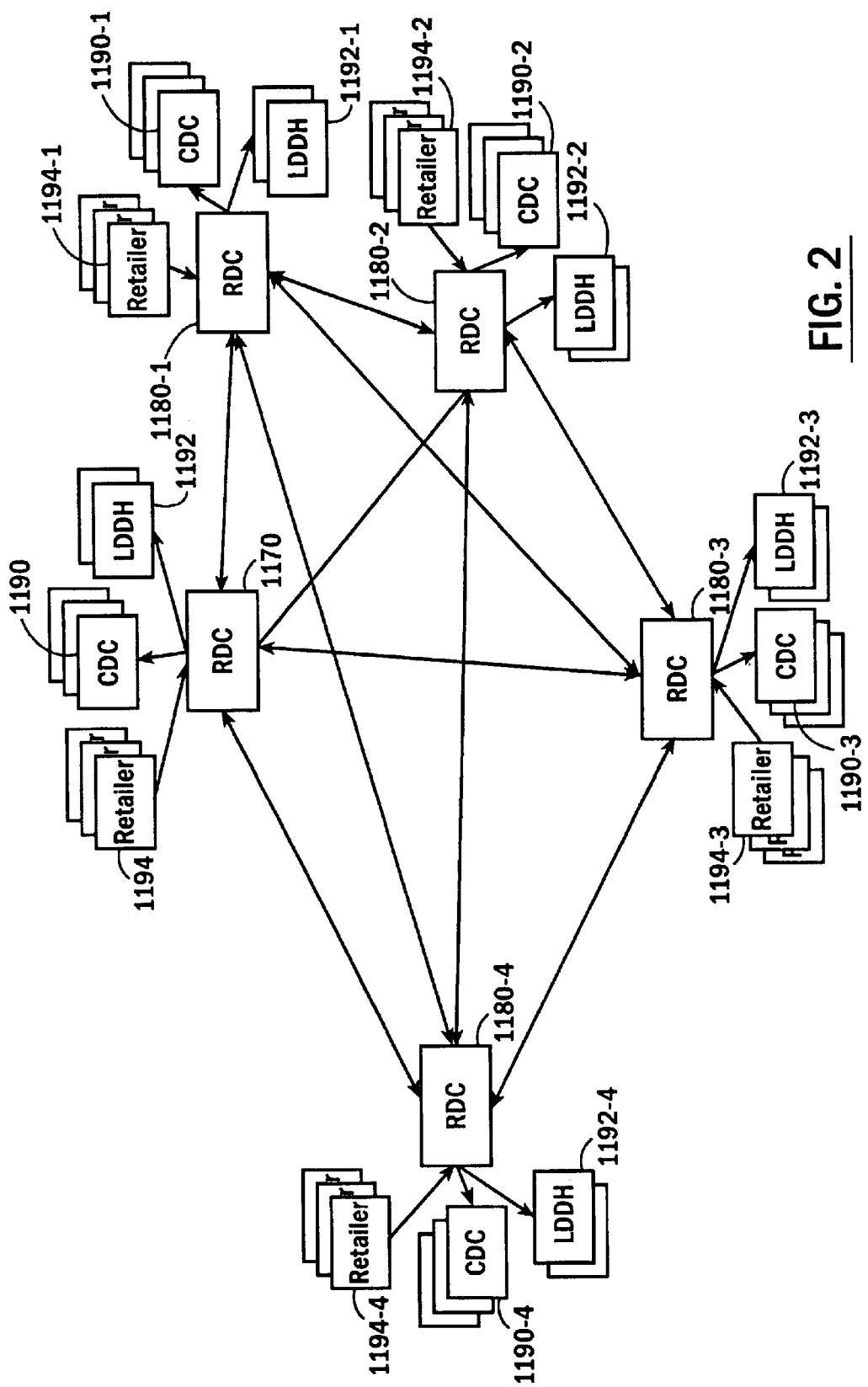
FIG. 2 is an illustrative embodiment of the various exemplary entities of the delivery process and their relative location to each other.

Referring now to FIG. 2, and by way of example, an illustrative delivery process consistent with the principles of the invention is described. The example illustrated by FIG. 2, describes the delivery process from the view point of one shipper, as it depicts the interaction between the different RDC's of one shipper and the interaction of those RDC's with retailer fulfillment sites, CDC's, and LDDH's. Each one of a shipper's RDC's can serve as an origination RDC for cases of items received from retailers, and as a destination RDC for some of those cases received from retailers (as depicted in FIG. 1A) and for cases of items received from other RDC's (as depicted in FIG. 1). For simplicity in referring to an origination RDC and a destination RDC within this illustrative example corresponding to FIG. 2, an origination RDC will be referred to as RDC 1170 and a destination RDC will be referred to as RDC 1180-1. Consistent with the numbering in FIG. 2, CDC's and LDDH's will be referred to as CDC 1190-1 and LDDH 1192-1 respectively when describing CDC's or LDDH's related to a destination RDC. Retailer fulfillment sites related to an origination RDC will be referred to as retailer fulfillment site 1194 in the illustrative example description of FIG. 2. The multiple overlapping shapes behind a retailer fulfillment site 1194-1, CDC 1190-1, and LDDH 1192-1 represent that there can be a plurality of instances of that type of facility related to each RDC facility depicted in FIG. 2. Accordingly, any reference to an entity represented by a numbered multiple overlapping shape can be a reference to any one of the plurality of instances of that type of entity.

The processing steps of the following illustrative example refer to FIG. 1 in addition to FIG. 2 and other figures as stated, except where specifically noted as referring to FIG. 1A. The delivery process can begin with customers placing orders with retailers or manufacturers that can accept orders via the internet, television shopping programs, mail-order catalogs, or any other means of placing an order for delivery. The term "retailer" will be used throughout this disclosure to refer to a retailer, manufacturer or other equivalent business that accepts orders for processing. Furthermore, a retailer may operate more than one order fulfillment site to process orders. If two or more distinct order fulfillment sites can be operated by the same retailer, each one can be identified by a different ePD Retailer Id. Throughout this disclosure each entity identified by an ePD Retailer Id will be referred to as a retailer, even if it is only representing one of a retailer's order fulfillment sites. The customer orders can be captured by the retailer as shown in step 1100. In most situations, customers placing the order can identify themselves as the recipient of that order, but a customer can also place an order for a different recipient. Throughout this disclosure, the entity placing an order will always be referred to as a customer, and the entity receiving (picking up) an order will always be referred to as a recipient, even though the customer and the recipient can be the same entity for many orders. In one aspect of the invention, customers can be given the capability to choose a delivery option. In addition to the existing delivery options that can be currently offered by package shippers (standard delivery and various forms of express delivery), retailers can also offer the more efficient ePackage Depot (ePD) delivery option. The ePD delivery option can typically be priced lower than other delivery options, since it requires the recipient to pickup their order from a customer distribution center (CDC) (or destination centralized pickup location) 1190-1. ePD delivery service may be provided by one or more package shippers or other organizations. A package shipper or other organization providing the ePD delivery service will be referred to throughout this disclosure as a "shipper". A shipper providing the ePD delivery service can also provide the traditional package delivery service of delivering a package to a customer specified address.

Customers who choose the ePD delivery option can enter their ePD customer identification number (Customer Id) and choose the CDC identifier (CDC Id) of a CDC 1190-1 where they want to pick-up their order. Customers who have used the ePD option in the past can be optionally shown (on a web page or be told over the phone) a default destination centralized pickup location (CDC) 1190-1—one that the customer previously provided as a preference or the last CDC 1190-1 they selected if they have not provided a preference. At this point a customer can select the default CDC 1190-1, input a different CDC Id or search for a different suitable CDC 1190-1 by providing appropriate search criteria including, but not limited to a zip code, a city name or a street name. Upon entering the appropriate search criteria, a customer can receive a listing of the nearby CDC locations 1190-1, for example, through a web page or over the phone. As an illustrative example, the listing can have the top five closest CDC locations 1190-1 to the search criteria. CDC's 1190-1 returned from a search can be listed in order from closest to farthest. If city is entered, a complete listing of CDC locations 1190-1 within or near the metro area of the entered city can be given including the full address of those CDC locations 1190-1.

Customers who are new to the ePD Delivery Process can be prompted to provide information necessary to set themselves up as new customers in the ePD Billing & Maintenance application via a linked internet web page or over the phone by a person taking their order who can access the ePD customer setup screen on the internet web page. The ePD Billing & Maintenance application can be a database and a set of programs to capture and maintain data related to customers, recipients, retailers, CDC's, RDC's, and shippers for use in the shipping operations of all ePD shippers. Exemplary information, which can be recorded to set up a customer or a recipient can include, but is not limited to name, social security number, zip code, CDC preference, primary contact phone number/e-mail address, and a secondary contact phone number/e-mail address. The type of contact can be recorded for both primary and secondary contacts. A calling window start time and end time can also be recorded for phone number contacts. Credit card or other payment information does not have to be captured for the ePD customer set up, but can be maintained or recorded by the retailer as part of a customer's order. In one embodiment, shipping costs for ePD delivery can be billed by shippers to retailers based on customer orders. Retailers may in-turn bill their customers for shipping by payment methods they establish with those customers.

In an alternate embodiment of the invention, shippers can bill retailers for each package based on package size instead of a flat shipping fee per order, a fee based upon the number of items in an order, a fee based upon the weight of an order, a fee based upon the value of an order, or a fee based upon other order-based factors. Alternately, shippers can bill the customers placing orders, instead of the retailers accepting those orders. The amount billed can be based upon factors including, but not limited to a flat shipping fee per order, a fee based upon the number of items in an order, a fee based upon the weight of an order, a fee based upon package size, a fee based upon the number of packages in an order, location-based storage rates, and seasonal-based storage rates.

In another aspect of the invention, the entity operating a CDC can charge retailers, shippers, or customers a storage fee for each package or order delivered based upon factors which can include, but are not limited to, the number of SBU bins used to hold the packages of an order, the size of each SBU bin used to hold each package, the amount of time that a package is in a SBU bin after the package recipient was notified of delivery, a flat storage charge per order, a storage charge based upon the value of an order, a flat storage charge per package depending upon package size, location-based storage rates, and seasonal-based storage rates.

With reference to FIG. 9E and FIG. 10B, customer, recipient, CDC, shipper, and employee information can be maintained centrally on the master copies of a Customer table 1256, a CDC table 1252, a Zip Code-CDC table 1254, a Shipper table 1260, and an Employee table 1308 of the ePD Billing & Maintenance Application. Although a recipient can be a different entity than a customer, recipient information can be maintained on the Customer table 1256 and can be required by a retailer when an order is placed for that recipient. Read-only copies of the Customer table 1256, CDC table 1252 and Zip Code-CDC table 1254 can be maintained in the database of each retailer's instance of an ePD Shipping Application by replicating data from the ePD Billing & Maintenance Application's master tables. A different instance of the ePD Shipping Application can be run by each retailer and shipper to facilitate the process of accepting customer orders for both ePD delivery to a CDC 1190-1 and traditional delivery to a customer-specified address and shipping ordered items from retailer fulfillment sites 1194 to shipper origination RDC's 1170. In referring to an "instance" of a program or an application throughout this disclosure, each instance contains the same basic software program or set of software programs, but the programs of each instance can be run against the same database instance or a different database instance and can have different pre-defined program values in a referenced file. Different instances of a database can have the same table and field structures, but different data values. In order to accept and process customer orders, the ePD Shipping Application can be integrated with the different order processing systems used by different retailers. The ePD Shipping Application can be integrated with each order processing system in such a way as to minimize the amount of change to the retailer's system while providing the necessary data and functionality to enable the shipper to use the ePD Shipping Application to support the ePD Delivery Process.

Figure 9A:
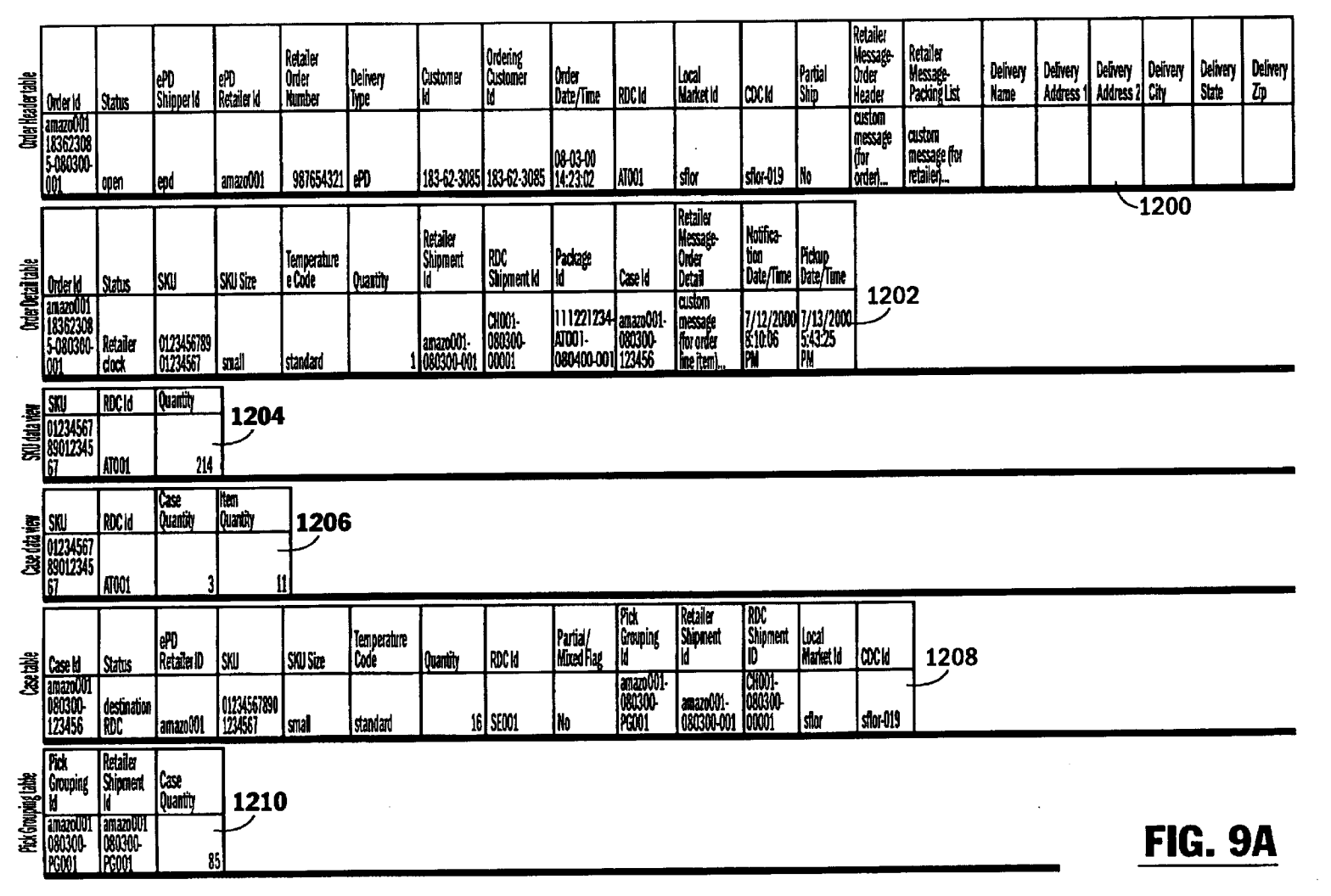

An instance of the ePD Shipping Application can run on a retailer workstation or server computer. Referring to FIG. 9A, Order information can be recorded in an Order Header table 1200 and an Order Detail table 1202 of the ePD Shipping Application as both ePD delivery orders and traditional delivery orders are taken by retailers. Depending upon how the two systems can be integrated, the ePD Shipping Application can either receive order related data directly from customers using a standardized web page front-end user interface of the ePD Shipping Application or indirectly through a back-end data interface from the retailer's order processing application. Order data elements such as the following can be written to the Order Header table 1200 when a customer order is recorded: an Order Identifier (Id), an ePD Retailer Identifier (Id), a Customer Identifier (Id), an Ordering Customer Identifier (Id), an ePD Shipper Identifier (Id), a CDC Identifier (Id), an Order Date/Time, a Retailer Order Number, a Delivery Type, and a Status. Order data elements such as the following, can be written to the Order Detail table 1202 when a customer order is recorded: Order Id, a SKU, a SKU Size, a Temperature Code, a Quantity, and Status. The values written to the following fields can be provided by the customer: Customer Id, Ordering Customer Id, ePD Shipper Id (if the retailer offers a choice of more than one shipper for ePD delivery), Delivery Type, CDC Id, SKU, and Quantity. If a customer places an order with themselves named as the recipient, Customer Id can be set to the value of the Customer Id and Ordering Customer Id can remain empty. If a customer places an order having someone else as a recipient, Customer Id can be set to the recipient's Customer Id value and Ordering Customer Id can be set to the value of the customer's Customer Id. Delivery Type can be a value that can be selected by the customer to define whether an order is for ePD delivery or for traditional delivery to a customer-specified address—the value of Delivery Type for an ePD delivery order can be "ePD" (ePackage Depot), while the value for a traditional delivery order can be "LDDH" (local delivery distribution hub). Other values can be written to the order tables as follows: a unique Order Id can be generated, for example, by concatenating ePD Retailer Id+Customer Id+order date+a 3 digit sequential number (a "sequential number" referred to throughout this disclosure can be generated by selecting the value of the field on the latest record and increasing it by one); ePD Retailer Id can be defaulted to the pre-defined values of that retailer, as configured in the retailer's instance of the application; ePD Shipper Id can also be defaulted to a pre-defined value if the retailer only uses one shipper (it can also be selected by the customer placing the order); Order Date/Time can be set to the current date/time; Retailer Order Number can be generated by the retailer's order processing system; Order Header Status can be set to a value such as "open"; Order Detail Status can be set to a value such as "new"; SKU Size and Temperature Code can be set to the values on the retailer's SKU table 1250 for the SKU selected. Each retailer can have its own instance of the SKU table 1250 in its database, containing SKU's and SKU-related values, which are specific to that retailer. Fields used to record order-specific or line item-specific messages for an order can either be written when an order is taken or when an order is fulfilled. Those message fields can include, but are not limited to, Retailer Message—Order Header and Retailer Message—Packing List on the Order Header table 1200, and Retailer Message—Order Detail on the Order Detail table 1202. Data for the following additional Order Header 1200 fields can also be captured for orders taken by a retailer for traditional delivery: Delivery Name, Delivery Address 1, Delivery Address 2, Delivery City, Delivery State, Delivery Zip.

Orders taken for express delivery to specific addresses are not usually written to the Order Header 1200 and Order Detail 1202 tables of the ePD Shipping Application, but can be handled separately by a different order processing application. Express delivery orders can be captured differently, because they are normally fulfilled differently. Express delivery orders can be usually packed and shipped directly from the retailer's fulfillment warehouse without being sent to an origination RDC 1170. If a shipper does create packages for express delivery orders in a destination RDC 1180-1, however, those orders can be recorded using the Order Header 1200 and Order Detail 1202 tables of the ePD Shipping Application in the same way as traditional delivery orders.

Following step 1100, cases of items can be picked, labeled, and prepared for shipment to fulfill the orders in step 1102. Prior to the scheduled ePD shipment pick-up, retailers can fulfill all of their customer orders that are ready to ship that day, preparing them for shipment. A retailer can pick items in batches at different times throughout the day to prepare the shipment if the shipment proves to be too large to be prepared at one time. There can be several different sorting processes which can be employed in the ePD Delivery Process. In one embodiment of the invention, a case sorting process can be used. The term "case" will be referred to throughout this document to describe a box or other container filled with a standard quantity of a particular SKU of a retailer's product. The word "situation" will be used to describe different occurrences or situations. Some retailers identify their products by SKU (stock keeping unit) numbers, while others may use other item identifiers to identify them. The term "SKU" and common item identifier will be used synonymously throughout this disclosure to refer to all types of item identifiers, but it should readily be understood that the term common item identifier is a more generic term and encompasses SKU. SKU's are well known in the art.

In accordance with this embodiment, a retailer can pick (retrieve from warehouse storage locations) items by total SKU quantity rather than order by order. Unlike the existing Internet retailer order picking methods, the ePD Delivery Process does not require a retailer to sort items into customer orders or even to break cases to fulfill customer orders. This is because items can be shipped out by the caseload to their initial destination, the shipper's origination RDC 1170 (the shipper's nearest RDC to the retailer's fulfillment site 1194). This efficient shipping process can also reduce the amount of packaging materials and available trailer space required for shipment, assuming that same SKU items can be packed together into cases more efficiently than different SKU items can be packed into packages for each customer. The ePD Delivery Process can save retailers labor costs, packing material costs, and can reduce the lead-time needed to prepare shipments.

Retailers can use the ePD Shipping Application to drive the fulfillment sub-process of the ePD Delivery Process. Cases of ordered items can be picked and shipped within the same sub-process for both ePD delivery orders to CDC's 1190-1 and for traditional delivery orders to customer-specified addresses. Orders specified for express delivery to specific addresses may be picked and shipped separately from all other orders depending upon how integrated or separated a shipper's express shipping process is from its ePD delivery and traditional non-express delivery process.

While ePD delivery orders can be delivered to CDC's 1190-1, traditional delivery orders can be delivered to local delivery distribution hubs 1192-1. A local delivery distribution hub (LDDH) 1192-1 can be a facility within a local market which can receive delivery shipments of packages from a destination RDC 1180-1 in much the same way as a CDC 1190-1 can receive delivery shipments of bulk delivered packages from a destination RDC 1180-1. Differences between a LDDH 1192-1 and a CDC 1190-1 can be in the next steps of each one's associated delivery process. The process of delivering individual packages to individual customer specified addresses can involve sorting those packages at a LDDH 1192-1 by zip code-based delivery zones, step 1132, loading those sorted packages onto delivery vehicles, step 1134, and routing those vehicles to have drivers deliver packages individually to specific addresses, step 1136. The steps in the traditional delivery process beyond delivering packages to a LDDH 1192-1 can be consistent with the traditional delivery process and are well known in the art. The details of the steps prior to and including delivering packages to a LDDH 1192-1 are detailed within this disclosure, as they can be similar to and intertwined with the ePD Delivery Process. An LDDH 1192-1 can be by its nature very different than a CDC 1190-1, but because the sub-processes involved in preparing and shipping packages to both CDC's 1190-1 and LDDH's 1192-1 can be the same, both can be identified by a CDC Id.

Retailers can run the ePD Shipping Application's Pick List Report Program (310) to create the report used to guide workers through the fulfillment warehouse to pick cases for shipment to the shipper's nearest origination RDC 1170. The following illustrates an exemplary embodiment that is not intended to limit the scope of the invention. The Pick List Report Program (310) can parse the CDC Id on an Order Header record 1200 to determine a Local Market Id embedded within the CDC Id of that CDC 1190-1. It should be noted that references to a "record" in this disclosure are references to data records in a database table or a data view, unless otherwise noted as data file records or other types of records. The program (310) can use that determined Local Market Id and the ePD Shipper Id on the Order Header record 1200 to select an RDC Id from a RDC-Local Market table 1264, and can update the Order Header record 1200 with the determined Local Market Id and the selected RDC Id. This applies to both delivery orders and traditional delivery orders, as items for both types of orders can be picked and shipped together. Next, the program (310) can select Order Detail records 1202 having Status equal to a value such as "new" or "not in stock" and the RDC Id field from the Order Header records 1200 associated with those Order Detail records 1202. It can then sort and group the order information by SKU and RDC Id to create a data view of the information containing the total quantities of each SKU bound for each destination RDC (for example 1180-1, 1180-2, 1180-3, 1180-4, and 1170)—a SKU data view 1204. Data views, as referred to throughout this disclosure, can be similar in structure and function to a data table, but the data in the fields of a data view can be derived by selecting and manipulating data from fields in one or more data tables. The data in the records of a data view can be dynamic, meaning that it can change as data changes on the tables from which that data view can be derived. The program (310) can then divide the total quantities per SKU-RDC Id combination by the standard case quantity for that SKU, as listed on the SKU table 1250, to create another view of the data listing the total number of cases and items needed per SKU, per RDC—a Case data view 1206. The remainders of the division can be listed as items. For example, if the total quantity of SKU 123456789 bound for RDC Id AA001=60 and the standard quantity per case for SKU 123456789 is 16, then the Case data view would show SKU: 123456789, RDC Id: AA001, Case Quantity: 3, Item Quantity: 12.

The program can use the Case data view 1206 and SKU table 1250 of the ePD Shipping Application and item inventory data from the retailer's inventory management system to create new records on a Case table 1208. The value of a Case Id field on newly created Case records 1208 can be set to a unique alphanumeric descriptor generated for each labeled case, for example, by concatenating ePD Retailer Id+date picked (current date)+a sequential 6 digit number. The ePD Retailer Id on each new Case record 1208 can be set to the value of the current retailer as configured within the retailer's instance of the ePD Shipping Application. The term "current" will be used throughout this disclosure to refer to the particular instance currently being described for data and objects for which there can be multiple instances within the ePD Delivery Process. The program (310) can set Status to a value such as "picked" on each new Case record 1208 it creates. As the program (310) compares the Case data view 1206 against the item inventory data in the retailer's inventory management system the program (310) can create a number of new Case records 1208 equal to the Case Quantity on the Case data view 1206, with each new record having the RDC Id and SKU values on those Case data view records 1206 and a Quantity equal to the Standard Case Quantity on the SKU table 1250 for the current SKU. Where the Item Quantity on a Case data view record 1206 is greater than zero, the program (310) can also create one additional new Case record 1208 having the current RDC Id and SKU of the current Case data view record 1206 and a Quantity equal to the Item Quantity on the current Case data view record 1206. SKU Size and Temperature Code on the new Case records 1208 can be set to the values on the SKU record 1250 corresponding to the SKU on the Case data view record 1206. Partial/Mixed Flag can be set to a value such as "no" on the new Case records 1208 created for the Case Quantity value and can be set to a value such as "yes" for the records 1208 created for the Item Quantity value. The other Case fields can have no value when Case records 1208 are first created.

Figure 9C:
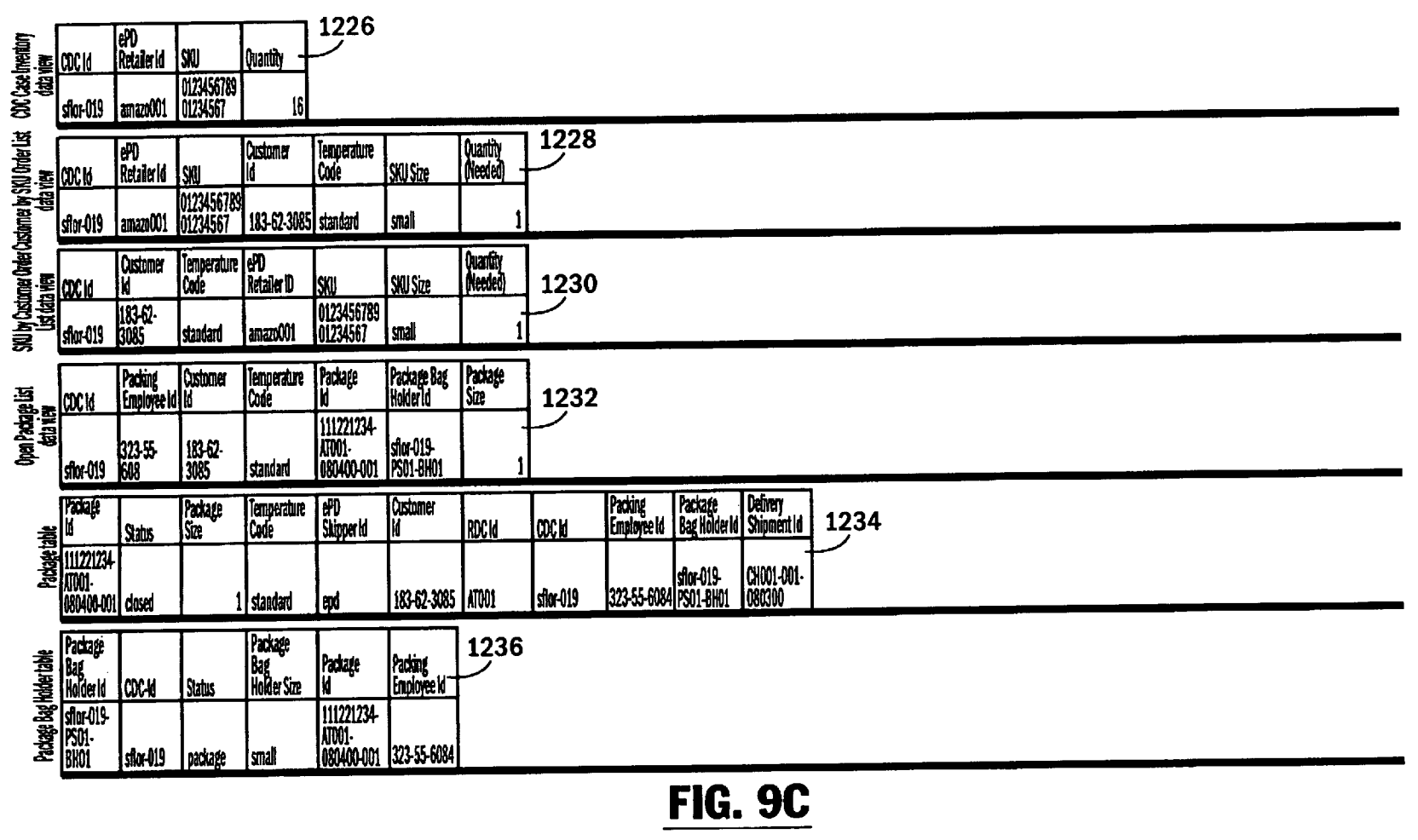
Figure 9D:
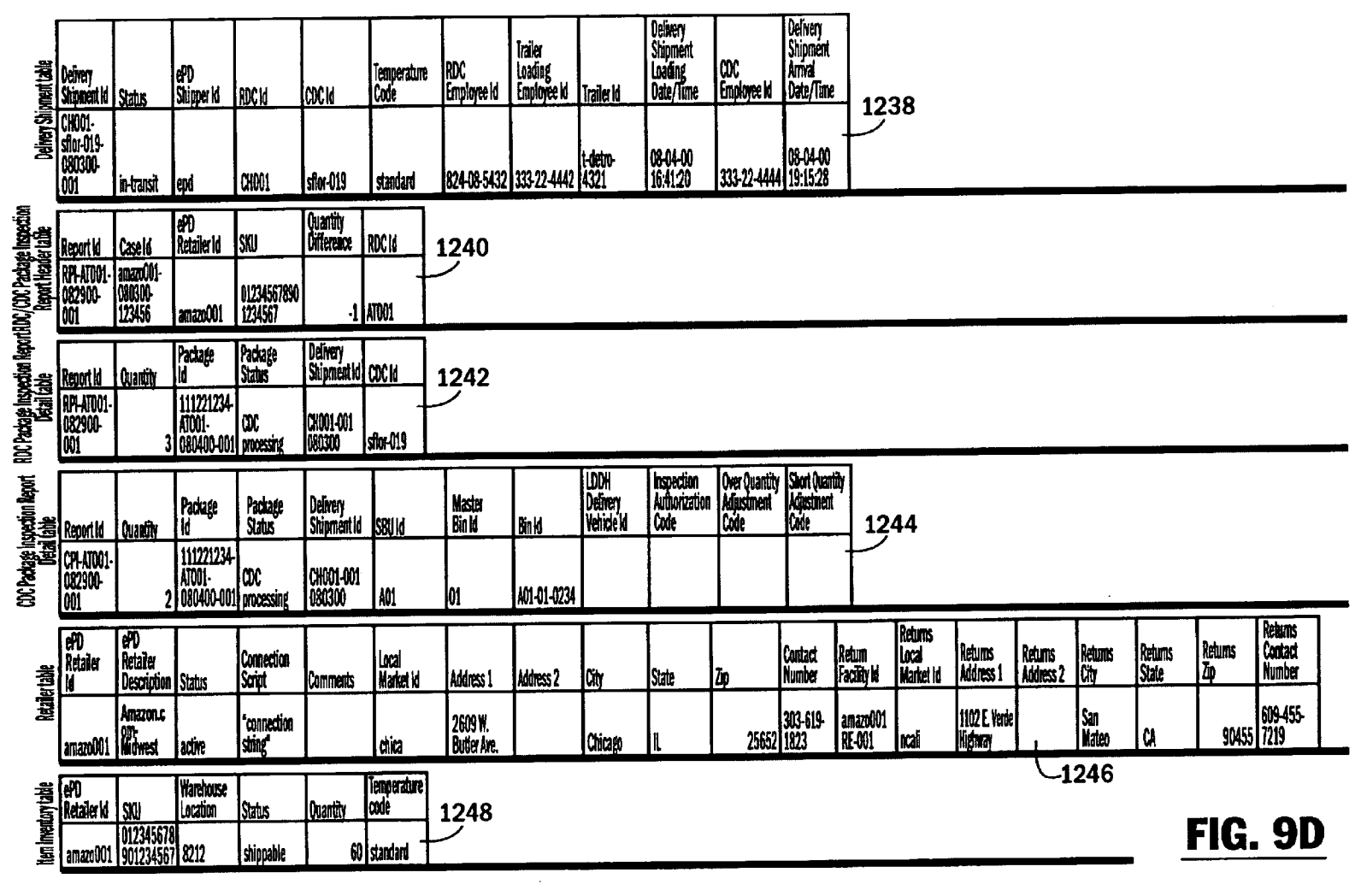

With reference to FIG. 9D, the program (310) may only create new Case records 1208 to meet the item quantities that can be found in stock in a retailer's inventory management system, for example, on the exemplary item inventory table 1248. Different retailers may use different inventory management systems, but the minimum data required for the ePD Delivery Process can be to have fields such as the following, accessible to the ePD Shipping Application: SKU, a Warehouse Location, and Quantity. As the Pick List Report Program (310) creates new Case records 1208, it can also update the Status on the Order Detail records 1202, which underlie the Case data view records 1206 from which the Case records 1208 can be created. A close relationship exists between the Order Detail data and Case data. Both sets of data can refer to the same physical items, and throughout the ePD Delivery Process both sets of records can be updated as the physical cases of items are moved through the different steps of the process. Order Detail Status can be updated to a value such as "pick list—new" or "pick list—back order" on all Order Detail records 1202 having the SKU and RDC Id corresponding to the Case records 1208 being created, up until the total quantity of all the created Case records 1208 for that SKU and RDC Id combination. The value to which Status can be updated can depend upon its previous value. Order Detail records 1202 which previously had a Status value such as "new" can be updated to a value such as "pick list—new", while those which previously had a Status value such as "not in stock" can be updated to a value such as "pick list—back order". Where quantities of an ordered SKU are not available in the retailer's item inventory, the Status on Order Detail records 1202 matching the quantity shortfall can be updated to a value such as "not in stock".

Referring to the prior exemplary embodiment, if the retailer had 60 or more of SKU 123456789 in stock, four records could have been created to hold the data. Each record would have had a unique Case Id. All four records would have had the same ePD Retailer Id, RDC Id, and SKU. The first three records would have had a quantity of 16. The fourth record would have had a quantity of 12. The Status field on all Order Detail records 1202 having SKU=123456789, Status="new" or "not in stock" and a related Order Header record 1200 having RDC Id="AA001" would have been updated to either "pick list—new" or "pick list—back order". If the retailer's inventory management system had showed less than 60 of SKU=123456789 in stock, then new Case records 1208 would have been created up to the total amount in stock and the Status on the underlying Order Detail records 1202 would have been updated to either "pick list—new" or "pick list—back order" only up to the in-stock amount. The program (310) would have attempted to create new Case records 1208 and update Order Detail records 1202 for all ordered items by the sequence in which the RDC Id's are sorted with priority given to the Order Detail records 1202 which already had a Status of "not in stock". Selected Order Detail records 1202 which were not updated to a Status of either "pick list—new" or "pick list—back order" would have been updated to a Status of "not in stock".

After the Case records 1208 get created, the program (310) can read through them to create a Pick List Report for all the new Case records 1208 (new Case records can be identified by selecting Status equal to a value such as "picked"). The Pick List Report can be printed on special pre-sized, peel-off sticker label stock. The report can print one label for each case to be picked, sorted first, for example, by warehouse location, then by SKU, and then by RDC Id. Before printing the report, the program (310) can display the total number of case labels to be printed and prompt the program user to enter the desired number of pick groupings. The user can then enter the number of pick groupings into which the report will be divided. Typically, workers will break the report into pick groupings based upon the number of workers picking items and a reasonable assessment of the amount of items to be picked and tracked together. The program (310) can create a new record on a Pick Grouping table 1210 for each pick grouping it creates. Pick Grouping records 1210 can be created with a Pick Grouping Id formed, for example, by concatenating ePD Retailer Id+date picked (current date)+"PG"+a sequential three digit number. The other fields on the Pick Grouping record 1210 can initially be created without values. The program (310) can then print out the report, for example, forcing a page break on each new pick grouping and printing the Pick Grouping Id in both readable and barcode format at the top of the first page of each pick grouping above the first case label of that pick grouping. The program (310) can also write the Pick Grouping Id value to the Pick Grouping Id field on the Case record 1208 corresponding to each case label printed within that pick grouping. As each Case record 1208 gets updated, the Case Quantity field on the Pick Grouping table can be incremented. The RDC Id printed on a case label is that case's destination RDC 1180-1—the RDC from which that case will be processed into different packages. Initially cases can be shipped to the closest RDC, which can be referred to as the origination RDC 1170. In some situations the origination RDC 1170 can also be the destination RDC 1170 (as depicted in FIG 1A).

Generally a retailer can have one origination RDC 1170 for a particular shipper to which all shipments can be sent. However, if a retailer is located in a market, which is approximately half-way between two or more RDC's of a particular shipper (1170 and 1180-2 for example), that retailer can send shipments for that shipper to more than one origination RDC. This can be done to minimize situations where cases are shipped to an origination RDC 1170 in one direction and then transported from that origination RDC 1170 to a destination RDC 1180-2 in the opposite direction. If a retailer regularly prepares shipments for more than one origination RDC (1170 and 1180-2 continuing with this example), a different customized version of the Pick List Report can be run to create the shipment for each origination RDC (1170 and 1180-2 continuing with this example). Each customized version of the Pick List Report can be configured to select only the order information containing specified RDC Ids. Continuing with the current example, the version of the report used to build retailer shipments sent to origination RDC 1170 could include all items ordered for CDC's or LDDH's associated with origination/destination RDC 1170 and destination RDC 1180-4, and the report used to build retailer shipments sent to origination RDC 1180-2 could include all items ordered for CDC's or LDDH's associated with origination/destination RDC 1180-2, destination RDC 1180-1, and destination RDC 1180-3. Although each Pick List Report can be used to prepare one shipment to one origination RDC (1170 or 1180-2), a shipment of cases picked to go to one origination RDC (1170 for example) may need to be split into two or more shipments, bound for that origination RDC 1170 at different times, depending upon the amount of available trailer space on the tractor-trailers bound for that origination RDC 1170. A retailer shipment can be defined as a group of item cases being shipped from one retailer, to one origination RDC 1170, on one trailer.

Referring to FIG. 8, the term "trailer" (202) refers to the cargo-carrying component of a tractor-trailer, which can be detachable from the tractor (200) having the engine to move the tractor-trailer. References in this disclosure to shipments of cases or packages being transported from one location to another on a trailer (202) or tractor-trailer can also include other non-tractor-trailer vehicles which are suitable to carry cargo, or an intermodal shipping combination using two or more of the following: a tractor-trailer or other suitable cargo carrying vehicle, a locomotive, a maritime vessel, and an airplane.

A Pick List Report can contain all the cases of items that can be needed to fill all open orders at the time it is printed. The Pick List Report can be divided into sections by pick groupings and each worker picking cases of items to fill open orders can be given one or more sections of the report. The Pick List Report can be made up mostly of case labels, with warehouse locations printed to one side of the labels on the report. The warehouse locations of the cases to be picked can guide one or more workers through the warehouse in warehouse location sequence. As a worker arrives at the warehouse location listed on the report, the worker can pick one case matching the SKU on one of the labels on the report. The worker can then peel the label off the report and place it on the side of the picked case. The worker can continue to pick all the cases listed on the report in this manner, location by location, in the sequence listed on the report.

Most of the labels on the report can be for full case quantities, but the report can also have labels for partial case quantities. Partial case labels can be marked, for example, with an asterisk next to the quantity on the label to easily identify a case to which it is affixed as a partial case. There may only be up to one partial case label printed per SKU-RDC Id combination. Workers can open a full or existing partial case to pick the exact number of items listed on a partial case label into an empty picking tote container. Partial case labels do not have to be applied to a case at the time the items get picked, since the case from which the items can be picked can remain in the warehouse location. Partial case items can be grouped together by RDC Id and packed together into boxes or other suitable containers for shipment to the destination RDC identified by each RDC Id. As the partial case items get packed together into mixed-item case boxes, the partial case labels can be peeled off of the report and placed on the boxes in which the picked items corresponding to those partial case labels are packed. Boxes containing partial case items of different SKU's packed together can have more than one label on them, but each label will have the same RDC Id.

Each case label can have a readable description containing the following information: Case Id, RDC Id, SKU, a Product Description, and Quantity. The RDC Id can be printed on the label in larger print to allow for easy identification without close inspection. The Case Id can be printed on the label, for example, in a barcode format, in addition to regular text. A character such as an "S" (for single-item case) can also be printed in large easily readable print, in a distinct area on a case label for a case having a Quantity of "1".

The labeled cases filled with ordered items can be stacked tightly on the retailer's shipping dock conveyor in a manner similar to how boxes would be stacked on pallets. The stacked cases can be grouped on the dock conveyor by pick grouping with the front page of the Pick List Report containing the Pick Grouping Id attached to one of the cases at the front of the grouped stack of cases. The cases can be stacked to make use of space as efficiently as possible without extending beyond the edges of the dock conveyor. For partially filled mixed-item cases, additional packing materials can be used when trying to consolidate the different types of partial case items into mixed-item case boxes.

Turning now to step 1106, tractor-trailers can be used to pickup shipments from retailers. These can include trailers that are empty after having completed deliveries to CDC's 1190 or LDDH's 1192 in the local market in which the retailer's fulfillment site 1194 is located. The tractor-trailers can pick-up shipments from retailer fulfillment sites 1194 in that local market before returning to the origination RDC 1170 where they might be based. Outbound delivery shipments from an RDC 1170 (serving as a destination RDC)

and inbound retailer shipments to that RDC 1170 (the same RDC, serving as an origination RDC) can be coordinated to minimize the need to send empty tractor-trailers from an origination RDC 1170 to retailer fulfillment sites 1194 to pick-up shipments. Empty tractor-trailers can also be sent from the origination RDC 1170 to retailer fulfillment sites 1194, if needed, to ensure shipments get transported to the RDC 1170 in a timely manner. If a retailer's shipment does not fill the scheduled tractor-trailer's available capacity, the tractor-trailer driver can contact the origination RDC 1170 to determine if there are other retailer fulfillment sites 1194 in the local market from which the driver could pick up retailer shipments before returning to the origination RDC 1170.

A tractor-trailer driver scheduled to pick up a shipment from a retailer can contact the retailer prior to arriving in order to determine how much trailer space is needed for the retailer's shipment. In a situation where there is a retailer which ships to more than one origination RDC 1170 the driver can let the retailer know which origination RDC (1170 or 1180-2 using the prior example) the driver is inquiring about. One of the retailer's workers can look at the sides of the shipping dock conveyor where the shipment of cases has been stacked to determine the approximate load requirement. Dock conveyors can have ruler markings on their sides (for example, meters and centimeters on one side, feet and inches on the other) running from front to back. The retailer can report a full shipment or the length of the shipment if the dock conveyor is less than full. A retailer can have multiple shipments on multiple dock conveyors and can communicate, to the inquiring driver, the total number of full shipments and/or the total length of any partial shipments it has prepared. Where the tractor-trailer had already picked up a shipment from another retailer and its driver knows that there will not be adequate space to accommodate the full shipment that the retailer has prepared, the driver can notify the retailer as to the length of the shipment that can be accommodated. A driver can know the remaining capacity of the trailer by checking the ruler markings on the sidewalls of the trailer. Upon being notified by the driver that the tractor-trailer picking up the retailer shipment only has a certain remaining capacity, the retailer can make adjustments to the prepared retailer shipment to split it into two if necessary, thereby creating a gap on the dock conveyor between the two retailer shipments. Where the driver is not able to pick up the entire shipment, even when the trailer is empty, but the retailer has more than one full shipment prepared, the driver can contact the origination RDC 1170 to alert the origination RDC 1170 of the total amount of trailer space needed to pick up the rest of the retailer's shipment(s) considering the portion of the retailer shipment that the tractor-trailer can accommodate. The origination RDC 1170 can make any necessary scheduling adjustments to send additional tractor-trailers as needed to pick up any remaining retailer shipment(s).

In a further aspect of the invention, a shipper's tractor-trailer can arrive at a retailer's fulfillment site 1194 empty or partially filled with a shipment previously picked up from another retailer. Upon arrival, a worker, for example, a retailer worker can start a Retailer Shipment Program (312) on a workstation or suitably configured computer or terminal running the ePD Shipping Application. The worker can use a hand-held scanner connected to that workstation to scan a barcode on their employee identification (id) card and then a barcode on the label on the back of the trailer door. With reference to FIG. 9B, the Retailer Shipment Program (312) can create a Retailer Shipment record 1212 which can have exemplary values such as: a Retailer Shipment Id created for example, by concatenating ePD Retailer Id+current date+a sequential three digit number; a Status which can be set to a value such as "in-transit"; an ePD Retailer Id, which can be set to the standard values configured for the current retailer; an ePD Shipper Id and an Origination RDC Id which can either be set to standard values configured for the current retailer or selected from lists of values configured for the current retailer (if the retailer uses more than one shipper and/or ships to more than one RDC); a Retailer Employee Id and a Trailer Id that can be set to the values scanned in by the worker; a Retailer Shipping Date/Time that can be set to the current date/time; and all other fields on the Retailer Shipment Record 1212 can be created with no value or a standard initialized value.

There is shown in FIG. 8, a trailer parked at a Shipping/Receiving Dock Area. FIG. 8 shows, tractor 200, trailer 202, trailer conveyor 204, facility exterior wall 231, shipping/receiving dock (bay) door 233, shipping/receiving dock conveyor (extension) 235, and shipping/receiving dock conveyor 236.

Referring to FIG. 8, a tractor-trailer driver can back the tractor-trailer up to the shipping dock of the retailer fulfillment site 1194 and open the trailer door. After opening the trailer door, the driver or a retailer worker can reposition a cargo restraining barrier out of the way, if one is being used to hold a partial shipment in place. A driver or retailer worker can then start a trailer conveyor (204) in the loading direction. Where there is already a shipment of cases on the trailer conveyor (204), the cases can remain stationary at the front end of the trailer (202) as the trailer conveyor (204) moves in the loading direction and pushes them up against the front wall of the trailer. A continuous three-section conveyor system can be realized when a conveyor extension (235) at the end of the retailer's dock conveyor can be lowered from its upright vertical position to a horizontal position which extends from the end of the dock conveyor, through the open loading dock door (233) and trailer door, to the end of the trailer conveyor (204) on the floor of the trailer (202). The three conveyor sections—the dock conveyor, conveyor extension (235), and trailer conveyor (204)—can be used to facilitate the continuous flow of cases from the shipping dock into the trailer (202). Based upon the availability of space on the trailer (202), a worker can determine how many pick groupings of stacked cases on the dock conveyor can be loaded into the trailer (202). The worker can scan the Pick Grouping Id barcode on the Pick List Report page attached to each pick grouping of stacked cases to be loaded onto the trailer (202). As each Pick Grouping Id gets scanned, the Retailer Shipment Program (312) can update its Pick Grouping record 1210 with the Retailer Shipment Id of the current Retailer Shipment record 1212. The program (312) can then update Case records 1208 which have that Pick Grouping Id to set Retailer Shipment Id to the current Retailer Shipment Id and Status to a value such as "retailer shipment". After updating Retailer Shipment Id and Status on the Case records 1208 associated with a pick grouping, the program (312) can update values such as the Retailer Shipment Id and Status on a number of Order Detail records 1202 up to the SKU (or item identifier) quantity, which was updated on the Case records 1208.

To determine appropriate Order Detail records 1202 to be updated, the program can determine the total quantity across all Case records 1208 having a particular SKU that has been updated with the current Retailer Shipment Id. The program (312) can determine that quantity by selecting all the records from the Case table 1208 having the current item identifier (SKU) and Retailer Shipment Id and calculating the total quantity for the selected records. It can then select and update Order Detail records 1202, having the current SKU and a Status such as "pick list—back order", to set Retailer Shipment Id to the current Retailer Shipment Id and Status to a value such as "retailer shipment—back order". Where enough Order Detail records 1202 to equal the SKU quantity total calculated for the selected Case records 1208, have not been updated from the selected Order Detail records 1202 having the current SKU and a Status such as "pick list—back order", the program (312) can select and update Order Detail records 1202, having the current SKU and a Status such as "pick list—new", to set Retailer Shipment Id to the current Retailer Shipment Id and Status to a value such as "retailer shipment—new". Priority can be given to back orders, since even though the program (312) is only looking at cases which are in stock and have already been picked, depending upon available trailer space, some of the picked cases may be delayed until a later retailer shipment.

In updating Order Detail records 1202 with Retailer Shipment Id's, the program (312) can make adjustments to an Order Detail record 1202 to partially fill an order, where a selected Order Detail record 1202 has a SKU quantity greater than what can be filled by the cases, which have been included in the retailer shipment. If for example, out of the Order Detail records 1202 having a particular SKU, remaining to be updated with a Retailer Shipment Id, the lowest Quantity is two. After assigning Retailer Shipment Id's to other Order Detail records 1202 having that SKU, there is a remaining difference of only one between the total SKU quantity of Case records 1208 and Order Detail records 1202 with the current Retailer Shipment Id. Since the program (312) can only update Order Detail records 1202 for up to a quantity of one, and the lowest remaining Order Detail Quantity is two, the program (312) can attempt to partially fill the order by creating a new Order Detail record 1202 and splitting the Order Detail Quantity across the new record 1202 and the existing record 1202. Continuing with the example, the program (312) creates a new Order Detail record 1202 by copying all the values of the existing record 1202, except for Quantity. Quantity on the new record 1202 can be set to the amount, which can be updated with the current Retailer Shipment Id. Status can be updated to either a value such as "retailer shipment—new" or "retailer shipment—back order" on the new Order Detail record 1202, depending upon the Status of the existing record 1202. Retailer Shipment Id can be updated to the current Retailer Shipment Id on the new Order Detail record 1202. Quantity on the existing record 1202 can be reduced by the Quantity of the new record 1202. Status and Retailer Shipment Id on the existing record 1202 are not changed when the record 1202 is split. After scanning all of the Pick Grouping Id's intended to be loaded onto the trailer (202), the worker can start the dock conveyor in the loading direction. The stacked cases can be moved from the dock conveyor, across the conveyor extension (235), and onto the trailer conveyor (204). The trailer conveyor (204) can move the cases toward the front of the trailer (202), up against the trailer's front wall or the cases of previously loaded shipments. The worker can stop the dock conveyor when the trailer is filled or the shipment is fully loaded onto the trailer (202). If necessary, the dock conveyor can be switched to the unloading direction to move cases back from the conveyor extension (235) to the dock conveyor. The driver or the retailer worker can stop the trailer conveyor (204) and if the trailer (202) is not completely filled, the driver or retailer worker can reposition a cargo net or other restrictive barrier to prevent the cases on the trailer (202) from moving. Whenever the trailer (202) cannot accept all the cases of a pick grouping that can be partially loaded onto a trailer (202) or if there is still available space to accommodate more cases on the trailer (202) after the cases of the scanned pick groupings have been loaded, the worker can initiate a Retailer Shipment Adjustments Program (314) to remove or add cases to the retailer shipment.

The Retailer Shipment Program (312) can have three menu options which end the program (312). If no adjustments are necessary, the retailer worker can end the Program (312) by selecting for example, a menu option such as "confirm shipment" at the workstation running the program (312). If more cases or pick groupings of cases are to be added to the retailer shipment, a menu option such as "add cases" can be selected. To remove cases or pick groupings of cases from the retailer shipment, a menu option such as "remove cases" can be selected. The "confirm shipment" option can simply end the program (312). By selecting either the "add cases" or "remove cases" option, the Retailer Shipment Program (312) can be terminated and the Retailer Shipment Adjustments Program (314) can be initiated in either an "add cases" or a "remove cases" mode. After initiating the Retailer Shipment Adjustments Program (314), a worker can for example, use a hand-held scanner to scan the case labels or Pick Grouping Id's of any cases the worker is adding to or removing from the retailer shipment. If adding or removing a mixed-item case having more than one case label, all the case labels need to be scanned to add or remove that mixed-item case.

The Retailer Shipment Adjustments Program (314) can select the Case record 1208 of each scanned Case Id and can delete the value in its Retailer Shipment Id field and update its Status field to a value such as "picked" if removing the case. If adding a scanned case, the program (314) can set the value of the Retailer Shipment Id field on the Case record 1208 of the scanned case to the value of the current retailer shipment and update its Status to a value such as "retailer shipment". Where a Pick Grouping Id is scanned, the program (314) can select and update the Pick Grouping record 1210 and the related Case records 1208 having that Pick Grouping Id to add or remove the cases of that pick grouping to/from the retailer shipment by making the Retailer Shipment Id and Status updates as described for adding or removing a single scanned case from a retailer shipment. The program (314) can also update Order Detail records 1202 to add or remove the current Retailer Shipment Id and update their Status appropriately. Updates made to Order Detail records 1202 when adding cases can be done in the same way as they are when pick groupings of cases are scanned into a retailer shipment by the Retailer Shipment Program (312), although lesser quantities can be updated as single cases get scanned. In an example where the possible values of the Status field on Order Detail records 1202 corresponding to the cases of a retailer shipment are "retailer shipment—new" or "retailer shipment—back order", the Retailer Shipment Adjustments Program (314) can update Order Detail records 1202 when removing cases by first selecting the ones having a Status of "retailer shipment—new" and the SKU of the scanned case. The program (314) can delete the Retailer Shipment Id value of the selected Order Detail records 1202 and can update their Status to "pick list—new". Continuing with this example, Order Detail records 1202 having a Status of "retailer shipment—back order" can be removed from the retailer shipment only after all Order Detail records 1202 having a Status of "retailer shipment—new" for the scanned SKU have already been removed. The program (314) can update the selected Order Detail records 1202 having a Status of "retailer shipment—backorder" in the same manner as described for the other record update in this example, except that the Status of the selected records 1202 can be set back to "pick list—back order".

After all the cases and/or pick groupings to be adjusted to or from the retailer shipment are scanned, a suitable menu option such as the "confirm shipment" menu option of the Retailer Shipment Adjustments Program (314) can be selected to terminate the program's (314) operation. When the retailer shipment is confirmed from either the Retailer Shipment Program (312) or the Retailer Shipment Adjustments Program (314), a Retailer Shipment Report can be created to list, for example, the total number of pick groupings and the total number of cases associated with the retailer shipment. The Retailer Shipment Id can be printed at the top of the page, for example, in barcode format as well as in readable format. The driver can then obtain that printed report, close the trailer door, and proceed to an origination RDC 1170 if the trailer (202) is full or to another retailer fulfillment site 1194 in the local market if the driver still has trailer space available.

The Retailer Shipment Program (312) can create an association between specific cases and a specific retailer shipment when it writes the Retailer Shipment Id of a retailer shipment to Case records 1208. Associating specific cases with a specific retailer shipment can allow the shipper and the retailer to track the location of ordered items at the case level from the retailer fulfillment site 1194 to a specific tractor-trailer to an origination RDC 1170. It can also give the retailer visibility to which cases remain on its shipping dock. The ePD Shipping Application can also provide visibility to which lines of an order have been picked and remain on the shipping dock, and which ones have been picked and shipped on a specific tractor-trailer. Thus, the application can provide visibility to the item quantities sent within a particular retailer shipment through both the Case records 1208 and the Order Detail records 1202 associated with that retailer's shipment. Since each can provide a different view of the same shipped items, the total item quantity across all the Case records 1208 for any given SKU within a retailer shipment is equal to the total item quantity across all the Order Detail records 1202 for that same SKU within that same retailer shipment. Although in total their item quantities move together, there is no direct link between Case records 1208 and Order Detail records 1202. There is no direct link, because an Order Detail record 1202 is not tied to any one specific case. Because Order Detail records 1202 do not have to be tied to specific cases (and specific Case records 1208), the RDC sorting process is more flexible and requires less effort than it would if it required RDC workers to find specific cases to fill specific orders.

Figure 3:
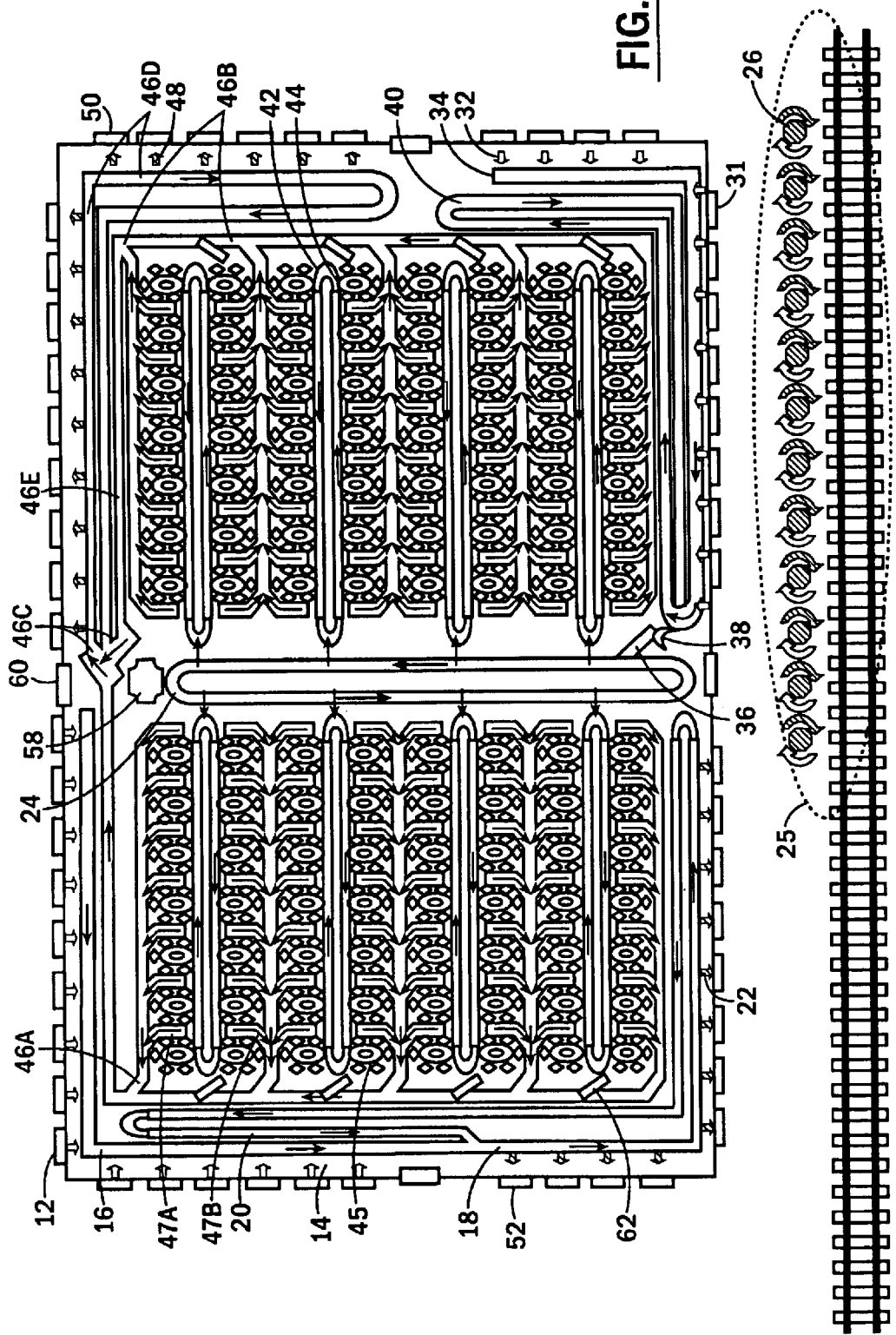
FIG. 3 is an illustrative embodiment of an exemplary layout of a Regional Distribution Center (RDC).

There is shown in FIG. 3, an exemplary embodiment of a Regional Distribution Center (RDC). The regional distribution center can comprise the following entities: Local market receiving dock (bay) door 12, Local market receiving dock conveyor 14, RDC sort conveyor—inbound section 16, RDC sort conveyor—outbound section 18, RDC sort conveyor—overflow section 20, RDC shipping dock conveyor 22, Local market sort conveyor 24, Intermodal rail yard 25, Intermodal railcar loading equipment 26, RDC inbound receiving dock (bay) door 31, RDC inbound receiving dock conveyor 32, RDC inbound conveyor—unloading section 34, RDC inbound conveyor—local market connection 36, RDC inbound conveyor—case diverting section 38, RDC inbound conveyor—overflow section 40, CDC sort conveyor 42, CDC packing station conveyor 44, CDC packing station 45, Package conveyor—left-side feed 46A, Package conveyor—right-side feed 46B, Package conveyor—merging section 46C, Package conveyor—outbound section 46D, Package conveyor—overflow section 46E, CDC Package conveyor—CDC feed 47A, CDC Package conveyor—local market feed 47B, Local market shipping dock conveyor 48, Local market shipping dock (bay) door 50, RDC shipping dock (bay) door 52, Bubble wrap bag production machine 58, RDC Worker Entrance door 60.

In a further aspect of the invention, inbound shipments from a plurality of retailers can be received for processing at an origination RDC 1170 as shown in step 1110. Referring to FIG. 3 in addition to FIG. 1, FIG. 2 and FIG. 8, a driver can back the tractor-trailer up to a local market receiving dock bay (12) at the origination RDC 1170 and signal to let RDC workers know that a shipment has arrived. Upon arrival at the origination RDC 1170, a worker can open a receiving dock door, scan a barcode on their employee identification (id) card, scan the barcode on the trailer label (located on the trailer door of a trailer (202)), and then open the trailer door. The worker can use a suitable barcode reading device such as a hand-held barcode scanner or a hands-free barcode scanner. A hands-free barcode scanner, as referenced throughout this disclosure, can include, but is not limited to barcode scanning devices in which the barcode scanning mechanism can be mounted onto a ring, glove, or bracelet. The barcode scanner used by the RDC worker can communicate via a wired and/or wireless access methodology with a workstation that can be connected to a RDC server running an instance of a Receive Retailer Shipment Program (316) of the current RDC's instance of the ePD Shipping Application. The programs of the ePD Shipping Application and an ePD Delivery Application, as referenced in describing the steps performed at a RDC (1110 through 1124) throughout this disclosure, can run on either a workstation connected to the RDC server or on the RDC server. After opening the trailer door, the worker can reposition a cargo net (or cargo restraining barrier) to one side of the trailer (202), if there is one holding the cases on the trailer (202) in place. The worker can then lower a conveyor extension (235) of a local market receiving dock conveyor (14) from its raised vertical position to its horizontal loading position to bridge the gap between the local market receiving dock conveyor (14) and the trailer conveyor (204). The worker can start the local market receiving dock conveyor (14) (including its conveyor extension (235)) in the unloading direction, and can then start the trailer conveyor (204) in the unloading direction. The retailer shipments of cases can flow from the trailer conveyor (204), across the conveyor extension (235), and onto the local market receiving dock conveyor (14).

The RDC worker unloading the current retailer shipments can receive all the Retailer Shipment Reports from the tractor-trailer driver, for the retailer shipments on the trailer (202). The worker can scan the Retailer Shipment Id barcode at the top of each report. By scanning the Retailer Shipment Id's on the Retailer Shipment Reports after scanning their Employee Id and the Trailer Id, the worker can accept all the retailer shipments and associated cases arriving on that trailer (202) into the current origination RDC 1170, by initiating the Receive Retailer Shipment Program (316) to add a new record to a Retailer Shipment Receiving table 1214 for each Retailer Shipment Id scanned. Each new Retailer Shipment Receiving record 1214 can have the scanned Retailer Shipment Id, Employee Id, and Trailer Id values. Each record 1214 can also be created with a Status field value such as "received" and an ePD Shipper Id field that can be set to the value of the shipper operating the current origination RDC 1170. After creating each Retailer Shipment Receiving record 1214, the program (316) can search a Retailer table 1246 for the record having the ePD Retailer Id embedded in the Retailer Shipment Id of the current Retailer Shipment Receiving record 1214. Data in a Connection Script field of that retailer's record 1246 can be read and used to establish a remote connection to a server running that retailer's instance of the ePD Shipping Application.

The program (316) can select the record, having the current Retailer Shipment Id on the Retailer Shipment table 1212 in the database of the retailer's instance of the ePD Shipping Application and make the following updates to it: Status can be set to a suitable value such as "received"; Retailer Shipment Arrival Date/Time can be set to the current date/time; and Receiving Employee Id can be set to the Employee Id on the current Retailer Shipment Receiving record 1214. The program (316) can then copy the Retailer Shipment record 1212 from the database of retailer's instance of the application to the database of the origination RDC's 1170 instance of the application. The program (316) can select the Case records 1208 and Order Detail records 1202 in the retailer's database instance having the current Retailer Shipment Id and can update the Status field on both sets of records to a value such as either "origination RDC" or "destination RDC". Case record Status can be updated to "destination RDC" if the RDC Id on the Case record 1208 is the one for the current origination RDC 1170. Order Detail record Status can be updated to "destination RDC" if the related Order Header record 1200 has the RDC Id of the current origination RDC 1170. The Status on all other Case records 1208 and Order Detail records 1202 can be updated to "origination RDC". After making the Status updates, the program (316) can copy the selected Case records 1208 and Order Detail records 1202 to the RDC's database instance along with the Order Header records 1200 associated with the selected Order Detail records 1202.

After all the cases get loaded onto the local market receiving dock conveyor (14), the worker can stop the trailer conveyor (204) and can close the trailer door. The local market receiving dock conveyor (14) can run along the floor of an origination RDC 1170, from the edge of local market receiving dock door (12) to the edge of the inbound section of the RDC sort conveyor (16). Although certain hardware, software, types of personnel, and functions may be described as being in either an origination RDC 1170 or a destination RDC (1180-1 or others), each RDC can have the same hardware, software, types of personnel, and functions as another RDC, as each one can serve as an origination RDC for some items and a destination RDC for some items. Hence, such description is not intended to be a limitation on the system and method. When the local market receiving dock conveyor (14) is moving in the unloading direction, it can carry cases unloaded from a trailer (202) onto the inbound section of the RDC sort conveyor (16). The inbound section of the RDC sort conveyor (16) can run along the floor of an origination RDC 1170 perpendicular to all the local market receiving dock conveyors (14) and the outbound section of the RDC sort conveyor (18) can run perpendicular to all the RDC shipping dock conveyors (22). Each section of the RDC sort conveyor (16, 18 & 20) can be left continually running as appropriate to handle the activity on any of the dock conveyors (14 and 22) adjacent to it. After all the cases unloaded from the trailer (202) have been moved from the dock conveyor (14) onto the inbound section of the RDC sort conveyor (16), the worker can stop the dock conveyor (14). The worker may need to stop and restart the dock conveyor (14) to coordinate the flow of cases from the dock conveyor (14) into the flow of cases already on the RDC sort conveyor (16).

In a further aspect of the invention, items received at the origination RDC 1170 can be sorted by RDC Id in step 112. Cases arriving at the origination RDC 1170 on a bulk carrier such as a tractor-trailer can be moved from the local market receiving dock conveyor (14) onto the inbound section of the RDC sort conveyor (16). The RDC sort conveyor can be made up of different conveyor belt sections, for example an inbound section (16), an outbound section (18), and an overflow section (20). The inbound section of the conveyor (16) can run along the floor perpendicular to and at the same height as the local market receiving dock conveyors (14). The inbound section of the RDC sort conveyor (16) can begin at the first local market receiving dock conveyor (14), continue along the floor past all the local market receiving dock conveyors (14) and end adjacent to the outbound section of the RDC sort conveyor (18). The inbound section of the conveyor (16) can always move in the same direction—toward the outbound section (18). The stacked cases of retailer shipments that enter the RDC on tractor-trailers can flow from the inbound section (16) to the outbound section of the RDC sort conveyor (18). There can be several possible embodiments of how the stacked cases of a retailer shipment can be broken down during sorting in an origination RDC 1170. In one exemplary embodiment, the stacked cases can be broken down into unstacked cases on the inbound section of the RDC sort conveyor (16) by one or more workers or by case sorting equipment prior to those cases moving to the outbound section of the RDC sort conveyor (18). Continuing with this exemplary embodiment, the outbound section of the RDC sort conveyor (18) can gradually rise from the floor to reach approximately the height of a typical worker's waist. In a different exemplary embodiment, the outbound section of the RDC sort conveyor (18) can run along the floor and the stacked cases of retailer shipments can be broken down by workers performing the RDC case sort 1112 on the outbound section of the RDC sort conveyor (18).

Workers performing the RDC case sort step 1112 can look at the RDC Id printed on the case label of each case passing by on the outbound section of the RDC sort conveyor (18). The workers can be organized into teams by the destination RDC (for example 1180-1, 1180-2, 1180-3, 1180-4, and/or 1170) for which they can be preparing RDC shipments. Members of each team can pick the cases marked for their destination RDC (for example 1180-1) from the conveyor (18) and move them onto the RDC shipping dock conveyor (22) upon which they can be preparing their RDC shipment. In the motion to move a case from the RDC sort conveyor (18) to the RDC shipping dock conveyor (22), a worker can scan the label on the picked case, for example, by moving it across a stationary barcode scanner associated with that RDC shipping dock conveyor (22). The stationary scanner can be located next to the dock conveyor (22). Scanners are well known in the art. Prior to scanning the first case of a new shipment, workers on the team can scan their employee id card to sign on as an author/sorter of that RDC shipment. Upon scanning the first case of a new shipment, a RDC Shipment Program (318) of the ePD Shipping Application can create a new record on a RDC Shipment table 1216. The program (318) can select the Case record 1208 of the scanned case using for example, the scanned Case Id and can update the new RDC Shipment record 1216 fields such as:

a RDC Shipment Id that can be set to a unique value generated by concatenating for example, the RDC Id of the current RDC 1170 (the origination RDC)+the current date+a sequential 5 digit number; a Status that can be set to a value such as "new"; an ePD Shipper Id that can be set to the value of the current shipper; an Origination RDC Id that can be set to the value of the current RDC 1170; a RDC Shipping Dock Id that can be set to the value of a RDC shipping dock (52) (the one at which the current RDC shipment is being created; a Destination RDC Id that can be set to the RDC Id value on the selected Case record 1208; a plurality of Employee Id fields that can be set to the values scanned in from the employee id cards (for example, Employee Id #1 can be set to the first employee id card scanned and Employee Id #2 can be set to the second employee id card scanned, etc.); and all other fields can be created with a null value or no value. The program (318) can also write the RDC Shipment Id of the newly created RDC Shipment record 1216 to the RDC Shipment Id field on the Case record 1208 of the scanned case.

The teams of RDC workers can continue to pick, scan, and load cases from the conveyor (18) onto the dock conveyor (22) until a full RDC shipment is compiled. A full RDC shipment can be compiled when the cases on the dock conveyor (22) are stacked up as high as the shipment height limit, which can be marked on both sides of the shipping dock door opening (52), as wide as can fit between the side edges of the dock conveyor (22), and as long as can fit between the dock conveyor extension against which the cases can be pressed up at the dock conveyor's (22) front edge and the shipment limit marking toward the back end of the dock conveyor (22). While workers are building the RDC shipment, scanning each case picked from the outbound section of the RDC sort conveyor (18), the RDC Shipment Program (318) can be validating that the RDC Id associated with each scanned case matches the RDC Id of the current RDC Shipment record 1216 and the first case scanned. If the scanned case is valid, the program (318) can update the Case record 1208 setting Status to a value such as "RDC shipment" and RDC Shipment Id to the value of the current RDC shipment. If the scanned case does not pass the validation, the program (318) can signal an error, for example, by sounding an error tone and lighting up a warning light/LED on the scanner to alert the worker that the Case record 1208 of the scanned case has not been updated and that the scanned case should not be loaded onto the dock conveyor (22) as part of the current RDC shipment. If an error was signaled, the worker can react to it by returning the case causing the error back to the outbound section of the RDC sort conveyor (18).

When the team has finished building the shipment, a worker can scan a command barcode such as "complete shipment" on, for example, his/her action command card by running it across the stationary barcode scanner. The "complete shipment" command can trigger the RDC Shipment Program (318) to take certain actions. These can include, but are not limited to, the following. First, it can update the RDC Shipment record 1216 by setting Status to a value such as "ready to ship" and RDC Shipment Prep Date/Time to the current date/time. Second, it can associate selected Order Detail records 1202 to the current RDC shipment by updating their Status to a value such as "RDC shipment" and updating their RDC Shipment Id to the value of the current RDC shipment. The program (318) can select the Order Detail records 1202 in a manner that can be similar to the way as the Retailer Shipment Program (312) did when it selected Order Detail records 1202 to associate them with a retailer shipment. The team of workers can then proceed to another RDC shipping dock conveyor (22) to start a new RDC shipment for the same destination RDC (for example 1180-1). Alternately, separate teams could be working in parallel to create separate RDC shipments for one destination RDC (for example 1180-1) at the same time, instead of only having one team per destination RDC (for example 1180-1).

Referring now to FIG. 1A in addition to FIG. 2 and FIG. 3 as another illustrative example of the embodiment, one of the RDC sorting teams can be responsible for moving cases bound for the current RDC 1170, serving as both an origination RDC and a destination RDC for those cases of items from the RDC sort conveyor (18) to a local market sort conveyor (24). The team members of the current origination/destination RDC 1170 can be stationed between the RDC sort conveyor (18) and the local market sort conveyor (24), past the last RDC shipping dock conveyor (22), where the end of the outbound section of the RDC sort conveyor (18) ends and the overflow section of the RDC sort conveyor (20) begins. The RDC workers on this team can pick cases marked for the current origination/destination RDC 1170 and place them onto the local market sort conveyor (24).

If any cases were picked and placed onto the local market sort conveyor (24) by mistake (such as a case bound for a different destination RDC 1180-4 for example), the team of workers picking cases for the current RDC can notice those cases moving by them on the local market sort conveyor (24) with an indicator, such as a RDC sort return marker for example, placed on top of them. Upon seeing a case on the local market sort conveyor (24) having a RDC sort return marker, a worker picking cases for the current origination/destination RDC 1170 can pick the case, remove its RDC sort return marker, and place the case on the overflow section of the RDC sort conveyor (20). The worker can also flip the RDC sort return marker over and place it back on the local market sort conveyor (24). RDC sort return markers can have a descriptor such as "RDC sort" printed on one side and a Local Market Id printed on the other. The Local Market Id printed on each marker can correspond to the local market for which the worker who identified the case picking error is working within the local market sort 1118. The circumstances of catching this type of error are discussed later in this description when the local market sort step 1118 is described.

The overflow section of the RDC conveyor (20) can be used to allow cases that are not picked by any of the teams to circle back around to the outbound section of the RDC sort conveyor (18) and pass by those teams again until they can be picked.

Now referring back to FIG. 1 along with FIG. 2, and FIG. 3, in a further aspect of the invention, cases of items resulting from the RDC sorting step 1112 can then be shipped to other destination RDC's (such as RDC 1180-1, RDC 1180-2, RDC 1180-3 or RDC 1180-4) as shown in step 1114. The RDC shipments which have been created by the RDC sort teams can sit on the RDC shipping dock conveyors (22) awaiting the arrival of empty drayage tractor-trailers from an intermodal rail yard (25) used by the current origination RDC 1170. Drayage tractor-trailers can normally arrive from the intermodal rail yard (25) with trailers full of cases of inbound RDC shipments sent via locomotive freight from other origination RDC's (for example 1180-1, 1180-2, 1180-3, and/or 1180-4) to the current destination RDC 1170. Although FIG. 1 shows the current RDC 1170 as being the origination RDC and another RDC 1180-1 as being a destination RDC, it should readily be understood that for purposes of receiving a RDC shipment from other RDC's, the current RDC 1170 can be considered a destination RDC and each RDC sending a RDC shipment can be considered the origination RDC for that shipment. Alternatively, these tractor-trailers can be long-haul tractor-trailers or other suitable cargo carrying vehicles and can arrive at the current RDC 1170, with or without cargo, directly from other RDC's (for example 1180-1, 1180-2, 11803, and/or 1180-4), from a local market, from an airport, or from a seaport. After inbound RDC shipments on these tractor-trailers are unloaded into the current RDC 1170, the drayage tractor-trailers can be moved from a RDC inbound receiving dock (31) to one of the RDC shipping docks (52). Each RDC shipping dock (52) can be designated to ship to a particular destination RDC (for example 1180-1). An empty drayage tractor-trailer can arrive at a particular RDC shipping dock (22) based upon factors for example, when cargo trains are scheduled to leave for particular destination RDC's. Referring now to FIG. 8 in addition to FIG. 3, when an empty tractor-trailer does back into one of the RDC shipping docks (52), a worker such as one of the RDC sort team workers can load the prepared RDC shipment onto the empty trailer (202) by lowering the RDC shipping dock conveyor extension (235) into the loading position (horizontal), initiating the trailer conveyor (204) in the loading direction, and then initiating the RDC shipping dock conveyor (22) in the loading direction. The cases stacked on the RDC shipping dock conveyor (22) can move across the dock conveyor (22) and its conveyor extension (235) and onto the trailer conveyor (204).

After the shipment has been moved onto the trailer (202), the RDC worker can stop the conveyors, reposition the conveyor extension (235) to the shipment preparation position (vertical), and close the trailer door. The worker can initiate a RDC Shipment Loading Program (320) of the ePD Shipping Application, for example by, using a hand-held or hands-free barcode scanner to scan the barcode on their employee id card, scan a RDC Shipping Dock Id barcode, located on a label on the side of the RDC shipping dock door (52), and scan the Trailer Id barcode, located on a label on the back of the trailer door. The RDC Shipment Loading Program (320) can select the RDC Shipment record 1216 by searching for a record having the scanned RDC Shipping Dock Id and a Status such as "ready to ship". It can then update the selected RDC Shipment record 1216, setting its Status field to a value such as "on trailer" and writing the scanned Employee Id to a Trailer Loading Employee Id field, the scanned Trailer Id to a Trailer Id field, and the current date/time to the RDC Shipment Trailer Date/Time field. By updating the RDC Shipment record 1216 with a different Status and associating it with a specific trailer, the RDC Shipment Loading Program (320) can associate the Case records 1208 and Order Detail records 1202 which make up that RDC shipment with that trailer (202). The Case records 1208 and Order Detail records 1202 are not actually updated by the program (320), but for the time that they have a Status such as "RDC shipment" and the RDC Shipment Id associated with that RDC shipment, they are associated with and thus can be affected by updates to the Status of that RDC Shipment record 1216.

The RDC Shipment Loading Program (320) can also access the server of the RDC shipment's destination RDC 1180-1 through a dial-up connection or a dedicated wide area network (WAN) and can create a new record on the RDC Shipment Receiving table 1218 from the current RDC Shipment record 1216, by copying fields such as the following: RDC Shipment Id, ePD Shipper Id, Origination RDC Id, Destination RDC Id, and Trailer Id. It can set the Status on the newly created RDC Shipment Receiving record 1218 to a value such as "new".

In an illustrative embodiment, a driver of a drayage tractor-trailers can transport a RDC shipment to the current RDC's intermodal rail yard (25). The intermodal rail yard (25) may not be as close to the RDC as shown in FIG. 3. The driver can position their tractor-trailer near intermodal railcar loading equipment (26) and can detach the trailer (202) of the tractor-trailer from its tractor (200). A worker at the current RDC's intermodal rail yard (25) can use the intermodal railcar loading equipment (26) to lift the trailer up and onto an empty flatbed rail car of a cargo train. Once the trailer containing the RDC shipment is loaded onto the train, a worker at the intermodal rail yard can initiate a Train Loading Program (322) of the ePD Shipping Application at a workstation or terminal, which can be located in an office at the rail yard (25). The worker can enter the Carrier Id of the current train on the workstation's keyboard and can use a wireless hand-held or hands-free scanner to scan their employee id card. The worker can then take the wireless scanner out to the train and scan the trailer label of each trailer loaded onto the train. The Train Loading Program (322) can select the RDC Shipment record 1216 of each RDC shipment loaded on the train by searching for the record with the scanned Trailer Id value and a Status such as "on trailer". The program (322) can update the selected record, setting its fields to values such as setting Status to, for example, "on train", Carrier Id to the entered value for the current train, Train Loading Employee Id to the scanned Employee Id, and RDC Shipment Train Date/Time to the current date/time.

A cargo train arriving at a RDC's intermodal rail yard (25) may be one that is scheduled to pick-up outbound shipments going to another RDC 1180-1 (which can serve as a destination RDC in the rail yard (25) of RDC 1170, continuing with the illustrative example depicted in FIG. 1), one that is scheduled to deliver inbound shipments from another RDC 1170 (which can serve as an origination RDC in the rail yard (25) of RDC 1180-1, continuing with the illustrative example depicted in FIG. 1), or one that is scheduled to do both (for example, the cargo train bringing an inbound RDC shipment to the rail yard (25) of RDC 1180-1 can then pick up one or more RDC shipments bound for another RDC, for example RDC 1180-3). In one embodiment, cargo trains can unload trailers, containing RDC shipments coming from other origination RDC's (for example 1180-2), off of rail cars and then load trailers, containing RDC shipments bound for other destination RDC's (for example 1180-4), onto the rail cars which have just been emptied. In other embodiments, tractor-trailers or other suitable cargo carrying vehicles can transport RDC shipments from an origination RDC 1170 directly to another RDC 1180-1, or can transfer a trailer or the contents of a trailer to a cargo airplane at an airport, or a cargo vessel at a seaport.

In step 1116, items in cases can be received from other origination RDC's 1170 (continuing with the illustrative example depicted in FIG. 1) at a destination RDC 1180-1. In an illustrative embodiment, a carrier, such as a cargo train, can arrive at a RDC's intermodal rail yard (25) making a scheduled stop to deliver inbound shipments coming from another RDC 1170 (which can serve as an origination RDC for that RDC shipment). Workers can use intermodal railcar loading equipment (26) to lift trailers off of flatbed rail cars and onto the ground in an unloading area. Drivers of drayage tractor-trailers or workers at the rail yard (25), which may have previously detached their trailers to be loaded onto the current cargo train or another cargo train, can attach their tractors to one of the trailers unloaded from the current train. The drivers can then transport trailers to the destination RDC 1180-1, backing them into a RDC inbound receiving dock bay (31).

Inbound RDC shipments can be physically unloaded from trailers into the destination RDC 1180-1 in the same manner as inbound Retailer shipments, except that cases can be moved from a RDC inbound receiving dock conveyor (32) to the unloading section of a RDC inbound conveyor (34), instead of being moved from a local market receiving dock conveyor (14) to the inbound section of the RDC sort conveyor (16). The end result of unloading RDC shipments into the destination RDC 1180-1 can be that cases from one or more other RDC's (1170 continuing with the illustrative example depicted in FIG. 1) are on the unloading section of the RDC inbound conveyor (34) and the tractor-trailers which carried those cases sit empty at RDC inbound receiving dock bays (31).

To receive a RDC shipment, a worker at the destination RDC 1180-1 can scan, for example, his/her employee id card, the trailer label of the trailer in which the RDC shipment arrived, and a case label on any one of the cases unloaded from the trailer. These actions can initiate a Receive RDC Shipment Program (324) of an instance of the ePD Shipping Application of the current RDC 1180-1. The Receive RDC Shipment Program (324) can search a database table, such as the RDC Shipment Receiving table 1218, for a record having the scanned Trailer Id and a Status such as "new". An Origination RDC Id value can be read from the selected record 1218 and can be used to search a RDC table 1258 for a record having that value in its RDC Id field. The Receive RDC Shipment Program (324) can then read a RDC Server Connection Script value from the selected RDC record 1258 and can use that information to establish a remote connection to the RDC server of the RDC shipment's origination RDC (1170 continuing with the illustrative example depicted in FIG. 1). Alternatively, the RDC Server Connection Script can be used to point to one of several RDC servers where a dedicated WAN can be used to link the servers of a shipper's RDC's. After establishing the remote connection, the Receive RDC Shipment Program (324) can validate that the Case record 1208 of the scanned Case Id on the origination RDC's 1170 server has the same RDC Shipment Id as the RDC Shipment Receiving record 1218 selected from the database on the current destination RDC's 1180-1 server using the scanned Trailer Id. This optional step can be done to validate that the case and the trailer on which it was carried are both associated with the same RDC Shipment Id. After such optional validation step is successfully completed, the Receive RDC Shipment Program (324) can use the RDC Shipment Id from the selected RDC Shipment Receiving record 1218 to select the RDC Shipment record 1216, in the database on the origination RDC's 1170 server, corresponding to the current RDC shipment. The program (324) can update the Status field to a value such as "received" and can write the scanned Employee Id to a Receiving Employee Id field on both the RDC Shipment record 1216 selected on the origination RDC's 1170 server and on the RDC Shipment Receiving record 1218 selected on the current destination RDC's 1180-1 server. The program (324) can also write the current date/time to the RDC Shipment Arrival Date/Time on the RDC Shipment record 1216 selected on the origination RDC's 1170 server. The Receive RDC Shipment Program (324) can also select all the Case records 1208 and Order Detail records 1202 on the origination RDC's 1170 server having the current RDC Shipment Id, update their Status to a value such as "destination RDC", and move the records (1208 and 1202) from the origination RDC's 1170 server to the current destination RDC 1180-1 server. When moving the Order Detail records 1202, the program (324) can also select and copy their related Order Header records 1200. Order Header records 1200 can be copied instead of moved, because there can be situations when some Order Detail records 1202 of an order are moved while others for that order remain on the origination RDC's 1170 database. By copying Order Header records 1200 instead of moving them, Order Detail records 1202 which remain on an origination RDC's 1170 database, and have related Order Header records 1200 which were copied to a destination RDC 1180-1 database, will still have a copy of their related Order Header record 1200 on the origination RDC's 1170 database. After the program (324) copies the Order Header records 1200, it can search the origination RDC's 1170 database for Order Header records 1200 which no longer have related Order Detail records 1202 and delete them.

After the cases of the inbound RDC shipment have been moved from the trailer conveyor to the RDC inbound receiving dock conveyor (32) and onto the unloading section of the RDC inbound conveyor (34), they may continue to travel around the RDC inbound conveyor, for example in a clockwise direction from the unloading section (34), onto an overflow section of the RDC inbound conveyor (40) and back onto the unloading section (34). The cases can move in this circular holding pattern, until a RDC inbound conveyor case diverting section (38) can be moved into a diverting position. In the exemplary conveyor system illustrated, the case diverting conveyor section (38) can normally be at rest, locked into an overflow position on the outside edge of the unloading conveyor section (34). To redirect the flow of cases from circling around the RDC inbound conveyor (34, 40), a worker at the destination RDC 1180-1 can release a locking pin on the case diverting conveyor section (38) to release it from an overflow position. The worker can then pivot the case diverting conveyor section (38) to slide it across and over top of the unloading conveyor section (34) and lock it into the diverting position by sliding its locking pin into place in a locking slot on the inside edge of the unloading conveyor section (34). When locked into the diverting position, the curved-shaped case diverting conveyor section (38) can intercept the flow of cases from the unloading section (34) and redirect them to a local market connection section (36). The local market connection section (36) of the RDC inbound conveyor can move cases onto the local market sort conveyor (24). Alternately, in another embodiment, automated sorting equipment can be used to direct the flow of cases from the unloading section of the RDC inbound conveyor (34) to the local market sort conveyor (24).

The local market connection section of the conveyor (36) can be located on an incline to facilitate the movement of cases from the case diverting conveyor section (38), starting at the same height as the floor level unloading conveyor section (34) up to a raised level of the local market sort conveyor (24). Workers at the destination RDC 1180-1 can break down the stacked cases of a RDC shipment to a level that is one case high before using the diverting conveyor section (38) to move cases from the RDC inbound conveyor (34) up onto the local market sort conveyor (24). Generally, a worker at the destination RDC 1180-1 can use the diverting conveyor section (38) to move cases from the RDC inbound conveyor up onto the local market sort conveyor (24) as soon as possible after the cases have been broken down. If space is unavailable on the local market sort conveyor (24), however, the flow of cases can be left so that it is directed to the overflow section of the RDC inbound conveyor (40).

In a further aspect of the invention, the following steps, consistent with step 1118, can be used to achieve a local market sort at a destination RDC processing center 1180-1. An ePD Delivery Application can run on a destination RDC's 1180-1 server to facilitate the RDC sub-processes involved in creating packages to fill customer orders for either ePD delivery to CDC's 1190-1 or traditional delivery to customer specified addresses. The steps of the ePD Delivery Process previously described in this illustrative embodiment involved moving cases of ordered items and the Case 1208, Order Header 1200, and Order Detail 1202 data records related to those cases to the destination RDC 1180-1 in which customer orders will be filled from those cases. At this point in this illustrative embodiment of the ePD Delivery Process, cases of ordered items, which have been designated for the current destination RDC 1180-1, have been received by and can be on the local market sort conveyor (24) of the current destination RDC 1180-1. The Case 1208, Order Detail 1202, and Order Header 1200 records related to those cases can be in the database on the current destination RDC's 1180-1 server and the Status of those Case 1208 and Order Detail records 1202 can be a value such as "destination RDC". The database on the destination RDC's 1180-1 server can be shared by the ePD Shipping Application, which can be used to drive the RDC-related steps prior to the local market sort step 1118, and the ePD Delivery Application, which can be used to drive the local market sort step 1118 and the remaining RDC-related steps of the ePD Delivery Process.

A Local Market Order List data view 1220 can be created from underlying Order Header 1200 and Order Detail 1202 tables, for example, by selecting, grouping and subtotaling the Quantity of each SKU from a particular ePD Retailer Id having a Status such as "destination RDC", to be delivered to CDC's 1190-1 or LDDH's 1192-1 associated with a particular Local Market Id. The Local Market Order List data view 1220 can be dynamic, meaning the Quantity subtotal of each ePD Retailer Id-SKU combination for a Local Market Id can increase as new Order Header 1200 and Order Detail 1202 records are added or can decrease as the Status of Order Detail records 1202 changes from a value such as "destination RDC" to a value such as "package". New Order Header 1200 and Order Detail 1202 records with a Status such as "destination RDC" can be added as RDC Shipments and Retailer Shipments are received into the current destination RDC 1180-1. The Status on Order Detail records 1202 can be changed from a value such as "destination RDC" to a value such as "package" as packages are created to fill orders.

A Local Market Case Inventory data view 1222 can be created from the underlying Case table 1208, for example, by selecting, grouping and subtotaling the Quantity of each SKU (or item identifier) and ePD Retailer Id combination for each Local Market Id on Case records 1208 having a Status such as "CDC sort" or "package sort". Case records 1208 can be assigned a Local Market Id when their related cases are scanned and picked from the local market sort conveyor (24) onto a CDC sort conveyor (42). In one embodiment, Case records 1208 of cases on the local market sort conveyor (24) do not have Local Market Id's and can be therefore not selected as part of the Local Market Case Inventory data view 1222.

Workers at the destination RDC 1180-1 who can be stationed between the local market sort conveyor (24) and the CDC sort conveyors (42) can for example, use hands-free barcode scanners to scan case label barcodes on cases moving by them on the local market sort conveyor (24). The barcode scanners can communicate with a workstation running an instance of a Local Market Sort Program (326) of the ePD Delivery Application via a wired or wireless data architecture. The Local Market Sort Program (326) can read the Case table 1208 to determine field values such as, the RDC Id, Local Market Id, SKU (item identifier) and ePD Retailer Id of the record having the Case Id of the scanned case label. The Local Market Sort Program (326) can evaluate the RDC Id value and if it is found that the RDC Id value on the Case record 1208 of the scanned case differs from the RDC Id of the current destination RDC 1180-1, an alert, such as a double invalid pick warning tone and/or an error warning light, can alert the RDC worker that the scanned case should not be on the local market sort conveyor (24). This situation can occur when an error has been made in the RDC sort step 1112, and a case bound for a different destination RDC (for example, RDC 1180-2) is mistakenly placed on the local market sort conveyor (24) of the current destination RDC 1180-1. Upon hearing the double invalid pick tone alert and/or seeing an error warning light, the worker at the destination RDC 1180-1 can place, for example, a RDC sort return marker on the case, and can let the case pass by on the local market sort conveyor (24). The RDC sort return marker can signal other workers performing the local market sort 1118 for other local markets not to scan that case. A worker performing the RDC sort 1112 for the current destination RDC 1180-1 can see the case with the RDC sort return marker on it, return the case to the overflow section of the RDC sort conveyor (20), flip the RDC sort return marker over, and place it on the local market sort conveyor (24). The worker who placed the RDC sort return marker on the case can later see the RDC sort return marker with the Local Market Id on it, as it moves around the local market sort conveyor (24), and can retrieve it from the conveyor (24).

In the situation where the RDC Id matches the value of the current destination RDC 1180-1, the Local Market Sort Program (326) can evaluate the Local Market Id value. If the Case record 1208 of the scanned case has no Local Market Id, the scanned case can be processed as a local market sort pick—picking a case from the local market sort conveyor (24) to a CDC sort conveyor (42). If the Case record 1208 has the Local Market Id of the current CDC sort conveyor (42), the case can be processed as a reverse local market sort pick—picking a case to remove it from the current CDC sort conveyor (42) and returning it to the local market sort conveyor (24). If the Case record 1208 has a Local Market Id of a different CDC sort conveyor (42), the case can be processed as a corrective local market sort pick—picking a case to remove it from its previous CDC sort conveyor (42) to the current CDC sort conveyor (42).

In processing a local market sort pick, the Local Market Sort Program (326) can search for the record on the Local Market Order List data view 1220 having the SKU (item identifier) and ePD Retailer Id of the scanned case, and the Local Market Id associated with the current CDC sort conveyor (42) (the one to which the worker's scanner is communicating). If there is a record 1220 for that SKU (item identifier), ePD Retailer Id, and Local Market Id combination, the Local Market Sort Program (326) can compare the Quantity of that record 1220 against the Quantity of its related record on the Local Market Case Inventory data view 1222, if there is one (a related record has the same SKU, ePD Retailer Id, and Local Market Id). The Local Market Sort Program (326) can subtract the Local Market Case Inventory Quantity (representing the total quantity of an ePD Retailer Id-SKU combination which has already been picked for that local market) from the Local Market Order List Quantity (representing the total quantity of an ePD Retailer Id-SKU combination needed to fill the open orders for that local market) to determine the net quantity of that ePD Retailer Id-SKU combination still needed for that local market. If the Local Market Order List record 1220 does not have a related Local Market Case Inventory record 1222, the full quantity of the Local Market Order List record 1220 can be considered the net quantity needed. If the net quantity needed of that ePD Retailer Id-SKU combination for that local market is greater than zero, the Local Market Sort Program (326) can signal the worker to pick the case, for example, by producing a pick confirmation tone and can assign the scanned case to the local market by writing the Local Market Id of the current CDC sort conveyor (42) into the Local Market Id field of its Case record 1208 and updating the Status of its Case record 1208 to a value such as "CDC sort". Upon hearing the pick confirmation tone (or recognizing another signal indicating to pick a scanned case), the worker at the destination RDC 1180-1 who scanned the case can pick it from the local market sort conveyor (24) and place it on the CDC sort conveyor (42) of the local market for which the worker is working. Where there is not a Local Market Order List record 1220 for the current local market with the ePD Retailer Id-SKU combination of the scanned case, or where there is one, but the Local Market Sort Program (326) determines that the net quantity needed for it is less than one, the Local Market Sort Program (326) can signal the worker not to pick the case, for example, by sounding an invalid pick warning tone. Upon hearing the invalid pick warning tone (or recognizing another signal indicating not to pick a scanned case), the worker can let the scanned case pass by on the local market sort conveyor (24).

Many cases picked from the local market sort conveyor (24) onto the CDC sort conveyor (42) for a local market can be used completely to satisfy orders for that local market. In that situation, the quantity of the picked case can be less than the net quantity needed for that local market. As the net quantity of an ePD Retailer Id-SKU combination needed for a local market decreases toward zero, a picked case can have a quantity greater than the net quantity needed. In that situation, the case can be picked and the net quantity needed can become negative. After all the item quantities of that ePD Retailer Id-SKU combination needed to fill orders for the current local market are picked from that case to create packages (as described in the create packages step 1122), a local market sort return marker, for example, can be placed on top of the case and the case can be returned to the CDC sort conveyor (42). As a worker picking cases from the local market sort conveyor (24) sees a case traveling around the CDC sort conveyor (42) with a local market sort return marker on it, the case can be picked from the conveyor (42), its label can be scanned, and it can be placed on the local market sort conveyor (24). The local market sort return marker can be removed from the case, flipped up-side-down, and placed back on the CDC sort conveyor (42). The Local Market Sort Program (326) determining that the Case record 1208 of the scanned case already has the Local Market Id of the current CDC sort conveyor (42), can process the scanned case as a reverse local market sort pick. In processing the scanned case as a reverse local market sort pick, the program (326) can verify that the needed quantity of the ePD Retailer Id-SKU combination of the scanned case for the current local market is less than one. If the needed quantity is one or greater, the program (326) can sound, for example, an invalid pick tone and can refrain from updating the Case record 1208. Upon hearing the invalid pick tone (or recognizing another indication not to pick a case), the worker can remove the local market sort return marker from the scanned case, place the marker up-side-down on the CDC sort conveyor (42), and let the case remain on the CDC sort conveyor (42). If the Local Market Sort Program (326) finds that the needed quantity is less than one, it can delete the Local Market Id value from the Case record 1208 of the scanned case, update the Status of that Case record 1208 to a value such as "destination RDC", and sound, for example, a pick confirmation tone. Upon hearing the pick confirmation tone (or recognizing another indication that a case should be picked) the worker can pick the case from the CDC sort conveyor (42) and place it on the local market sort conveyor (24). Changing the Status and removing the Local Market Id value from the Case record can automatically reduce the Quantity of the ePD Retailer Id-SKU combination of the scanned case on the Local Market Case Inventory data view record 1222, since the Case record 1208 of the scanned case will no longer be selected by the Local Market Case Inventory data view 1222. By reducing the Quantity on the Local Market Case Inventory data view record 1222, the net quantity needed for the current local market can increase, since the value that the Local Market Sort Program (326) subtracts from the Local Market Order List data view record 1220 has been reduced. If the full needed amount of items is picked from the case before the reverse local market sort pick is processed, the end result of the reverse pick action can be that a negative needed quantity is increased to zero.

Two situations which can result in a case being physically located on the local market sort conveyor (24), but logically associated with a CDC sort conveyor (42) will be discussed here as an illustrative example. One situation in which this can occur is when a case is picked from a CDC sort conveyor (42) and placed back on to the local market sort conveyor (24) without being scanned to initiate a reverse local market sort pick. Another situation in which it can occur is when a case is scanned on the local market sort conveyor (24), but is not physically picked from that conveyor (24) to a CDC sort conveyor (42). Where a case having a Local Market Id because of either situation is traveling around on the local market sort conveyor (24) and is scanned, the Local Market Sort Program (326) can process that case as a corrective local market sort pick. The Local Market Sort Program (326) can update the Local Market Id value on the Case record 1208 of the scanned case to the value associated with the current CDC sort conveyor (42) and can sound, for example, a pick confirmation tone. Upon hearing the pick confirmation tone (or recognizing another indication that a case should be picked), the worker can pick the case from the local market sort conveyor (24) and place it on the CDC sort conveyor (42). In updating the Local Market Id on the Case record 1208 of the scanned case, the Local Market Sort program (326) can correct the error that existed in the Local Market Case Inventory data view 1222 by reducing the Quantity of that ePD Retailer Id-SKU combination for the local market to which it was being credited incorrectly. At the same time the Local Market Sort program (326) can correctly update the Local Market Case Inventory data view 1222 for the local market of the current CDC sort conveyor (42) as the case is picked and placed on that conveyor (42).

There can, however, be one exception to the normal result of a corrective local market sort pick. If a case on the local market sort conveyor (24) already has a Status such as "CDC sort" and a Local Market Id, and the worker scanning the case happens to be working at the CDC sort conveyor (42) identified by the same Local Market Id as the one on the Case record 1208 of the scanned case, then the program (326) can process the scanned case as a reverse local market sort pick instead of a corrective local market sort pick. The Local Market Sort program (326) can remove the Local Market Id from the Case record 1208 and sound, for example, a pick confirmation as the worker picks the case from the local market sort conveyor (24) to the CDC sort conveyor (42). The result of this action can actually switch the database from being in error in one direction to being in error in the opposite direction. Before the case was scanned and picked, the database could have incorrectly included the quantity of the case in the Local Market Case Inventory data view 1222, when the case was not physically on the CDC sort conveyor (42) of that local market. After the case is scanned and picked, the case can physically be on the CDC sort conveyor (42), but the database can no longer be including the quantity of that case in the Local Market Case Inventory data view 1222. This error can be corrected the first time the case is scanned during a CDC sort processing step 1120.

Most of the cases on the local market sort conveyor (24) can be full cases containing the standard case quantity for one ePD Retailer Id-SKU combination or partially picked cases containing less than the standard case quantity for one ePD Retailer Id-SKU combination. There can be situations where a mixed-item case can be found on the local market sort conveyor (24). Mixed-item cases can contain multiple SKU's from one retailer. There should be no instance when the SKU's of different retailers can be found mixed together in the same case within a destination RDC 1180-1. Workers at the destination RDC 1180-1 performing the local market sort 1118 can break apart mixed-item cases into separate cases or other suitable containers containing a quantity of a single SKU (or item identifier) as they find them on the local market sort conveyor (24). Mixed-item cases can be easily identified because they can have multiple case labels on them. Workers can pick the mixed-item cases off of the local market sort conveyor (24) and read the information on each of the case labels to determine the quantity of each SKU (item identifier). They can remove the different item quantities from the mixed-item case, separating the items of different SKU's into different totes (or other suitable containers). The item quantity of one of the SKU's can be left in the case. The labels of each different SKU can be removed from the mixed-item case and placed face-up on top of the items inside each tote. The label corresponding to the SKU (item identifier) remaining in the case can be left on the case. Workers can place the totes and the case back onto the local market sort conveyor (24) where they can be processed in the same manner as other cases.

After the local market sort 1118 is performed at the destination RDC 1180-1, the CDC sort step 1120 can then be performed at the destination RDC 1180-1. The CDC sort step 1120 can be achieved in a manner similar to the local market sort step 1118. Both include methods for directing cases of items toward a CDC packing station (45) at which packages can be created from those cases. The local market sort 1118 can be a higher level sort used to direct cases which have been designated for the current destination RDC 1180-1 to the CDC sort conveyor (42) of a particular local market to meet the ePD Retailer Id-SKU quantity levels needed to fill the orders bound for that local market. The CDC sort 1120 can be a lower level sort used to direct cases which have been designated for the current local market to a CDC packing station conveyor (44) of a particular CDC 1190-1 or LDDH 1192-1 (within the destination RDC 1180-1) to meet the ePD Retailer Id-SKU quantity levels needed to fill the orders bound for that CDC 1190-1 or LDDH 1192-1. A CDC packing station conveyor (44) can be dedicated to creating packages for either a LDDH 1192-1 or a CDC 1190-1.

In accordance with the invention, a CDC Order List data view 1224 can be created from the underlying Order Header 1200 and Order Detail 1202 tables by for example, selecting, grouping, and subtotaling the Quantity of each SKU (item identifier), from a particular ePD Retailer Id, having, a Status such as "destination RDC", to be delivered to a particular CDC 1190-1 or LDDH 1192-1. The CDC Order List data view 1224 can be dynamic, meaning that the Quantity subtotal of each ePD Retailer Id-SKU combination for a CDC Id can be increased as new Order Header records 1200 having that CDC Id and their related Order Detail records 1202 can be added, or it can be decreased, as the Status of Order Detail records 1202 related to Order Header records 1200 having that CDC Id changes from a value such as "destination RDC" to a value such as "package". New Order Header 1200 and Order Detail 1202 records with a Status such as "destination RDC" can be added as RDC Shipments and Retailer Shipments are received into the current destination RDC 1180-1. The Status on Order Detail records 1202 can be changed from a value such as "destination RDC" to a value such as "package" as packages can be created to fill orders.

With reference to FIG. 9C, the CDC Case Inventory data view 1226 can be created from the underlying Case table 1208 by, for example, selecting, grouping and subtotaling the Quantity of each SKU and ePD Retailer combination for each CDC Id on Case records 1208 having a Status such as "package sort". Case records can be assigned a CDC Id when they get scanned and picked from a CDC sort conveyor (42) onto one of the CDC packing station conveyors (44).

Workers stationed between a CDC sort conveyor (42) and a CDC packing station conveyor (44) at the destination RDC 1180-1 can, for example, use hands-free barcode scanners to scan case label barcodes on cases moving by them on the CDC sort conveyor (42). A CDC Sort Program (328) of the ePD Delivery Application can read the Case table 1208 to find, for example, a RDC Id, a Local Market Id, a CDC Id, a SKU, and an ePD Retailer Id of the scanned Case Id. The CDC Sort Program (328) can validate the RDC Id value in a similar manner as the Local Market Sort Program (326). Although it is highly unlikely to find a case for a different RDC on the CDC sort conveyor (42), if such a condition is detected by the CDC Sort Program (328), the worker performing the CDC sort can react with the same actions as described for the worker that performed the local market sort 1118 when a similar error was detected.

After validating the RDC Id, the CDC Sort Program (328) can validate that the Local Market Id on the Case record 1208 of the scanned case matches the Local Market Id of the current CDC sort conveyor (42). The Local Market Id is normally correct for all cases on the CDC sort conveyor (42), but if a picking error was made and the Case record 1208 did not have a Local Market Id or had a Local Market Id different than the one of the current CDC sort conveyor (42), the CDC Sort Program (328) can correct the situation by updating the Local Market Id to the value of the current CDC sort conveyor (42). If the CDC Sort Program (328) does make an update to the Local Market Id on a Case record 1208, the Local Market Case Inventory 1222 data view can be automatically updated in the same manner as it would if the Local Market Sort Program (326) was making the update. This corrective function of the CDC Sort Program (328) can correct the previously described local market sort picking error in which the Local Market Sort Program (326) processes a scanned case as a reverse local market sort pick instead of a corrective local market sort pick.

Consistent with the invention, after checking that the Local Market Id matches the one for the current CDC sort conveyor (42), the CDC Sort Program (328) can check the CDC Id value. If the program (328) finds that the Case record 1208 of the scanned case has no CDC Id, it can process the scanned case as a CDC sort pick—picking a case from the current CDC sort conveyor (42) to the current CDC packing station conveyor (44). If it finds that the Case record 1208 has the CDC Id of the current CDC packing station conveyor (44), it can process the case as a reverse CDC sort pick—removing a case from the current CDC packing station conveyor (44) to the current CDC sort conveyor (42). If the program (328) finds a CDC Id of a different CDC packing station conveyor (44), it can process the case as a corrective CDC sort pick—removing a case from its previous CDC packing station conveyor (44) and picking it for the current CDC packing station conveyor (44).

In processing a CDC sort pick, the program (328) can search for the record on the CDC Order List data view 1224 with, for example, the SKU and ePD Retailer Id of the scanned case, and the CDC Id associated with the current CDC packing station conveyor (44). If a record 1224 corresponding to that SKU, ePD Retailer Id, and CDC Id combination is located, the CDC Sort Program (328) can compare the Quantity of that record 1224 against the Quantity of its related record on the CDC Case Inventory data view 1226, if there is one. (A related record can have the same SKU, ePD Retailer Id, and CDC Id). The CDC Sort Program (328) can subtract the CDC Case Inventory Quantity (representing the total quantity of an ePD Retailer Id-SKU combination which has already been picked for that CDC 1190-1 or LDDH 1192-1) from the CDC Order List Quantity (representing the total quantity of an ePD Retailer Id-SKU combination needed to fill the open orders for that CDC 1190-1 or LDDH 1192-1) to determine the net quantity of that ePD Retailer Id-SKU combination still needed for that CDC 1190-1 or LDDH 1192-1. If the CDC Order List record 1224 does not have a related CDC Case Inventory record 1226, the full quantity of the CDC Order List record 1224 can be considered the net quantity needed. If the net quantity needed of that ePD Retailer Id-SKU combination for that CDC 1190-1 or LDDH 1192-1 is greater than zero, the CDC Sort Program (328) can indicate that the case should be picked by, for example, producing a pick confirmation tone and can assign the case to the CDC 1190-1 or LDDH 1192-1 by writing the CDC Id of the current CDC packing station conveyor (44) into the CDC Id field of the Case record 1208 and updating the Status of the Case record to a value such as "package sort". Upon hearing the pick confirmation tone (or recognizing another indicator to pick a case), the worker who scanned the case can pick it from the CDC sort conveyor (42) and place it on the CDC packing station conveyor (44) of the CDC 1190-1 or LDDH 1192-1 for which the worker is working. If there is not a CDC Order List record 1224 for the current CDC 1190-1 or LDDH 1192-1 with the ePD Retailer Id-SKU combination of the scanned case, or if there is one, but the CDC Sort Program (328) determines that the net quantity needed for it is less than one, the program (328) can indicate that the case should not be picked by, for example, sounding an invalid pick warning tone. Upon hearing the invalid pick warning tone (or recognizing another indicator not to pick a case), the worker can let the case pass by on the CDC sort conveyor (42).

Some cases picked from the CDC sort conveyor (42) onto the CDC packing station conveyor (44) for a CDC 1190-1 or LDDH 1192-1 can be used completely to satisfy orders for that local market. If that is the situation, the quantity of the picked case will be less than the net quantity needed for that CDC 1190-1 or LDDH 1192-1. As the net quantity of an ePD Retailer Id-SKU combination needed for a CDC 1190-1 or LDDH 1192-1 decreases close to zero, a picked case can have a quantity greater than the net quantity needed. In that situation, the case can be picked and the net quantity needed can become negative. After all the item quantities of that ePD Retailer Id-SKU combination needed to fill orders for the current CDC 1190-1 or LDDH 1192-1 are picked from that case to create packages, a CDC sort return marker can be placed on top of the case and the case can be returned to the CDC packing station conveyor (44). As the worker picking cases from the CDC sort conveyor (42) sees a case traveling around the CDC packing station conveyor (44) with a CDC sort return marker on it, the worker can, for example, pick the case from the conveyor (44), scan the case's label, place the case on the CDC sort conveyor (42), flip the CDC sort return marker up-side-down, and place the marker back on the CDC packing station conveyor (44). Because the CDC Sort Program (328) can determine that the Case record 1208 of the scanned case already has the CDC Id of the current CDC packing station conveyor (44), it can perform reverse CDC sort pick processing. The program (328) can first check to make sure that the needed quantity of the ePD Retailer Id-SKU combination of the scanned case for the current CDC 1190-1 or LDDH 1192-1 is less than one. If the needed quantity is one or greater, the program (328) can sound, for example, an invalid pick tone and can refrain from updating the Case record 1208. The worker can, for example, remove the CDC sort return marker, place it up-side-down on the CDC packing station conveyor (44), and let the case remain on the CDC packing station conveyor (44). If the CDC Sort Program (328) determines that the needed quantity is less than one, it can, for example, delete the CDC Id value on the Case record 1208 of the scanned case, update the Status of that Case record 1208 to a value such as "CDC sort", and indicate to pick the case by sounding a pick confirmation tone. Upon hearing the pick confirmation tone (or recognizing another indicator to pick a case) the worker can, for example, pick the case from the CDC packing station conveyor (44) and place it on the CDC sort conveyor (42). Changing the Status and removing the CDC Id value from the Case record 1208 can automatically reduce the Quantity of the ePD Retailer Id-SKU combination of the scanned case on the CDC Case Inventory data view record 1226, since that Case record 1208 will no longer be selected by the CDC Case Inventory data view 1226. By reducing the Quantity on the CDC Case Inventory data view record 1226, the net quantity needed for the current CDC 1190-1 or LDDH 1192-1 can be increased, since the value that the CDC Sort Program (328) subtracts from the CDC Order List data view record 1224 has been reduced. If the full needed amount of items was picked from the case before the reverse CDC sort pick was done, the reverse pick action can result in a negative needed quantity being increased to zero.

Situations can occur in which a case is physically on a CDC sort conveyor (42), but logically associated with a CDC packing station conveyor (44). In one situation, a case can be picked from a CDC packing station conveyor (44) and placed back on to a CDC sort conveyor (42) without being scanned to initiate a reverse CDC sort pick. In another, a case can be scanned on the CDC sort conveyor (42), but not physically picked from that conveyor (42) to a CDC packing station conveyor (44). If a case having a CDC Id because of either situation is traveling around on the CDC sort conveyor (42) and gets scanned, the CDC Sort Program (328) can process that case as a corrective CDC sort pick. The CDC Sort Program (328) can update the CDC Id value on the Case record 1208 of the scanned case to the value of the current CDC packing station conveyor (44) and can indicate that the scanned case should be picked, for example, by sounding a pick confirmation tone. The worker can pick the case from the CDC sort conveyor (42) and place it on the CDC packing station conveyor (44). In updating the CDC Id on the Case record 1208 of the scanned case as part of the corrective CDC sort pick, the CDC Sort Program (328) can correct the error that existed in the CDC Case Inventory data view 1226 by reducing the Quantity of that ePD Retailer Id-SKU combination for the CDC 1190-1 or LDDH 1192-1 that it was being credited to incorrectly. The corrective CDC sort pick action can also correctly update the CDC Case Inventory data view 1226 for the CDC 1190-1 or LDDH 1192-1 of the current CDC packing station conveyor (44) as the scanned case gets picked and placed on that conveyor (44).

An exception to the normal result of a corrective CDC sort pick can occur when the Case record 1208 of a case on the CDC sort conveyor (42) already has a Status such as "package sort" and a CDC Id, and the worker scanning the case happens to be working at the CDC packing station conveyor (44) identified by the CDC Id of that Case record 1208. In this situation, the CDC Sort Program (328) can process the scanned case, for example, as a reverse CDC sort pick instead of a corrective CDC sort pick. The program (328) can remove the CDC Id from the Case record 1208 and make an indication to pick the case, such as sounding a pick confirmation tone as the worker picks the case from the CDC sort conveyor (42) to the CDC packing station conveyor (44). The result of this action actually switches the database from being in error in one direction to being in error in the opposite direction. Before the case was scanned and picked, the database incorrectly included the quantity of the case in the CDC Case Inventory data view 1226, when the case was not physically on the CDC packing station conveyor (44) of that CDC 1190-1 or LDDH 1192-1. After the case gets scanned and picked, the case can be physically on the CDC packing station conveyor (44), but the database no longer includes the quantity of that case in the CDC Case Inventory data view 1226. This error can be corrected when the case is scanned in the process utilized for creating packages. The CDC sort step 1120 can result in cases containing the item quantities needed to fill a CDC's 1190-1 or a LDDH's 1192-1 orders being on the CDC packing station conveyor (44) of that CDC 1190-1 or LDDH 1192-1.

Once the CDC sort step 1120 is completed, packages can be created from the sorted items as illustrated in step 1122. One of the main purposes that each shipper's RDC can serve within the ePD Delivery Process can be as an origination RDC—acting as an initial receiving point for all cases of product from nearby retailers and sorting and forwarding those cases onto their destination RDC's. Another main purpose a shipper's RDC can serve can be as a destination RDC—creating bulk delivered packages for recipients from the cases of ordered items received from other RDC's or directly from retailers and shipping those packages in bulk to the CDC's and LDDH's in the local markets served by that RDC.

In accordance with a further aspect of the invention, refrigerated items, frozen items, and standard temperature items are not packaged together, because each type of item requires a different storage temperature. In the one embodiment, refrigerated and/or frozen temperature items can be packed into packages by retailers at their fulfillment sites and delivered directly into CDC's 1190-1 by a shipper or the retailer. Because many retailers will either ship only items requiring cold temperature storage or items which can be stored at standard temperatures, many retailers can employ one order fulfillment method and can either ship item cases to the nearest origination RDC 1170 or ship customer packages directly to their destination CDC 1190-1. If a retailer ships both types of items, it can employ separate order fulfillment methods to ship each type of item. Although in this exemplary embodiment packages are described as being created in a destination RDC 1180-1 for standard temperature items only, the database and programs of the ePD Delivery Application can be designed to provide the capability to create separate packages for items requiring different storage temperatures. Retailers that ship bulk delivered packages directly to CDC's 1190-1 can utilize a Retailer Package Creation Program (315) of the ePD Shipping Application or a modified version of their own order fulfillment software to create Package records 1234 and print packing lists and package labels as they create packages to ship directly to CDC's 1190-1.

The workers at the destination RDC 1180-1 that create packages can be stationed at a CDC packing station (45) at which they can be working. CDC packing stations (45) designated to a particular CDC 1190-1 or LDDH 1192-1 can be located adjacent to the CDC packing station conveyor (44) designated to that CDC 1190-1 or LDDH 1192-1. One RDC worker can be assigned to one CDC packing station (45) at one time, and that worker can be dedicated to the task of creating packages for only the one CDC 1190-1 or LDDH 1192-1 to which that CDC packing station (45) is dedicated. A Package Creation Program (330) of the ePD Delivery Application can drive the package creation process. CDC packing stations (45) can be grouped together by the CDC 1190-1 or LDDH 1192-1 to which they can be dedicated. Each CDC packing station (45) within the group can be connected to and can be powered by its own workstation, located, for example, within its back console. Each packing station workstation (not shown separate from a CDC packing station (45)) can run a different instance of the Package Creation Program (330), but each instance running within the group (of CDC packing stations (45) organized for a specific CDC 1190-1 or LDDH 1192-1) can have the same pre-defined program value for CDC Id. All program instances running within the current destination RDC 1180-1 can have the same pre-defined program value for RDC Id and ePD Shipper Id.

Figure 4:
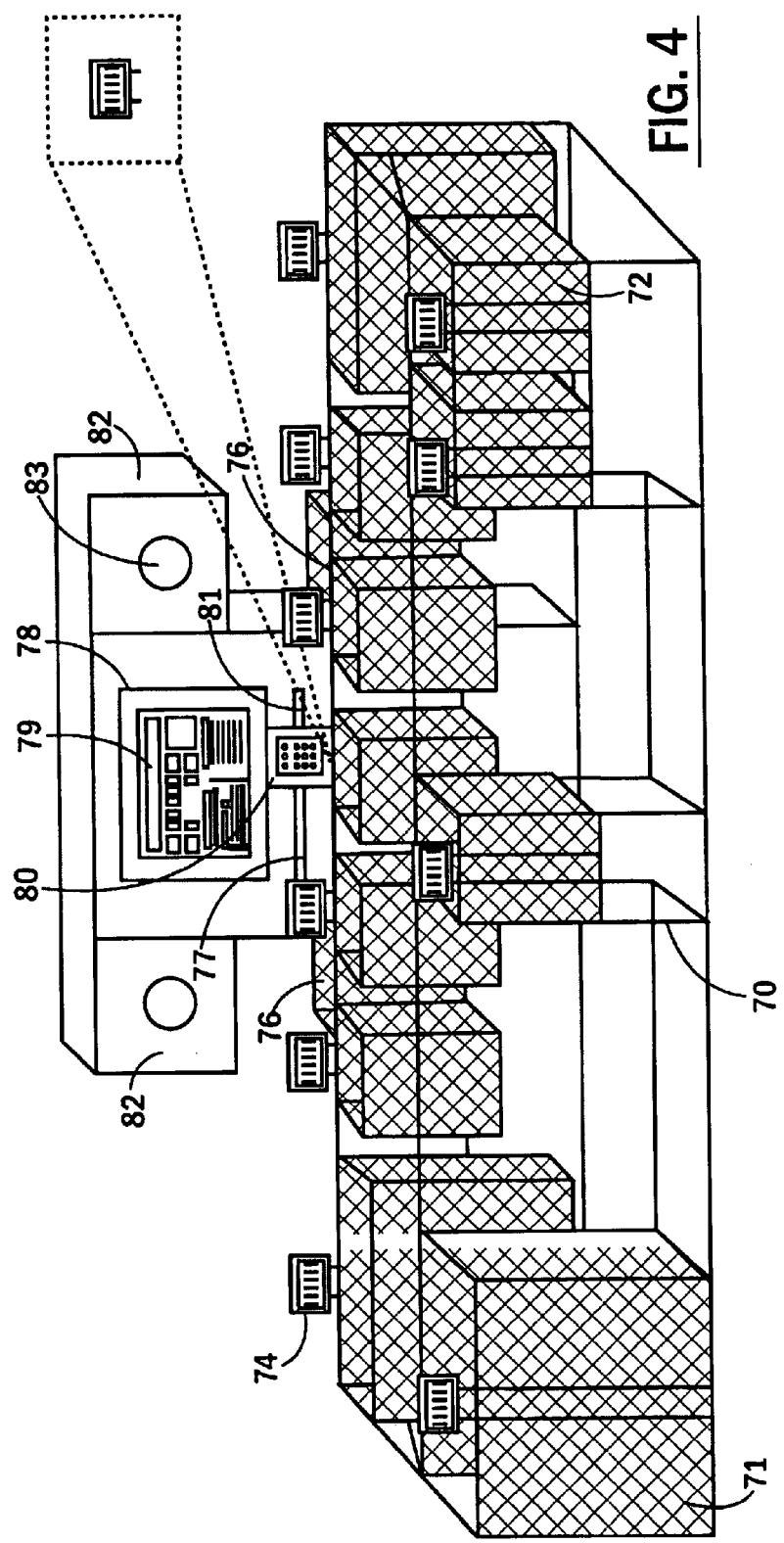
FIG. 4 is an illustrative embodiment of an exemplary package creation side of a Customer Distribution Center (CDC) Packing Station.

There is shown in FIG. 4, an illustrative embodiment of an exemplary package creation side of a Customer Distribution Center (CDC) Packing Station. The Customer Distribution Center (CDC) Packing Station of FIG. 4, can have the following entities: rack frame (70), large package bag holder (71), small package bag holder (72), fixed location bar code label plate (74), packing material storage bin (76), packing document printer (77), back console (78), program display monitor (79), keypad (80), label printer (81), package bag storage dispenser (82), and package bag storage dispenser opening (83).

Referring to FIG. 4, in one embodiment of the invention, the package creating side of a CDC packing station (45) can consist of a rack frame (70) made of metal or a suitable composite which can contain, for example, multiple wire mesh package bag holders arranged in rows. For illustrative purposes, there can be 11 package bag holders arranged into two rows. Likewise, there can be two different sizes of package bag holders. A CDC packing station (45) can have, for example, large package bag holders (71) in three of its corners. For example, five of its eight small package bag holders (72) can be spaced a few inches apart between the two large package bag holders (71) in the second row of the packing station. The other three small package bag holders (72) can be in the front row of the packing station—one can be directly in front of the middle small package bag holder (72) of the second row and two can be spaced a few inches apart, directly in front of one of the large package bag holders (71) in the second row of the packing station. There can be sufficient space inside the front row of the packing station to allow free access to the surrounding package bag holders or any of the components on the back console of the packing station (78). The package bag holders can be spaced a few inches apart from each other on each side and there can be a few inches of space between the front and second rows. The tops of the package bag holders in the second row can be raised a few inches above the tops of the package bag holders in the first row. The wire mesh package bag holders can be open at the top, having four sides and a bottom. Each package bag holder can have a fixed location barcode label plate (74) mounted just above its top edge either a few inches in front of the center of its top front edge (for the package bag holders in the front row) or a few inches behind the center of its top back edge (for the package bag holders in the second row). A fixed location barcode label plate (74) can be a thin metal or plastic plate with a barcode label affixed to it, and can be attached to the bottom of a package bag holder (71 or 72), for example, by two thin metal beams which can extend out one or more inches from the front or back side of the package bag holder and can run parallel to the front or back side of the package bag holder. A fixed location barcode label plate (74) can be designed to allow for a barcode label to be physically associated with a package bag holder, without being covered and/or blocked by a package bag, which can be placed in and around that package bag holder. A packing station (45) can also have, for example, two packing material storage bins (76) on either side of the back console (78) extending from and attached to the back of the rack frame of the packing station (70). These two bins (76) can be made of material, such as, wire mesh or comparable material similar to the package bag holders. The packing material storage bins (76) can be used to store bubble wrap packing sheets which can be packed between items within a package bag to protect those items from damage. The back console (78) of the CDC packing station (45) can be situated behind the rack frame (70) of the CDC packing station (45) in between the two storage bins (76). The back console (78) can have, for example, a program display monitor (79), a keypad (80), a packing document printer (77), and a label printer (81). There can be two package bag storage dispensers (82) located on either side of the back console (78) at approximately the same height as the program display monitor (79). Each of the package bag storage dispensers (82) can have an open back to facilitate loading and an opening (83) in the center of its front side, through which a worker can take package bags as they can be needed. One of the package bag storage dispensers (82) can be used to dispense small package bags while the other can be used to dispense large package bags.

In a further embodiment, specially designed ePD package bags can be used in creating packages. ePD package bags can be made of material, for example, plastic bubble wrap, which can be approximately one inch in thickness. Pre-sized plastic bubble wrap bags can advantageously cushion and protect items from damage while in transit or in a Smart Bin Unit (SBU) at a CDC 1190-1. Furthermore, pre-sized bags can ensure a proper fit for the SBU bins at a CDC 1190-1 when delivered. For illustration, the outer dimensions of the small package bags can measure 12 inches by 17 inches by 40 inches, with an inner capacity of 10 inches by 15 inches by 24 inches. The opening of the small package bag can be approximately 10 inches by 15 inches with the thickness of the sides of the bubble wrap bag accounting for the other approximate two inches of each outer dimension. The small package bag can have a pre-marked capacity fill line on it located at approximately 25 inches from the bottom of the bag. As an illustration, the height of the bag can consist of approximately 24 inches of inner capacity on top of one inch of the bottom of the bag's thickness, with approximately 15 inches of height allowing for the bag to be cinched closed at the top—8½ inches (one-half of 17 inches, the larger of the bag opening's dimensions) to bring the widest sides of the bag together, plus another 6½ inches (approximately a handful) of extra material above the point where the bag is cinched. The outer dimensions of the large bags can measure 28 inches by 17 inches by 63 inches, with an inner capacity of 26 inches by 15 inches by 44 inches. The inner capacity dimensions can be calculated in the same manner as for the small bag, but the large bag can have three pre-marked capacity fill lines on it—at 21, 33, and 45 inches. In an alternate embodiment of the invention, other material suitable for packing can be utilized. This can include cardboard boxes, packaging paper, or other material known in the art.

The package bag holders can be sized to fit the package bags inside them allowing for the outer sides of the package bag to fit easily but snugly within its mesh wire sides—for illustration, small package bag holders (72) can be approximately 12 inches left to right, by 17 inches front to back, by 25 inches top to bottom; the large package bag holders (71) can be approximately 28 inches left to right, by 17 inches front to back, by 45 inches top to bottom. The extra material of the bubble wrap package bags extending above the package bag holders (71 & 72) can be folded back over the top edges and down the sides of the package bag holders.

In one embodiment, each item SKU shippable by the ePD Delivery Process can be categorized into one of five different sizes. A small-sized SKU can be one that is small enough to fit into a small package bag. A medium-sized SKU can be one that is too large to fit into a small package bag, but is small enough to fit into a large package bag. A large-sized SKU can be one that is too large to fit into a large package bag, but is small enough to fit into one of the divided sections within a configured stationary bin of a Smart Bin Unit (SBU) at a CDC 1190-1. An extra-large-sized SKU can be one that is too large to fit into a divided section of a SBU stationary bin, but is small enough to fit into the largest, undivided, configured stationary bin of a SBU. A LDDH-sized item SKU can be too large to fit into the largest, undivided, configured stationary bin of a SBU and can be considered unshippable to a CDC 1190-1, but it can be delivered to a customer-specified address after being distributed to a local delivery distribution hub (LDDH) 1192-1. In addition to being too large to fit into SBU bins at a CDC 1190-1, LDDH-sized items can be generally too bulky and heavy for a person to carry without moving equipment and can therefore be delivered more efficiently via a LDDH to a customer-specified address. Some SKU's which can be small enough to fit into the largest configured stationary bin of a SBU can still be classified as LDDH-sized if their weight and dimensions make it dangerous or impractical for a recipient to carry them away from a CDC 1190-1 without moving equipment. Large-sized, extra-large-sized, and LDDH-sized SKU's will be referred to collectively as over-sized items throughout the remainder of this disclosure. SKU size can be tracked on the Case 1208 and Order Detail 1202 tables and some of the data views created from those tables.

With reference to FIG. 9C, there can be three data views created and used by the Package Creation Program (330) of the ePD Delivery Application. One can be a Customer By SKU Order List data view 1228, which can subtotal the Quantity needed for each recipient of each ePD Retailer Id-SKU combination. It can be created from the underlying Order Header 1200 and Order Detail 1202 tables by selecting, grouping, and subtotaling, for example, Customer Id's (representing the recipient of each order) and their Quantities for each CDC Id-ePD Retailer Id-SKU combination. A temperature Code and SKU Size associated with each SKU can also be selected as part of the data view 1228. The following illustrative Structured Query Language (SQL) can be used in creating the Customer By SKU Order List data view 1228:

select CDC Id, ePD Retailer Id, SKU, Customer Id, Temperature Code, SKU Size, Quantity from Order Header and Order Detail where Order Detail.Status= "destination RDC" group by CDC Id, ePD Retailer Id, SKU, Customer Id, Temperature Code, SKU Size order by CDC Id, ePD Retailer Id, SKU, Customer Id A SKU By Customer Order List 1230 can be another data view, which can be created from the underlying Order Header 1200 and Order Detail 1202 tables. Instead of selecting Customer Id's and their Quantities for CDC Id-ePD Retailer Id-SKU combinations, the SKU By Customer Order List data view 1230 can be created by selecting and grouping, for example, ePD Retailer Id-SKU combinations and their Quantities for each CDC Id-Customer Id-Temperature Code combination. The SKU Size associated with each SKU can also be selected as part of the data view 1230. The purpose of this data view 1230 can be to subtotal the Quantity of each ePD Retailer Id-SKU combination needed for each CDC Id-Customer Id-Temperature Code combination. The following illustrative Structured Query Language (SQL) can used in creating the SKU By Customer Order List data view 1230:

select CDC Id, Customer Id, Temperature Code, ePD Retailer Id, SKU, SKU Size, Quantity from Order Header and Order Detail where Order Detail.Status= "destination RDC" group by CDC Id, Customer Id, Temperature Code, ePD Retailer Id, SKU, SKU Size order by CDC Id, Customer Id, Temperature Code, ePD Retailer Id, SKU The other data view used by the Package Creation Program (330) can be an Open Package List data view 1232. It can be created by selecting, for example, the CDC Id, Customer Id, Temperature Code, Package Id, Package Bag Holder Id, and Package Size for each Packing Employee Id from the underlying Package table 1234. The purpose of this data view 1232 can be to organize selected package information for the open packages of each worker creating packages. The following illustrative Structured Query Language (SQL) can be used in creating the Open Package List data view 1232:

select CDC Id, Packing Employee Id, Customer Id, Temperature Code, Package Id, Package Bag Holder Id, Package Size from Package where Status "open" order by CDC Id, Packing Employee Id, Customer Id, Temperature Code All three data views can be dynamically updated as data changes on their underlying tables. The ePD Retailer Id's and SKU's can be selected together in combination for the data views to ensure that a customer who orders a particular SKU from one retailer does not receive the same SKU from a different retailer who may sell the same item. Customer Id's and Temperature Codes can be selected together in combinations to separate items, requiring different shipping and storage due to their temperature, into different packages, even if those packages are for the same recipient and CDC 1190-1 or LDDH 1192-1.

The Package Creation Program (330) can use the three data views in combination with its program rules to coordinate the creation of packages by multiple workers destined for recipients at one CDC 1190-1 or LDDH 1192-1. The Package Creation Program (330) can allow one open package at a time for a given combination of recipient, temperature code, and CDC 1190-1 or LDDH 1192-1. It is possible for a recipient to have more than one open package if the packages are for different CDC's 1190-1 or LDDH's 1192-1 or if the packages have different temperature codes. As one worker closes or completes a package for a given Customer Id-Temperature Code-CDC Id combination, a new package can be opened for that same combination by that same worker or by another worker. The Package Creation Program (330) can attempt to pick a SKU to finish an open package, before it picks a SKU to create a new package. Each worker can have a limited number of small-sized and medium-sized packages open at one time, which can be configured based upon the number of package bag holders of each size contained within their packing station (45). In one embodiment a worker may have up to three medium-sized and eight small-sized packages open at the same time. When creating a new package for a recipient, the Package Creation Program (330) can determine the size of the package by the size of the SKU's needed for that recipient (Customer Id). If the SKU Size on any of the SKU by Customer Order List records 1230 for the open orders of a Customer Id-Temperature Code combination for the current CDC Id is a value such as "medium", the Package Creation Program (330) can direct the worker to use one of the large package bag holders on the packing station (45). If all of the SKU Sizes needed for the open orders of a Customer Id-Temperature Code combination for the current CDC Id are either small-sized or over-sized, the Package Creation Program (330) can direct the worker to use one of the small package bag holders when the case of one of those small-sized SKU's is scanned. Over-sized items are not packed into package bags with other items. The Package Creation Program (330) can treat them as separate single-item packages and can direct workers to apply package labels directly to them. In one aspect of the invention, when a case label is scanned by a worker at a packing station (45), the Package Creation Program (330) can result in one of several actions, which can include but are not limited to: a prompt to pick a specified quantity from the scanned case to pack into one of the worker's existing packages; a prompt to create a new package with a specified quantity from the scanned case; a prompt to label the case as a large single-item package; or an indication to let the scanned case pass by on the CDC packing station conveyor (44).

Figure 5:
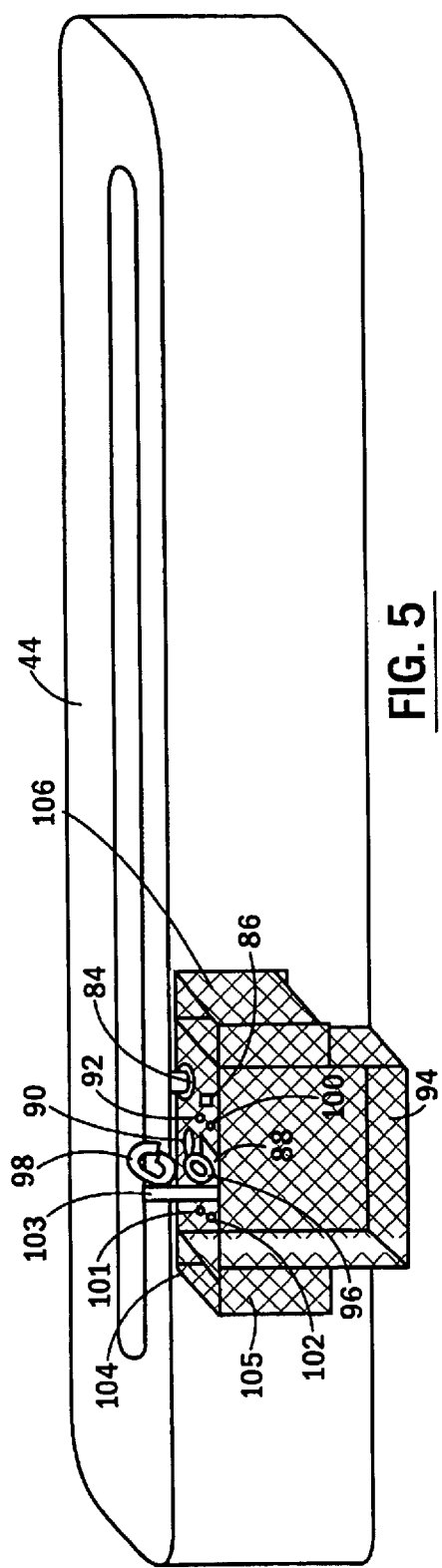
FIG. 5 is an illustrative embodiment of an exemplary Package Sealing side of a Customer Distribution Center (CDC) Packing Station.

Each packing station (45) can be divided into several parts. For example, there can be two main parts, namely, a package creation side as illustrated in FIG. 4 and a package sealing side (FIG. 5). There is shown in FIG. 5, an illustrative embodiment of an exemplary Package Sealing side of a Customer Distribution Center (CDC) Packing Station. The Package Sealing side of a Customer Distribution Center (CDC) Packing Station can have the following entities: pick confirmation light (84), scanner port (86), trimming slot (88), package tie holder (90), tie holder lock button (92), package sealer compartment (94), package guide ring (96), package holding ring (98), tie holder release button (100), package holder lock button (101), package holder release button (102), package holder support base (103), package sealing station top (104), packing list pouch storage bin (105), and package tie storage bin (106).

Referring to FIG. 5, the package sealing side can be built onto the edge of a CDC packing station conveyor (44). The package creation side (FIG. 4) can be an independently standing structure, which can be located opposite to the package sealing side, with working space in between the two sides in which a worker is able to move. A RDC worker can log into an instance of the Package Creation Program (330) by using, for example, a hands-free barcode scanner attached to a CDC packing station (45) to scan their employee identification (id) card. The hands-free scanner can be plugged into a scanner port (86) on the package sealing side of the CDC packing station (45) at which the worker is stationed. Upon logging into the program (330), the scanned employee id value can be written to the Packing Employee Id field of all the records on a Package Bag Holder table 1236 associated with that worker's packing station (45). As a case moves by on the current CDC packing station conveyor (44) the worker can scan the barcode on the case label. The Package Creation Program (330) can read the Case Id from the scanned barcode and use it to retrieve information such as, the ePD Retailer Id and SKU of that case from the Case table 1208. The Package Creation Program (330) can use the ePD Retailer Id, SKU, and the CDC Id associated with the current CDC packing station (45) to retrieve data records from the Customer By SKU Order List data view 1228. The retrieved records can be a listing of all the recipients for whom an ordered item of the scanned case is to be delivered to the current CDC 1190-1 or LDDH 1192-1. Each of the retrieved data records 1228 can include information such as the Customer Id, Temperature Code, SKU Size, and Quantity of the item ordered by the customer. The program can check the SKU Size of the first Customer By SKU Order List record 1228 retrieved to determine if single-item package or multi-item package processing should be followed. If the selected record's 1228 SKU Size is a value such as "large", "extra-large", or "LDDH", single-item package processing can be performed. If the selected record's 1228 SKU Size is a value such as "small" or "medium", multi-item package processing can be performed.

Figure 7:
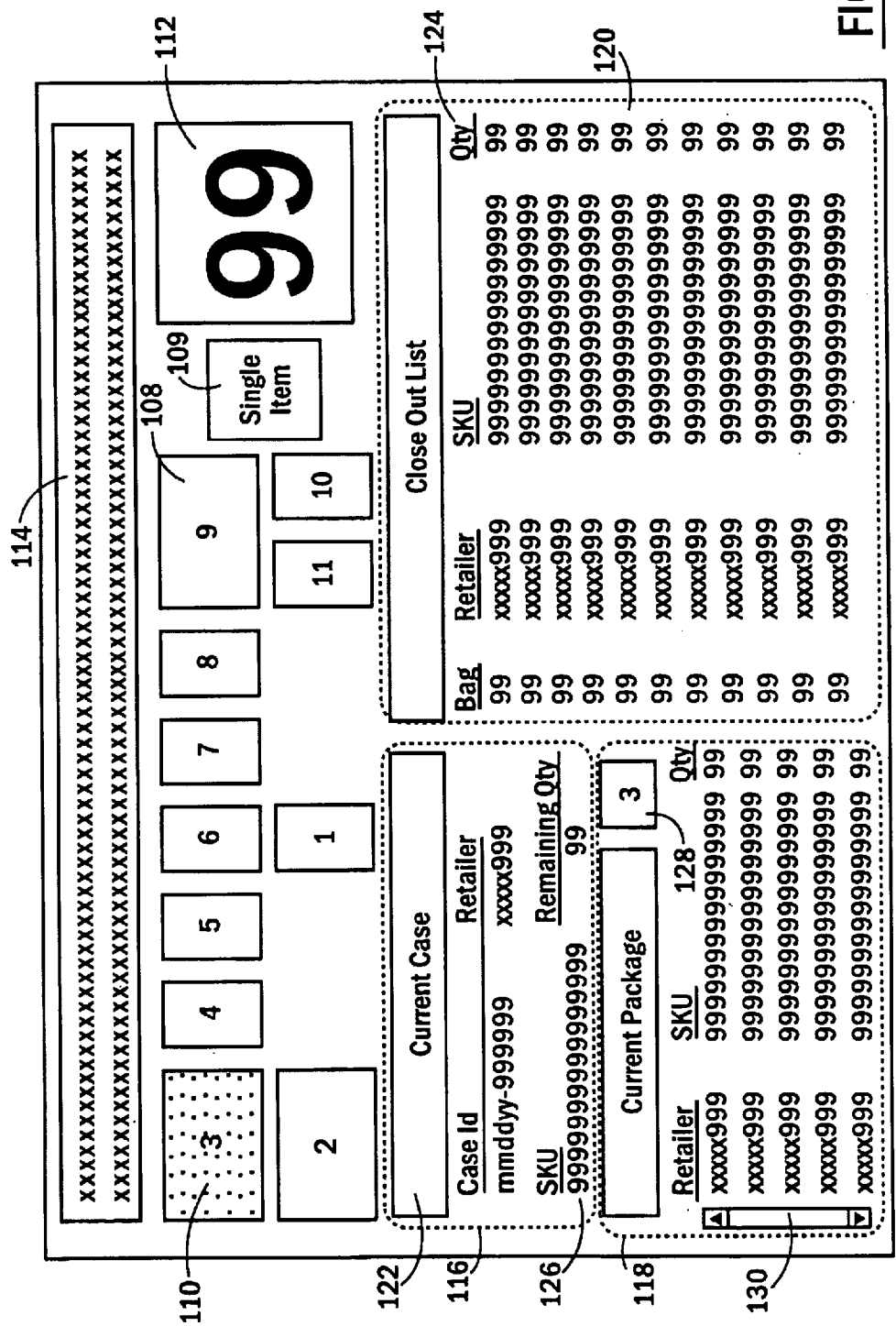
FIG. 7 is an illustrative embodiment of an exemplary layout of a Package Creation Screen.

There is shown in FIG. 7, an illustrative embodiment of an exemplary layout of a Package Creation Screen. The Package Creation Screen can have the following: Package bag indicator 108, Single item package indicator 109, Pick quantity indicator field 112, Message field 114, Current case information display section 116, Current package information display section 118, Close out list information display section 120, Information display section title 122, Information display section column header 124, Information display section line detail 126, Current package information display—package indicator 128, and Package list scroll bar 130. One of the package bag indicators 108 can be displayed as a highlighted package bag indicator 110, when the Package Creation Program (330) is trying to identify a package bag as part of a program action. As part of a multi-item package processing, the Package Creation Program (330) can use the current CDC Id (the CDC Id associated with the current CDC packing station (45)) and the worker's Employee Id to select records from the Open Package List data view 1232, having the current CDC Id in the CDC Id field and the worker's Employee Id in the Packing Employee Id field. The Package Creation Program (330) can read the list of Customer Id-Temperature Code combinations from the selected Open Package List records 1232 sequentially, searching for each Customer Id-Temperature Code combination in the data that was retrieved from the Customer By SKU Order List data view 1228 when the case was scanned. Whenever a match is found, the worker can already have an open package, having the same temperature code as the scanned case, for a recipient for whom the item of the scanned case was ordered. The Package Creation Program (330) can make an indication to pick one or more items from the case, for example, by sounding a pick confirmation tone, lighting up the pick confirmation light (84), highlighting the package bag indicator (108) containing that recipient's open package, displaying the quantity to pick in the pick quantity indicator field (112), and displaying a message in the message field (114) of a Package Creation Screen, illustrated in FIG. 7, on the program display monitor (79).

The displayed message can direct the worker to pack the indicated quantity of the item in the scanned case into the package bag represented by the highlighted package bag indicator (110) and scan the fixed location barcode label plate (74) of the highlighted package bag. The Package Creation Program (330) can determine which package bag indicator (108) to highlight from a Package Bag Holder Id on the selected Open Package List record 1232. A Package Bag Holder Id can be a fixed value that represents a particular package bag holder (71 or 72) on a packing station (45) and the package currently in that package bag holder (71 or 72). The Package Creation Program (330) can determine the value to display in the pick quantity indicator field (112) by selecting the Quantity on the underlying Order Detail record 1202 of the transaction. To select the transaction's underlying Order Detail record 1202, the Package Creation Program (330) can search for a record 1202 containing the Customer Id, for which it was able to find a match between the Open Package List record 1232 and the Customer By SKU Order List record 1228, the current CDC Id, and the ePD Retailer Id and SKU of the scanned case. If the recipient (represented by Customer Id) has more than one open order (Order Detail record 1202 having a Status such as "destination RDC") for the current CDC 1190-1 or LDDH 1192-1 containing the item of the scanned case, the Order Detail record 1202 associated with the Order Header record 1200 having the earliest Order Date/Time can be selected. Upon hearing the pick confirmation tone or seeing the pick confirmation light (84) flash (or recognizing another indicator to pick an item from the scanned case), the worker can pick the case from the CDC packing station conveyor (44) and for example, place it on top of the packing station—on either the package sealing side (FIG. 5) or the package creation side (FIG. 4). The worker can look at the case label to determine if the case is a single-item case or a multi-item case. If the case label does not have an indicator, such as a large "S" printed on it, to indicate a single-item case, the worker can, for example, open the case (if it has not already been opened), pick the indicated quantity of items from the case, pack the indicated quantity of items into the highlighted package bag, enter the picked quantity using for example, the packing station keypad (80), and scan the fixed location barcode label plate (74) associated with the highlighted package. When packing the items into the package bag, the worker can use packing materials such as bubble wrap packing sheets, which can be stored in the packing material storage bin (76), as needed to protect the items from damage.

The Package Creation Program (330) can determine the Package Id associated with the scanned fixed location barcode label plate (74) by searching the Package table 1234 for the record having the Package Bag Holder Id that is printed in barcode format on that label plate (74) and a Status such as "open". The program (330) can validate the scanned Package Bag Holder Id against the Package Bag Holder Id selected from the Open Package List data view 1232. If it does not match, the worker scanned a different label plate (74) by mistake and the program (330) can signal that an error has occurred, for example, by sounding an error tone and displaying a message indicating that the wrong package was scanned. The program (330) can also validate the quantity entered on the keypad (80) against the value in the Quantity field of the selected Order Detail record 1202 underlying the transaction. If the entered quantity does not match, the worker entered a different value and the program (330) can signal that an error has occurred, for example, by sounding an error tone and displaying a message indicating that the wrong quantity was entered. If the worker did not enter a quantity before scanning the barcode on the label plate (74), the program (330) can signal that an error has occurred, for example, by sounding an error tone and displaying the same error message as it does when the wrong quantity is entered. Upon successful validation, the Package Creation Program (330) can update the selected Order Detail record 1202 by setting its Status to a value such as "package", writing the Package Id from the selected Open Package List record 1232 to the Package Id field, and writing the Case Id of the scanned case to the Case Id field. The Package Creation Program (330) can also update the Case record 1208 of the scanned case by decrementing its Quantity by the quantity the worker entered on the keypad (80). After the worker enters the indicated pick quantity and scans the correct label plate (74), the program (330) can indicate that the picked quantity of items was successfully associated with the package of the scanned label plate (74), for example, by sounding another confirmation tone and displaying a confirmation message confirming that the picked items were added to the package successfully.

If a match was not found when the worker scanned the case label and the program (330) searched for the Customer Id-Temperature Code combinations of the worker's open packages on the Customer By SKU Order List records 1228 having the current CDC Id and the ePD Retailer Id-SKU combination of the scanned case, then none of the recipients of the worker's open packages require an item from the scanned case. The program (330) can then check to see if a new package should be created for a recipient using the items of the scanned case. The Package Creation Program (330) can determine whether a new package should be created by sequentially reading the records selected from Customer By SKU Order List 1228 for the current CDC Id and the ePD Retailer Id-SKU combination of the scanned case, checking for the Customer Id-Temperature Code combination of each record 1228 on the Open Package List records 1232 having the current CDC Id. If all the Customer Id-Temperature Code combinations on the Customer By SKU Order List 1228 are also on the Open Package List 1232, then all the recipients for whom that item has been ordered for delivery to the current CDC 1190-1 or from the current LDDH 1192-1 can already have open packages with other workers. In this situation, a new package should not be created. The Package Creation Program (330) can indicate not to pick items from the case, for example, by sounding an invalid pick tone, turning off the highlight of whichever package bag indicator (108) was previously highlighted, setting the pick quantity indicator field (112) to zero, and displaying a message in the message field (114) of the Package Creation Screen. The message can direct the worker not to pick items from the scanned case, because its items are intended for packages at other packing stations (45).

If the Package Creation Program (330) was able to find a Customer Id-Temperature Code combination on the Customer By SKU Order List data view 1228, for which there was not a matching record on the Open Package List data view 1232, when trying to determine whether a new package should be opened for a recipient, then that recipient does not have an open package at any packing station (45) for the current CDC 1190-1 or LDDH 1192-1 and a new package should be created. To create a new package, the program (330) can check to determine if the worker has availability at the packing station (45) to start the new package. Determining packing station availability can include determining the package size. The Package Creation Program (330) can determine the package size needed for the recipient by searching the SKU By Customer Order List data view 1230 for all of the records with the current CDC Id and Customer Id-Temperature Code combination. If any of the selected records 1230 has a SKU Size value such as "medium", the Package Creation Program (330) can search the Package Bag Holder table 1236 for records containing the worker's id in the Packing Employee Id field, a Status such as "available", and a Package Bag Holder Size such as "large". If none of the selected records has a SKU Size value such as "medium", the Package Creation Program (330) can search the Package Bag Holder table 1236 for records containing the worker's id in the Packing Employee Id field, a Status value such as "available", and Package Bag Holder Size value such as "small". If the Package Creation Program (330) doesn't find an available package bag holder (71 or 72) of the right size, it can indicate that a new package cannot be created with items from the scanned case, for example, by sounding an invalid pick tone, turning off the highlight of whichever package bag indicator (108) was highlighted, setting the pick quantity indicator field (112) to zero, and displaying a message in the message field (114) of the Package Creation Screen. The message can direct the worker not to pick items from the case, because the worker's packing station (45) doesn't have a package bag holder of the correct size (71 or 72) available. It can be possible for a worker to override the Package Creation Program (330) and start a new package for the recipient, using for example, a package creation override key sequence on the packing station keypad (80), if the Package Creation Program (330) was looking for a small package bag holder (72) and only a large one (71) was available.

On finding an available package bag holder (71 or 72) of the appropriate size, the Package Creation Program (330) can create a new record on the Package table 1234 having, for example, the Customer Id and Temperature Code from the Customer by SKU Order List 1228, the value of the current CDC Id of the packing station (45), the ePD Shipper Id and RDC Id values of the current destination RDC 1180-1, the Packing Employee Id of the worker logged into the current instance of the program (330), the Package Bag Holder Id from the selected Package Bag Holder record 1236, and a Status set to a value such as "open". The Package Id value on the new record can be generated, for example, by concatenating Customer Id+RDC Id+current date+a sequential 3 digit number. All other fields can be initially created without values. The program can update the selected Package Bag Holder record 1236, setting Status to a value such as "package" and Package Id to the value of the newly created Package record 1234. In addition to creating the new Package record 1234 and updating the selected Package Bag Holder record 1236, the program (330) can indicate to pick items from the scanned case for a new package, for example, by sounding a confirmation tone, lighting up the pick confirmation light (84), highlighting the package bag indicator (108) of the selected package bag holder where the new package can be created, displaying the quantity to pick in the pick quantity indicator field (112), and printing a package label. Package labels can contain the Package Id in both a barcode and a readable format and the destination CDC Id in a readable format. The Package Creation Program (330) can also display a message in the message field (114) directing the worker to create a new package.

The worker can pick the case from the CDC packing station conveyor (44) and place it on top of the packing station (45). The worker can take a new package bag of the appropriate size from one of the package bag storage dispensers (82) (depending upon whether the program (330) highlighted a large or small bag holder). After peeling the package label from the label stock printout, which can be hanging out of the packing station's label printer (81), the package label can be affixed to the outer surface of the package bag. Package labels can be placed on the side of package bags near the bottom. The worker can scan the barcode on the package label and position the package bag in the package bag holder (71 or 72) indicated by the highlighted package bag indicator (110), pushing the bottom of the bag down into the center of the package bag holder (71 or 72), and folding the sides of the package bag, which can extend above the top of the package bag holder (71 or 72), down around the outside edges of the package bag holder (71 or 72). The package bag can be pushed down into the package bag holder (71 or 72) so that the top fill line marked on the package bag is aligned with the top of the package bag holder (71 or 72). After labeling and positioning the new package bag in a package bag holder (71 or 72), the remaining actions of creating a new package—picking the indicated quantity of items from the scanned case into the new package—can be the same as picking items into an existing package (as previously described).

The step of scanning the barcode label on the package bag, in creating a new package (between the normal packing steps of scanning a case label and then scanning a fixed location barcode label (73)), can associate the package bag label with a specific package bag holder location on the packing station (45). For the time while a package is open and in the process of being packed, the Package Creation Program (330) can consider the value of the fixed location barcode label (73) to be synonymous with the value of the barcode on the package label. This can enable the Package Creation Program (330) to validate that a package has been initially set up in the correct package bag holder (71 or 72), and to validate on each packing action that the worker has packed the items into the correct package.

After a worker picks a quantity of an item from a case and packs it into either a new or an existing package, the picked case can be sitting on top of the worker's packing station (45). Before returning the case to the CDC packing station conveyor (44), the worker can scan the barcode label on the case again to see if additional items should be picked from it. The Package Creation Program (330) can perform the processing that it performs when a case is scanned, which can result in the worker packing another quantity from that case into an existing package, creating a new package, or placing the case back onto the conveyor (44). The worker can continue to scan the case until the case is empty or the program (330) directs the worker to return the case to the conveyor (44). When the program (330) determines that a case is empty—for example, when the Quantity on the Case record 1208 has been decremented to zero—it can display a message indicating that the case is empty. Empty cases can be placed back onto the conveyor (44) and can be moved through the destination RDC 1180-1 to one of the local market shipping dock conveyors (48) to be sent into a recycling process.

If a case only has part of the quantity needed for a customer order, the Package Creation Program (330) can indicate a need to pick only the remaining quantity in the case. After the worker scans the barcode on the fixed location barcode label plate (74) of the package, the Package Creation Program (330) can update the existing Order Detail record 1202 as it normally would when performing a pack action, including writing the Package Id and Case Id to the record 1202 and changing the Status to a value such as "package". In addition to its normal updates, the Package Creation Program (330) can reduce the Quantity on the Order Detail record 1202 to equal the picked quantity and can create a new Order Detail record 1202 with the same information as the existing record except for a few differences. The differences can be that the Package Id and Case Id can be empty, Status can be set to a value such as "destination RDC", and Quantity can be set to the difference between the Quantity value that was on the existing record before it was updated, and the Quantity value to which it was updated. If the Package Creation Program (330) directs the worker to pick a higher quantity than what is physically in the case, the worker has uncovered a previously made packing error—an over-packing error. In this situation, the worker can leave the items in the case, cancel the current pick action, run a RDC Package Inspection Report, and place the case to the side of the packing station (45). After the program (330) makes the previously described update to the Status on Order Detail records 1202 as items are packed into packages (updating Status from a value such as "destination RDC" to a value such as "package"), it can check the CDC Order List 1224 and Local Market Order List 1220 data views to determine if there is still a demand for the scanned case's items in both the current CDC 1190-1 and the current local market. If the (needed) Quantity of the ePD Retailer-SKU combination for the current CDC Id on the CDC Order List 1224 reaches zero, as the Quantity on the underlying Order Detail record 1202 is decremented, the Package Creation Program (330) can, for example, sound a message alert tone and display a message on the Package Creation Screen, indicating that the scanned case should be redirected back to the CDC sort conveyor (42) of the local market. The worker can place, for example, a CDC sort return marker on top of the case after placing the case back onto the CDC packing station conveyor (44). Upon seeing a case with a CDC sort return marker, a worker performing the CDC sort function 1120 for the current CDC 1190-1 or LDDH 1192-1 can scan the case to initiate a reverse CDC sort pick and can move the case back to the CDC sort conveyor (42) of the current local market. When moving the case, the CDC sort worker can, for example, remove the CDC sort return marker, flip it up-side-down, and place it back on the CDC packing station conveyor (44). The CDC sort return marker can have for example, a packing station id written on one side and text such as "CDC sort" on the other. When the packing worker who originally placed the CDC sort return marker on the case sees the marker on the CDC packing station conveyor (44) with their packing station id on it, the worker can retrieve it for later use.

When the (needed) Quantity of the ePD Retailer-SKU combination for the current Local Market Id on the Local Market Order List data view 1220 reaches zero, the Package Creation Program (330) can, for example, sound a message alert tone and displays a message on the Package Creation Screen, indicating that the scanned case should be redirected back to the local market sort conveyor (24). The worker can place, for example, a local market sort return marker on top of the case after placing the case back onto the CDC packing station conveyor (44). Upon seeing a case with a local market sort return marker, a worker performing the CDC sort function 1120 for the current CDC 1190-1 or LDDH 1192-1 can scan the case to initiate a reverse CDC sort pick and can move the case, with the local market sort return marker still on top of it, back to the CDC sort conveyor (42) of the current local market. Upon seeing a case on the CDC sort conveyor (42), with a local market sort return marker, a worker performing the local market sort function 1118 for the current local market can scan the case to initiate a reverse local market sort pick and can move the case back to the local market sort conveyor (24). When moving the case, the local market sort worker can remove the local market sort return marker, flip it up-side-down, and place it back on the CDC sort conveyor (42). The local market sort return marker can have, for example, a CDC Id and a packing station id written on one side and text such as "local market sort" on the other. When a CDC sort worker sees the marker with the CDC Id on it, the worker can pick it from the CDC sort conveyor (42) and place it on the CDC packing station conveyor (44) at which the worker is working. When the packing worker who originally placed the local market sort return marker on the case sees the local market sort return marker on the CDC packing station conveyor (44), with their packing station id on it, the worker can retrieve it for later use.

The Package Creation Program (330) can also check the SKU By Customer Order List data view 1230, after the Order Detail Status update is made during the packing action, to determine if there are any remaining Order Detail records 1202 for that recipient (represented by Customer Id) with a Status value such as "destination RDC" and a SKU Size such as "small" or "medium". If it finds at least one record on the SKU by Customer Order List data view 1230 having the Customer Id of the Order Header record 1200 underlying the SKU by Customer Order List data view record 1230, a SKU Size such as "small" or "medium" and a Status such as "destination RDC", then there are still some items currently in the destination RDC 1180-1 to be packed for that recipient and the Package Creation Program (330) can refrain from initiating an action to close that recipient's package. If the program (330) is unable to find any SKU by Customer data view records 1230 for that recipient having a SKU Size such as "small" or "medium" and a Status such as "destination RDC", then there are no items remaining in the destination RDC 1180-1 for that recipient which are small enough to be packed into a package for the recipient and the Package Creation Program (330) can, for example, sound a message alert tone and display a message in the message field (114) of the Package Creation Screen, indicating that the package should be closed.

The worker can also initiate the action to close a package by, for example, pressing a close package key on the packing station keypad (80), and then confirming the action by pressing a confirmation key, when the Package Creation Program (330) prompts for a confirmation. The confirmation prompts of the ePD Delivery Application's programs can consist of displaying a message which shows the worker what action is being confirmed and asks the worker to press a confirmation key. There can be several circumstances in which a worker realizes the need to close a package. One circumstance can occur when the worker has finished packing the full quantity of a picked SKU into the package bag and sees that although the SKU quantity fit in the package bag completely, there is very little remaining available space below the package's top fill line for other items. Another circumstance can occur when the worker scans a case and the Package Creation Program (330) can direct the worker to pick one or more items into a package bag in which there is not enough space available to accept the full quantity of items. In the latter situation, the worker can pack as many of the items into the package as can be accommodated and can key in the quantity that was packed. If the items are too large to pack even one of them into the package, the worker can enter a zero for the quantity. When the worker enters a quantity less than what the Package Creation Program (330) directed the worker to pick, the Package Creation Program (330) can indicate that the correct quantity was not picked by, for example, sounding an error tone and displaying a message indicating that the correct quantity was not entered and the picked quantity should either be re-entered or confirmed. If there was truly either a picking error or a data entry error, the worker can count the quantity in the package, compare it to the quantity directed by the Package Creation Program (330), and re-pick and/or re-enter the quantity so that the quantity picked matches both the quantity entered and the quantity directed by the Package Creation Program (330). If the situation was not really an error, but one in which the worker needs to open a new package for the picked items, instead of re-entering the amount picked, the worker can close the package by, for example, pressing a close package key or other suitable key. The Package Creation Program (330) can prompt the worker to confirm the action, and when the worker presses the confirmation key, the Package Creation Program (330) can update the Order Detail 1202 and Case 1208 records to reflect the actual amount picked. The update to the Order Detail record can be made in the same way as the one described earlier, in which the picked quantity is less than the amount directed by the Package Creation Program (330) because only part of the ordered amount is available in the case—a new Order Detail record 1202 can be created having the unpicked quantity. If the quantity picked and entered was zero, the program (330) can end the pick/pack action and begin the close package action without making any updates to the Order Detail 1202 or Case 1208 records.

Regardless of whether the Package Creation Program (330) or the worker initiates a close package action, the Package Creation Program (330) and worker can follow the same set of package closing procedures. If the package is in one of the large package bag holders (71), the program (330) can display a message on the program display monitor (79) to prompt the worker to enter the package size. The worker can look into the package bag to count the number of visible fill lines on the inside of the package. The worker can enter the number of visible fill lines completely above all the items in the package as the package size ("3", "2", or "1"). The Package Creation Program (330) can update Status on the Package table 1234 to a value such as "closed" and can set the Package Size to a value such as "2", "3", or "4" depending upon the value entered by the worker—for example, an entered value such as "3" can be set to a Package Size such as "2", an entered value such as "2" can be set to a Package Size such as "3", and an entered value such as "1" can be set to a Package Size such as "4". If the package is in one of the small bag holders, the program (330) can update Status on the Package table to a value such as "closed" and can set the Package Size to a value such as "1", without prompting the worker to enter a package size.

The Package Creation Program (330) can call or initiate or cause to be initiated, a Packing List Report Program (332) to print packing lists for the items in the package. A separate packing list can be created for each distinct retailer having items in the package. Each packing list can contain the same basic information—the quantity of each SKU included in the package—as well as retailer specific information—retailer order number(s), a customizable packing list header message, a customizable order header message, and customizable line item detail messages. The retailer order number can be a different number than the Order Id. A packing list can also contain an Order Id for each order listed on it and an item return barcode for each line item listed on it. An item return barcode can contain, but is not limited to the following information associated with a line item printed in barcode format: Package Id, Order Id, and SKU. Each retailer can provide specifications and/or document templates to shippers to enable a packing list to be printed to look exactly the way it would if the retailer had printed it itself. To create the packing lists, the Package Creation Program (330) can select a list of Order Detail records 1202 with the Package Id of the current package, sorted by, for example, Order Id. The Package Creation Program (330) can use the Order Id to select the corresponding Order Header records 1200 and can then pass certain data fields to the Packing List Report Program (332). These fields can include, but are not limited to, the ePD Retailer Id, Order Id, Customer Id, ePD Shipper Id, Order Date/Time, Retailer Order Number, Retailer Message-Order Header, Retailer Message-Packing List, SKU, Quantity, Package Id, and Retailer Message-Order Detail. The Package Creation Program (330) can pass the Order Header 1200 and Order Detail 1202 data selected for the current package to the Packing List Report Program (332) one retailer at a time, for example, by sub-selecting data from the selected data using each ePD Retailer Id contained in the selected data. If one retailer has more than one order in the same package, the report information can be grouped by Order Id, with common header information printed at the top of the report and order-specific header information printed at the top of each order grouping. The Package Creation Program (330) can then sub-select the data corresponding to the next retailer, from the data selected for the current package, and can call or cause to be called the Packing List Report Program (332) again to print the next packing list for the current package. This sub-process can be repeated until all packing lists are printed for the current package. The worker can take the packing list reports from the packing document printer (77) and place them inside the package bag.

After putting packing lists in the package, the worker can seal the package, for example, by pulling up the sides of the package bag from around the outside of the package bag holder (71 or 72) and cinching them closed above the packed items. The package bag can then be lifted out of the package bag holder (71 or 72) and brought to the package sealing side of the packing station (FIG. 5). The following description of sealing a package bag using the exemplary package sealing side of a CDC packing station depicted in FIG. 5 is an illustrative example of how a package can be sealed after it is created at a destination RDC 1180-1, other suitable means and methods can alternately be used to close a package bag in the create packages step 1122 of the ePD Delivery Process. The package can be placed in the package sealer compartment (94) by sliding the cinched part of the package bag through the trimming slot (88), while placing the bulk of the package containing the items below the package sealing station top (104). When placing the package bag into the package sealing side of the packing station (FIG. 5), the worker can hold the cinched part of the package bag with two hands, one tightly holding the bag closed just above the items, and the other several inches above the lower hand. In the motion to slide the cinched part of the package bag through the trimming slot (88), the worker can push the bottom portion of the cinched part of the package bag, below their lower hand, into the package guide ring (96), and the top portion of the cinched part of the package bag, between their upper and lower hands, into the package holding ring (98). In entering the package guide ring (96), the package bag can push the spring-hinged collapsible side of the package guide ring (96) to force entry inside the ring, and the spring-hinged collapsible side of the package guide ring (96) can spring back into its normal position, reforming a solid ring around the cinched part of the package bag. The package holding ring (98) can have a gap in its outer edge, which can allow the worker to pass the cinched part of the package bag through its outer edge to its inner circumference. At this point, the package bag can be suspended above the bottom of the package sealer compartment (94) by the worker's hands, although the package guide ring can now be holding the top of the bag cinched together. The worker can release one of their hands from holding the package bag and use it to press the package holder lock button (101). When the package holder lock button (101) is pressed, the inside of the package holder ring (98) can constrict around the top portion of the cinched part of the package bag, until it is tight enough to hold the weight of the package. The worker no longer needs to hold the package as it can be suspended within the package sealer compartment (94) by the package holder ring (98). The package holder ring (98) can be attached to and supported by a package holder support base (103). The package holder support base (103) can be attached to and supported by the entire structure of package sealing side of the packing station (FIG. 5), which can be attached to and supported by the CDC packing station conveyor (44) and the floor of the destination RDC facility 1180-1.

For illustration, the package ties used to seal packages can be a strand of tubular rubber approximately 30 inches long and $\frac{3}{16}^{th}$ of an inch in diameter. Once the package is held in place by the package sealing side of the packing station (FIG. 5), the worker can grab a package tie from the package tie storage bin (106) and pull the two ends of the package tie together. The worker can place the two ends in the package tie holder (90) and press the tie holder lock button (92) to secure the package tie in place. The package tie holder (90) can clamp down on the two ends of the package tie to hold them in place securely. The worker can grab the package tie and stretch it to find its mid-point. Holding it at its mid-point, the worker can loop the double-strands of the package tie around the bottom of the cinched part of the package bag, just above the package guide ring (96), and pull it through the loop to form a knot. The worker can continue to pull the mid-point of the package tie toward them, tightening the knot around the cinched part of the package bag. A package handle can be formed by the loop of excess package tie on one side of the knot, which can now be sealing the package closed. The worker can press the package holder release button (102) initiating movements by the components that make up the package holder ring (98). Cutting blades which can be located on the underside of the package holder ring (98), can move toward the center of the ring to cut through the cinched package bag material in one movement. In another movement the package holder cutting blades can move back to their original state within the protective cutting blade covers on the underside of the package holder ring (98). In another movement the inside edges of the package holder ring (98), which are constricting the package bag material that has now been separated from the package, can move back to their original non-constricted position. Package labels that were applied near the bottom of package bags can remain on the package undamaged, when the excess material at the top of the package is trimmed away. After the excess material at the top of the package has been severed, the package is no longer suspended by the package holder ring (98), but the weight of the package can now be supported by the package tie knot and the two ends of the package tie, which can be clamped to the package sealing station top (104) by the package tie holder (90). The worker can grab the scraps of package bag material that have been cut away from the top of the package and place them in a scrap container. The worker can slip one of their hands through the package tie handle and can press the tie holder release button (100) with their other hand. The package tie holder (90) can be lifted off of the two ends of the package tie and the worker can now be holding the package up by its package tie handle. The worker can grab the bottom of the package with their other hand and lower it to the bottom of the package sealer compartment (94), removing their hand from the package tie handle and letting the cinched part of the package and the package tie handle to slip down through the package guide ring (96) and the trimming slot (88). The package tie handle can then be used to lift the package out of the package sealer compartment (94), and it can be placed on the CDC packing station conveyor (44). After sealing the package and placing it on the conveyor (44), the worker can return to the case at their packing station (the case from which the worker had last picked the items for the package that the worker has just finished sealing). The worker can scan the case to have the program (330) direct their next action.

In another aspect of the invention, single-item package processing can be performed when cases containing one over-sized item (large-sized, extra-large-sized or LDDH-sized) are scanned by a worker creating packages at a CDC packing station (45). Although all items received into a destination RDC 1180-1 have been referred to as being in cases, it should be readily understood by one skilled in the art that an over-sized item case may actually just be a single over-sized item with a case label attached to it rather than an over-sized item physically inside a box or other suitable container. Some over-sized items may be too large or odd shaped to fit into a box or other suitable container. When a worker scans the case label of an over-sized item case, the Package Creation Program (330) can read the Case Id and perform the same initial actions as it does when processing a case containing a small-sized or medium-sized SKU. It can retrieve a listing of records from the Customer By SKU Order List data view 1228 and can check the SKU Size of the first record 1228 to determine whether single-item package processing or multi-item package processing should be performed. The retrieved record can represent a list of all the recipients for which the item of the scanned case has been ordered for delivery to/from the current CDC 1190-1 or LDDH 1192-1. Because an over-sized item has been scanned, the program (330) can find an over-sized SKU Size on the selected Customer by SKU Order List data view 1228 and can perform single-item package processing. Instead of selecting a list of records from the Open Package List data view 1232 to try to determine if the current packing employee has any open packages, for any of the recipients on the selected Customer by SKU Order List records 1228, in single-item package processing, the program (330) can simply create a single-item package to meet the demand of the first selected Customer by SKU Order List record 1228. To ensure that two workers picking the same item SKU at approximately the same time do not fill the same order, the program (330) can, for example, select and invoke a table-lock on the underlying Order Detail record 1202 before updating it. If another instance of the program (330) has already table-locked or updated the Order Detail record 1202 underlying the first record selected from the Customer by SKU Order List data view 1228, before the current instance is able to invoke a table-lock on it, the current instance of the program (330) can attempt to select and invoke a table-lock on the Order Detail record 1202 underlying the next record selected from the Customer by SKU Order List data view 1228. Other methods of preventing multiple simultaneous modifications to records of a database are well known in the art. The Package Creation Program (330) can update the Order Detail record 1202 in single-item package processing in the same manner as it does in multi-item package processing, including creating a new Order Detail record 1202 for any quantity of an item which remains unfilled by the current transaction. The Package Creation Program (330) can also select and update the Case record 1208 of the scanned case in a manner consistent with multi-item package processing, including updating its Status to a value such as "empty" when its Quantity is decreased to zero. In many situations over-sized items can be single-item cases, which can be updated to a Quantity of zero and a Status such as "empty" when scanned. However, there can be situations in which an over-sized item case contains multiple quantities of an over-sized item SKU. In these situations the Package Creation Program (330) can perform single-item package processing to create a new Package record 1234 for each over-sized item picked. Package Id, Customer Id, Temperature Code, CDC Id, ePD Shipper Id, RDC Id, and Packing Employee Id, for example, can be written to the new Package record 1234 in the same manner as they can be in multi-item package processing. The following field updates can be made differently as a Package record 1234 gets created by single-item package processing: Status can be set to a value such as "closed"; Package Bag Holder Id can be set to a value such as "none"; and Package Size can be set to a value based upon the SKU Size value of the selected Customer by SKU Order List data view record 1228 Package Size can be set to a value such as "5" for a SKU Size value such as "large", Package Size can be set to a value such as "6" for a SKU Size value such as "extra-large", or Package Size can be set to a value such as "7" for a SKU Size value such as "LDDH".

In addition to updating the records involved in a single-item package processing transaction, the Package Creation Program (330) can, for example, sound a pick confirmation tone, illuminate the pick confirmation light (84), highlight the single item package indicator (109), print a package label and a packing list, and display a message in the message field (114) directing the worker to attach the packing list and package label to the picked item.

Upon hearing a pick confirmation tone and/or seeing the pick confirmation light after scanning a case label, the worker can pick the case from the CDC packing station conveyor (44), place it on top of the package sealing station top (104), and look at the program display monitor (79) of their packing station (45). Following the direction of the program, the worker can take the package label from the label printer (81) and the packing list from the packing document printer (77), and can look at the label on the picked case to determine if it is a single-item case or a multi-item case. If the case label indicates that the case is a single-item case, for example if there is a large "S" printed on it, the worker can take a packing list pouch from the packing list pouch storage bin (105), peel the back off of its adhesive back side, and attach it to the single-item case, for example, over top of the case label. The packing list can be placed inside the packing list pouch by sliding it through its pouch opening, and the package label that was printed for the single-item package can be affixed on the outside of the packing list pouch. The single-item case, with its attached packing list and package label, can now be considered a single-item package and can be placed back onto the CDC packing station conveyor (44). If the case label does not have, for example, a large "S," or other suitable marking on it to indicate a single-item case, the picked case can be a multi-item case containing multiple over-sized SKU items. The worker can scan the case label of the multi-item case of over-sized SKU items, pick one of the items from the case, and attach a packing list pouch, packing list, and package label to it in manner that can be similar to that of a single-item case, except that there is no case label on the over-sized SKU item to cover with the packing list pouch. The single-item package can be placed on the conveyor (44) and the case label of the multi-item case of over-sized SKU items can be scanned again. The worker can continue to pick items from the multi-item case of over-sized SKU items, creating single-item packages, until the case is empty or the Package Creation Program (330) displays a message telling the worker to redirect the case to a different CDC 1190-1/ LDDH 1192-1 or local market.

Errors can occur at the destination RDC 1180-1 during the process of creating packages 1122. When picking items from cases to create packages, if a worker sees, for example, a message on their program display monitor (79) that the case the worker just scanned is empty, while there are still items in the case, then the worker can have uncovered a previously made packing error (an under-packing error). The worker can, for example, key in the sequence on their packing station keypad (80) to run the RDC Package Inspection Report, scan the case label of the case in error, key in the quantity difference, and place the case off to the side of their packing station (45). A RDC Package Inspection Report Program (334) can be initiated. It can use, for example, the scanned Case Id to select all the Package Id's and Quantities from the Order Detail records 1202 having that Case Id in the Case Id field. The RDC Package Inspection Report Program (334) can use the selected Package Id's to select the Status, Delivery Shipment Id, and CDC Id of each package from the Package table 1234. The detail of the report, as shown on the RDC Package Inspection Report Detail table 1242, can list, for example, the Quantity, Package Id, Package Status, Delivery Shipment Id, and CDC Id for each package. The report header, as shown on the RDC/CDC Package Inspection Report Header table 1240, can list, for example, the ePD Retailer Id and SKU of the case and the Quantity Difference. The RDC Package Inspection Report can be printed on the packing document printer (77) of the packing station (45), upon which it is run, or other suitably configured printer, and it can be used to track down the location of each package regardless of whether the package is still in the destination RDC 1180-1 or has left on its way to a CDC 1190-1 or LDDH 1192-1. If the report contains packages that have already left the destination RDC 1180-1 on delivery shipments, the RDC Package Inspection Report Program (334) can send data to the processing servers, whether remote or local, of the appropriate CDC's 1190-1 or LDDH's 1192-1 and can trigger a CDC Package Inspection Report Program (336) to run at those CDC's 1190-1 or LDDH's 1192-1. The CDC Package Inspection Report Program (336) can print a paper report on a CDC or LDDH printer, to be used by CDC or LDDH workers to find and unload packages from SmartBin Units (SBU's) at a CDC 1190-1 or recall packages from the delivery vehicles of a LDDH 1192-1 for inspection. The printed CDC Package Inspection Report can contain, for example, readable SBU Id's or LDDH Delivery Vehicle Id's to assist in finding each package listed, and Inspection Authorization Codes, Over Quantity Adjustment Codes, and Short Quantity Adjustment Codes to unload and enter over/short adjustments for each package listed in a barcode format. A SBU Id/LDDH Delivery Vehicle Id can be listed on the report for a package if it has already been loaded into a SBU/delivery vehicle. Packages listed on the report that have not been loaded into a SBU or onto a delivery vehicle can have a blank SBU Id/LDDH Delivery Vehicle Id. An Inspection Authorization Code can consist of concatenated data, which can include, but is not limited to the following: a Package Id, a SBU Id, and a LDDH Delivery Vehicle Id. In FIG. 9D, an exemplary table containing the detailed report is shown on the CDC package inspection report detail table (1244). In addition to printing a physical report, once the CDC Package Inspection Report Program (336) is initiated on a CDC's 1190-1 or LDDH's 1192-1 processing server, it can continue to run as a service until all the packages listed on the report, having the CDC Id of the processing server on which it can be running, are scanned or until the program is aborted. The CDC Package Inspection Report Program (336) can validate each Package Id scanned, during package loading at a CDC 1190-1 or package sorting at a LDDH 1192-1, against the Package Id's listed on the report having the current CDC Id. The CDC Package Inspection Report Program (336) can alert the CDC 1190-1 or LDDH 1192-1 workers, if they scan a package that is listed on the report, to first inspect the package and confirm that it contains the correct quantity of the SKU listed on the report, before continuing to load it into a SBU at a CDC 1190-1 or sort it for delivery at a LDDH 1192-1. The alert can consist, for example, of an invalid warning tone and a text message displayed on a scanning device display screen or on a SBU display screen in a CDC 1190-1 or a workstation monitor in a LDDH 1192-1. The CDC Package Inspection Report Program (336), running as a service on the CDC/LDDH server can be aborted by a worker at the CDC 1190-1/LDDH 1192-1, or it can be aborted by a worker connecting to the CDC/LDDH server remotely from a destination RDC 1180-1. Program security permissions can be used to control which workers at CDC's 1190-1, LDDH's 1192-1, and destination RDC's 1180-1 have the ability to abort the CDC Package Inspection Report Program (336).

The Package Status and Delivery Shipment Id of each line on the RDC Package Inspection Report can be used to locate packages in the destination RDC 1180-1. As a package is located and inspected in the destination RDC 1180-1, the worker performing the inspection can open the package and count the number of items, of the SKU listed on the RDC Inspection Report, to determine if the package contains the Quantity listed on the report. If the physical count in the package matches the Quantity on the report, the package can be repacked and the Package Id can be checked-off on the report. If the physical count doesn't match the Quantity on the report, the package can be brought back to the CDC packing station (45), where the case in error can be located, to be repacked. If the physical count in the package varies from the report Quantity by exactly the amount of the Quantity Difference on the report, then the workers tracking down the packages on the report can be notified to stop their inspections. If not, the package inspections can continue until the full amount of the Quantity Difference is found. To remove the SKU in error from the package, the worker at the packing station (45) can, for example, enter a key sequence to initiate a Packing Adjustment Program (338), and can then scan the label on the case in error and the label on the package in error. The Packing Adjustment Program (338) can reset the values on the Order Detail 1202, Package 1234, and Case 1208 records that were updated when the items from the case were originally packed into the package. The Packing Adjustment Program (338) can use the scanned Case Id to select the Case record 1208 and the scanned Package Id to select the Package record 1234. The appropriate Order Detail record 1202 can be selected by the program (338) using the scanned Package Id and the SKU and ePD Retailer Id from the selected Case record 1208. Status can be set to a value such as "destination RDC" and the Package Id can be deleted on the Order Detail record 1202. Status can be set to a value such as "open" and Delivery Shipment Id can be deleted if it had a value on the Package record 1234. The amount that was decremented from the Quantity on the Case record 1208, when the item was originally picked from the case, can be added back to the Quantity value on that Case record 1208. The Status on the Case record 1208 can be reset to a value such as "package sort" if it had been set to a value such as "empty".

The worker can physically remove all the items of the SKU of the case in error from the package, and place them back in the case. After the Packing Adjustment Program (338) completes the packing adjustment, the worker can scan the case label of the case in error to begin repacking its items. The Package Creation Program (330) can direct the worker to pack the identified quantity from the case into the package as if there had never been a problem. After the packing adjustment transaction and the subsequent packing transaction, the quantity remaining in the case should be in synch with the data on the Case table 1208. The Packing Adjustment Program (338) can also be run against a package that is still open to remove a specific SKU from that package.

If a package is not located and inspected until it is already in a CDC 1190-1 or LDDH 1192-1, the CDC Package Inspection Report Program (336) can print a hard copy report on the CDC/LDDH printer as previously described. In most situations, a packing error should be discovered early on in the process, before the package leaves the destination RDC 1180-1 or when it is scanned during processing at a CDC 1190-1 or LDDH 1192-1, but it is possible that a package may be loaded into a SBU or onto a LDDH delivery vehicle before the error is realized. If there are packages listed on the CDC Package Inspection Report that have already been loaded onto a LDDH delivery vehicle, the LDDH worker reading the report can attempt to contact the driver of the delivery vehicle to ask them to look out for the package in question. If there are packages listed on the report that have already been loaded into SBU's at a CDC 1190-1, a CDC worker arriving at the CDC 1190-1 can use the report to search for the packages listed using the SBU Id listed with each package. The worker can go to the SBU listed on the report, connect the hands-free barcode scanner that the worker can be using to the SBU, for example, by plugging it into a scanner port of the SBU, scan their employee id card, and then scan the Inspection Authorization Code barcode on the report to initiate a CDC Package Adjustment Program (350) of an ePD SBU Application running on a server for the current CDC 1190-1. The CDC Package Adjustment Program (350) can use the Package Id and SBU Id embedded in the scanned Inspection Authorization Code to retrieve the package listed on the report from the SBU. Once the package requiring inspection is retrieved, the CDC worker can perform the inspection in the same manner as a package inspection performed in the destination RDC 1180-1, but if a difference is found the package is not returned to the packing station (45) in the destination RDC 1180-1 to be repacked. If the package was over-packed (meaning a greater quantity was physically placed in the package) the worker can remove the extra items to make the physical quantity match the quantity listed on the CDC Package Inspection Report and the package's packing list. The worker can send the extra quantity of the item back to the destination RDC 1180-1 with the report on a CDC reverse shipment originating from the CDC 1190-1 to its destination RDC 1180-1. When the item is received at the destination RDC 1180-1 it can be physically added back into the case that was set aside because of the error. Adjustments to the related data records are not required to correct an over-pack error because the physical situation has been corrected to match the data. If the package was under-packed (meaning a lesser quantity was physically placed in the package), the package does not need to be changed physically except that the packing list containing the under-packed item can be adjusted by hand to show the correct quantity. The CDC worker can update the quantities on the related Order Detail 1202 and Case 1208 records to account for the difference by scanning the short adjustment barcode corresponding to the package on the report and entering the quantity adjustment that was made, for example, on the SBU keypad. The CDC Package Adjustment Program (350) can send the data from the CDC's 1190-1 processing server to update the Order Detail 1202 and Case 1208 tables in the database on the destination RDC's 1180-1 processing server. The Quantity on the Case record 1208 can be increased by the short adjustment quantity and the adjusted quantity should match the physical quantity remaining in the case that was set-aside at the packing station (45) in the destination RDC 1180-1. A new Order Detail record 1202 can be created to split the quantity on the existing record 1202, resulting in the existing record 1202 retaining its Package Id and Status and having an adjusted Quantity to match the actual physical quantity that was in the package and the new record 1202 having the same Order Id, a Quantity equal to the short adjustment quantity, a Status value such as "destination RDC", and no Package Id value. The under-packed item quantity can be picked from a case and packed into a package at the destination RDC 1180-1 as the Package Creation Program (330) attempts to satisfy the demand of the new Order Detail record 1202 created by the transaction used to correct the under-pack error.

Following the creation of packages step 1122, delivery shipments of packages to be delivered to a CDC 1190-1 or LDDH 1192-1 can be created at the destination RDC 1180-1 as illustrated in step 1124. To create ePD delivery shipments, one or more workers at a destination RDC 1180-1 can be stationed between a CDC packing station conveyor (44) and a CDC feed of the CDC package conveyor (47A) to organize packages bound for a particular CDC 1190-1 or LDDH 1192-1 into an ePD delivery shipment. An ePD delivery shipment can consist of a group of packages bound for one CDC 1190-1 or LDDH 1192-1 on one trailer or other suitable cargo carrying transport. A worker creating an ePD delivery shipment can use, for example, a hands-free barcode scanning device communicating with the workstation running their instance of a Delivery Shipment Creation Program (340) to scan package label barcodes as the worker picks packages from the CDC packing station conveyor (44) and places them into cargo cages sitting on the CDC feed conveyor (47A) at which the worker is working. In one aspect of the invention, boxes, bins, crates or other containers known in the art can be employed instead of cargo cages. Cargo cages can be used to organize packages bound for the same CDC 1190-1 or LDDH 1192-1 into an ePD delivery shipment. A cargo cage can be a container designed to hold many small and medium sized packages. For illustration, each side of a cargo cage can be constructed of, for example, $\frac{1}{16}^{th}$ inch thick plastic coated metal wires, which cross each other perpendicularly every few inches. The metal wires can be bound into the four perpendicularly intersecting side edge beams that form each rectangular side of the cargo cage. The sides of the cargo cage can be attached to each other by metal linking clasps sized to fit around the width of two edge beams. Linking clasps can be attached near each corner of a cargo cage side panel to bind the side panels to each other and to the cargo cage bottom panel to form a cargo cage. The bottom panel of the cargo cage can consist of two panels, constructed in a manner that can be similar to the way the side panels are constructed, with shock absorbers between the two panels at each corner and at the midpoint of each side. Each shock absorber can consist of, for example, a spring made of metal or other suitable composite, a few inches high, and a few inches in diameter. Linking clasps can also be used to bind different cargo cages together to form a grouping of cargo cages for a delivery shipment. A cargo cage label plate holder can be built into the upper corner of at least one of the sides of each cargo cage. A cargo cage label plate holder can be a frame with a hollow slot in which a label plate can be inserted (and subsequently removed) to label one or more grouped cargo cages as a delivery shipment.

A worker can create a new ePD delivery shipment for a CDC 1190-1 or LDDH 1192-1 by first selecting an option on the program menu of the Delivery Shipment Creation Program (340) such as the "create new delivery shipment" menu option. The Delivery Shipment Creation Program (340) can create and print a new delivery shipment label for the delivery shipment. The delivery shipment label can contain the Delivery Shipment Id in both a barcode and a readable format and the CDC Id of the delivery shipment in readable format. The worker can, for example, take the delivery shipment label from the label printer, affix it to a delivery shipment label plate, and place the label plate in the label plate holder of an empty cargo cage. The label plate can be a non-descript rectangular card, made of plastic, metal or another firm and durable material, upon which a label can be affixed. The unique delivery shipment label on the label plate can make it useful in identifying a delivery shipment and all its associated packages. The worker can continue creating the delivery shipment, by scanning, for example, their employee id card, scanning the label on the delivery shipment label plate, picking a sealed package from the CDC packing station conveyor (44), and scanning the barcode label on the package, as the worker places it into the cargo cage. The worker can continue to pick sealed packages from the CDC packing station conveyor (44), scan the package labels, and place the packages into the cargo cage, until the cargo cage is filled. Additional cargo cages can be built from cargo cage bottom panels, side panels, and linking clasps which can be stored near the CDC feed conveyor (47A). The cargo cages can be attached next to or on top of cargo cages already filled for the current CDC (1190-1) or LDDH (1192-1), as more multi-item packages get added to the delivery shipment. The worker can identify single-item packages to be picked from the CDC packing station conveyor (44) by their packing list pouches. The worker can pick single-item packages, scan their package labels, and place them on the CDC feed conveyor (47A) next to or on top of the cargo cages bound for the same CDC 1190-1 or LDDH 1192-1. The worker can continue to load multi-item packages into cargo cages and place single-item packages next to or on top of the cargo cages on the CDC feed conveyor (47A) until there are enough to fill an entire trailer-load. The amount of cargo cages and single-item packages needed to fill a trailer-load can be measured in length by ruler markings on the sides of the CDC feed conveyor (47A), similar to the ones used on the sides of retailer dock conveyors. In one embodiment, cargo cages can be stacked, for example, up to three units high to fit into trailers. The Delivery Shipment Creation Program (340) can associate the scanned multi-item and single-item package with the current delivery shipment until the worker selects a menu option to end the current delivery shipment.

The Delivery Shipment Creation Program (340) can create a new record on the Delivery Shipment table 1238 as a worker physically creates each new delivery shipment. The Delivery Shipment Creation Program (340) can create the new Delivery Shipment records 1238 having the following exemplary field values: a unique Delivery Shipment Id can be created by concatenating, for example, the RDC Id+CDC Id+current date+a sequential three digit number; Status can be set to a value such as "in RDC"; ePD Shipper Id and RDC Id can be set to the values for the current destination RDC 1180-1; CDC Id and Temperature Code can be set to the value from the Package record 1234 of the first scanned package; RDC Employee Id can be set to the value from the scanned employee id card; and the other fields can be created without values. The Package record of each package scanned into a delivery shipment can be updated to set Status to a value such as "delivery shipment" and Delivery Shipment Id can be set to the value on the newly created delivery shipment record to which the package was added. As packages are scanned to be added to a delivery shipment, the Delivery Shipment Creation Program (340) can validate the CDC Id value of the scanned package to verify that it matches the value on the current Delivery Shipment record 1238. If a package having a different CDC Id is scanned by mistake the Delivery Shipment Creation Program (340) can signal an error, for example, by sounding an invalid warning tone and displaying a message, on the workstation running the Delivery Shipment Creation Program (340), indicating that the scanned package is for a different CDC 1190-1 or LDDH 1192-1.

In a further aspect of the invention, full-trailer-load delivery shipments can be created to meet the frequency of tractor-trailers leaving for the local market of those delivery shipments' CDC's 1190-1 or LDDH's 1192-1. However, if necessary, delivery shipments bound for different CDC's 1190-1 or LDDH's 1192-1 within the same local market can be combined together into a full-trailer-load. To combine different delivery shipments together into one full-trailerload, the workers creating the delivery shipments on nearby CDC feed conveyors (47A) can collaborate with each other to move their delivery shipments in close proximity of each other. A local market feed of a CDC package conveyor (47B) can be made up of different independent conveyor sections which can be moved in either direction or remain motionless, independently of each other. There can be local market feed conveyor sections (47B) in between each of the different CDC feed conveyors (47A), and between the CDC feed conveyors (47A) and either a left side feed of a package conveyor (46A) or a right side feed of a package conveyor (46B). Multiple delivery shipments can be organized into a full-trailer-load by moving the CDC feed conveyors of different CDC's and LDDH's (47A) and the different sections of the local market feed conveyor (47B) in between those CDC feed conveyors (47A) forward and/or backward in a coordinated effort to align the different delivery shipments in close proximity of each other, in a desired sequence. One delivery shipment label plate can be located on the back of the last cargo cage, at the trailing end of each delivery shipment. A small amount of space can be left between the different delivery shipments of a full-trailer-load, to ensure that they can be visibly seen as separate delivery shipments within the same full-trailer-load, and to allow access to the label on each delivery shipment label plate.

When a full-trailer-load of delivery shipments has been assembled on either the CDC feed (47A) or the local market feed (47B) of a CDC package conveyor, one of the workers involved in organizing the full-trailer-load, can use the motion controls of the local market feed package conveyor (47B) to coordinate all of the conveyor sections of the local market feed package conveyor (47B) in between the full-trailer-load and a side package conveyor (either left-side 46A or right-side 46B) to move the full-trailer-load onto the side package conveyor (46A or 46B). The delivery shipments of a full-trailer-load can travel together, in close proximity to each other, from the side package conveyor (46A or 46B) onto the merging section of the package conveyor (46C), and then onto the outbound section of the package conveyor (46D).

There is shown in FIG. 8A, a detailed layout of an exemplary local market shipping dock area within a RDC. The exemplary local market shipping dock area of FIG. 8A can contain: a package conveyor—outbound section 46D, a local market shipping dock conveyor 48, a local market shipping dock conveyor extension 48A, a local market shipping dock (bay) door 50, a package diverting conveyor unit (inactive position) 208, a package diverting conveyor unit (loading position) 208A, a locking pin (in locking slot) 210, a pivot pin 212, a pivot support base 214, an inactive locking slot 216, a loading locking slot 218, and a local market shipping dock workstation (& printer) 220. There is also shown in FIG. 8A, a tractor 200 having a trailer 202, the trailer 202 being parked with its rear toward a RDC exterior wall 206. Within the trailer 202 is a trailer conveyor 204, which can facilitate loading and unloading of cargo.

The curved-shaped package diverting conveyor unit (208) can be similar to the case diverting section of the RDC inbound conveyor (38) in its composition and function. Referring to FIG. 8A, there can be a package diverting conveyor unit (208) for each local market shipping dock conveyor (48). Package diverting conveyor units (208) can be attached to the outside edge of the outbound section of the package conveyor (46D) and can be locked into one of two positions by a locking pin (210). The conveyor units (208) can be locked into the loading position to intercept and divert packages from the package conveyor (46D) to a local market shipping dock conveyor (48) or into the inactive position to remain out of the way as full-trailer-loads pass by on the outbound section of the package conveyor (46D). When it is in the loading position, the leading end of the package diverting conveyor unit (208) can sit over top of the package conveyor (46D) and its trailing end can sit over top of the local market shipping dock conveyor (48). When it is in the inactive position, the unit (208) can sit completely over top of its pivot support base (214), with only its leading edge resting on the outer side edge of the package conveyor (46D). When a package diverting conveyor unit's locking pin (210) is unlocked, the unit (208) can be shifted between the inactive position and the loading position by pushing or pulling it in the desired direction until its locking pin (210) lines up with the inactive locking slot (216) or the loading locking slot (218). Locking slots can be built into the side edges of the package conveyor (46D). The conveyor unit (208) can pivot between the two positions on support roller wheels attached to its bottom. The support roller wheels can allow the bulky conveyor unit (208) to glide easily, back and forth, on top of its pivot support base (214) and the package conveyor (46D). The unit's pivot pin (212) can anchor the unit (208) on a fixed pivot axis as it moves between its two positions. When the unit's leading end is locked into the loading position, its trailing end can be aligned over top of the local market shipping dock conveyor (48).

As a full-trailer-load of delivery shipments moves along on the outbound section of the package conveyor (46D) and passes by a worker responsible for loading delivery shipments onto outbound tractor-trailers, the worker can inspect the delivery shipment label plate on the back of the trailing-end of the full-trailer-load's last delivery shipment. Workers responsible for loading delivery shipments onto outbound tractor-trailers can be organized, for example, so that each one covers a few adjacent local market shipping dock conveyors (48) from which tractor-trailers bound for one specific local market can be loaded. When one of these workers sees a full-trailer-load containing a delivery shipment bound for one of the CDC's 1190-1 or LDDH's 1192-1 of their local market (one worker may also cover one or more local markets), the worker can use a package diverting conveyor unit (208) to move the full-trailer-load of delivery shipments onto one of their empty local market shipping dock conveyors (48).

To move a full-trailer-load of delivery shipments from the outbound section of the package conveyor (46D) onto a local market shipping dock conveyor (48), the worker can lift the package diverting conveyor unit's locking pin (210) out of the inactive locking slot (216), push the conveyor unit (208) from the inactive position to the loading position, slide the locking pin (210) into the loading locking slot (218), and switch on the power of the conveyor unit (208) to start its conveyor motion. The worker can start the local market shipping dock conveyor (48) upon which the worker positioned the conveyor unit (208) in the loading direction. The full-trailer-load can move from the package conveyor (46D) up onto the conveyor unit (208). The full-trailer-load can follow the conveyor unit's (208) curved path, moving down onto the local market shipping dock conveyor (48), and can be moved on the local market shipping dock conveyor (48) from its back end toward the local market shipping dock conveyor extension (48A) at its front end. After the full-trailer-load has been moved onto the dock conveyor (48) completely, the worker can stop the motion of the dock conveyor (48) and the conveyor unit (208) and can reposition the conveyor unit (208) back to the inactive position.

After repositioning the package diverting conveyor unit (208), the worker can return to the outbound section of the package conveyor (46D) to search for another full-trailer-load of delivery shipments bound for their local market. The worker can continue this sub-process until a tractor-trailer driver signals that a tractor-trailer is ready to accept delivery shipments.

Following the creation of the delivery shipments of packages, step 1124, the packages can be ready to be shipped to one or more CDC's 1190-1 or to one or more LDDH's (1192-1), as illustrated in step 1128 and step 1126 respectively. After the trailer door closes at the end of unloading retailer shipments onto a local market receiving dock conveyor (14), the process of receiving retailer shipments into an origination RDC 1180-1 (in the current illustrative example RDC 1180-1 can serve as an origination RDC for cases of items received into that RDC from retailer fulfillment sites 1194-1 in a local market served by RDC 1180-1, in a step similar to step 1110) can be complete. Referring to FIG. 3, the tractor-trailer driver can drive a tractor-trailer (200 & 202) from the local market receiving dock bay (12) to a local market shipping dock bay (50) corresponding to the local market to which the driver travels. The tractor-trailer (200 & 202) can be backed up to the local market shipping dock door (50) and the driver can signal the loading workers at the destination RDC 1180-1 (in the current illustrative example RDC 1180-1, can now serve as a destination RDC for delivery shipments of packages to be delivered to one or more CDC's 1190-1 or LDDH's 1192-1 in the local market to which the driver travels) to let them know that an empty tractor-trailer (200 & 202) has arrived. The driver can refuel the tractor-trailer (200 & 202), while a RDC worker loads a full-trailer-load of delivery shipments onto the driver's tractor-trailer (200 & 202) from the local market shipping dock conveyor (48) at which the driver arrived. The worker who loads the trailer (202) can be the same worker who moved the full-trailer-load onto that dock conveyor (48). With reference to FIG. 11B, the worker can open the local market shipping dock door (50) and initiate a Delivery Shipment Program (342) by, for example, scanning the barcode on their employee id card, scanning the Trailer Id barcode on the trailer door label, and scanning the Delivery Shipment Id barcode on the label plate of the delivery shipment farthest away from the shipping dock door (50). The Delivery Shipment Program (342) can read the CDC Id from the record on the Delivery Shipment table 1238, having the scanned Delivery Shipment Id and can use it to retrieve the values of the Type, CDC Server Connection Script, Primary Contact Number, Secondary Contact Number, and Temp Code Reservation Override fields from the CDC table 1252. If the Type value retrieved is a value such as "LDDH", the Delivery Shipment Program (342) can determine the quantity of multi-item packages (in cargo cages) and single-item packages by selecting records from the Package table 1234 having the scanned Delivery Shipment Id, and grouping and subtotaling those records by Package Size. This calculated package count information can be saved along with the Delivery Shipment Id by the Delivery Shipment Program (342). This saved information can later be printed on the Delivery Shipments Report. If the Type value retrieved is a value such as "CDC", the Delivery Shipment Program (342) can use the retrieved CDC Server Connection Script value to establish a remote connection to the database on the server of the destination CDC 1190-1. The Delivery Shipment Program (342) can use the remote connection to retrieve that CDC's 1190-1 available SBU bin capacity for each Bin Size, from the Unreserved Bins data view.

Figure 10A:
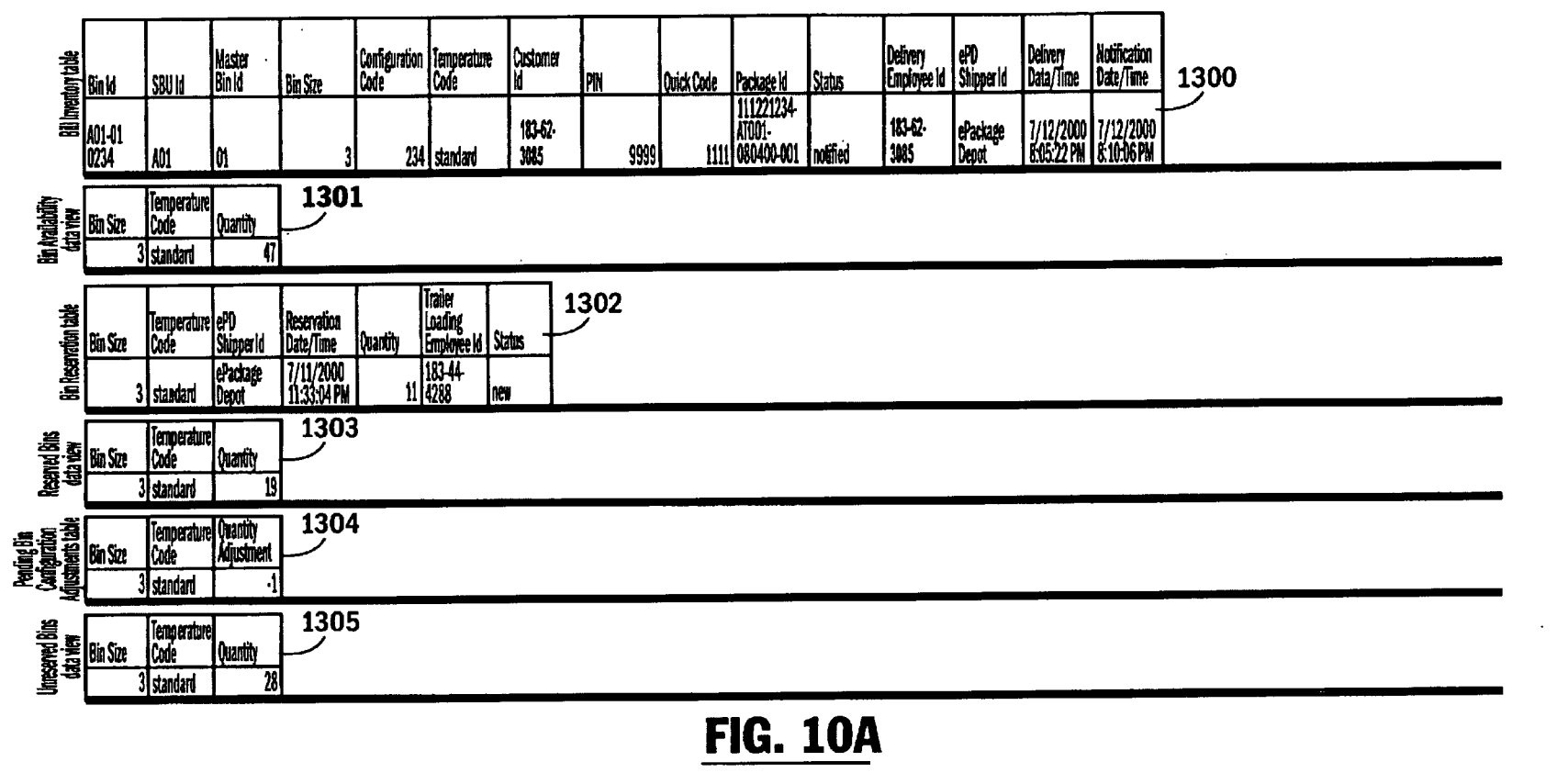

With reference to FIG. 10A, an Unreserved Bins data view 1305, can be created by subtracting the Quantity of bins of each Bin Size-Temperature Code combination on a Reserved Bins data view 1303 from the Quantity of the corresponding Bin Size-Temperature Code combination on a Bin Availability data view 1301, and then adding the Quantity Adjustment of the corresponding Bin Size-Temperature Code combination on a Pending Bin Configuration Adjustments table 1304. The Bin Availability data view 1301 can be created from an underlying Bin Inventory table 1300 by selecting records having a Status such as "available", grouping those selected records by Bin Size and Temperature Code, and then subtotaling a count of the records within each group. The Reserved Bins data view 1303 can be created from an underlying Bin Reservation table 1302, for example, by selecting, grouping, and subtotaling the Quantity on records of each Bin Size-Temperature Code combination that do not have a Status such as "filled".

After retrieving the available bin capacity for each Bin Size-Temperature Code combination from the Unreserved Bins data view 1305, the Delivery Shipment Program (342) can compare it against the number of packages of each Package Size-Temperature Code combination in the current delivery shipment to determine the extent of the CDC's 1190-1 available bin capacity to receive the packages of the current delivery shipment. The Delivery Shipment Program (342) can select and group Package records 1234 having the scanned Delivery Shipment Id by Package Size and Temperature Code. The program (342) can subtotal the record count of each group of Package records 1234 to determine the number of packages of each Package Size-Temperature Code combination in the current delivery shipment. The Delivery Shipment Program (342) can add a new record to the Bin Reservation table 1302 (on the current CDC's 1190-1 database server) to reserve, for the current shipper, the Quantity of each Bin Size-Temperature Code combination needed to receive the bulk delivered packages of the delivery shipment, up to the available bin capacity found on the Unreserved Bins data view 1305. Each new Bin Reservation record 1302 can be created with, for example, the Bin Size, Temperature Code, and Quantity being reserved, the ePD Shipper Id of the current shipper, a Reservation Date/Time equal to the current date/time, Trailer Loading Employee Id equal to the value scanned from the worker's employee id card, and a Status value such as "new". The Delivery Shipment Program (342) can track the bin capacity shortage of each Bin Size-Temperature Code combination in a program variable. If bins are available to be reserved for the entire Quantity of a Package Size-Temperature Code combination, the program variable holding the bin capacity shortage for the corresponding Bin Size-Temperature Code combination can be zero. The ePD Delivery Application can allow different shippers to reserve bin space in a CDC 1190-1, as there may be multiple shippers shipping bulk delivered packages from different destination RDC's (the RDC's of shippers other than the one shipper depicted in the illustrative example of FIG. 2 are not shown) to the same CDC 1190-1. In another embodiment of the invention, a given CDC can be run by a single shipper, and can receive delivery shipments from one destination RDC 1180-1 only, negating the need to reserve bin space.

The Delivery Shipment Program (342) can also update the Delivery Shipment record 1238 of the scanned delivery shipment on the current RDC's 1180-1 database server by, for example, changing its Status to a value such as "in-transit", writing the scanned employee id into the Trailer Loading Employee Id field, writing the scanned trailer id into the Trailer Id field, and writing the current date and time into a Delivery Shipment Loading Date/Time field. The update can associate the delivery shipment (and all the packages of ordered items contained therein) with the trailer (202) upon which it will be loaded.

If the Delivery Shipment Program (342) does not find enough unreserved SBU bins having a Temperature Code value such as "standard" to receive all the packages having a Temperature Code value such as "standard", it may attempt to reserve SBU bins having a Temperature Code value such as "refrigerated" to receive "standard" Temperature Code packages. To determine whether it is able to reserve "refrigerated" Temperature Code SBU bins for "standard" Temperature Code packages, the program (342) can check the Temp Code Reservation Override field that was retrieved from the CDC table 1252 for current CDC 1190-1 and can compare the percentage listed against the unreserved refrigerated bins ratio. The unreserved refrigerated bins ratio can be calculated by dividing the sum of the Quantity values on the Unreserved Bins data view records 1305 having a Temperature Code value such as "refrigerated" by the total count of bins on the Bin Inventory table 1300 having a Temperature Code value such as "refrigerated". If the Temp Code Reservation Override percentage is less than the unreserved refrigerated bin ratio, then the Delivery Shipment Program (342) can begin to reserve "refrigerated" Temperature Code bins up until the unreserved refrigerated bins ratio becomes less than or equal to the Temp Code Reservation Override value for the current CDC 1190-1. The unreserved refrigerated bins ratio can be decreased as "refrigerated" bins are reserved.

If the Delivery Shipment Program (342) cannot reserve enough bins to receive all the bulk delivered packages of the delivery shipment, it can initiate or cause to be initiated, a Configuration Adjustments Report Program (344) to determine the SBU bin configuration adjustments that should be made to increase the number of bulk delivered packages from the current delivery shipment which are able to be received into the CDC 1190-1. When the Delivery Shipment Program (342) calls or causes the Configuration Adjustments Report Program (344) to be called, it can pass its program variables containing the bin capacity shortage of each Bin Size-Temperature Code combination as inputs. The Configuration Adjustments Report Program (344) can use the bin capacity shortage information and its program rules to effectively make configuration adjustments by updating the Pending Bin Configuration Adjustments table 1304, and in some situations updating the Bin Inventory table 1300. While the Configuration Adjustments Report Program (344) does not make the actual bin configuration adjustments, it can effectively make the adjustments by updating the data views used to determine bin availability, to take into account the bin configuration adjustments that will be made. The actual bin configuration adjustments can be physically made to SBU's in the CDC 1190-1, in step 1140, by CDC workers using the Configuration Adjustments Report. The Configuration Adjustments Report Program (344) can also add records to the Bin Reservation table 1302 to reserve the bins made available by its configuration adjustments for the packages of the current delivery shipment.

The program rules of the Configuration Adjustments Report Program (344) can be followed to effectively make bin configuration adjustments and bin reservations to resolve the bin capacity shortage of each Package Size-Temperature Code combination in a serial manner. The bin capacity shortage of each Package Size-Temperature Code can be processed one at a time, in the sequence of the Configuration Adjustments Report Program's (344) priority rules, and each subsequent bin configuration adjustment can be calculated based upon prior bin configuration adjustment updates and bin reservation updates. Package Size-Temperature Code bin capacity shortages can be processed in priority sequence by Temperature Code, starting with a value such as "freezer", then a value such as "refrigerated", and finishing with a value such as "standard". Within Temperature Code priorities, Package Size-Temperature Code bin capacity shortages can be processed by a pre-defined Package Size priority sequence, for example, "4", "3", "6", "2", "5", "1". To resolve each shortage, the Configuration Adjustments Report Program (344) can attempt to make a division configuration adjustment before making a consolidation configuration adjustment. Bin Sizes such as "5" and "6" can be considered separately from the other Bin Sizes when making bin configuration adjustments, as they can be part of separate master bins.

To effectively make a division configuration adjustment, the Configuration Adjustments Report Program (344) can search the Unreserved Bins data view 1305 for the Quantity of Bin Size-Temperature Code combinations larger than the Package Size of the Package Size-Temperature Code bin capacity shortage that it is trying to resolve. It can start with the next largest bin size, greater in size than the Package Size for which it is searching, before searching for larger Bin Sizes in increasing size sequence. The Configuration Adjustments Report Program (344) can determine how many bins, of the Bin Size corresponding to the current Package Size, it can make from dividing one bin of the selected Bin Size. It can, for example, multiply the total number of bins, of the selected Bin Size found on the Unreserved Bins data view 1305, by the number of bins, of the Bin Size corresponding to the current Package Size, that can be created from each one of those selected bins. The Configuration Adjustments Report Program (344) can also determine if there can be a remainder Bin Size left after dividing the selected unreserved bins. The Configuration Adjustments Report Program (344) can update the existing record 1304 or create a new record on the Pending Bin Configuration Adjustments table 1304 to account for a positive adjustment to the Quantity of bins of the Bin Size-Temperature Code combination that will be created when the bin configuration adjustment is physically made at the CDC 1190-1. The Configuration Adjustments Report Program (344) can also update or create another record on that table 1304 to account for a negative adjustment to the Quantity of bins of the Bin Size-Temperature Code combination that will be divided to create the additional smaller bins. If a number of bins will be created from the remainder of each bin configuration adjustment, a new record can be added or a Quantity update to an existing record can be made to the Pending Bin Configuration Adjustments table 1304 to account for the positive adjustment to the Quantity of bins of the Bin Size-Temperature Code combination of the remainder Bin Size. The Configuration Adjustments Report Program (344) can also create a new record on the Bin Reservation table 1302 to reserve bins for the Quantity of additional packages, of each Package Size-Temperature Code combination in the current delivery shipment, that will be able to be delivered because of the newly made pending bin configuration adjustments.

If the Configuration Adjustments Report Program (344) was unable to resolve the entire bin capacity shortage of the Package Size-Temperature Code combination using the first Bin Size-Temperature Code combination it selected from the Unreserved Bins data view 1305, it can select the Unreserved Bins record 1305 having the next largest Bin Size for the same Temperature Code, and can follow the same processing logic to resolve the remaining shortage. If there is still a shortage after trying to divide the largest possible Bin Size applicable to that Package Size (single-item packages for stationary bins can be considered separate from multi-item packages for revolving bins), the Configuration Adjustments Report Program (344) can attempt to effectively make a consolidation configuration adjustment to resolve the remaining shortage. To effectively make a consolidation configuration adjustment, the Configuration Adjustments Report Program (344) can select all the records from the Bin Inventory table 1300 having the Temperature Code of the current Package Size-Temperature Code combination and a Status such as "available" in a subquery. It can then select the records from that subquery for which there is more than one record having the same Master Bin Id. The Configuration Adjustments Report Program (344) can read through the Configuration Codes of those selected subquery records to determine if the selected bins can be consolidated together to receive a package of the current Package Size. If the Configuration Adjustments Report Program (344) determines, using its configuration logic rules, that two or more selected Bin Inventory records 1300 having the same Master Bin Id can be consolidated together to create a bin to meet the size of the current Package Size, then the Configuration Adjustments Report Program (344) can search the Unreserved Bins data view 1305 to make sure that the selected Bin Inventory records 1300 are not already reserved indirectly on the Bin Reservation table 1302. If the Configuration Adjustments Report Program (344) is able to find a bin on the Unreserved Bins data view 1305 to match the Bin Size of each Bin Inventory record 1300 involved in the possible bin configuration adjustment, then there can be enough unreserved bins to accept incoming packages without the selected Bin Inventory records 1300. The program (344) can update the Status of the selected Bin Inventory records 1300 to a value such as "configuration reserved". The program (344) can also make updates to the Pending Bin Configuration Adjustments table 1304 to account for both the positive and negative adjustments to the Quantity of the Bin Size-Temperature Code combinations that will be created and removed when the consolidation bin configuration adjustment is physically made at the CDC 1190-1. A new Bin Reservation record 1302 is not created to reserve bins for a consolidation bin configuration adjustment, since a "hard allocation" reservation was made directly to the Bin Inventory table 1300 through the Status update. The Status update that can be made to the selected Bin Inventory record 1300 for a pending consolidation bin configuration adjustment can automatically, flow through to the Bin Availability data view 1301 that is created from the Bin Inventory table 1300 and the Unreserved Bins data view 1305 that is created from the Bin Availability data view 1301. A Loading Program (356), which can be run in a CDC 1190-1 when packages are being loaded into SBU bins, will not allow packages to be loaded into bins that have a Status value such as "configuration reserved". A "hard allocation" (a reservation of specific bins) can be made for consolidation bin configuration adjustments, because unlike a division bin configuration adjustment in which any available bin of a larger size can be divided into smaller bins, a consolidation bin configuration adjustment can require that two or more available smaller bins be adjacent to each other within the same master bin to be configured together into a larger bin. Reserving specific bins can prevent a bulk delivered package from being loaded into a bin, and can thus preserve that bin's ability to be consolidated with one or more adjacent bins to create a larger bin.

Once the Configuration Adjustments Report Program (344) finishes a consolidation adjustment for a given Package Size-Temperature Code combination, it can attempt to find another set of selected Bin Inventory records 1300 to effectively make another consolidation adjustment until the entire bin capacity shortage for that Package Size-Temperature Code combination is fully resolved, or until it is unable to find a set of Bin Inventory records 1300 which can be consolidated to hold a package of the current Package Size-Temperature Code. Once either of these two situations occurs, the Configuration Adjustments Report Program (344) can begin to process the bin capacity shortage of the next Package Size-Temperature Code combination. As it finishes effectively making all the bin configuration adjustments that it is able to make to resolve a bin capacity shortage, the Configuration Adjustments Report Program (344) can continue to save the remaining bin capacity shortage value for each Package Size-Temperature Code combination in a program variable.

The Configuration Adjustments Report Program (344) can print, or caused to be printed, a hard copy report for the CDC workers of the ePD shipper on, for example, a report printer in the CDC 1190-1. It can also send, or cause to be sent, an e-mail/text pager message to the primary and secondary cell phone/text pager device associated with that CDC 1190-1 to notify the CDC workers of that CDC 1190-1 that a Configuration Adjustments Report has printed. Configuration Adjustments Reports for different shippers can be printed on the same CDC report printer, but a shipper's CDC workers can identify which report to use by looking for the ePD Shipper Id in the report header. Each Configuration Adjustments Report can contain only the bin configuration adjustments needed to receive the packages of that shipper.

After the Configuration Adjustments Report Program (344) finishes its bin configuration processing, it can initiate a Shipment Adjustments Report Program (345), passing the remaining bin capacity shortage values to the program (345) as program inputs. If all of the remaining bin capacity shortage values equal zero, the Shipment Adjustments Report Program (345) can send a message to the Delivery Shipment Program (342) to confirm that no shipping adjustments are required. If there is at least one remaining bin capacity shortage value greater than zero, the Shipment Adjustments Report Program (345) can create a report listing the total quantity of packages of each Package Size-Temperature Code combination that should be removed from the current delivery shipment to prevent sending more packages than the CDC 1190-1 has the capacity to accept. A barcode containing an identifier of the program variable holding the bin capacity shortage value of each Package Size-Temperature Code combination can be printed with each report line. The barcodes can be used to initiate the action of removing packages from the delivery shipment. The Shipment Adjustments Report Program (345) can, for example, sound an error tone, and/or light the local market shipping dock workstation warning light (located at the local market shipping dock workstation (220) processing the current delivery shipment), print a hard copy of the report at, for example, the workstation's (220) printer, and send a message to the Delivery Shipment Program (342) to confirm that the report has been sent to the printer.

A worker can retrieve the Shipping Adjustments Report from the workstation's printer (220) and can scan the barcode on the report next to the first report detail line. The worker can pick the number of packages, of the Package Size-Temperature Code combination listed on that report line, out of the current delivery shipment, scanning the package label barcode of each one as the worker places it aside the local market shipping dock conveyor (48). The Shipment Adjustments Report Program (345) can use the scanned Package Id to validate that the Package Size and Temperature Code of the scanned package match the Bin Size and Temperature Code of the last identifier scanned on the Shipment Adjustments Report. If the scanned package fails validation, the program (345) can, for example, sound an error tone, light the local market shipping dock workstation warning light, and/or display a message on the workstation's program display monitor (220) that the scanned package does not match the delivery shipment adjustment scanned on the report. If the scanned package passes validation, the Shipment Adjustments Report Program (345) can, for example, sound a confirmation tone and can update the Package record 1234 of the scanned package, setting Status from a value such as "delivery shipment" back to a value such as "closed" and deleting the Delivery Shipment Id. The program (345) can also decrement the bin capacity shortage value of the barcode indicator scanned on the report by one for each package successfully removed from the delivery shipment. The removed packages which have been set aside can later be moved back to the CDC feed conveyor (47A) from which those package came, after the worker is finished loading all of the delivery shipments into the outbound trailer (202). The worker can continue to scan the barcodes listed on the report and remove packages as required until the entire quantity of packages of each Package Size-Temperature Code listed on the Shipping Adjustments Report has been removed from the delivery shipment. After finishing working through the report, the worker can, for example, scan a confirmation barcode at the bottom of the report to confirm that all the adjustments have been made. The Shipment Adjustments Report Program (345) can validate that the value of each bin capacity shortage program variable has been decremented to zero and can sound a confirmation tone.

If there is more than one delivery shipment on the local market shipping dock conveyor (48), the worker can scan the Delivery Shipment Id barcode on the cargo cage of the next delivery shipment to repeat the delivery shipment loading process previously described, for the remaining delivery shipments. The delivery shipments can be scanned in a sequence starting with the one farthest from the local market shipping dock door (50). After all the delivery shipments have been processed, the worker can select the program menu option to end the Delivery Shipment Program (342) and the Delivery Shipments Report can print on the workstation's report printer (220). The Delivery Shipments Report can list the delivery shipments that will be physically loaded onto the trailer (202) in the sequence in which they were scanned (which can also be the sequence in which they will be unloaded). The Delivery Shipments Report can provide guidance to the driver transporting delivery shipments to CDC's 1190-1 and/or LDDH's 1192-1 within a local market, by listing the destination CDC 1190-1 or LDDH 1192-1 of each delivery shipment on the tractor-trailer in unloading order. The CDC Id, CDC Description, CDC address related fields (for example, an Address 1 field, an Address 2 field, a City field, a State field, and a Zip field), Primary Contact Number, Secondary Contact Number, the total number of multi-item packages in the delivery shipment, and the total number of single-item packages in the delivery shipment can be listed on the Delivery Shipments Report in a readable format for each CDC 1190-1/LDDH 1192-1 listed on the report. The Delivery Shipment Id, Temperature Code and the total number of packages of each Package Size in the delivery shipment can be printed, for example, in a single parseable barcode on the Delivery Shipments Report for each CDC 1190-1/LDDH 1192-1 report item. The total number of packages of each Package Size and the total number of multi-item packages and single-item packages for a delivery shipment can have been calculated when the program (342) originally selected records from the Package table 1234 for that delivery shipment. CDC related information can have been retrieved from the CDC table 1252 using the CDC Id embedded in the scanned Delivery Shipment Id barcode.

After retrieving the Delivery Shipments Report from the report printer (220), a worker can open the trailer door, move the conveyor extension of the local market shipping dock conveyor (48A) into the horizontal loading position, start the trailer conveyor (204) in the loading direction, and then start the local market shipping dock conveyor (48) in the loading direction. The system of conveyors can move the delivery shipments onto the trailer conveyor (204). The RDC worker can stop the conveyors (204, 48A & 48), reposition the conveyor extension (48A) to the vertical delivery preparation position, and close the trailer door. The worker can hand the Delivery Shipments Report to the tractor-trailer driver, and the driver can depart for the first CDC 1190-1 or LDDH 1192-1 listed on the report.

Figure 6:
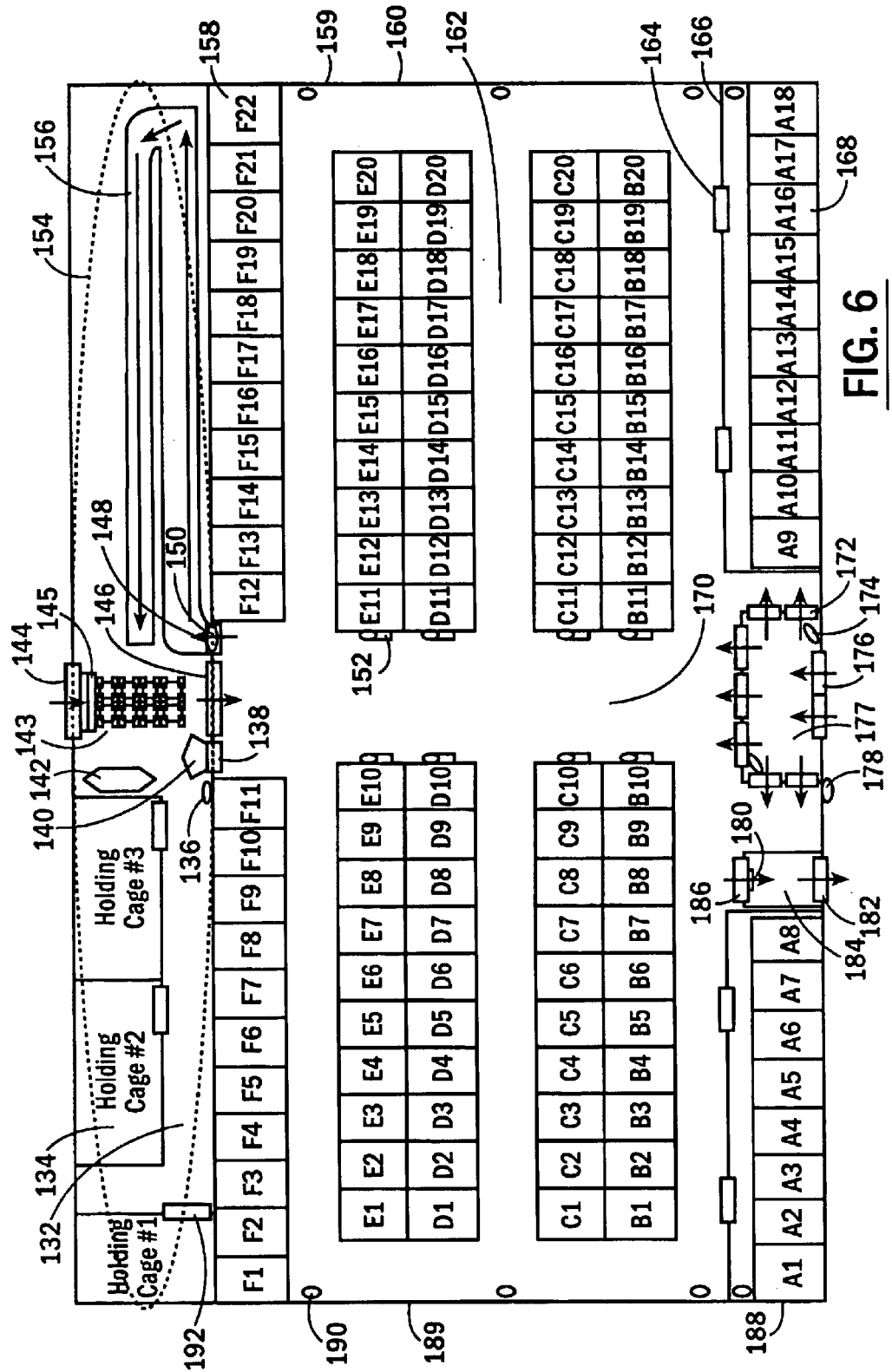
FIG. 6 is an illustrative embodiment of an exemplary layout of a Customer Distribution Center (CDC).

In a further aspect of the invention an illustrative embodiment of a process used to recycle packing materials can be shown. Recipients can be asked to voluntarily return package bags to CDC's 1190-1 for recycling. Referring to FIG. 6, recipients can place empty package bags, including the package ties and packing sheets that came with each package bag, in a package bag recycling chute (138) at a CDC 1190-1. Returned package bags can be left to accumulate in a package bag recycling collection tank (140) of a CDC 1190-1, until a large volume of them has accumulated. Periodically, large batches of returned package bags can be taken from package bag collection tanks (140), in CDC's 1190-1 that do not have a package bag recycling machine (142), and transported to a CDC 1190-1 in the same local market that does have a package bag recycling machine (142). A package bag recycling machine (142) can be located in at least one CDC 1190-1 within a local market. Workers at a CDC 1190-1, where package bags can be recycled, can separate package ties from package bags, and load the package bags and packing sheets into a package bag recycling machine (142). A package bag recycling machine (142) can condense bubble wrap package bags and packing sheets into blocks of recycled plastic source material which can be used later to make new package bags and packing sheets.

CDC workers can break down the empty cargo cages, that were received into a CDC 1190-1, for shipping, by unlatching enough of the cargo cage linking clasps to fold the sides of the cargo cages, down on top of each other, to create flat condensed cargo cage units. Tractor-trailers can be used to transport condensed cargo cage units, package bag ties, and blocks of recycled plastic source material from a local market to its RDC 1180-1. While package bags, packing sheets, and package bag ties can be grouped together to one or a few CDC's in a local market before being recycled and shipped to a RDC, cargo cages can be transported directly from CDC's 1190-1 and LDDH's 1192-1 to a RDC 1180-1. The package bags used in traditional deliveries to customer-specified addresses from LDDH's 1192-1 can be returned to a CDC 1190-1. With reference to FIG. 8, after blocks of recycled plastic source material, package bag ties, and disassembled cargo cages arrive at a RDC 1180-1 on a tractor-trailer (200 & 202), the different materials can be unloaded from the trailer (202) onto the local market receiving dock conveyor (14) and moved through the RDC 1180-1. The packing materials can travel to the local market sort conveyor (24) along the same path as inbound cases from retailers. From the local market sort conveyor (24), the blocks of recycled plastic source material can be moved to a bubble wrap bag production machine (58), which can be located adjacent to the local market sort conveyor (24). The recycled plastic source material can be fed into the bubble wrap bag production machine (58) to make new bubble wrap package bags and bubble wrap packing sheets. Newly created package bags can be packed into totes carrying a standard quantity. The totes can be labeled with a barcode containing a special Case Id that can identify the tote as one containing packing materials. A Packing Materials Supply Program (346) can be used to generate a Case record 1208 and a case label for each tote. The Case Id of packing material totes (cases) can consist of, for example, the current RDC Id+a value such as "pm"+the current date+a sequential seven digit number. Status can be set to a value such as "destination RDC". SKU can be set to a value corresponding to the type of packing material—large package bags, small package bags, package bag ties, or packing sheets. Quantity can be set to the standard quantity packed in each tote for either small or large package bags. Quantity can be set to a value such as "1" for package bag ties or packing sheets (the exact quantity of package bag ties and packing sheets in a tote may not be tracked). ePD Retailer Id can be set to a value such as "pack". The Temperature Code can be set to a value such as "standard". Other fields on the Case record 1208 can have no value when the record 1208 is created. The totes containing packing materials can be placed onto the local market sort conveyor (24). Although not absolute, cargo cages can be preferably not labeled or placed into totes.

RDC workers performing the local market sort 1118 and CDC sort 1120 can be responsible for picking totes of packing materials, as well as item SKU cases, for the packing stations (45) which they support. There can be special Order Header 1200 and Order Detail records 1202 for packing materials that define the safety stock for each type of packing material. There can be a separate set of Order Header 1200 and Order Detail 1202 records for each type of packing material, for each CDC 1190-1 or LDDH 1192-1. Each set of packing material Order Header 1200 and Order Detail 1202 records can establish a continual request for a supply of a packing material to meet the predefined safety stock of that packing material. Safety stock levels can be defined for each CDC 1190-1 or LDDH 1192-1 based for example, upon the number of packing stations (45) normally in use for that CDC 1190-1 or LDDH 1192-1. The safety stock level quantities required for each CDC 1190-1 or LDDH 1192-1 can be adjustable through a menu option function of the CDC Sort Program (328). Package bag safety stock levels can be set, for example, to require two totes of the standard quantity of each package bag size per packing station (45)—one full tote quantity for working stock and another one for safety stock. Package bag tie, packing sheet, and cargo cage safety stock levels can be set relative to the number of package bags or totes of package bags in package bag safety stock levels. For example, one tote of package bag ties can be required for every 20 totes of package bags, 1.5 totes of packing sheets can be required for each tote of package bags, 2.5 cargo cages can be required for each tote of small package bags, and 6 cargo cages can be required for each tote of large package bags. The Order Header records 1200 for packing materials can be defined, for example, as follows: Order Id consists of RDC Id+a value such as "pack"+CDC Id+a filler value such as "010101"+a 3 digit number representing the type of packing material; Status can be set to a value such as "open"; Local Market Id can be set to the value associated with the current CDC Id; CDC Id can be set to the value of the current CDC 1190-1 or LDDH 1192-1 related to a group of packing stations (45); Customer Id can be set to a value such as "packing-m"; ePD Retailer Id can be set to a value such as "pack"; and all other fields can have no value. Order Detail records 1202 for packing materials can be defined, for example, as follows: Order Id can be the same as the value on the corresponding packing material Order Header record 1200; Status can be set to a value such as "destination RDC"; SKU can be set to the value representing the type of packing material (consistent with the SKU values used on Case records 1208 for each type of packing material); Quantity can be set to the safety stock value as previously described; Temperature Code can be set to a value such as "standard"; and all other fields can have no value.

As packages are created by workers at packing stations (45), the Package Creation Program (330) can decrement the Quantity on the packing material Case record 1208 of the current CDC 1190-1 or LDDH 1192-1, for the package bag size that was used in creating the package. The Package Creation Program (330) can also increment the Quantity on the Packing Material Restocking Counter table 1262 for the records having a Type value such as "package bag tie" and "packing sheet" and a CDC Id value equal the current packing station CDC Id, as each new package is created. The Packing Material Restocking Counter table 1262 can serve as a counter, relative to package bag consumption, which can be used to determine when to decrement the Quantity of a packing material Case record 1208, of package bag ties or packing sheets, from one to zero. Since the exact counts of package bag ties and packing sheets are not tracked, when the Packing Material Restocking Counter record 1262, tracking either package bag ties or packing sheets for packing stations (45) of the current CDC 1190-1 or LDDH 1192-1, reaches a predefined level, the Quantity of a packing material Case record 1208, having the current packing station CDC Id and the SKU of the packing material reaching the predefined level, can be decremented from one to zero. The predefined level can be based upon the ratio of the consumption of that packing material relative to the consumption of package bags. Since Case records 1208 are not used to track the supply of cargo cages, the CDC Sort Program (328) can use the Packing Material Restocking Counter table 1262 as the supply count of cargo cages for the packing stations of the current CDC 1190-1 or LDDH 1192-1.

Unlike normal Order Detail records 1202, packing material Order Detail records 1202 are not updated as packing material items are picked from totes to create packages, so the safety stock demand, against which the packing materials supply can be measured, can remain constant. As the Quantity on a packing material Case record 1208 for the packing stations of the current CDC 1190-1 or LDDH 1192-1 decreases below the safety stock level defined on its Order Detail record 1202, the CDC Sort Program (328) and Local Market Sort Program (326) can indicate to pick a tote of that packing material, when the case label of one of those packing material totes is scanned. The sorting programs (326 & 328) can also display a restocking alert message on a program display monitor of workstations used by the workers performing the CDC sort 1120 and local market sort 1118 for the packing stations of the CDC 1190-1, LDDH 1192-1, or the local market of the CDC 1190-1 or LDDH 1192-1 for which the packing material demand has been realized. As the Quantity of a Packing Material Restocking Counter record 1262 of the packing stations of a CDC 1190-1 or LDDH 1192-1, having a Type value such as "cargo cage", decreases below the safety stock level defined on its Order Detail record 1202, the sorting programs (326 & 328) can also display restocking alert messages on the appropriate workstation program display monitors. Upon seeing the restocking alert message, workers performing the local market sort 1118 and CDC sort 1120 can pick cargo cages from the local market sort conveyor (24) and CDC sort conveyor (42) respectively, to meet the demand. Workers performing the CDC sort 1120 can enter the picked quantity into the CDC Sort Program (328) on their workstation keyboards, updating the cargo cage supply on the Packing Material Restocking Counter table 1262. Workers performing the local market sort 1118 can pick cargo cages from the CDC sort conveyor (42). A cargo cage does not have to be scanned and an update does not have to be made to the Packing Material Restocking Counter table 1262 as cargo cages are picked from the local market sort conveyor (24) to a CDC sort conveyor (42).

Figure 12:
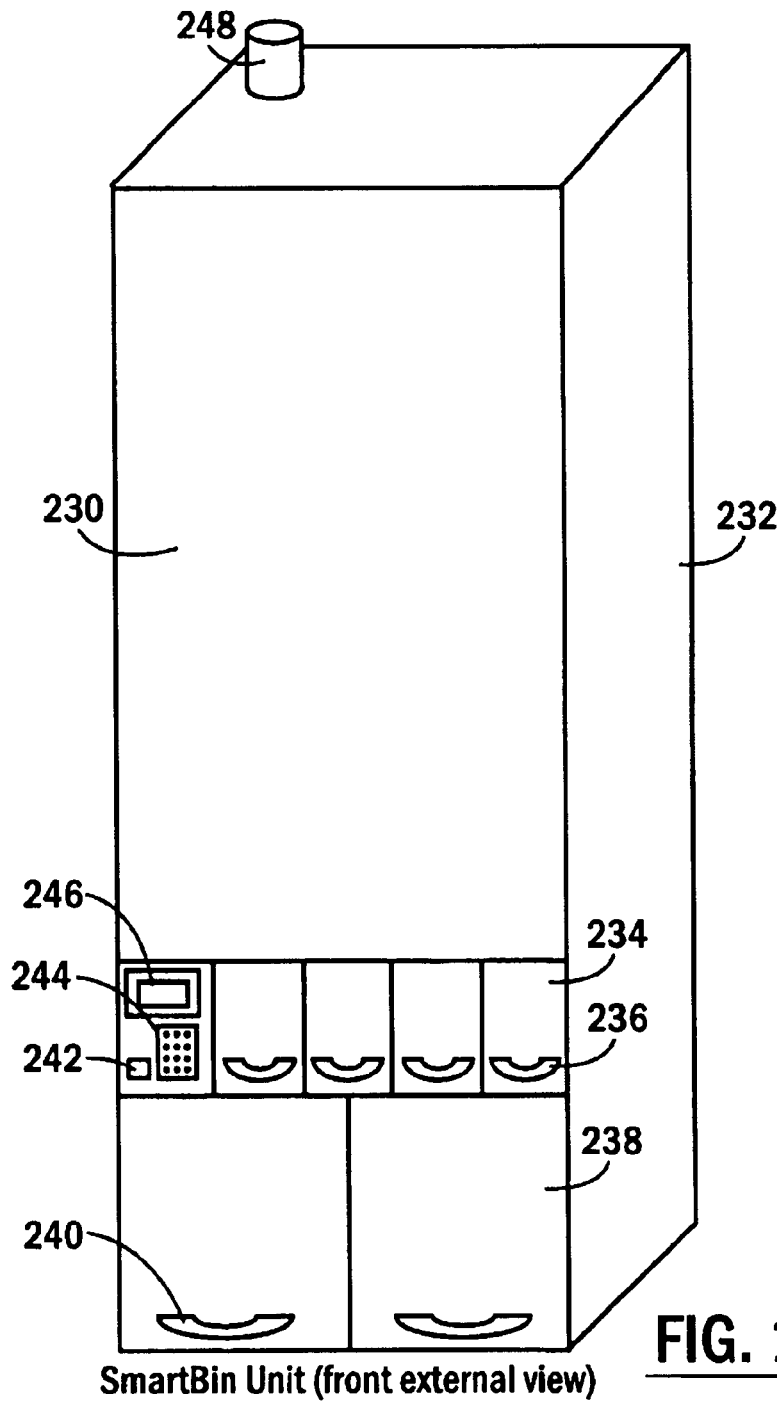
FIG. 12 is an illustrative embodiment of an exemplary SmartBin Unit (SBU) containing storage locker bins within an automated system of storage locker bins.

Referring to FIG. 12, there is shown an exemplary Smart-Bin Unit (SBU) consisting of revolving bins and stationary bins that can be subsections of a physical bin structure which can be configurable, and which can be divided into two or more subsections. A SmartBin Unit can include a front exterior panel 230, side exterior panels 232, revolving bin doors 234, revolving bin door handles 236, stationary bin doors 238, stationary bin door handles 240, a scanner port 242, a keypad 244, a display screen 246 and an exterior wiring duct 248.

Each subsection of a physical bin structure can be referred to as a bin and the physical bin structure can be referred to as a master bin. Thus with reference to the Bin Inventory table 1300 of FIG. 10A, if a master bin is divided into two or more bins, each subsection or bin can have the same Master Bin Id for one of its data attributes. The bins can also have Configuration Codes and Bin Sizes that identify the manner in which they have been divided. A Configuration Code can numerically describe which subsections comprise a bin, of the possible number of subsections within a master bin. Each subsection of a revolving master bin can be numbered, for example, from left to right starting with a value such as "1". Each subsection of a stationary master bin can be numbered from left to right starting with the number equal to the highest revolving bin subsection number, plus one. A Configuration Code can, for example, consist of only the numbers of the master bin subsections that comprise the bin, moving from left to right. The Bin Size of any revolving bin can be equal to the number of its subsections. For example, a bin with a Configuration Code of "234" can have a Bin Size of "3". The Bin Size of any stationary bin can be equal to its number of subsections+the largest possible Bin Size of a revolving bin. For example, if the largest possible Bin Size of a revolving bin is "4", a stationary bin with a Configuration Code of "6" can have a Bin Size of "5". Each bin within a CDC 1190-1 can be tracked on the Bin Inventory table 1300 in the database of that CDC's 1190-1 processing server. The Bin Inventory record 1300 of each bin can contain a unique Bin Id, which can be derived by concatenating, for example, its SBU Id+its Master Bin Id+its Configuration Code.

The following two illustrative examples can illustrate how different configurations of a master bin can be tracked on the Bin Inventory table 1300. In the first illustrative example, a revolving master bin—Master Bin Id "02" of SBU Id "A01"—can be divided into three bins. Bin Id "A01-02-0012" can encompass the left half of the master bin and can have a Bin Size of "2". Bin Id "A01-02-0003" can encompass the third quarter of the master bin, just to the right of Bin Id "A01-02-0012", and can have a Bin Size of "1". Bin Id "A01-02-0004" can encompass the right-most quarter of the master bin and can have a Bin Size of "1". The Configuration Codes of the three bins respectively can be as follows: "12", "3", "4". In the second illustrative example, a stationary master bin—Master Bin Id "S1" of SBU Id "A01"—can be configured as one bin, consisting of both master bin subsections. Bin Id "A01-S1-0056" can encompass the whole stationary bin, can have a Bin Size of "6", and a Configuration Code of "56".

SBU master bins can have one or more two-section panels, called configuration dividing panels (CDP's), hinged on one side to the top surface of their bottom panels. Each CDP can be locked into one of two different positions. For example, a consolidating position or the dividing position. The two sections of the CDP can be attached to each other by folding hinges. The section which is not hinged to the bottom panel of the master bin can have, for example, four CDP cam locks, each of which slide a CDP bolt 90 degrees to lock or unlock the CDP into one of its two positions. CDC workers can use, for example, configuration keys to lock a CDP into or unlock a CDP out of the dividing position or the consolidating position. The CDP cam lock and configuration key can be similar to the lock and key mechanism used to open and close vending machines. Configuration keys can be constructed in such a manner as to be used interchangeably between all CDP cam locks and bin door cam locks of any SBU. The design of the configuration key can allow a worker with a key to make bin configuration adjustments to any SBU, while preventing someone without a configuration key from changing a bin's configuration, even if the door of the bin has been opened.

When a CDP is in the consolidating position, a first panel section of the CDP, which is hinged to the bottom of the master bin, can rest horizontally in a recessed area on top of the master bin's bottom panel. The second panel section of the CDP can rest horizontally on top of the first panel section, and can also be recessed so that the top surface of the second panel section is level with the surface of the rest of the master bin's bottom panel. The CDP bolts of the four CDP cam locks can be locked into locking slots, built into the sides forming the recessed area within the master bin's bottom panel. When a CDP is in the dividing position, the two panel sections of the CDP can both be vertical, sitting on top of each other, with the first panel section perpendicular to the bottom panel, of the master bin to which it is attached, and the second panel section perpendicular to the top panel of the master bin, into which it can be locked in place by two of its CDP bolts. Two of the second panel's CDP bolts can lock into locking slots in the top panel of the master bin, while the two CDP bolts on its other side can lock into locking slots built into the side of the first panel section. The CDP bolts which can lock down into the side of the first panel section can provide structural support to form a single, solid dividing panel. The CDP bolts which can lock into the top panel of the master bin and the hinges which can attach the first panel section to the bottom panel of the master bin can secure the CDP as the side wall between two adjacent bins of a master bin.

If bin configurations are required to receive a delivery shipment, CDC workers covering a CDC 1190-1 can be alerted that a Configuration Adjustments Report is printing on the CDC printer, while bins in that CDC 1190-1 are being reserved for the delivery shipment. Upon arriving at the CDC 1190-1 where the Configuration Adjustments Report printed, CDC workers can use the report to make the necessary configuration adjustments, step 1140, before the delivery shipment which triggered the report is received. The Configuration Adjustments Report can guide a CDC worker to the SBU's, upon which the worker will make configuration adjustments, by listing them in SBU Id order. A CDC worker can, for example, wear a hands-free barcode scanning device as the worker takes the report to each listed SBU. The CDC worker can, for example, connect the scanning device into the scanner port (242) of the first SBU listed on the report, scan their employee id card to identify themselves as the worker configuring the current SBU, and scan the first barcode next to a Master Bin Id, listed underneath the SBU Id on the report. The scanner could also be a wireless scanner, which can communicate to a remote device or server. A SBU Configuration Program (352) of the ePD SBU Application can be initiated on the CDC's 1190-1 processing server. Under each SBU Id on the Configuration Adjustments Report, Master Bin Id's can be listed in ascending order, with stationary master bins preceding revolving master bins. In one embodiment of a SBU, the SBU can have only one stationary master bin, which can contain only one CDP, but because other embodiments may feature more than one stationary master bin and/or may feature stationary master bins with more than one CDP, in this disclosure both stationary master bins and their CDP's will be referred to in a more general plural sense, rather than as one specific master bin or CDP. If more than one bin configuration adjustment is to be made to one master bin, each bin configuration adjustment can be listed separately. For example, the Master Bin Id can be listed more than once under its SBU Id. The new Configuration Codes of the bins to be created within the master bin can be listed next to each Master Bin Id on the report, along with a barcode that can be used to trigger the database changes associated with the configuration action.

There can be many possibilities of forming a new bin configuration from an existing one, but no matter what the bin configuration is at the start and end of a bin configuration adjustment, every bin configuration adjustment can be classified as either a dividing bin configuration adjustment or a consolidating bin configuration adjustment. The barcode of a dividing bin configuration adjustment can contain, for example, a configuration type identifier, followed by the Bin Id of the bin to be divided, followed by the Configuration Code of each bin resulting from the bin configuration adjustment, in a barcode format which can be parseable. When the barcode of a dividing bin configuration adjustment is scanned, the SBU Configuration Program (352) can parse the data in the barcode, use the configuration type identifier to determine that the configuration action is a dividing one, and use the Bin Id to select the Bin Inventory record 1300 of the bin being divided. The program (352) can create two or more new Bin Inventory records 1300 from the selected Bin Inventory record 1300, before deleting the selected record 1300. Each new Bin Inventory record 1300 can have the same values as the deleted Bin Inventory record 1300, except for the Configuration Code, Bin Id, and Bin Size fields. The Configuration Code on the first record 1300 created can be set to the value of the first Configuration Code, listed after the Bin Id, in the scanned report barcode. The Configuration Code on subsequently created records 1300 can be set to the value of each subsequent Configuration Code, listed after the first one, in the scanned report barcode. The Bin Id on each new record 1300 can be derived, for example, by concatenating SBU Id+Master Bin Id+Configuration Code. Bin Size on new records 1300 created for revolving bins can be set to the number of digits in the Configuration Code. Bin Size on new records 1300 created for stationary bins can be set to the number of digits in the Configuration Code added to the value of the largest possible revolving Bin Size. The parseable barcode of a consolidating bin configuration adjustment can contain, for example, a configuration type identifier, followed by the Configuration Code of the new bin resulting from the bin configuration adjustment, followed by the Bin Id of each bin within the master bin to be consolidated, in a barcode format. When the barcode of a consolidating bin configuration adjustment is scanned, the program (352) can parse the data in the barcode, use the configuration type identifier to determine that the configuration action is a consolidating one, and use the Bin Id's to select the Bin Inventory records 1300 of the bins being consolidated. The program (352) can create one new Bin Inventory record 1300 from the selected Bin Inventory records 1300, before deleting the selected records 1300. The new Bin Inventory record 1300 can have the same values as the deleted Bin Inventory records 1300, except for the Configuration Code, Bin Id, Bin Size, and Status fields. The Configuration Code on the new record 1300 can be set to the value of the Configuration Code, listed after the configuration type identifier, in the scanned report barcode. The Bin Id on the new record 1300 can be derived, for example, by concatenating SBU Id+Master Bin Id+Configuration Code. Bin Size on the new record 1300 can be set for a revolving or stationary bin based on the Configuration Code in a manner that can be consistent with the way it can be set for a dividing bin configuration adjustment. Status can be set to a value such as "available".

As each dividing bin configuration adjustment is made to the Bin Inventory table 1300, the program (352) can update the Pending Bin Configuration Adjustments table 1304 to offset the amount of pending bin configuration adjustments by the amount of bin configuration adjustments actually made. It can reduce the Quantity of the Pending Bin Configuration Adjustments record 1304, having the Bin Size and Temperature Code of the newly created Bin Inventory records 1300, by the number of new bins created. It can increase the Quantity of the Pending Bin Configuration Adjustments record 1304, having the Bin Size and Temperature Code of the deleted Bin Inventory records 1300, by the number of records deleted. The Pending Bin Configuration Adjustments table 1304 does not have to be updated as consolidating bin configuration adjustments are made, because pending consolidating bin configuration adjustments can be tracked by the Status on specific Bin Inventory records 1300, instead of on Pending Bin Configuration Adjustments records 1304. With reference to FIG. 10B, the program (352) can also add a new record to a Configuration Adjustment Log table 1306 to track each bin configuration adjustment made, using the data from the scanned report barcode and the scanned employee id. A Configuration Adjustment Id can be derived, for example, by concatenating the value of the first Bin Id listed in the scanned report barcode+the current date. Configuration Type can be set to the value of the configuration type identifier. The value of Bin Id 1 through Bin Id 4 can be set to the value of each Bin Id listed in the barcode, in the sequence that it is listed. The value of Configuration Code 1 through Configuration Code 4 can be set to the value of each Configuration Code listed in the barcode, in the sequence that it is listed. Employee Id can be set to the value on the scanned employee id card, and Configuration Date/Time can be set to the current date/time.

When the barcode of a stationary master bin listed on a Configuration Adjustments Report is scanned, the program (352) can unlock the bin doors (238) of the stationary master bin and display the Master Bin Id and the desired Configuration Codes on the SBU display screen (246). The program (352) can separate the Master Bin Id and each individual Configuration Code with, for example, hyphens, when displaying them on a SBU display screen (246). The worker can hold the stationary bin doors (238) open while using a configuration key to reposition the CDP's of the stationary master bin to achieve the bin configuration dictated by the Configuration Codes listed on the Configuration Adjustments Report and the SBU display screen (246). The worker can also use a configuration key to reposition bin door configuration bolts into either a dividing or consolidating position to align the configuration of the stationary bin doors (238) with the new bin configuration. Unlike bin door configuration bolts on revolving bin doors (234), which can be moved electronically by ePD SBU Application programs, bin door configuration bolts on a stationary bin door (238) can be moved manually using a bin door cam lock, located near the bottom of the inside of a stationary bin door (238). When a CDP has been moved in place to divide a stationary bin, the bin door configuration bolt between the two bin doors (238) on either side of that CDP should be in the dividing position—for example, vertical, completely within the structure of one of the two stationary bin doors (238). When a stationary bin CDP is folded down and locked into the consolidation position, the bin door configuration bolt, between the two stationary bin doors (238) on either side of where that CDP is hinged, should be in the consolidating position—for example, horizontal, overlapping into the locking slot within the structure of the stationary bin door (238) adjacent to the stationary bin door (238) into which it is built.

Figure 10C:
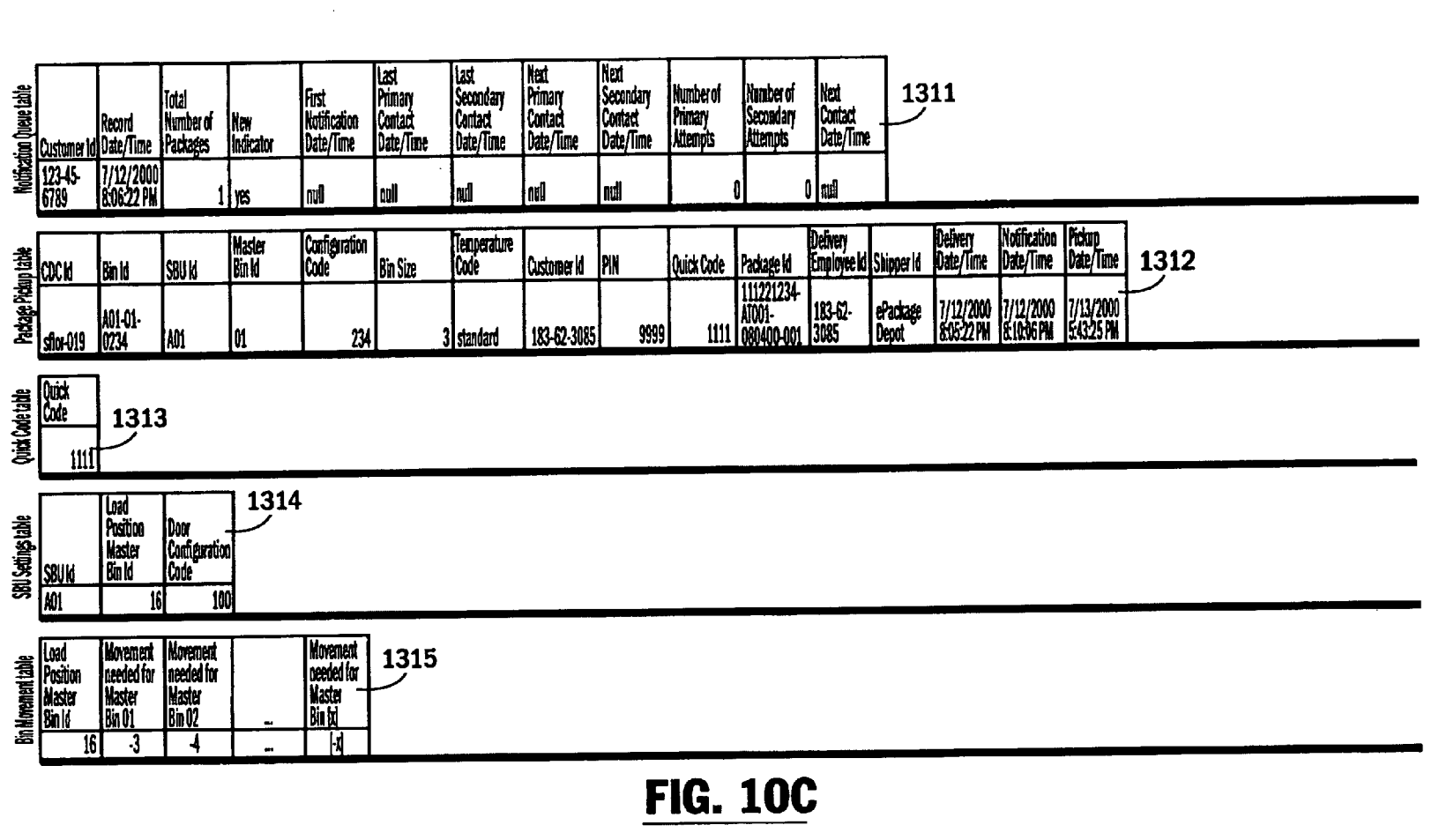

With reference to FIG. 10C, when the barcode of the first revolving master bin of a SBU listed on a Configuration Adjustments Report is scanned, the program (352) can move the master bin of the scanned report barcode into the unloading position (the unloading/loading position of a SBU bin or master bin can be with the open front side of the master bin lined up with the SBU's revolving bin doors (234)), move the bin door configuration bolts to consolidate the revolving bin doors (234) to form one solid bin door across the entire revolving master bin, update the values on a SBU Settings record 1314 of the current SBU, and unlock the revolving bin doors (234). The SBU Configuration Program (352) can call or cause to be called, a Bin Positioning Program (372) and can use program logic similar to an Unloading Program (370) to position and unlock revolving bins. A difference between how the SBU Configuration Program (352) works as compared to the Unloading Program (370) can be in how it determines which bins to move and unlock. The SBU Configuration Program (352) can determine which bins to move from the Master Bin Id associated with one or more of the Bin Id's in the scanned report barcode, and it can unlock all the revolving bin doors (234). The Unloading Program (370) can determine which bin to move and which revolving bin doors (234) to unlock from the information entered on the SBU keypad (244) by the package recipient. After moving the master bin into the unloading position and unlocking the revolving bin doors (234), the SBU Configuration Program (352) can display the Master Bin Id and the desired Configuration Codes on the SBU display screen (246). The worker can open the consolidated bin doors (234), lift them up against the front panel (230) of the SBU, and use a configuration key to lock them into an open position. The locking bolt of a revolving bin door cam lock, which can be located on the inside of one of the revolving bin doors (234), can slide into a locking slot on the front panel of the SBU to lock the bin doors (234) into an open position. The worker can use a configuration key to reposition the CDP's of the revolving master bin to achieve the bin configuration dictated by the Configuration Codes listed on the Configuration Adjustments Report and the SBU display screen (246).

Like the Unloading Program (370), whenever the SBU Configuration Program (352) moves the revolving bins and the revolving bin door configuration bolts, it can update the current SBU's record on the SBU Settings table 1314 to account for the movements. It can set Load Position Master Bin Id to the Master Bin Id of the bin moved to the unloading position and Door Configuration Code to the value that describes the current setting of each revolving bin door configuration bolt. The Door Configuration Code can be an alphanumeric value, consisting of zeros and ones. It can have as many characters as there can be bin door configuration bolts, and each character can represent a bin door configuration bolt starting from left to right. Zeros can be used, for example, to denote that a bin door configuration bolt is in the dividing position. Ones can be used, for example, to denote that a bin door configuration bolt is in the consolidating position.

The worker can continue to scan the barcodes underneath the SBU Id on the report and make the bin configuration adjustments to each master bin as directed on the Configuration Adjustments Report and the SBU display screen (246). The SBU Configuration Program (352) can move a SBU's bins regardless of whether the revolving bin doors (234) of that SBU are closed. After all bin configuration adjustment changes for a SBU are complete, the worker can, for example, scan a confirmation barcode, which can be listed on the last report line underneath the SBU Id, to confirm that all the bin configuration adjustments listed for that SBU have been made. Upon receiving a confirmation tone and a confirmation message on the SBU display screen (246) for example, the worker can use a configuration key to unlock the revolving bin doors (234) from the open position. The worker can then lock the revolving bin doors (234) by firmly pushing them closed. The worker can then proceed to the other SBU Id's listed on the Configuration Adjustments Report, scanning their employee id card and making bin configuration adjustments on each one until the end of the report is reached. After all the bin configuration adjustments listed on the Configuration Adjustments Report have been made and confirmed, the SBU Configuration Program (352) can end.

The Configuration Adjustments Report for one delivery shipment may be split between two or more CDC workers making the bin configuration adjustments. Each worker can scan their employee id card before starting to make configurations to a SBU, allowing the program (352) to track the worker who made each bin configuration adjustment on the Configuration Adjustment Log table 1306.

In a further aspect of the invention, the tractor-trailer driver can stop at the CDC's 1190-1 and/or LDDH's 1192-1 listed on their Delivery Shipments Report in the sequence in which they can be listed. Prior to arriving at the CDC's 1190-1, the driver can use a communication means such as a cellular phone to call a Primary Contact Number for each CDC 1190-1 in order to alert CDC workers that a delivery shipment will arrive, give, for example, an estimated time of arrival, and let the workers know whether the incoming delivery shipment encompasses more or less than half of the trailer (202). If the attempt to reach the team of CDC workers covering the CDC 1190-1 using its Primary Contact Number fails, the driver can attempt to call the CDC's 1190-1 Secondary Contact Number (both numbers can be listed on the Delivery Shipments Report with each CDC Id). In one embodiment, the Primary Contact Number and Secondary Contact Number of a CDC 1190-1 do not dial telephones located in the CDC facility 1190-1. Instead, the contact numbers can dial cellular phones designated to those CDC's 1190-1. As a team of CDC workers begins its work shift to cover a group of CDC's 1190-1, the CDC workers of the prior work shift can transfer the cellular phones, designated to the CDC's 1190-1 they are covering, to the team of CDC workers accepting coverage responsibility for those CDC's 1190-1. Depending upon the designation of the CDC coverage routes within a local market, there can be a group of CDC's 1190-1 which share the same contact numbers. Upon receiving a call from a tractor-trailer driver, the team of CDC workers can travel to the identified CDC 1190-1 to meet the delivery shipment. In one embodiment, a tractor-trailer driver does not need to call ahead to alert a LDDH 1192-1 when making a delivery there, as LDDH's can have dedicated workers on site to receive delivery shipments.

The CDC workers can arrive ahead of the delivery shipment in order to minimize the time (and the costs associated with that time) the tractor-trailer and its driver spend away from their primary function of transporting cases and packages. With reference to FIG. 6, prior to the arrival of the delivery shipment, CDC workers can position a number of mobile putaway conveyor units (143) on the receiving dock area, in front of the CDC receiving dock conveyor extension (145). In one embodiment, either four or eight mobile putaway conveyor units (143) can be used depending upon the size of the delivery shipment. Eight conveyor units (143) can be set up, if the driver indicated that the delivery shipment for the CDC 1190-1 encompassed more than half of the trailer. Four conveyor units (143) can be set up, if the driver indicated that the delivery shipment encompassed less than half of the trailer. Some of the conveyor units (143) may have already been positioned and prepared to receive the next delivery shipment by the CDC workers who last used them. Although specified units can be described, other quantities can be used without departing from the spirit of the invention.

For illustration, each mobile putaway conveyor unit (143) can have an electric power outlet on the side of its base component, below a rotating conveyor component, above where wheels can be attached to the base, at each of the corners of the base component. Each conveyor unit (143) can be as wide as half the width and as long as one-fourth of the length of a trailer conveyor (204). When positioning the conveyor units (143), the workers can connect power cables between the power outlets of adjacent conveyor units (143), forming a horseshoe shaped chain, for example, starting from the front-left unit. The power cable connections between the conveyor units (143) can extend back the left side to the unit farthest away from the CDC delivery dock door (144), across to a back-right unit, and back up the right side to the unit positioned to the right of the front-left unit. The power cables used to connect the units (143) to each other can normally sit with one end plugged into one of the power outlets of the unit (143), and the other plug end, for example, fastened under a holding clip built into the side of that unit (143). The power cable at the front-left corner of the front-left unit (143), can be plugged into an electrical power outlet, located for example, on the base of the CDC receiving dock conveyor extension (145), underneath its pivoting conveyor component. Since the CDC receiving dock conveyor extension (145) can be plugged into an electric power outlet of the CDC facility 1190-1, electric power can be supplied to each of the mobile putaway conveyor units (143) linked together by the power cables. Another step in positioning conveyor units (143) to receive a delivery shipment can be locking their wheels to prevent the conveyor units (143) from moving, as cargo cages get loaded onto them. Each mobile putaway conveyor unit (143) can have a wheel locking mechanism that can be set to either lock all of its wheels or allow them to move freely. CDC workers can engage the wheel locking mechanism on each conveyor unit (143) after that conveyor unit (143) has been aligned in position to receive a delivery shipment. Yet another step in preparing the conveyor units (143) to receive a delivery shipment can be to raise a cargo stop wall on the two units farthest from the CDC delivery dock door (144), to prevent cargo cages from moving off of the end of the conveyor unit (143) as they are loaded onto the conveyor units (143). Cargo stop walls can be slightly less than the width and height of the backside of the base of the conveyor unit (143) into which they can be built. Cargo stop walls can be contained within a rectangular frame that can be built into the backside of the base of the conveyor unit (143) just beyond the edge of the end of the conveyor component. The cargo stop walls can be positioned either in the inactive position—down inside its base frame—or in the active position—extended upward from the top of the frame, forming a wall that extends beyond the top of the conveyor component. A spring-loaded locking pin can be used to keep a cargo stop wall in one of the two positions and must be disengaged to allow the cargo stop wall to be moved from one position to the other. The mobile putaway conveyor units (143) can be designed to be interchangeable with each other. That can simplify the steps involved in positioning them by removing the possibility of positioning one in the wrong place. The conveyor units (143) do need to be positioned in the correct direction, however, to enable the movement of their conveyors to be in synchronization with each other, the dock conveyor extension (145), and the trailer conveyor (204). A correctly positioned conveyor unit (143) can have its cargo stop wall end away from the CDC delivery dock door (144). After the mobile putaway conveyor units (143) are positioned and ready to receive a delivery shipment, one of the CDC workers can open the CDC delivery dock door (144). The CDC workers can then await the arrival of the tractor-trailer (200 & 202) carrying the delivery shipment.

In step 1142, a delivery shipment can be received into a CDC 1190-1. When the tractor-trailer (200 & 202) arrives and finishes backing up to the CDC delivery dock door (144), a CDC worker can open the door of the trailer and lower the CDC receiving dock conveyor extension (145) to the horizontal unloading position. The lowered conveyor extension (145) can bridge the gap between the trailer conveyor (204) and the mobile putaway conveyor units (143) to form one continuous set of conveyor sections. One of the CDC workers can switch on the conveyors of the mobile putaway conveyor units (143) and the CDC receiving dock conveyor extension (145) to move in the unloading direction (away from the trailer (202)). A CDC worker can then switch the trailer conveyor (204) to move in the unloading direction (toward the trailer door) and the cargo cages and single-item packages can be moved from the trailer conveyor (204) across the conveyor extension (145), and on to the conveyor units (143). If the driver had informed the CDC workers that the delivery shipment encompassed less than half of the trailer (202), for example, only four conveyor units (143) would be positioned to receive the delivery shipment, and the trailer conveyor (204), conveyor extension (145), and conveyor units (143) can be stopped after a delivery shipment the size of approximately half of the contents of the trailer is moved onto the conveyor units (143). If the driver had informed the CDC workers that the delivery shipment encompassed more than half of the trailer (202), for example, eight conveyor units (143) would be positioned to receive the delivery shipment, and the trailer conveyor (204), conveyor extension (145), and conveyor units (143) can be stopped after a delivery shipment the size of approximately all of the contents of the trailer (202) is moved onto the conveyor units (143). While the number and the design of conveyor units (143) required can be specified, other numbers of conveyor units (143) and variations in the design of those conveyor units (143) can appropriately be used without departing from the spirit of the invention. The cargo cages and single-item packages at the leading end of the delivery shipment can move across the conveyor units (143) closest to the trailer (202), and then back onto the ones farthest away from the trailer (202), until they hit up against the cargo stop walls at the back end of the conveyor units (143) farthest away from the trailer (202).

The CDC workers can look at the delivery shipment label plate on one of the first cargo cages at the lead end of the delivery shipment to confirm that the delivery shipment unloaded is for the current CDC 1190-1. They can then work their way back looking for another delivery shipment label plate on the other cargo cages to determine where the current CDC's 1190-1 delivery shipment ends and another CDC's 1190-1 delivery shipment begins. If the contents of the trailer (202) contains more than one delivery shipment, the workers can see a delivery shipment label plate with a different CDC Id listed on it, marking the cut off point between two different delivery shipments. If the CDC workers do find a second delivery shipment label plate, they can switch the trailer conveyor (204), the conveyor extension (145), and the conveyor units (143) in the loading direction to move the cargo cages and single-item packages of the second delivery shipment back onto the trailer conveyor (204). If necessary, the appropriate sections of the coordinated system of conveyors—trailer conveyor (204), CDC receiving dock conveyor extension (145), and mobile putaway conveyor units (143)—can be controlled separately from each other in a coordinated manner to move cargo cages and single-item packages back onto the trailer (202). Once the delivery shipment for the current CDC 1190-1 has been unloaded onto the conveyor units (143) and any parts of other delivery shipments, which may have been partially unloaded, have been reloaded back onto the trailer conveyor (204), the different components of the coordinated system of conveyors can be switched off. A CDC worker can, for example, manually move the conveyor extension (145) into the vertical non-loading position, close the trailer door, and close the CDC delivery dock door (144).

The driver of the tractor-trailer can give one of the CDC workers the Delivery Shipments Report for the current CDC 1190-1. In one embodiment, the CDC worker can connect a hands-free barcode scanning device to a workstation running the current CDC's 1190-1 instance of the ePD SBU Application. The worker can, for example, initiate a Loading Guide Report Program (354) to run on the workstation and use the hands-free barcode scanning device to scan their employee id card and the report barcode underneath the current CDC 1190-1 on the Delivery Shipments Report to accept the delivery shipment. The Loading Guide Report Program (354) can read the report barcode and parse the information it contains according to its standard format. The barcode on the Delivery Shipments Report can contain the Delivery Shipment Id, the Temperature Code, and the number of packages in the delivery shipment of each Package Size.

The number of packages of each size can be listed in the barcode, in increasing Package Size sequence, using a standard number of digits per Package Size. Due to the nature of how packages can be transported, packages received in the same delivery shipment can have the same Temperature Code. Packages having a Temperature Code value such as "refrigerated" or "freezer" can arrive in temperature-controlled vehicles that can maintain the temperature conditions required by each of those types of packages, while packages having a Temperature Code value such as "standard" can arrive in non-temperature controlled tractor-trailers. The Loading Guide Report Program (354) can search the Bin Inventory table 1300 for the count of records of each Bin Size having the Temperature Code of the delivery shipment and a Status such as "available", and can compare that count of available bins against the package counts of each corresponding Package Size from the Delivery Shipments Report barcode to create a Loading Guide Report. The Loading Guide Report Program (354) can read a High-Availability Bins data view 1307 before searching the Bin Inventory table 1300, so that it can search the Bin Inventory table 1300 for SBU's having a large number of available bins, first, before searching for other SBU's having less availability. Both data sets (SBU Id's with high availability and other SBU Id's) can be selected in SBU Id sequence. The ePD SBU Application can maintain the High-Availability Bins data view 1307 dynamically as the underlying Bin Inventory table 1300 is updated. The High-Availability Bins data view 1307 can list, for example, the SBU Id, Temperature Code, and Available Quantity of bins for SBU's which have a quantity of available bins greater than a target number considered to indicate high availability (such as more than 50% of its bins are available). The setting for the number or percentage of bins available to be considered as indicating a high availability can be configurable and can be set differently at each CDC 1190-1. As the Loading Guide Report Program (354) creates the Loading Guide Report, it can save the listing of SBU Id's needed to accept the packages of the smallest Package Size. In searching for SBU Id's to accept packages of each increasing Package Size, the Loading Guide Report Program (354) can search the saved list of SBU Id's first, before searching selected SBU Id's with high bin availability, and then searching other SBU Id's. SBU Id's can be added to the list being saved for the report, during the search for bins of each Package Size, if the search for that Package Size is not satisfied by the existing saved list. The program (354) can print the Loading Guide Report as the final saved list of SBU Id's, in SBU Id sequence, once the program (354) has finished its search for all Package Sizes of the delivery shipment. The Loading Guide Report can list, for example, the total quantity of available bins of each Bin Size for each SBU Id that it lists.

In addition to printing the Loading Guide Report, the Loading Guide Report Program (354), can for example, open a remote dial-up connection with the RDC server, of the destination RDC 1180-1 serving the current CDC 1190-1, and update the Delivery Shipment table 1238 of the ePD Delivery Application. The following updates can be made to the Delivery Shipment record 1238 having the Delivery Shipment Id of the scanned report barcode: Status can be set to a value such as "received"; Delivery Shipment Arrival Date/Time can be set to the current date/time; and CDC Employee Id can be set to the value of the scanned employee id card. The update to the Status of the Delivery Shipment record 1238 by the ePD SBU Application can trigger, or cause to be triggered, the ePD Delivery Application, which can be running on the RDC server, to automatically update the Status to a value such as "in CDC" on all Package table records 1234 having a Delivery Shipment Id equal to the value in the updated Delivery Shipment record 1238. As the ePD Delivery Application updates the Status on each Package record 1234, it can also update the Order Detail records 1202 that contain that Package Id, setting their Status to a value such as "in CDC".

After scanning the barcode on the Delivery Shipments Report, the CDC worker can hand the report back to the driver and the driver can depart for the next CDC 1190-1 listed on the report. CDC workers can disconnect the power cables between the mobile putaway conveyor units (143), unlock the wheels of the conveyor units (143), and move the conveyor units (143) into a holding cage (134) designated to the shipping organization for which they work. With reference to FIG. 6, a holding cage (134) can be an area within the backroom area (154) of a CDC 1190-1, which can be secured by a fence-like structure, which can have a lockable door. The CDC workers can lock the holding cage (134) and travel to the next CDC 1190-1 listed on the Delivery Shipments Report to meet the tractor-trailer driver. The CDC workers can continue to unload the trailer (202) until it becomes empty or contains only delivery shipments for LDDH's 1192-1. When the workers get finished unloading the trailer's (202) last CDC delivery shipment, the CDC workers can begin to load the packages of the delivery shipment into SBU's in whichever CDC 1190-1 they are currently in. After disconnecting the power cables and unlocking the wheels of the conveyor units (143), the CDC workers can begin to move the conveyor units (143) throughout the CDC 1190-1 to load the packages of the delivery shipment into SmartBin Units (SBU's) (158), as illustrated in step 1144. The workers can then travel back to the other CDC's 1190-1 in which they received a delivery shipment to load the packages of the delivery shipments, which they had previously placed into the holding cages (134). In one embodiment, multiple shippers can deliver to the same CDC's 1190-1, and different holding cages (134) can correspond to different shippers and can have security to restrict access to only workers of that shipper. In another embodiment, an entire CDC 1190-1 can be run by one shipper and mobile putaway conveyor units (143) can be left in the back room area (154) of the CDC 1190-1, eliminating the need for holding cages (134). In either embodiment, the entire back room area (154) of a CDC 1190-1 can be secured to allow access to shipper workers only.

After a driver unloads all of their delivery shipments, the driver can leave for a retailer site or can load up CDC reverse shipments and/or recycled materials depending upon their next scheduled run. At this point in the ePD Delivery Process, the packages of a delivery shipment have been delivered in bulk and received into a CDC location 1190-1 as illustrated in step 1142. The bulk delivered packages of the delivery shipment can later be retrieved by many different recipients, in step 1150.

Following step 1142, the packages can be loaded into the SBU's (158) as illustrated in step 1144 of FIG. 1. After the CDC workers unload the last delivery shipment from a trailer into a CDC 1190-1, they can use the Loading Guide Report to guide them as they move mobile putaway conveyor units (143) from the CDC back room area (154) or holding cage (134) through the main room delivery entrance door (146), into the CDC's main aisle (170), cross aisles (162), and side aisles (160) to the SBU's (158) listed on the report. To load the bulk delivered packages into a SBU (158), a CDC worker can connect, for example, a hands-free scanning device into a SBU's scanner port (242) and can scan, for example, their employee id card to activate the Loading Program (356) of the ePD SBU Application. The Loading Program (356) can determine which revolving master bin is closest to the loading position and has at least one available bin, so that it can move that bin into the loading position. To select the closest bin with a Status value such as "available", the Loading Program (356) can select the record from the SBU Settings table 1314 having the SBU Id of the current SBU (158). With reference to FIG. 10D, the Loading Program (356) can use, for example, the value in the Load Position Master Bin Id field of the selected SBU Settings record 1314, to select all the Master Bin After Movement values for that master bin from a Master Bin by Movement table 1316. The Loading Program (356) can use each selected Master Bin After Movement value, in the sequence the fields can be listed on the Master Bin by Movement table 1316 (which can be sequenced by the lowest absolute value of a movement), to search the Bin Inventory table 1300 for the first record having, for example, the current SBU Id, a Status value such as "available", and a Master Bin Id value matching the selected Master Bin After Movement value. The first Bin Inventory record 1300 it finds meeting that criteria can contain the closest available bin. Once the Master Bin Id of the closest available bin is determined, the Loading Program (356) can call or cause to be called, a Bin Positioning Program (372) to determine the movement needed to position the selected master bin into the loading position. The Loading Program (356) can pass the Load Position Master Bin Id value for the current SBU (158) and the Master Bin Id value of the selected master bin (the one for the closest available bin) to the Bin Positioning Program (372) as inputs. The Bin Positioning Program (372) can use the input values to search a Bin Movement table 1315 for the movement required to move the selected master bin into the loading position. The Loading Program (356) can send a motor command to the SBU motor to move the revolving bins by the movement value returned from the Bin Positioning Program (372). Upon receiving the motor command, the SBU motor can move the revolving bins to position the selected master bin into the loading position.

The Loading Program (356) can read a Door Configuration Code value from the SBU Settings record 1314 it had selected for the current SBU (158) and can determine the bin door configuration commands needed to move the bin door configuration bolts to consolidate all the revolving bin doors (234) to form one solid bin door across the entire revolving master bin. The Loading Program (356) can send the needed bin door configuration commands to the bin door configuration mechanisms on the revolving bin doors, and the bin door configuration bolts can be moved accordingly. In referring to sending a bin door configuration command to a bin door configuration mechanism in this disclosure, a program can be sending the command directly to the bin door configuration mechanism through a local area network connecting each SBU (158) to the CDC processing server or it can actually be sending the command to a bin door configuration bolt controller, which in turn, can interpret the command and initiate the action through a wired connection to the bin door configuration mechanism. If a bin door configuration bolt controller is used, it can be centralized to control all the bin door configuration mechanisms in a CDC 1190-1 or specific to a single SBU (158) or a group of SBU's (158). The program (356) can update the values on the SBU Settings record 1314 of the current SBU (158) to reflect the bin movement and the bin door configuration bolt movement. The program (356) can send an unlock command to the bin door locking mechanism of each revolving bin door to unlock all of the revolving bin doors (234). In referring to sending an unlock command to a bin door locking mechanism in this disclosure, a program can be sending the command directly to the bin door locking mechanism through a local area network connecting each SBU (158) to the CDC processing server or it can actually be sending the command to a lock controller, which in turn, can interpret the command and initiate the action through a wired connection to the bin door locking mechanism. If a lock controller is used, it can be centralized to control all the bin door locking mechanisms in a CDC 1190-1 or specific to a single SBU (158) or a group of SBU's (158). The program (356) can also send, for example, a display command to display the Master Bin Id and Configuration Codes of the master bin in the loading position, on the SBU display screen (246). The Loading Program (356) can also check the Status of the Bin Inventory records 1300 for the current SBU's (158) stationary bins to determine if one or more of them have a Status such as "available". The Loading Program (356) can send an unlock command to the bin door locking mechanism of one or more of the stationary bin doors, as needed, to unlock the bin doors (238) corresponding to available stationary bins.

A CDC worker can open consolidated revolving bin doors (234), lift them up against the front panel (230) of the SBU (158), and use a configuration key to lock them into the open position—fully open, against the SBU (158), above the bin door openings of the revolving bins. The worker can pick a bulk delivered multi-item package from one of the cargo cages on the mobile putaway conveyor unit (143), scan the barcode on its package label, and place it into the left-most available bin with the package tie handle facing out or to one side of the bin. The worker can then scan the bin door label barcode located on the inside of the bin door (234) of the bin in which the bulk delivered multi-item package was loaded. In one embodiment, if a bin is configured to span across more than one revolving bin door (234), the bin door label on the left-most bin door (234) corresponding to the bin must be scanned. The Loading Program (356) can, for example, sound an error tone and/or display an error message, if a bin door label other than the left-most one of an available bin gets scanned, or if a bin door label of a bin that already contains a package gets scanned, or if two package labels get scanned consecutively, or if two bin door labels get scanned consecutively. When a loading error occurs, the program (356) can also clear its memory of a Package Id that may have been scanned in the transaction prior to the error. If the bulk delivered package gets loaded successfully when a package label and then a bin door label are scanned, the Loading Program (356) can for example, sound a confirmation tone and/or display a message on the SBU's display screen (246), confirming that the package was loaded successfully.

As each bulk delivered package gets loaded into a SBU bin, the Loading Program (356) can update the Bin Inventory 1300 and Bin Reservation tables 1302 of the SBU Application, and can create a new record on a Notification Check table 1310 of the SBU Application. The Loading Program (356) can read, for example, a Customer Id, embedded in the Package Id on the scanned package label, and can use it to select the Customer table record 1256 corresponding to the bulk delivered multi-item package. The Loading Program (356) can use the Employee Id on the scanned employee id card to select the ePD Shipper Id from the Employee table 1308. The Loading Program (356) can read the SBU Id and a Bin Door Identifier, in the barcode on the scanned bin door label, and can use that SBU Id to search the SBU Settings table 1314 to determine which master bin is in the loading position. The Loading Program (356) can then select the Bin Inventory record 1300 of the bin in which the bulk delivered multi-item package was loaded, by selecting the Bin Inventory record 1300 having the SBU Id of the scanned bin door label, a Master Bin Id equal to the value of the Load Position Master Bin Id field on the SBU Settings record 1314 having that SBU Id, and a Configuration Code that contains the Bin Door identifier of the scanned bin door label. The Loading Program (356) can update the selected Bin Inventory record 1300, for example: Package Id can be set to the value of the barcode scanned on the package label; Customer Id can be set to the Customer Id value embedded in the Package Id; PIN can be set to the value on the selected Customer record 1256; Status can be set to a value such as "loaded"; Delivery Employee Id can be set to the value scanned from the barcode on the employee id card; ePD Shipper Id can be set to value from the selected Employee record 1308; and Delivery Date/Time can be set to the current date/time. The Loading Program (356) can select, for example, the Bin Reservation record 1302 having the Bin Size, Temperature Code, and ePD Shipper Id of the Bin Inventory record 1300 which it just updated and a Status such as "new", and can decrement its Quantity by one. If more than one Bin Reservation record 1302 gets selected using Bin Size, Temperature Code, and ePD Shipper Id, the Loading Program (356) can update the one with the earliest Reservation Date/Time. When the Quantity of a Bin Reservation record 1302 reaches zero, the Loading Program (356) can set its Status to a value such as "filled". The Loading Program (356) can also create a new record on the Notification Check table 1310 by writing the Customer Id that was embedded in the Package Id on the new record 1310.

If there is another available bin in the master bin in the loading position, after a bulk delivered multi-item package gets loaded, the worker is able to load another bulk delivered multi-item package using the same steps just described. When all the bins in the current master bin are filled after a bulk delivered multi-item package is loaded, the Loading Program (356) can move the revolving bin structure to position the closest remaining master bin, having at least one available bin, into the loading position. The Loading Program (356) can, for example, repeat the processing performed to move the first closest available bin into the loading position, when determining the movement needed to position the closest remaining available bin into the loading position. In one embodiment, the program commands are not issued to move bin door configuration bolts or unlock revolving bin doors as the Loading Program (356) subsequently positions each master bin into the loading position, because the revolving bin doors (234) can already be locked into the open position. The worker can continue to load bulk delivered multi-item packages into available bins in this manner until the SBU (158) no longer has any available revolving bins.

Workers can also load bulk delivered single-item packages into a SBU's (158) stationary bins by placing the bulk delivered single-item package in the stationary bin, scanning its package label, and scanning the bin door label of the bin. In one embodiment, stationary bin doors (238) are not locked into or out of a loading position using a configuration key. When loading bulk delivered single-item packages into a stationary bin, a worker can hold the stationary bin doors (238) open while placing the package into the stationary bin. Unlike the loading of bulk delivered multi-item packages into revolving bins, the Loading Program (356) does not confirm the bulk delivered single-item package as being successfully loaded into a stationary bin until its stationary bin door (238) gets pushed closed to lock the stationary bin. After the program makes the updates to the Bin Inventory 1300 and Bin Reservation 1302 records and creates the new Notification Check record 1310 for the bulk delivered single-item package (in the same manner as described for updating/creating records when multi-item packages are loaded into revolving bins), it can display a message to prompt the worker to close the bin door, and it can check the state of the bin door sensor (of the bin in which the bulk delivered single-item package was loaded) to determine if the bin door has been closed. The Loading Program (356) can, for example, sound an error tone and display an error message if any scanning action is done before the bin door of the stationary bin into which the bulk delivered single-item package was loaded, has been closed. When that bin door (238) gets closed, the Loading Program (356) can, for example, sound a confirmation tone and display a confirmation message on the SBU display screen (246). Other audio, or visual alerts may be utilized. A worker is not required to close the bin doors (238) of a stationary bin, unless a package has been loaded into that stationary bin. A stationary bin can be allowed to remain empty as the program (356) ends.

When the Loading Program (356) unlocks bin doors (234 or 238) at its start, the bin doors (234 or 238) can be pushed out to rest upon locking mechanisms, and the locking mechanisms can be set back into a locked position. The SBU bin door lock (for both revolving bins and stationary bins) can consist of, for example, three components: a two-pronged bin door locking mechanism which can extend from the SBU frame, a catch slot in the bin door (234 or 238) into which the bin door locking mechanism can fit to form the lock, and a spring-loaded bin door sensor which can extend outward from the SBU frame in its natural state when it is not compressed. In one embodiment, the SBU bin door locks may only be capable of performing a minimal amount of functions: unlocking and detecting if a bin door (234 or 238) is closed. In this embodiment, a closed bin door can always be a locked bin door, and the lock movements which can be triggered by programs of the ePD SBU Application do not actually perform the locking function. A person applying pressure to the bin door (234 or 238) to close it can be the action that locks a bin door (234 or 238). It should be noted while the embodiment of the locking mechanism described can contain the specified components, other combination of components can be possible without departing from the spirit of the invention.

When a SBU bin door (234 or 238) gets closed and locked, the prongs of the locking mechanism can fit inside the bin door catch slot and the heads of each prong can extend around the side edges of the catch slot hooking it into a locked position. The spring action of the bin door sensor can be constantly trying to extend outward into its natural uncompressed position. Because the bin door sensor can be situated between the bin door (234 or 238) and the SBU frame, when the bin door sensor moves from a compressed state into its natural uncompressed state, it can push the bin door (234 or 238) away from the SBU frame. The bin door locking mechanism prongs, when hooked around the side edges of the catch slot, can prevent the bin door sensor from extending into an uncompressed state, as they hold the bin door (234 or 238) into place against the SBU frame, forcing the bin door sensor to be compressed. When the bin door lock receives an unlock command from the CDC server, it can contract the two prongs of the locking mechanism toward each other, into an unlocked position, where the prong heads can be completely within the catch slot, no longer extending beyond the catch slot's side edges. Since the prongs no longer remain in position to secure the bin door (234 or 238), the spring action of the bin door sensor can then extend away from the SBU frame pushing the bin door (234 or 238) away from the SBU frame and beyond the front end of the prong heads. When the unlock command has finished contracting the prongs, the prongs can be released back into the locked position. Even though the prongs can be in the locked position, however, the bin door (234 or 238) can be unlocked because it can already have been pushed out beyond the front edge of the prong heads and can be resting in an unclosed position against the prongs and the bin door sensor. When a person applies pressure to push the bin door (234 or 238) closed, the catch slot of the bin door can push against the angled front edges of the prong heads, forcing them to contract in toward each other until they are narrow enough to fit inside the side edges of the catch slot. As the bin door (234 or 238) continues to move toward the SBU frame and the prong heads have passed completely inside the catch slot, the prong heads can extend outward to their normal position hooking around the inside edges of the catch slot in the locked position. The bin door sensor can become compressed as the bin door (234 or 238) is closed and can register a closed status once the bin door (234 or 238) is flat against the SBU frame.

When there are no available revolving or stationary bins remaining in a SBU (158), the Loading Program (356) can, for example, sound a message alert tone and display a message requesting the worker to close the revolving bin doors (234). The action of closing the revolving bin doors (234) of a SBU (158) while the Loading Program (356) is running for that SBU (158), can end the Loading Program (356) for that SBU (158). A CDC worker can use a configuration key to unlock the revolving bin doors (234) from the open position, and the revolving bin doors (234) can fall against their corresponding bin door locking mechanisms. The worker can push the revolving bin doors (234) firmly against their locking mechanisms until they get locked into place. As the Loading Program (356) determines that all the revolving bin door sensors are in the closed position, it can, for example, sound a confirmation tone, display a confirmation message that the program has ended successfully, and end. A worker can then disconnect their hands-free scanning device or other suitable scanning device from the SBU scanner port (242) and can proceed on to the next SBU (158) listed on the Loading Guide Report. If the worker did not close all of the revolving bin doors to end the program (356) successfully, the Loading Program (356) can, for example, sound an error tone and display an error message, indicating that one of the revolving bin doors (234) has not been closed properly. In one embodiment, this validation step can occur when that worker tries to scan their employee id card to log into another SBU (158). In another embodiment, a worker can scan a SBU Id barcode on a label affixed to the exterior of a SBU to switch from loading one SBU to another instead of scanning an employee id card, and the Loading Program (356) can perform the validation step to ensure that all the revolving bin doors (234) of a SBU (158) have been closed properly at the time the SBU Id barcode of another SBU (158) is scanned. CDC workers do not have to be restricted to loading bulk delivered packages into SBU bins in any particular order. Although a Loading Guide Report can be used as a guide to make the package loading process more efficient by pointing workers toward the SBU's (158) with the most available bins, CDC workers can load packages into any available SBU bin, whether or not it is listed on a Loading Guide Report.

SBU's (158) can be loaded in the same manner regardless of where they can be located in a CDC 1190-1. Some SBU's (168 and 188 respectively) can be located in refrigerated or freezing temperature controlled areas within the CDC 1190-1. Others can be located outside the air-conditioned space of a CDC facility 1190-1, for example, on trailers or under covered areas in a CDC's parking lot. The practice of using SBU's (158) outside of a CDC 1190-1 in a temporary fashion can be employed to provide additional bin capacity to accommodate extremely high seasonal volumes of packages delivered in bulk.

After the team of CDC workers finishes loading all the bulk delivered packages of a delivery shipment in one CDC 1190-1, the team can travel to another CDC 1190-1 where a delivery shipment was received, to load the packages of that delivery shipment. Optionally, a program can be used to create an exception report that can compare the Package Id's having a particular Delivery Shipment Id (the bulk delivered packages in a particular delivery shipment) against the Package Id's on the Bin Inventory table 1300 of the CDC 1190-1 having the CDC Id embedded within that Delivery Shipment Id (the bulk delivered packages that have been loaded into bins at the CDC 1190-1 where that delivery shipment was delivered). This exception report can be created at either the CDC 1190-1 by a CDC worker before leaving for another CDC 11901 or by a RDC worker at the destination RDC 1180-1 from which the delivery shipment was sent. The exception report can be used to help ensure that the bulk delivered packages of a delivery shipment are accounted for and to identify and investigate packages that are shipped from a destination RDC 1180-1 but not loaded into a SBU (158).

Following the loading of bulk delivered packages into SBU's (158) as described in step 1144, notification contacts can be made according to step 1148. Recipients can receive electronic notification messages to alert them that bulk delivered packages have been delivered to a CDC 1190-1 for them. The electronic notification can be an automated message delivered by a telephone call, e-mail, facsimile machine, or an alphanumeric pager. Several programs and tables can be employed by the ePD Delivery Process to provide flexibility in the method and timing of sending electronic notification messages to recipients to alert or remind them that they have one or more bulk delivered packages ready to be picked up from a CDC 1190-1. Recipients can be given a great number of choices in how and when they wish to be contacted by an ePD shipper for bulk delivered package delivery notification. At a minimum, a recipient (which may or may not be the customer who ordered the items of the bulk delivered package) can be required to provide at least one phone number or e-mail address as their primary contact. A recipient can also provide secondary contact information and can choose to be contacted by both the primary and secondary contacts each time, or to be contacted using the secondary contact only when the primary contact fails. For each contact that a recipient provides to an ePD shipper, the recipient can specify the type of contact (for example, a value such as "phone" for telephone, facsimile, or an alpha-numeric pager reached via a telephone number or a value such as "e-mail" for e-mail or an alpha-numeric pager reached via an internet address), the contact phone number or e-mail address, the frequency of which the recipient wishes to receive reminder messages after the initial notification message (which can be measured for example, in the number of hours between reminder messages), and if the contact type is a value such as "phone", the recipient can specify a calling window start time and end time. A recipient's notification preference information can be stored on their Customer record 1256, and can be updated through an interface connected to the ePD Billing & Maintenance application, for example, a web-page-based interface accessible by customers and recipients.

A New Package Notification Program (358) can run as a service on a CDC's 1190-1 processing server or a remote server, to set up the information needed to trigger an electronic notification to a recipient. The New Package Notification Program (358) can work with the Notification Check 1310 and Customer 1256 tables to create new and update existing records on a Notification Queue table 1311. Records on a Notification Queue table 1311 can be used later by a Notification Program (360) to initiate an electronic notification to notify or remind a recipient to pick up at least one bulk delivered package at a CDC 1190-1. The New Package Notification Program (358) can continually monitor and read the Notification Check table 1310 to find the Customer Id on records that were written as bulk delivered packages were loaded into SBU's (158). One Notification Check record 1310 can be created for each bulk delivered package that was loaded into a SBU (158) at a CDC 1190-1. As the New Package Notification Program (358) reads each Customer Id on the Notification Check table 1310, it can search the Notification Queue table 1311 for a record having that Customer Id, to determine whether the recipient already has a record on the Notification Queue table 1311 or whether a new record should be added to the table for him. A recipient can already be on the Notification Queue table 1311 if the recipient was added for a different bulk delivered package that the recipient has not yet picked up. In one embodiment, a recipient may only have one Notification Queue record 1311 for a CDC 1190-1 at one time, and that record 1311 can remain until that recipient has unloaded all of their bulk delivered packages from the SBU's (158) of that CDC 1190-1. If a recipient already has a record on the Notification Queue table 1311 , the program (358) can update the recipient's existing record 1311, for example, by incrementing the Total Number of Packages field by one and setting the New Indicator field to a value such as "yes". If the recipient does not already have a record on the Notification Queue table 1311, the New Package Notification Program (358) can use the Customer Id to select information from that recipient's record on the Customer table 1256, and create a new record for the recipient on the Notification Queue table 1311.

The new record can be created on the Notification Queue table 1311 for the recipient, for example: the Customer Id can be set to the value on the current Notification Check record 1310; Record Date/Time can be set to the current date/time; Total Number of Packages can be set to "1"; New Indicator can be set to a value such as "Yes"; First Notification Date/Time, Last Primary Contact Date/Time, Last Secondary Contact Date/Time, and Next Contact Date/Time can have no value (depending upon the database management system a date/time field having no value can actually have a null value or an initialized date/time value); Number of Primary Attempts and Number of Secondary Attempts can be set to "0"; Next Primary Contact Date/Time and Next Secondary Contact Date/Time can have no value or can be set to the value of the Primary Calling Window Start Time and the value of the Secondary Calling Window Start Time (both from the Customer record 1256) respectively, depending upon the current time. If the current time precedes, for example, the value of the Primary (or Secondary) Calling Window Start Time field on the selected Customer record 1256, the value of the Next Primary (or Secondary) Contact Date/Time field on the Notification Queue record 1311 can be set to a date/time value consisting of the current date and the time of the Primary (or Secondary) Calling Window Start Time. If the current time is later than the Primary (or Secondary) Calling Window End Time field on the selected Customer record 1256, the value of the Next Primary (or Secondary) Contact Date/Time can be set to a date/time value consisting of the following date and the time of the Primary (or Secondary) Calling Window Start Time. If the current time is between the Primary (or Secondary) Calling Window Start Time and the Primary (or Secondary) Calling Window End Time, or if the primary (or secondary) contact does not have a calling window defined, the Next Primary (or Secondary) Contact Date/Time can have no value. Whether the New Package Notification Program (358) updates an existing Notification Queue record 1311 or creates a new one when processing a Notification Check record 1310, it can delete the Notification Check record 1310 as part of its processing. The program (358) can continue to read Notification Check records 1310 and perform the processing as previously described until there are no remaining records on the Notification Check table 1310. After it has processed and deleted all the records on the Notification Check table 1310, the New Package Notification Program (358) can monitor the Notification Check table 1310 for new records to process. The New Package Notification Program (358) can be configured to monitor the Notification Check table 1310 at predetermined intervals of time.

The Notification Program (360) is another program, which can run continuously on the CDC server or on a remote server as a service. It can read the Notification Queue table 1311 and can, for example, compare the Next Contact Date/Time field of each record against the current date/time. If the Next Contact Date/Time has no value or a value prior to the current date/time, the Notification Program (360) can attempt to send an electronic notification to the recipient using the primary and/or secondary contact information. If the Next Contact Date/Time is later than the current date/time, the Notification Program (360) can skip the record and evaluate the next one. When the Notification Program (360) finishes reading the last Notification Queue record 1311 listed on the table, it can return to the first record on the table and repeat its processing to evaluate the remaining records on the table. If the Notification Program (360) is able to skip all the records listed on the Notification Queue table 1311 when making a full pass through the table to evaluate the records, it can begin another pass through the table to evaluate the records again, after optionally pausing for a predetermined amount of time. The length of time the Notification Program (360) pauses, if it pauses at all can depend upon how it is configured.

If the Notification Program (360) determines that an electronic notification should be sent to the recipient on a Notification Queue 1311 record, it can compare the Next Primary Contact Date/Time to the current date/time. If the Next Primary Contact Date/Time has no value or a value prior to the current date/time, the program (360) can use, for example, the value of the Customer Id field to select the Customer record 1256 of the recipient for which the notification is being sent, and can then use the data on the Notification Queue 1311 record and the selected Customer record 1256 to compile the input data needed to run either an Auto-call Program (362) or an Auto-e-mail Program (364). Before compiling the input data, the Notification Program (360) can evaluate the values of the Primary Contact Frequency field on the selected Customer record 1256 and the Last Primary Contact Date/Time on the Notification Queue record 1311. If the value of Primary Contact Frequency is zero and the Last Primary Contact Date/Time field has a value, the Notification Program (360) can skip the remaining processing steps involved in sending a notification message to the primary contact, and can evaluate the value of the Dual Notification Indicator on the Customer record 1256 to determine if it should compare the Next Secondary Contact Date/Time against the current date/time or begin processing the next Notification Queue record 1311. Recipients that specify that they do not wish to receive reminder notification messages after the first primary or secondary contact is made, can have a value of zero in the Primary (or Secondary) Contact Frequency field on their Customer records 1256.

If the value of the Primary Contact Frequency is not zero or if the Last Primary Contact Date/Time field has no value, the Notification Program (360) can calculate one input data value—the number of days since the first notification—by subtracting the First Notification Date/Time on the current Notification Queue record 1311 from the current date/time and rounding down to the number of whole days. The program can compile other input data values by selecting, for example, the Primary Contact Number/Address value from the Customer record 1256, the First Notification Date/Time, Total Number of Packages, and New Indicator values from the Notification Queue record 1311, the current date/time, and the value of the current CDC's 1190-1 address. The value of the current CDC's 1190-1 address can be pre-configured for the instance of the program (360) running on the current CDC's 1190-1 server. If the value of Primary Contact Type on the selected Customer record 1256 is a value such as "phone", the Notification Program (360) can initiate the Auto-call Program (362) and pass it the compiled input data values. The Auto-call Program (362) can use the Primary Contact Number/Address value to dial the recipient's phone number and play a pre-recorded message to notify or remind the recipient that there is at least one bulk delivered package at the CDC 1190-1, ready to be picked up. The pre-recorded message can include at least the value of the current CDC's 1190-1 address (the values in the Address 1 and Address 2 fields of the current CDC's 1190-1 record on the CDC table 1252), and can also include, but is not limited to, the current date/time, the value of the Total Number of Packages, an indication of whether or not a bulk delivered package has been delivered since the last notification message (determined from the New Indicator value), the number of days since the first notification (calculated as previously described), the First Notification Date/Time, general shipper policy information (including early pickup incentive discounts and late pickup penalties), contact information to submit questions, and other general information.

After the Notification Program (360) calls the Auto-call Program (362), it can increment the value of the Number of Primary Attempts by one on the Notification Queue record 1311 and wait for the Auto-call Program (362) to finish its processing and return a confirmation output. If the Auto-call Program (362) returns an output indicating that an electronic notification message was sent successfully, the Notification Program (360) can update the Notification Queue record 1311, for example: if the First Notification Date/Time has no value, it can be set to the current date/time; Last Primary Contact Date/Time can be set to the current date/time; Next Primary Contact Date/Time can be set to the current date/time plus the number of hours in the Primary Contact Frequency on the Customer record 1256 (adjusted to the next earliest Primary Calling Window Start Time if the calculated value does not fall between the Primary Calling Window Start Time and the Primary Calling Window End Time); Number of Primary Attempts can be set to zero; and if the value of the Dual Notification Indicator on the selected Customer record 1256 is a value such as "no", the Next Contact Date/Time can be set to the same value as the Next Primary Contact Date/Time field. The updates which can be made to the Notification Queue 1311 record by the Notification Program (360) can reset the record to trigger the sending of another electronic notification message to the Primary Contact Number/Address after the Primary Contact Frequency interval elapses.

In addition to updating the other fields on the Notification Queue record 1311 after receiving a successful confirmation output, the program (360) can evaluate the value of New Indicator field on the Notification Queue record 1311. If it is set to a value such as "yes", the program (360) can reset it to a value such as "no" and select records from the Bin Inventory table 1300 having a Status value such as "loaded" and a Customer Id equal to the value on the Notification Queue record 1311. The program (360) can update each selected Bin Inventory record 1300, for example, setting the Status to a value such as "notified" and Notification Date/Time to the value of the Last Primary Contact Date/Time. The program (360) can also create, for example, a new record in a Notification Update data file for each Bin Inventory record 1300 it updates, writing the Package Id and Notification Date/Time from the updated Bin Inventory record 1300 to the data file. If the New Indicator field being evaluated has a value such as "no", the program (360) can continue with its next processing step.

After updating the Notification Queue table 1311, Bin Inventory table 1300, and Notification Update data file records following the receipt of a successful confirmation output for a primary contact, the value of the Dual Notification Indicator on the selected Customer record 1256 can be evaluated. If the Dual Notification Indicator field has a value such as "no", the program (360) can proceed to process the next Notification Queue record 1311. If it has a value such as "yes" the Notification Program (360) can follow processing steps that can be similar to those described for sending an electronic notification message to the primary contact, except that the secondary contact information can be read and updated. One exception to secondary contact processing steps using secondary contact information can be that after a successful confirmation output is received by the Notification Program (360) for a secondary contact, the Notification Program (360) can update the Next Contact Date/Time to the same value as the Next Primary Contact Date/Time field, instead of the value of the Next Secondary Contact Date/Time field. In addition to when the Dual Notification Indicator for a recipient has a value such as "yes", there can be other situations in which the Notification Program (360) can use secondary contact information to send an electronic notification message. Those situations can include, but are not limited to: a situation where the Next Contact Date/Time and the Next Secondary Contact Date/Time are prior to the current date/time, but the Next Primary Contact Date/Time is later than the current date/time; and a situation where the output return received from the Auto-call Program (362) indicates that the primary contact attempt was unsuccessful.

If both the primary and secondary contact attempts are unsuccessful, the Notification Program (360) can proceed to process the next record listed on the Notification Queue table 1311. The Notification Program (360) can attempt to process the unsuccessful record 1311 again on each successive pass it makes through the Notification Queue table 1311, until the record 1311 gets updated as successful or the Number of Primary Attempts and Number of Secondary Attempts on the record 1311 reach a predefined limit. Once the predefined limits in the number of attempts fields are reached, the Notification Program (360) can reset the values in both number of attempts fields to zero and can reset the Next Contact Date/Time to a future date/time, which can be a predefined time interval ahead of the current date/time.

The Notification Program (360) can process primary and secondary contacts having a Primary (or Secondary) Contact Type value such as "e-mail" using the same processing steps as described for sending an electronic notification message for a contact having a Primary (or Secondary) Contact Type value such as "phone", except that it can initiate the Auto-e-mail Program (364) instead of the Auto-call Program (362) and it does not need to wait for a confirmation output return from the Auto-e-mail Program (364) before continuing its processing. The Notification Program (360) can assume notification e-mail messages to be sent successfully, and can update the Notification Queue table 1311, Bin Inventory table 1300, and Notification Update data file records in the same way as it would after receiving a successful confirmation output from the Auto-call Program (362), immediately after it initiates the Auto-e-mail Program (364). The Auto-e-mail Program (364) can use the Primary (or Secondary) Contact Number/Address to send an e-mail message to the recipient. The same data input variables that can be passed to the Auto-call Program (362) can be passed to the Auto-e-mail Program (364) and the text of the prerecorded script used for the phone message can be the text of the e-mail message. The same updates can be made to the Notification Queue table 1311, Bin Inventory table 1300, and Notification Update data file records during processing. Although e-mail notification messages can be assumed to be sent successfully when transmitted, an E-mail Error Checking Program (366) can search the inbox of the internet account used by the Auto-e-mail Program (364) for returned e-mail error messages from unsuccessful e-mail transmissions. The E-mail Error Checking Program (366) can read the e-mail address reference in the returned e-mail error message, select the Customer table record 1256 containing that e-mail address value in either the Primary Contact Number/Address or Secondary Contact Number/Address, and create a record in a Notification Error data file containing the Customer Id, the e-mail address causing the error, and the Primary (or Secondary) Contact Number/Address that did not cause the error. The Notification Error data file can later be used to contact recipients to correct invalid e-mail addresses.

The ability for a customer and/or recipient to view the status and CDC location 1190-1 of items that have been ordered but have not yet picked up can be provided using, for example, a web-page-based interface, which can have read-only access to information on a shipper's RDC and/or CDC servers. In a one aspect of the invention, a customer or recipient can log into an Internet site specific to a shipper or one that is common across many ePD shippers to view delivery information including, but not limited to, the number of bulk delivered packages currently in a CDC 1190-1 for the recipient to retrieve, the SBU Id's of each SBU (158) containing a bulk delivered package for the recipient to retrieve, the elapsed time that each bulk delivered package has been in a CDC 1190-1 since notification of delivery was first made, the recipient's notification preferences, the customer or recipient's ePD Account Balance, and the Status of any CDC outbound package sent by the customer which has not yet been picked up by its package recipient.

In FIG. 6, there is depicted an exemplary Customer Distribution Center (CDC). The CDC of FIG. 6 can comprise the following entities: backroom aisle (132), holding cage (134), backroom video surveillance camera (136), package bag recycling chute (138), package bag recycling collection tank (140), package bag recycling machine (142), mobile putaway conveyor unit (143), CDC delivery dock door (144), CDC receiving dock conveyor extension (145), main room delivery entrance door (146), returns processing entry point (148), returns video surveillance camera (150), customer service video conferencing station (152), backroom area (154), returns conveyor (156), SmartBin Unit machine (158), outbound package processing workstation (159), side aisle (160), cross aisle (162), temperature controlled storage room door (164), temperature controlled storage room wall (166), temperature controlled SmartBin Unit machine (168), main aisle (170), entrance station/entrance station door (172), entrance station video surveillance camera (174), exterior entrance doors (176), inner entranceway area (177), exterior video surveillance camera (178), exit way video surveillance camera (180), exterior exit door (182), exit aisle (184), interior exit door (186), SmartBin Unit machine—frozen articles (188), returns processing workstation (189), interior video surveillance camera (190), and holding cage door (192).

A further embodiment of the invention can include one or more customer service video conferencing stations (152) located in a CDC 1190-1 that can be used by a recipient to contact a customer service worker specific to a shipper or one that supports more than one shipper. The recipient can ask questions or report a discrepancy involving a bulk delivered package, a CDC outbound package, or an item return package. The recipient can have the ability to see the customer service worker and their immediate surrounding area and the customer service worker can have the ability to see the recipient and the immediate surrounding area including any packages or nearby SBU's (158), outbound package processing workstations (159), or returns processing workstations (189). Customer service can be provided to recipients and customers across every CDC location 1190-1, 24 hours a day, seven days a week by a centralized group of customer service workers without incurring the cost of staffing one or more customer service representatives in every physical location. Another aspect can include various interior video surveillance cameras (190) and exterior video surveillance cameras (178), located at a CDC 1190-1, that can be monitored remotely by a security service or a shipper's in-house security personnel. Security personnel based in the local markets can be on call to respond as needed to situations, which may require the interaction of a security worker. Any improper actions can also be captured on video for later use in prosecuting a wrongdoer. Security services can be provided remotely to all CDC locations, 24 hours a day, seven days a week by a centralized security service working in conjunction with local on-call security response personnel without incurring the cost of staffing one or more security workers in every physical location.

Returning to the notification step 1148, the recipient can retrieve (or pick up) one or more bulk delivered packages as described in step 1150. After receiving one or more notification phone calls, e-mails, or text page messages, a recipient can travel to the CDC 1190-1 identified in the notification message (the same CDC 1190-1 which the customer selected as the destination centralized pickup location when the customer ordered the items from retailers) to pick-up their bulk delivered packages. For illustration, the recipient can chose to park in the CDC's 1190-1 parking lot, walk to the closest package cart keeper machine near their parking space, run their ePD customer access card through the package cart keeper's card reader, and press the release button to release a package cart from the package cart keeper machine. The recipient can push the cart through the parking lot and through the CDC's 1190-1 exterior entrance doors (176), which can automatically open for the recipient as the recipient approaches them. A sensor can be used to automatically open the doors (176) using technology similar to the technology commonly found on the automatic opening doors of supermarkets and other public places. The recipient can push their cart through the exterior entrance doors (176) and up to one of the entrance station doors (172) in the CDC's 1190-1 inner entranceway area (177).

There can be one or more entrance stations (172) located in the inner entranceway area (177) of a CDC 1190-1. Each one can consist of the following components: a card reader, a keypad, a tape printer, a display screen, and an electronic locking door. The components can be wired to the CDC server through networking cables to pass data from the card reader and keypad components to the CDC server and to pass commands and data from the CDC server to the display screen, tape printer, and electronic locking door components of the entrance station (172).

The recipient can run their ePD customer access card through the entrance station card reader and can key in their personal identification number (PIN) on the entrance station keypad. An ePD customer access card can have, for example, a magnetic data strip that contains at least the recipient's Customer Id and can optionally include other data used for security validation. The recipient's actions can initiate or cause to be initiated, an instance of a Package Location Report Program (368) to run on the CDC server. The Package Location Report Program (368) can validate the scanned card and entered PIN by using the Customer Id on the access card to select the Customer record 1256 and then comparing the entered PIN value against the PIN value on the selected Customer record 1256. If the entered PIN does not match, the Package Location Report Program (368) can, for example, sound an error tone and/or display an error message on the entrance station display screen to indicate that the entered PIN is not valid for the access card. Alternately, other audio and or visual alerts can be used. If the entered PIN matches, the Package Location Report Program (368) can search the Bin Inventory table 1300 for all the records that have a Customer Id equal to the one read from the access card. The Package Location Report Program (368) can generate and assign, for example, a Quick Code to all of the Bin Inventory records 1300 found for the recipient (having the Customer Id of the scanned access card). The Quick Code can serve as a temporary alias for a recipient's Customer Id and can be a random number, for example, four digits in length. In generating a random number for the Quick Code, the Package Location Report Program (368) can validate the generated random number against a Quick Code table 1313 to ensure that the number was not already assigned to another recipient. If the Package Location Report Program (368) finds the randomly generated number on the Quick Code table 1313 it can attempt to generate a different random number and check it against the Quick Code table 1313 to ensure that it has not already been assigned to a recipient. When the Package Location Report Program (368) generates a number that is not already listed on the Quick Code table 1313, it can write that number to the Quick Code table 1313 and to the Quick Code field of each Bin Inventory record 1300 it selected for that recipient. Recording assigned Quick Code numbers to the Quick Code table 1313 can ensure that no two recipients will have the same Quick Code over a certain time period until Quick Codes are reset. A Quick Code Reset Program (376), which can be used to reset (delete all Quick Code values from) the Quick Code table 1313, can be scheduled to run at a different frequency in each CDC 1190-1. In one embodiment of the ePD Delivery Process, the Quick Code Reset Program (376) can be scheduled to reset the Quick Code table 1313 each night.

After assigning Quick Codes to the Bin Inventory records 1300 selected for the recipient, the Package Location Report Program (368) can create a Location Report listing the Quick Code and all the SBU Id numbers of the selected Bin Inventory records 1300. The Location Report can be printed on the tape printer at the entrance station (172) where the recipient swiped their ePD customer access card and entered their PIN number. The Location Report can be formatted to have, for example, the Quick Code printed on the top line next to a heading such as "Quick Code=", a blank second line, and a listing of each SBU Id on a separate line below an underlined header such as "SBU locations". The SBU locations can be listed in SBU Id sequence, and if a recipient has more than one bulk delivered package in a SBU (158), that SBU (158) can be listed once for each bulk delivered package that it holds for that recipient. After printing the report, the Package Location Report Program (368) can unlock and automatically open the entrance station door (172) for a short period of time to allow the recipient to grab the report from the tape printer and enter the CDC 1190-1 with their package cart.

Basic information about using an entrance station (172) can be posted in the inner entranceway area (177) near the entrance stations (172), including a message to tell recipients to press an instructions key on the entrance station keypad to print detailed instructions on how to operate an entrance station, read a Location Report, and operate a SBU (158). When recipients press the instructions key on the entrance station keypad, the CDC server can print a standard instructions report listing the basic instructions on how to maneuver through the CDC 1190-1. The printer could be, but is not limited to a tape printer, laser, inkjet, or dot matrix printer or any combination thereof.

Continuing with the illustrative example, after passing through the entrance station door (172), the recipient can walk through the aisles of the CDC 1190-1 using posted SBU location number range signs to guide them to the SBU's (158) listed on their Location Report. Upon arriving at each SBU (158) listed on their report, the recipient can key in the Quick Code listed on their report and their PIN using the SBU's keypad (244) to retrieve each bulk delivered package listed on their Location Report from an SBU (158). When the Quick Code and PIN are keyed in, the information can be passed through the SBU (158) and sent to the CDC server along with the SBU Id of the SBU (158). An Unloading Program (370) of the ePD SBU Application can be initiated and it can search the records on the Bin Inventory table 1300 having the SBU Id of the SBU (158) from which the data was sent. The Unloading Program (370) can search the Bin Inventory records 1300 corresponding to that SBU's bins for the Quick Code and PIN entered by the recipient. The Unloading Program (370) can search for the records 1300 corresponding to a SBU's stationary bins before searching for the records 1300 corresponding to its revolving bins. If the Unloading Program (370) finds a stationary bin's record 1300 having a Quick Code and PIN that matches the values entered by the recipient, it can send a display command to the SBU display screen (246) to display the bin door number or numbers corresponding to the bin containing the recipient's bulk delivered package. The Unloading Program (370) can also send an unlock command to the bin door locking mechanism of one or more of the stationary bin doors (238), depending upon the configuration of the stationary bins, to open the bin doors (238) of the bin containing the recipient's bulk delivered package. The Unloading Program (370) can also, for example, write a new record to a Package Pickup table 1312 and a Pickup Update data file, and can update the selected Bin Inventory record 1300 to initialize it as an available bin.

The Package Pickup table 1312 of the SBU Application can have all the same fields as the Bin Inventory table 1300 except for Status. It can also have two additional fields that are not on the Bin Inventory table 1300—CDC Id and Pick-up Date/Time. To create the new Package Pickup record 1312, the Unloading Program (370) can copy all the data from the Bin Inventory record 1300 except for Status. On the new Package Pickup record, CDC Id can be set to the value of the current CDC 1190-1 in which the application is running, and Pick-up Date/Time can be set to the current date/time. The Unloading Program (370) can create the new Pickup Update data file record by writing the Package Id from the selected Bin Inventory record 1300 and the Pickup Date/Time as the current date/time. To initialize the Bin Inventory record 1300 as an available bin, the Unloading Program (370) can set its Status equal to a value such as "available" and can delete the values from the data fields related to the bulk delivered package—Customer Id, PIN, Quick Code, Package Id, Delivery Employee Id, Shipper Id, Delivery Date/Time, and Notification Date/Time.

If the Unloading Program (370) finds a revolving bin record matching the Quick Code and PIN, it can call or cause to be called, the Bin Positioning Program (372) to determine the movement needed to position the master bin containing the recipient's bulk delivered package into the unloading position. Before calling the Bin Positioning Program (372), the Unloading Program (370) can determine which master bin is currently in the unloading position for the current SBU (158) by selecting the Load Position Master Bin Id value from the SBU Settings table 1314. The Unloading Program (370) can pass the values of the selected Load Position Master Bin Id and the Master Bin Id (from the selected Bin Inventory record 1300) of the bin containing the recipient's bulk delivered package to the Bin Positioning Program (372). The Bin Positioning Program (372) can use the Load Position Master Bin Id value to search a Bin Movement table 1315 for the movement required to move the master bin containing the recipient's bulk delivered package into the unloading position. The Bin Movement table 1315 can show the movement needed to move the selected bin into the unloading position, relative to the unloading position if moving in the clockwise direction (when referring to bin movement in this disclosure, moving a SBU's front bins upward and back bins downward is considered a clockwise direction). For example, if the selected Master Bin Id is "05" and the Master Bin Id currently in the unloading position is "03", the movement needed to move Master Bin Id "05" into the unloading position can be "−2". Since master bins can be numbered in the clockwise direction, Master Bin Id "05" can be two positions beyond the unloading position in the clockwise direction in this example, and would need to be moved counterclockwise for a distance of two positions. In another example, where the SBU (158) has a total of eighteen bins, the selected Master Bin Id is "17" and the Master Bin Id in the unloading position is "03", the required movement needed to move Master Bin Id "17" into the unloading position can be "4", because "17" can be four positions away from the unloading position in the counterclockwise direction and therefore would need to be moved four positions in the clockwise direction to reach the unloading position. If the master bin containing the recipient's bulk delivered package is already in the unloading position the Bin Positioning Program (372) can calculate the required movement to be "0" and bypass the step of sending a motor command to the SBU (158).

After determining the movement required to move the master bin containing the recipient's bulk delivered package into the unloading position, the Unloading Program (370) can check all the bin door sensors on the revolving bin doors (234) to make sure that all the revolving bin doors (234) are in the closed position before moving the master bins. If any of the revolving bin doors (234) are not fully closed (and thus locked), the Unloading Program (370) can display message on the SBU's display screen (246) to request the recipient to close the revolving bin doors (234). The SBU (158) can continue to display the message and refrain from performing any other actions until the doors (234) are closed. Once all the revolving bin doors (234) are in the closed position, the Unloading Program (370) can send a motor command, with the bin movement calculated by the Bin Positioning Program (372), to the SBU motor to move the selected master bin into the unloading position. The program (370) can also send a display command to the SBU display screen (246) to display the bin door number or numbers corresponding to the bin containing the recipient's bulk delivered package, and it can send a configuration command to one or more of the bin door configuration mechanisms to move the bin door configuration bolts into the correct sequence for the Configuration Code of the selected bin. The Unloading Program (370) can check the value of the Door Configuration Code field on the SBU Settings record 1314 having the current SBU Id to find the current configuration of the revolving bin doors (234), and can compare it to the Configuration Code on the Bin Inventory record 1300 of the bin containing the recipient's bulk delivered package to determine the needed configuration commands. If the configuration bolts are already in a workable sequence for the selected bin, then configuration commands may not need to be sent. When the SBU motor and bin door configuration mechanisms have completed their actions successfully, the Unloading Program (370) can send an unlock command to one or more of the bin door locking mechanisms to open the bin doors (234) corresponding to the configuration of the selected bin. After successfully unlocking the revolving bin doors (234), the Unloading Program (370) can create and update records in a manner consistent with the way it does when it unlocks a stationary bin, writing a new record to the Package Pickup table 1312 and the Pickup Update data file, and updating the Bin Inventory record 1300 to initialize it as an available bin. The Unloading Program (370) can also update the SBU Settings table 1314 when it unlocks a revolving bin, setting the Load Position Master Bin Id equal to the Master Bin Id value of the selected bin and the Door Configuration Code to the value which describes the current position of the bin door configuration bolts.

If the SBU gets listed on the recipient's Location Report more than once, indicating that there is more than one bulk delivered package for that recipient in that SBU (158), the recipient can reenter the Quick Code and PIN for each bulk delivered package listed to retrieve the bulk delivered packages one at a time. This can ensure that the recipient makes an effort to receive each bulk delivered package and can eliminate the potential problems of opening several bins from one recipient action. An example of such a problem being that a recipient can retrieve fewer bulk delivered packages than the number released from a SBU (158) and can leave one or more bulk delivered packages behind, which could be taken by another person.

The ePD SBU Application's programs and tables can track information that can be used by shippers to administer financial incentives when bulk delivered packages get picked up early or financial penalties when bulk delivered packages get picked up late. Each shipper can set their own policies regarding incentives and penalties, and those policies can be changed at the discretion of each shipper. The data used to track recipient pick up activity can be captured on the Package Pickup table 1312 as recipients remove their bulk delivered packages from SBU bins. Pickup Date/Time can be compared against Notification Date/Time on the Package Pickup table 1312 to determine how long a bulk delivered package remained in a SBU bin following delivery notification. A running total of the net cumulative incentive discount or penalty charge can be calculated and tracked for each shipper or in total across all shippers, for a customer or recipient, in a field such as an ePD Account Balance field on a Customer record 1256.

If a recipient accidentally locks a SBU bin with their bulk delivered package still inside, for example, by pushing it closed when trying to retrieve the bulk delivered package from the SBU (158), the recipient can open the bin again, for example, by pressing a "re-open" key or key sequence on the SBU keypad (244) and then keying in their Quick Code and PIN again. The re-open feature can re-open a bin on a SBU (158) that the recipient had previously opened using the same entered Quick Code and PIN. When the recipient presses the "re-open" key or key sequence, the SBU (158) can send a re-open request including the SBU Id and the entered Quick Code and PIN to the CDC server. A Re-open Program (374) can be initiated and can search the Package Pickup table 1312 for a record matching the SBU Id, Quick Code, and PIN sent from the SBU (158). If the recipient had retrieved more than one bulk delivered package from the SBU (158), the Re-open Program (374) can select all the records 1312, and process them in sequence of Pick-up Date/Time starting with the latest one. The Re-open Program (374) can function in the same way as the Unloading Program (370) with some exceptions. Instead of reading data from the Bin Inventory table 1300, the Re-open Program (374) can read data from the Package Pickup table 1312. The Re-open Program (374) doesn't need to update a Bin Inventory record 1300 to initialize it. The Re-open Program (374) doesn't write new records to the Package Pickup table or the Pickup Update data file. Also, after the Re-open Program (374) finds the Bin Id on the Package Pickup table 1312, it can check the Status of that Bin Id on the Bin Inventory table 1300 prior to taking any action. If the Status is a value such as "available", "re-open", or "configuration reserved" the Re-open Program (374) can perform the actions required to re-open the bin. If the Status does not equal a value such as "available", "re-open", or "configuration reserved" the Re-open Program (374) can check the next selected Package Pickup record 1312 if more than one was selected, until it finds one having a corresponding Bin Inventory record 1300 with a Status value such as "available", "re-open", or "configuration reserved". If the Re-open Program (374) cannot find a Bin Id on a selected Package Pickup record 1312 which has the appropriate status on its corresponding Bin Inventory record 1300, the Re-open Program (374) can, for example, sound an error tone and/or displays an error message indicating that there are no bins in the SBU (158) corresponding to the entered Quick Code and PIN.

The re-open feature can be used when a recipient mistakenly pushes the bin door (234 or 238) closed when trying to retrieve their bulk delivered package. In that situation, the result of the Re-open Program (374) can be to re-open a stationary bin or a revolving bin that is already in the unloading position. If the recipient does not use the re-open feature immediately after closing the bin door (234 or 238) (if they are unaware of the re-open feature and confused as to what to do), they can come back at a later time and use the re-open feature to retrieve their bulk delivered package. If a recipient does come back to use the re-open feature at a later time, the Re-open Program (374) can move the bin containing the recipient's bulk delivered package to the unloading position before unlocking the bin, if the bins have been moved since the recipient originally tried to retrieve the bulk delivered package. When loading bulk delivered packages into a SBU (158), if a CDC worker comes across a bin having a bulk delivered package in it and a Bin Inventory record 1300 with a Status value such as "available", the worker can update the Status of the Bin Inventory record 1300 corresponding to the bin, changing it from a value such as "available" to a value such as "re-open". The worker can, for example, scan a "re-open" status update barcode on their scan commands sheet, the package label barcode of the bulk delivered package already in the bin, and the bin door label of the bin containing the bulk delivered package to cause the Loading Program (356) to update the Bin Inventory record 1300 corresponding to that bin to reflect that the bulk delivered package has been 'reloaded' with a Status value such as "re-open". In this situation, the CDC worker should not remove the bulk delivered package and load another bulk delivered package into the bin. If the bulk delivered package becomes lost, the next worker to load a bulk delivered package into a bin which previously contained a bulk delivered package that a recipient has claimed to have not retrieved can be easily identified.

When the recipient has retrieved all of their bulk delivered packages from the CDC 1190-1, the recipient can exit the CDC 1190-1 with their package cart of bulk delivered packages by walking through the interior exit door (186), the exit aisle (184), and the exterior exit door (182). Both the interior exit door (186) and the exterior exit door (182) can have sensors that can automatically open the door for persons exiting from the inside. This makes it easy for recipients to exit through the exit corridor, while making it difficult for someone to enter the CDC 1190-1 through the exit corridor. The recipient can push their package cart to their car and unload their bulk delivered packages into their car. The recipient can then return the package cart to the package cart keeper machine closest to their car, for example, by pushing the package cart into the package cart keeper machine, running their ePD access card through the machine's card reader, and pressing a "return" button to credit their account for returning the package cart. The package cart keeper system can be similar to the luggage cart systems used in airports that charge customers a fee to use the carts, and in some cases refund part of the fee back to the customer upon returning the cart. In one embodiment of the ePD Delivery Process, recipients do not get charged for using package carts at CDC's 1190-1 as long as they return them to one of the package cart keeper machines. If a recipient does not return a cart, they can be charged a fee, for example, through their ePD account. This type of cart system can be used to provide recipients with the convenience of using a cart to carry their bulk delivered packages, at no cost. At the same time, it can discourage recipients from leaving carts randomly in the parking lot or CDC 1190-1 and can eliminate the need (and the associated labor cost) of having workers on site at each CDC 1190-1 to collect and organize the carts, as is done, for example at many supermarkets. It should be noted that a recipient does not have to acquire a cart to retrieve a package and a CDC can choose not to employ a package cart system without departing from the spirit of the invention.

Following the notification update step 1148, the retailer billing step 1138 can be followed as described. A Notification Update data file can be sent from the CDC server to the RDC server at predefined intervals. The CDC Id and the current date/time can be written as part of the data file header information. A Notification Update Program (347) can run on a RDC server and can process each Notification Update data file received. As the Notification Update Program (347) reads through each record in the data file, it can select all the Order Detail records 1202 having the Package Id of the current Notification Update data file record. The Notification Update Program (347) can update the selected Order Detail records 1202, setting their Status to a value such as "notified" and their Notification Date/Time to the value on the current Notification Update data file record. After updating the selected Order Detail records 1202, the Notification Update Program (347) can use each unique Order Id of the updated Order Detail records 1202 to select all the Order Detail records 1202 having that Order Id. From each group of Order Detail records 1202 selected by Order Id, the Notification Update Program (347) can attempt to select records that do not have a Status value such as "notified" or "picked up" to determine if there are any Order Detail records 1202 of that order, which are not in bulk delivered packages for which the recipient has been notified of delivery. If the Notification Update Program (347) can find a group of Order Detail records 1202 in which every record has a Status value such as "notified" or "picked up", it can select the Order Header record 1200 having the Order Id of the group and update that Order Header record's 1200 Status to a value such as "delivered".

A Billing Program (349) can run on the RDC server at each RDC to create a billing output data file for the shipper running that RDC. Billing output data files created for a shipper can be used by that shipper's billing application to bill retailers for delivered orders. To create the billing data file for a shipper, the Billing Program (349) can select records from the Order Header table 1200 having the ePD Shipper Id of that shipper and a Status value such as "delivered". Order Header records 1200 with a Status such as "delivered" can represent customer orders for which all ordered items have been loaded as bulk delivered packages into SBU's (158) at a CDC 1190-1, prior to at least one electronic notification message being sent successfully to the recipients to notify them of the bulk delivered package delivery. As the Billing Program (349) processes each selected Order Header record 1200, it can use the Order Id on the Order Header record 1200, to select the associated Order Detail records 1202. The Billing Program (349) can check the Status of the Order Detail records 1202 to determine if the entire order has been picked up by the recipient (if the Status of all the selected Order Detail records 1202 has a value such as "picked up"). If the Status of all associated Order Detail records 1202 has a value such as "picked up", the Billing Program (349) can set the Status of the current Order Header record 1200 to a value such as "picked up". If the Status of any one of the associated Order Detail records 1202 does not equal a value such as "picked up", the Billing Program (349) can set the Status of the current Order Header record 1200 to a value such as "billed".

The Pickup Update data file can be sent from a CDC server to a RDC server at predefined intervals. The CDC Id and the current date/time can be written as part of the data file header information. A Pickup Update Program (348) can run on a RDC server and can process each Pickup Update data file received. As the Pickup Update Program (348) reads through each record in the data file, it can select all the Order Detail records 1202 having the Package Id of the current Pickup Update data file record. The Pickup Update Program (348) can update the selected Order Detail records 1202, setting their Status to a value such as "picked up" and their Pickup Date/Time to the value on the current Pickup Update data file record. The Pickup Update Program (348) can also select the Package record 1234 having the Package Id of the current Pickup Update data file record and can update its Status to a value such as "picked up". After updating the selected Order Detail records 1202 and Package record 1234, the Pickup Update Program (348) can use each unique Order Id of the updated Order Detail records 1202 to select all the Order Detail records 1202 having that Order Id. From each group of Order Detail records 1202 selected by Order Id, the Pickup Update Program (348) can attempt to select records that do not have a Status value such as "picked up" to determine if there are any Order Detail records 1202 of that order, which can be in bulk delivered packages that have not been retrieved by the recipient. If the Pickup Update Program (348) can find a group of Order Detail records 1202 in which every record has a Status value such as "picked up", it can select the Order Header record 1200 having the Order Id of the group and can update that Order Header record's 1200 Status to a value such as "picked up" if its existing Status is a value such as "billed". If the existing Status on an Order Header record 1200 is a value such as "delivered", the Pickup Update Program (348) can refrain from updating the Order Header record's 1200 Status. A Status such as "picked up" on Order Header 1200, Order Detail 1202, and Package 1234 records does not affect the billing process, but can provide information, which can be used in answering package pickup inquiries.

Figure 13:
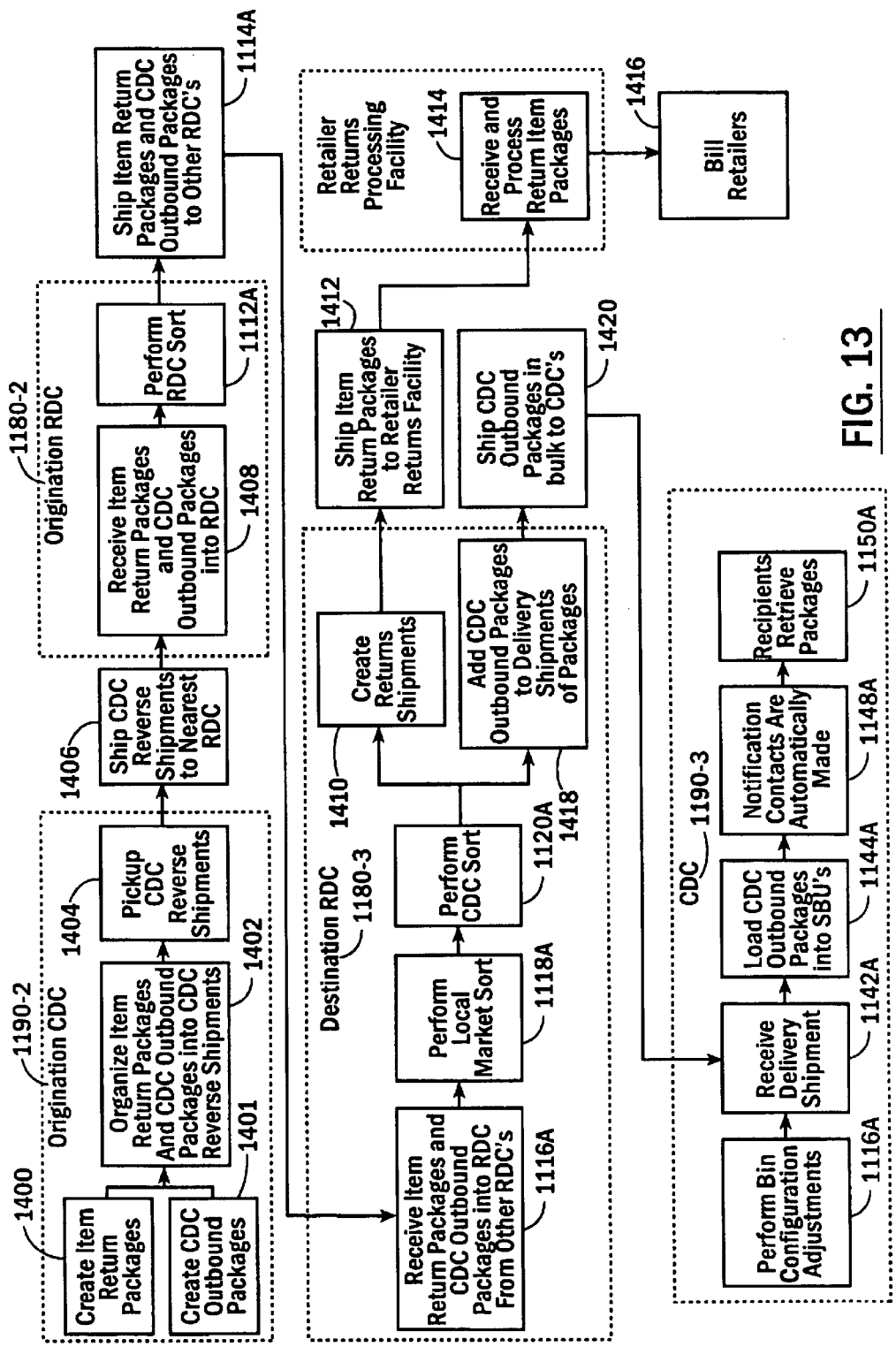
FIG. 13 is an illustrative flow diagram of the processing that occurs at the various distribution centers in sending an item return package from a CDC to a retailer's returns processing facility and/or in sending a CDC outbound package from one CDC to another CDC for a recipient.

In another aspect of the invention, recipients can return ordered items back to a retailer using the infrastructure of the ePD Delivery Process. There is shown in FIG. 13, an illustrative embodiment depicting the steps that can be used to efficiently return an ordered item to a retailer. Recipients can return ordered items at a CDC 1190-2 by initiating a CDC Returns Program (378) of the ePD SBU Application which can be running, for example, on a returns processing workstation (189). To initiate the CDC Returns Program (378) to process the return of an ordered item and create an item return package, step 1400, a recipient can bring the ordered item and the packing list associated with the item to a returns processing workstation (189) in a CDC 1190-2. The recipient can run an ePD customer access card through a card reader and key in their PIN number. The card reader can be located at the workstation (189), and the workstation's keyboard can be used to key in the PIN. This can be used to initiate the item return transaction. The recipient can use, for example, a hand-held barcode scanning device that can communicate with the workstation (189) to scan the item return barcode on the packing list associated with the item being returned. Such communication can be wireless or wired. The recipient can use the workstation's keyboard to key in the quantity of the item being returned, select a return reason from a predefined list, and type in a comment related to the returned item. Where no appropriate option is available in the list, the recipient can select a return reason such as "other" and can enter a personal reason in the comment field. The CDC Returns Program (378) can validate that the entered PIN matches the PIN on the Customer record 1256 having the Customer Id of the ePD customer access card which was read by the card reader, and that the Customer Id from the ePD customer access card matches the Customer Id embedded in the Package Id of the scanned item return barcode. An item return barcode can contain, but is not limited to the following: the Package Id, Order Id, and SKU of an ordered item. If one of the CDC Returns Program's (378) validation checks fails, the CDC Returns Program (378) can, for example, sound an error tone and/or display a message explaining which scanned and/or entered information failed its validation. With reference to FIG. 9F, if the entered and/or the scanned information passes the CDC Returns Program's (378) validation checks, the CDC Returns Program (378) can create a record on an Item Return Header table 1266 and an associated record on an Item Return Detail table 1268 for the item return transaction.

The term "retailer" can be referring to one of a retailer's or manufacturer's or other equivalent business' order fulfillment operations, if they operate multiple order fulfillment operations. If a retailer does operate multiple order fulfillment operations, each one can be identified by its own ePD Retailer Id. A retailer's item returns processing facility can be identified by a Returns Facility Id, can have a Returns Local Market Id associated with it, and can be assigned to each distinct ePD Retailer Id on the Retailer table 1246. Before creating a new Item Return Header 1266 and Item Return Detail records 1268, the CDC Returns Program (378) can select the ePD Shipper Id from the record on the RDC table 1258 having the RDC Id embedded in the Package Id of the scanned item return barcode. The CDC Returns Program (378) can also select the Returns Local Market Id from the record on the Retailer table 1246 having the ePD Retailer Id embedded in the Order Id from the scanned item return barcode. After selecting the ePD Shipper Id (of the original bulk delivered package) and the Returns Local Market Id (of the retailer of the original bulk delivered package) the CDC Returns Program (378) can select the RDC Id from the RDC-Local Market table 1264 having the selected ePD Shipper Id value and a Local Market Id equal to the value of the selected Returns Local Market Id (the RDC associated with the shipper for that retailer's returns facility—referred to as the origination RDC for the current item return package). The new Item Return Header record 1266 can be created with, for example, the selected ePD Shipper Id, Returns Local Market Id, and RDC Id values, the Customer Id from the ePD customer access card, the current CDC Id, a Status value such as "in CDC", the ePD Retailer Id embedded in the Order Id from the scanned item return barcode, and an Item Return Creation Date/Time equal to the current date/time. The Item Return Detail record 1268 can be created with, for example, the SKU, Package Id, and Order Id from the scanned item return barcode and the Return Quantity, Return Reason Code, and Return Reason Comment that the recipient entered and selected using the workstation keyboard. The Item Return Id on both new records can be set, for example, to a concatenation of the ePD Retailer Id+Customer Id+CDC Id+current date+a value such as "IR"+a sequential 3 digit number. After a recipient performs the actions to initiate the return of an item and the CDC Returns Program (378) successfully creates a new record on the Item Return Header 1266 and Item Return Detail 1268 tables, the CDC Returns Program (378) can, for example, sound a confirmation tone, display a confirmation message to confirm that the item return transaction has been recorded successfully, print an item return package label, and start a returns conveyor (156). The item return package label can include, but is not limited to the following information: the RDC Id, Returns Local Market Id, and Item Return Id printed in readable format and the Item Return Id printed in barcode format.

The recipient can return another item from the same packing list or a different packing list by scanning its item return barcode, keying in the Return Quantity, selecting a Return Reason Code, and entering a Return Reason Comment. If a subsequent item being returned is from the same packing list or from a different packing list that is from the same retailer, an additional Item Return Detail record 1268 can be created for that item return transaction with the same Item Return Id as the records 1268 created for the previous item return transaction (since both transactions are for the same retailer). If a subsequent item being returned comes from a packing list of a different retailer, the CDC Returns Program (378) can create a new set of Item Return Header 1266 and Item Return Detail 1268 records and can print a new item return package label for the item return transaction. A new item return package label can be created for each new set of Item Return Header 1266 and Item Return Detail 1268 records.

Recipients can be instructed to separate items being returned to different retailers into separate item return packages and to combine different items being returned to the same retailer into one item return package, as the size of a package bag allows. In one aspect of the invention, a recipient can place the items the recipient is returning, and their associated packing lists, into separate package bags by retailer, affix item return package labels to the item return packages to which they correspond, seal the item return packages, and place them through a returns processing entry point (148) and onto a returns conveyor (156). Package bags and package ties in which the recipient originally received the items the recipient is returning or new package bags and package ties available from packing materials dispensers at a returns processing workstation (189) can be used to create an item return package. An item return label should be placed over top of an existing package label, if one exists on a package bag. A returns video surveillance camera (150) can be located at a returns processing workstation to record, in a digital data file, moving video or still photos of a recipient's actions in placing items being returned into package bags and placing those package bags through the returns processing entry point (148). A shipper's return policy can include requiring a recipient to clearly show their actions in processing an item return in front of a returns video surveillance camera (150).

An item return can be performed at any CDC 1190-2 running the CDC Returns Program (378), regardless of to which CDC 1190-2 the bulk delivered package that contained the items was originally delivered. Even items, in packages that were moved through a LDDH 1192-2 and delivered directly to customer specified addresses, can be returned using the CDC Returns Program (378) at a CDC 1190-2. In a further aspect of the invention, the ePD Delivery Process can also allow a customer to send a package to a CDC 1190-2 or a specific address for a recipient through a method similar to processing an item return. There is also shown in FIG. 13, an illustrative embodiment depicting the steps that can be used to enable a customer to efficiently ship a package from one CDC 1190-2 to another CDC 1190-3 for a recipient. A customer or someone sending a package, can create a CDC outbound package for a recipient, step 1401, for example, by putting items in an ePD package bag and sealing it using an ePD package tie. In step 1401, larger items suitable for shipping (packed in a large box or container or wrapped with protective material to prevent damage) can also be shipped as a CDC outbound package, provided the larger items are not larger than the largest configurable SBU bin, if shipping to a CDC 1190-2. A package sender can use a package bag and package tie from a bulk delivered package the package sender had previously received, or the package sender can take a new package bag and package tie from the packing materials dispensers at an outbound package workstation (159). A package sender can bring a package that the package sender wishes to send, a CDC outbound package, to an outbound package processing workstation (159) at any CDC 1190-2 in which the shipper, that the package sender intends to deliver their package, accepts CDC outbound packages. An electronic scale can be connected to, for example, an outbound package processing workstation (159) and can be used to calculate a package sender's ePD shipping cost based upon several factors that can be defined differently for each shipper. Those shipping cost factors can include, but are not limited to Delivery Type, Weight, Package Size, Origination CDC Id, and Destination CDC Id. In one aspect of the invention, a credit card/bank debit card reader with a connection to a payment transaction validation service can be located at and connected to an outbound package processing workstation (159) to enable credit cards and debit cards to be authorized and accepted as payment options. In a further aspect of the invention, a package sender can also have an ePD account, which can be debited as a payment option for the cost of shipping a CDC outbound package.

The package sender can run an ePD access card through, for example, the workstation's card reader, key in their PIN number on the workstation's keypad, select a shipper from a predefined list, select the type of delivery—either ePD delivery to a CDC 1190-2 or LDDH delivery to a specific address—and place their CDC outbound package on the outbound package processing workstation's electronic scale. If the delivery type selected was ePD delivery, the package sender can then key in or select the Customer Id of their CDC outbound package's recipient and select the CDC Id of the destination centralized pickup location (or CDC) 1190-2 where the package sender wants the package to be delivered, from a predefined list. A package sender can search through a listing of Customer Id's on the outbound package workstation (159) using other customer information related to the package recipient including, but not limited to Last Name to find the package recipient's Customer Id. The predefined list containing CDC Id's of potential CDC locations 1190-2 can also be narrowed using information related to the package recipient including, but not limited to Zip and City. If the LDDH delivery type was selected, the package sender can then type in the name of the recipient and the specific address to which the package sender wants the CDC outbound package to be delivered.

A CDC Outbound Package Creation Program (380) of the ePD SBU Application can validate the entered PIN against the Customer record 1256 of the Customer Id read from the ePD customer access card and can create a record on a CDC Outbound Package table 1270. Before creating the new CDC Outbound Package record 1270, the CDC Outbound Package Creation Program (380) can use, for example, the entered/selected information, the electronic scale reading, and a CDC Outbound Package Cost Calculation table 1317 to determine the cost the selected shipper will charge for shipping the current CDC outbound package from the current CDC 1190-2 to a selected CDC 1190-3 or specific address. If a shipper bases the cost on Package Size as well as weight, the CDC Outbound Package Creation Program (380) can prompt the package sender to enter the estimated size of the package based upon guidelines that the shipper can provide. The CDC Outbound Package Creation Program (380) can, for example, sound a message alert tone and display a message on the workstation's display monitor to communicate the shipping cost of the CDC outbound package and prompt the package sender to select a form of payment. The package sender can choose to cancel the transaction or select a form of payment and run their credit card or debit card through the credit card/bank debit card reader to initiate a payment authorization request.

Upon receiving a successful credit/debit authorization or the selection of a payment option that does not require a payment authorization (such as an ePD account or a shipper account), the CDC Outbound Package Creation Program (380) can use the CDC Id of the selected destination CDC 1190-3 to select the Local Market Id associated with the destination CDC 1190-3 from the CDC table 1252, and can then use that selected Local Market Id and the ePD Shipper Id selected by the package sender to select the RDC Id from the RDC-Local Market table 1264 associated with the shipper and local market of the destination CDC 1190-3. If the Delivery Type of a CDC outbound package is a value such as "LDDH", the CDC Outbound Package Creation Program (380) can use the Delivery Zip entered by the package sender and the Zip Code-CDC 1254 and CDC 1252 tables to determine the CDC Id and Local Market Id associated with the LDDH 1192-3 that delivers to the delivery address specified by the package sender. The CDC Outbound Package Creation Program (380) can then use that determined Local Market Id and the selected ePD Shipper Id to determine the RDC Id associated with that LDDH 1192-3. In one aspect of the invention, the CDC Outbound Package Creation Program (380) can create a new record on the CDC Outbound Package table 1270 for the CDC outbound package transaction, for example, as follows: RDC Id can be set to the value selected from the RDC-Local Market record 1264; Local Market Id can be set to the value selected from the CDC record 1252; CDC Outbound Package Id can be set to a concatenation of the Customer Id of the package recipient+the Origination CDC Id (the CDC Id of the current CDC 1190-2)+the current date+a sequential 3 digit number; Status can be set to a value such as "in origination CDC"; ePD Shipper Id can be set to the value of the shipper selected by the package sender; Shipping Customer Id can be set to the value read from the ePD customer access card; Delivery Type can be set to the value selected by the package sender; Origination CDC Id can be set to the value of the current CDC 1190-2; Recipient Customer Id can be set to the value entered by the package sender or can be created with no value if Delivery Type has a value such as "LDDH"; Destination CDC Id can be set to the value selected by the package sender or can be selected from the Zip Code-CDC table 1254 if Delivery Type has a value such as "LDDH"; Temperature Code can be set to a value such as "standard" (packages requiring refrigeration or freezer storage cannot be shipped as CDC outbound packages); Weight can be set to the value read from the workstation's electronic scale; Cost can be set to the value calculated by the CDC Outbound Package Creation Program (380)—by comparing the information entered by the package sender against the CDC Outbound Package Cost Calculation table 1317; Delivery Name, Delivery Address 1, Delivery Address 2, Delivery City, Delivery State, and Delivery Zip can be set to the values entered by the package sender (or can be created with no value if Delivery Type is a value such as "ePD"); Payment Method can be set to the method selected by the package sender; Payment Card Number can be set to the card number of the credit or debit card run through the credit card/bank debit card reader; and Payment Authorization Number can be set to the value returned from a successful credit card or debit card authorization request.

After the customer performs the actions that can be used to ship a CDC outbound package and the CDC Outbound Package Creation Program (380) successfully creates a new record on the CDC Outbound Package table 1270, the CDC Outbound Package Creation Program (380) can, for example, sound a confirmation tone, display a confirmation message to confirm that the CDC outbound package has been recorded successfully, print an outbound package label, and start the returns conveyor (156). The exemplary outbound package label can include, but is not limited to, the following information: the RDC Id, Destination CDC Id, CDC Outbound Package Id, Delivery Name, Delivery Address 1, Delivery Address 2, Delivery City, Delivery State, and Delivery Zip printed in readable format and the CDC Outbound Package Id printed in barcode format. The package sender can affix the package label to the CDC outbound package (over top of any existing package labels) and can place the CDC outbound package through the returns processing entry point (148) and onto the returns conveyor (156).

In one aspect of the invention, CDC workers can organize item return packages and CDC outbound packages into CDC reverse shipments using a CDC Reverse Shipment Creation Program (382) in step 1402. The CDC Reverse Shipment Creation Program (382) can run, for example, on a workstation in the backroom area (154) of a CDC 1190-2. After starting the CDC Reverse Shipment Creation Program (382) a CDC worker can scan their employee id card and begin scanning the barcodes on the labels of item return packages and CDC outbound packages as the worker puts them into cargo cages. A CDC worker can look for the RDC Id on the label of an item return package or a CDC outbound package to determine if it is a package for the shipper for whom the worker works. The CDC Reverse Shipment Creation Program (382) can validate that the first scanned item return package or CDC outbound package is associated with the shipper with whom the CDC worker is employed, by using the Item Return Id of the scanned item return label or the CDC Outbound Package Id of the scanned CDC outbound package label to select the ePD Shipper Id from the Item Return Header 1266 or CDC Outbound Package record 1270, and comparing it against the ePD Shipper Id selected from the Employee table record 1308 having the Employee Id of the scanned employee id card. If the first package, scanned after the employee id card is scanned, passes the CDC Reverse Shipment Creation Program's (382) validation, the CDC Reverse Shipment Creation Program (382) can create a new CDC reverse shipment by creating a new record on a CDC Reverse Shipment table 1274. In a further aspect of the invention, in order to create the new CDC Reverse Shipment record 1274, the CDC Reverse Shipment Creation Program (382) can select the Local Market Id from the CDC table record 1252 of the current CDC 1190-2 and use it along with the ePD Shipper Id value, selected from the Employee table 1308 during the CDC Reverse Shipment Creation Program's (382) validation, to select a RDC Id from the RDC-Local Market table 1264. The CDC Reverse Shipment Creation Program (382) can create the new CDC Reverse Shipment record 1274, for example, as follows: Origination RDC Id can be set to the selected RDC Id value; CDC Reverse Shipment Id can be set to a concatenation of the current CDC Id+the current date+a value such as "RS"+a 3 digit sequential number; Status can be set to a value such as "in CDC"; CDC Id can be set to the value of the current CDC 1190-2; ePD Shipper Id can be set to the value selected from the Employee table 1308 during the program's (382) validation; and Shipment Creation Employee Id can be set to the value from the scanned employee id card.

As a CDC worker scans subsequent item return packages and CDC outbound packages, the CDC Reverse Shipment Creation Program (382) can validate that each scanned item return package or CDC outbound package is associated with the shipper with whom the CDC worker is employed using the same validation that it used for the first item return package or CDC outbound package added to the CDC reverse shipment. If a scanned package does not pass the CDC Reverse Shipment Creation Program's (382) validation, the CDC Reverse Shipment Creation Program (382) can, for example, sound an invalid tone and display a message that the scanned package is for a different shipper. If a scanned package passes the CDC Reverse Shipment Creation Program's (382) validation, the CDC Reverse Shipment Creation Program (382) can update, for example, the Item Return Header record 1266 or CDC Outbound Package record 1270 of the scanned item return package or CDC outbound package, to set its Status to a value such as "CDC reverse shipment" and its CDC Reverse Shipment Id field to the CDC Reverse Shipment Id of the current CDC reverse shipment being created.

The CDC worker can stop adding item return packages to a CDC reverse shipment at any time by, for example, selecting a program option to print a CDC reverse shipment label. A CDC worker can create different sized CDC reverse shipments depending upon when the worker decides to print the CDC reverse shipment label. The worker can, for example, peel the CDC reverse shipment label from its label stock, affix it to a label plate, and slide the label plate into the cargo cage label plate holder of one of the cargo cages containing the item return packages and CDC outbound packages that the worker grouped together into a CDC reverse shipment. Information printed on a CDC reverse shipment label can include, but is not limited to, the CDC Reverse Shipment Id and ePD Shipper Id in a readable format and the CDC Reverse Shipment Id in a barcode format.

In another aspect of the invention, after a tractor-trailer finishes unloading all of its delivery shipments in a local market, it can stop at one or more CDC's 1190-2 within that local market to pick up CDC reverse shipments, step 1404. A team of CDC workers and a tractor-trailer driver can coordinate with each other to meet at a CDC 1190-2 to load CDC reverse shipments onto a tractor-trailer (200 & 202) bound for a RDC 1180-2 which serves the local market in which that CDC 1190-2 is located. The CDC workers can start a CDC Reverse Shipment Program (384) of the ePD SBU Application on a workstation in the backroom area (154) of a CDC 1190-2. After starting the CDC Reverse Shipment Program (384), a CDC worker can scan their employee id card, the Trailer Id barcode on the trailer door label, and the label on each CDC reverse shipment being loaded onto the trailer (202). Mobile putaway conveyor units (143), a CDC receiving dock conveyor extension (145), and the trailer conveyor (204) of the tractor-trailer (200 & 202) can be used to load the cargo cages and large packages of CDC reverse shipments onto the tractor-trailer (200 & 202).

As the label on each CDC reverse shipment is scanned, the CDC Reverse Shipment Program (384) can update the CDC Reverse Shipment record 1274 of the scanned label, for example, as follows: Status can be set to a value such as "in-transit"; Loading Employee Id can be set to the value from the scanned employee id card; Trailer Id can be set to the value of the scanned Trailer Id barcode; and CDC Reverse Shipment Date/Time can be set to the current date/time. After the updates are made to CDC Reverse Shipment records 1274, the CDC Reverse Shipment Program (384) can create data files from the CDC Reverse Shipment 1274, Item Return Header 1266, Item Return Detail 1268, and CDC Outbound Package 1270 tables on the CDC server. The data files can be created to move the records from the database on the CDC server to the database on the RDC server, and each data file can have the same fields as the table from which it can be created. In one aspect of the invention, the CDC Reverse Shipment Program (384) can create a CDC Reverse Shipment data file by selecting records from the CDC Reverse Shipment table 1274 using the CDC Reverse Shipment Id of each scanned CDC reverse shipment label as the CDC reverse shipments are loaded onto the tractor-trailer (200 & 202).

After each CDC Reverse Shipment data file record is created, the CDC Reverse Shipment Program (384) can select all the Item Return Header records 1266 and CDC Outbound Package records 1270 having the CDC Reverse Shipment Id of the scanned CDC Reverse Shipment label and can create an Item Return Header data file and a CDC Outbound Package data file respectively. As the CDC Reverse Shipment Program (384) is creating the Item Return Header data file it can also create an Item Return Detail data file by selecting records from the Item Return Detail table 1268 having the Item Return Id of the records being written to the Item Return Header data file.

Figure 9G:
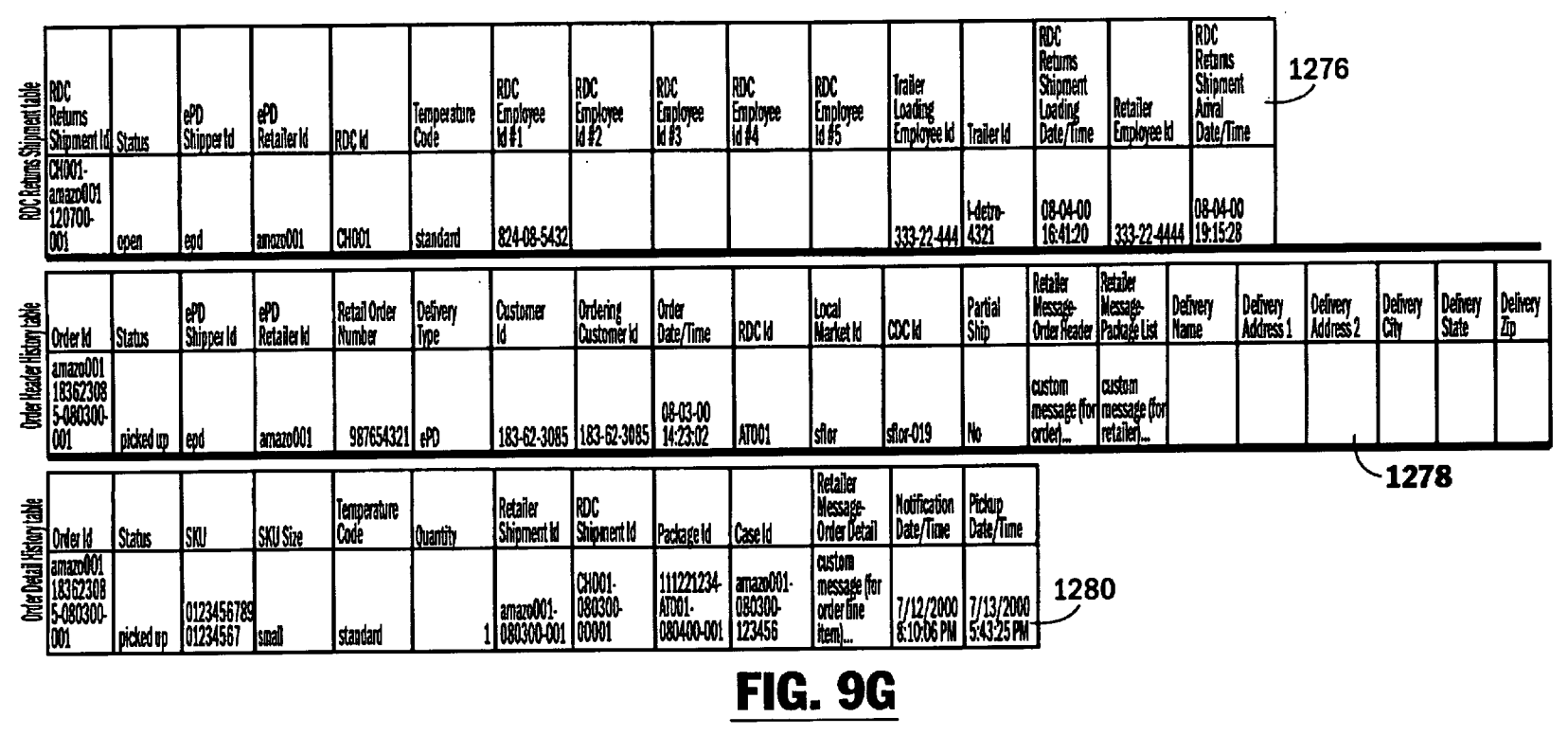

A CDC reverse shipment containing item return packages and CDC outbound packages can be shipped from an origination CDC 1190-2 to an origination RDC 1180-2 in step 1406. After CDC reverse shipments have been loaded onto the trailer (202), the tractor-trailer (200 & 202) can leave the current origination CDC 1190-2 to proceed to the current shipper's origination RDC 1180-2 which serves the current CDC 1190-2, or to another CDC 1190-2 in the local market to pick up more CDC reverse shipments, or to a retailer fulfillment site 1194-2 (FIG. 2) in the local market to pick up retailer shipments. Also shown in FIG. 2, is a retailer fulfillment site 1194-3 and a retailer fulfillment site 1194-4. A CDC worker running the CDC Reverse Shipment Program (384) can end the CDC Reverse Shipment Program (384) by, for example, selecting an option to transmit the data files related to the CDC reverse shipment. The CDC Reverse Shipment Program (384) can transmit, for example, the Item Return Header, Item Return Detail, CDC Outbound Package, and CDC Reverse Shipment data files via a file transport program to the RDC server of the shipper's RDC 1180-2 which serves the current CDC 1190-2 (the RDC Id selected from the RDC-Local Market table 1264 having the current ePD Shipper Id and the local market of the current CDC 1190-2). When the data files are received onto the RDC server, a Receive RDC Reverse Shipment Data Program (317) of the shipper's instance of the ePD Shipping Application can read each data file and write the data to the tables corresponding to each data file (having the same name) in the ePD Shipping Application's database on the RDC server. As the Receive RDC Reverse Shipment Data Program (317) reads through each record in a data file it can add a new record to the corresponding table and update the Status on each data file record to a value such as "record received". When processing Item Return Header and Item Return Detail data files to add records to their corresponding tables, the Receive RDC Reverse Shipment Data Program (317) can process the files together by first writing an Item Return Header record 1266 and then writing the Item Return Detail records 1268 that have the Item Return Id of that Item Return Header record 1266. With reference to FIG. 9G, as the Receive RDC Reverse Shipment Data Program (317) writes the first Item Return Detail record 1268 corresponding to an Item Return Header record 1266, it can use, for example, the Order Id of that Item Return Detail record 1268 to select the Order Delivery Type, CDC Id, Retailer Order Number, and Order Date/Time values from either the Order Header record 1200 or an Order Header History record 1278 having that Order Id. In another aspect of the invention, a data archiving process can be employed to write Order Header 1200 and Order Detail 1202 records to an Order Header History table 1278 and an Order Detail History table 1280 respectively, after an entire order has been billed and picked-up. The Receive RDC Reverse Shipment Data Program (317) can use the selected Order Header 1200 (or Order Header History 1278) data to update the Item Return Header record 1266, for example, as follows: Original Order Delivery Type can be set to the Order Delivery Type value selected from the Order Header 1200 or Order Header History 1278 record; and Original Order CDC Id can be set to the CDC Id value selected from the Order Header 1200 or Order Header History 1278 record. The Receive RDC Reverse Shipment Data Program (317) can use the selected Order Header 1200 (or Order Header History 1278) data to update the first record written to the Item Return Detail table 1268 and each subsequent Item Return Detail record 1268 written to the table having the same Item Return Id, for example, as follows: Retailer Order Number and Order Date/Time can be set to the values selected from the Order Header 1200 or Order Header History 1278 record.

After reading through and updating the Status on all the records in each data file, the Receive RDC Reverse Shipment Data Program (317) can send the data file back to the CDC server from which it was received. Upon receiving each data file on the CDC server, a CDC Reverse Shipment Maintenance Program (386) can read each record in the data file, verify that its Status is a value such as "record received", and delete its corresponding record in the database, using its Item Return Id, CDC Outbound Package Id, or CDC Reverse Shipment Id. Item Return Header and Item Return Detail data files can be processed after both data files have been received. If the Receive RDC Reverse Shipment Data Program (317) is unable to write a new record to the ePD Shipping Application's database from the data file successfully, the Receive RDC Reverse Shipment Data Program (317) can move the unsuccessfully written data file record from the data file to an error file or table for later error processing.

In a further aspect of the invention, RDC workers can use a Receive RDC Reverse Shipment Program (319) of the ePD Shipping Application to receive CDC reverse shipments into an origination RDC 1180-2, step 1408. The cargo cages and large item return/CDC outbound packages making up the CDC reverse shipments can be physically moved from a trailer conveyor (204) onto a local market receiving dock conveyor (14) in a manner consistent with the way retailer shipments can be received into a RDC 1180-2. To start the Receive RDC Reverse Shipment Program (319) a RDC worker can select the Receive RDC Reverse Shipment Program's (319) start option on a workstation upon which it is located. After starting the Receive RDC Reverse Shipment Program (319) a RDC worker can, for example, scan their employee id card and the CDC reverse shipment label on a CDC reverse shipment to trigger an update to the records related to the CDC reverse shipment. The Receive RDC Reverse Shipment Program (319) can select the record on the CDC Reverse Shipment table 1274 having the CDC Reverse Shipment Id of the scanned CDC reverse shipment label and can update it, for example, as follows: Status can be set to a value such as "received"; Receiving Employee Id can be set to the value from the scanned employee id card; and CDC Reverse Shipment Arrival Date/Time can be set to the current date/time. After updating the CDC Reverse Shipment record 1274, the Receive RDC Reverse Shipment Program (319) can use the CDC Reverse Shipment Id of that updated record 1274 to select the Item Return Header records 1266 and CDC Outbound Package records 1270 having that CDC Reverse Shipment Id. The Receive RDC Reverse Shipment Program (319) can update the Status on each selected Item Return Header record 1266 and CDC Outbound Package record 1270 to a value such as "destination RDC" and "origination RDC" respectively.

Item return packages and CDC outbound packages can travel from a local market receiving dock conveyor (14) onto the inbound section of the RDC sort conveyor (16) and then onto the outbound section of the RDC sort conveyor (18). As the item return packages and CDC outbound packages move past the teams of workers performing the RDC sort process, step 1112A (FIG. 13), those workers can look at the RDC Id on the labels of the item return packages and CDC outbound packages to identify the ones that can be added to the RDC shipment they are currently building. The RDC workers can, for example, pick the item return packages and CDC outbound packages matching their RDC shipment, scan their labels using the stationary scanner located next to the side of the RDC shipping dock conveyor (22), and place them into a cargo cage on the shipping dock conveyor (22). As each item return package or CDC outbound package is scanned, the RDC Shipment Program (318) of the ePD Shipping Application can write the RDC Shipment Id of the RDC shipment, being built on the shipping dock conveyor (22) associated with the stationary scanner used, to the RDC Shipment Id field on the Item Return Header record 1266 of the scanned item return package or the CDC Outbound Package record 1270 of the scanned CDC outbound package. If a RDC worker scans an item return package or CDC outbound package to start a new RDC shipment, the RDC Shipment Program (318) can create a new RDC Shipment record 1216 in the same way that it can create a new record when scanning a case of ordered items, except Destination RDC Id on the new RDC Shipment record 1216 can be set to the RDC Id value from the selected Item Return Header record 1266 or CDC Outbound Package record 1270 instead of from a selected Case record 1208. Item return packages and CDC outbound packages that are labeled with the current RDC Id can be picked from the outbound section of the RDC sort conveyor (18) to the local market sort conveyor (24) by the same team of workers that is picking cases labeled with the current RDC Id from the outbound section of the RDC sort conveyor (18) to the local market sort conveyor (24).

In another aspect of the invention item return packages and CDC outbound packages can be shipped as part of a RDC shipment from an origination RDC 1180-2 to a destination RDC 1180-3 in step 1114A. A RDC shipment arriving at its destination RDC 1180-3 may contain item return packages and CDC outbound packages as well as cases of ordered items. The cargo cages containing the item return packages and CDC outbound packages, as well as the cases of ordered items, can be received into the destination RDC 1180-3 in step 1116A, and can be moved from the trailer conveyor (204) to the RDC inbound receiving dock conveyor (32), to the unloading section (34), case diverting section (38), and local market connection (36) of the RDC inbound conveyor, and up onto the local market sort conveyor (24) in the same way as described in step 1116 (FIG. 1). One difference between step 1116A and step 1116, can be that item return packages and CDC outbound packages which were not described in step 1116 can also be moved to the local market sort conveyor (24) along with the cases described in step 1116. In step 1116A, a RDC worker can perform the same actions as described in step 1116 to initiate the Receive RDC Shipment Program (324), and the Receive RDC Shipment program (324) can perform the same steps, as detailed in step 1116, to update, for example, the RDC Shipment record 1216 of the RDC shipment in the database on the origination RDC's 1180-2 server and the RDC Shipment Receiving record 1218 of the RDC shipment in the database on the current destination RDC's 1180-3 server. In addition to updating and moving all the Case 1208, Order Header 1200, and Order Detail 1202 records associated with the current RDC shipment from the database on the origination RDC's 1180-2 server to the database on the destination RDC's 11803 server, the Receive RDC Shipment Program (324) can also update and move the Item Return Header 1266, Item Return Detail 1268, and CDC Outbound Package 1270 records associated with the current RDC shipment from the database on the origination RDC's 1180-2 server to the database on the destination RDC's 1180-3 server. The Receive RDC Shipment program (324), running on the destination RDC's 1180-3 server, can use the remote connection that it established to the origination RDC's 1180-2 server and the RDC Shipment Id, from the record on the RDC Shipment Receiving table 1218 having the Trailer Id that was scanned when the RDC shipment was received, to select the Item Return Header records 1266 and CDC Outbound Package records 1270 from the origination RDC's 1180-2 server having that RDC Shipment Id. The Receive RDC Shipment Program (324) can update the Status of the selected Item Return Header records 1266 to a value such as "origination RDC" and the Status of the selected CDC Outbound Package records 1270 to a value such as "destination RDC". The Receive RDC Shipment Program (324) can use the Item Return Id's of the Item Return Header records 1266 to select their associated Item Return Detail records 1268. The Receive RDC Shipment program (324) can move the selected Item Return Header 1266, Item Return Detail 1268, and CDC Outbound Package 1270 records from the database on the origination RDC's 1180-2 server to the database on the current destination RDC's 1180-3 server. The RDC into which a RDC shipment arrives can be referred to as its destination RDC 1180-3, even though it may have been the origination RDC for the items of a return item package and can be reflected as the "origination RDC" in the Status of item return packages.

The item return packages and CDC outbound packages that were moved to the local market sort conveyor (24), during the RDC sort, step 1112A, or the receipt of a RDC shipment, step 1116A, can move around on the local market sort conveyor (24) and pass by the RDC workers performing the local market sort, step 1118A. In addition to scanning case labels to determine if a case should be picked from the local market sort conveyor (24) to the CDC sort conveyor (42) at which a RDC worker is stationed, a RDC worker can look at labels on item return packages and CDC outbound packages to determine if they should pick them from the local market sort conveyor (24) to their CDC sort conveyor (42). The worker can pick an item return package that has a Returns Local Market Id printed on its label that matches the local market id of their CDC sort conveyor (42). Additionally, the worker can also pick a CDC outbound package that has a local market id, embedded in the CDC Id printed on its label, that matches the local market id of their CDC sort conveyor (42). In one embodiment, item return packages and CDC outbound packages do not need to be scanned when picked from the local market sort conveyor (24).

In another aspect of the invention, a RDC worker performing the CDC sort, step 1120A, can scan the label of a CDC outbound package on the CDC sort conveyor (42) to determine if it is for the CDC 1190-3 associated with the CDC packing station conveyor (44) for which the RDC worker is picking cases of ordered items. The CDC Sort Program (328) can determine if the format of the data scanned from the label is for a case or a CDC outbound package. If an item return package label gets scanned, the CDC Sort Program (328) can determine that the scanned data was neither a Case Id nor a CDC Outbound Package Id and can, for example, sound an invalid pick tone. If a case label gets scanned, the CDC Sort program (328) can perform its processing as previously described in step 1120. If a CDC outbound package label gets scanned, the CDC Sort program (328) can use, for example, the scanned CDC Outbound Package Id to select the CDC Outbound Package record 1270 of the CDC outbound package, can validate its RDC Id and Local Market Id values, and can compare its Destination CDC Id value against the CDC Id value of the current instance of the CDC Sort Program (328) (the instance associated with the current CDC packing station conveyor (44)). The RDC Id and Local Market Id values on the selected CDC Outbound Package record 1270 can be validated by the CDC Sort Program (328) in the same way that the RDC Id and Local Market Id values on the Case record 1208 of a scanned case can be validated. The worker who scanned the CDC outbound package can respond to a validation error tone, for example, a double invalid pick warning tone, from a scanned CDC outbound package in the same way the worker responds to a similar validation error tone from a scanned case. If the CDC Sort program (328) can determine that the CDC Id associated with the scanned CDC outbound package does not match the CDC Id associated with the current instance of the CDC Sort Program (328), it can indicate not to pick the scanned CDC outbound package, for example, by sounding an invalid pick tone. Upon hearing an invalid pick tone or another indication not to pick a scanned CDC outbound package, a worker can allow a CDC outbound package or an item return package to pass by them on the CDC sort conveyor (42). If the CDC Sort program (328) determines that the CDC Id associated with the scanned CDC outbound package matches the CDC Id associated with the current instance of the CDC Sort Program (328), it can indicate to pick the scanned CDC outbound package, for example, by sounding a pick confirmation tone. Upon hearing a pick confirmation tone or another indication to pick a scanned CDC outbound package when scanning a CDC outbound package, the worker can pick the CDC outbound package from the CDC sort conveyor (42) and place it on the CDC packing station conveyor (44) at which the worker is stationed.

In another aspect of the invention, CDC outbound packages can be added to a delivery shipment of packages designated for a particular CDC or LDDH, step 1418. A RDC worker, creating an ePD delivery shipment on the CDC feed of a CDC package conveyor (47A) associated with a particular CDC 1190-3 or LDDH 1192-3 by scanning packages that were created at the current destination RDC 1180-3 into cargo cages, step 1124, can also pick and scan CDC outbound packages from the CDC packing station conveyor (44) associated with that CDC 1190-3 or LDDH 1192-3 in step 1418. The worker can place each CDC outbound package picked from the CDC packing station conveyor (44) into a cargo cage of the current delivery shipment that the worker is creating. Upon scanning a CDC outbound package label, the worker's instance of the Delivery Shipment Creation Program (340) can, for example, recognize the format of the scanned value as a CDC Outbound Package Id instead of a Package Id, use the scanned CDC Outbound Package Id to select the appropriate CDC Outbound Package record 1270, display the Package Size of the selected record 1270 on the workstation running the Delivery Shipment Creation Program (340), and prompt the worker to confirm or override the displayed Package Size. After the worker confirms or overrides the displayed Package Size, the Delivery Shipment Creation Program (340) can update, for example, the selected CDC Outbound Package record 1270 by setting its Status to a value such as "delivery shipment" and writing the Delivery Shipment Id, of the current delivery shipment being created, to its Delivery Shipment Id field. If the worker overrode the displayed Package Size value instead of confirming it, the Delivery Shipment Creation program (340) can also update the Package Size on the selected record 1270 to the value entered by the worker and can write data values from the selected record 1270 to a table or file that can be used to create an exception report of CDC outbound packages which have had their Package Size overridden. The data fields which can be written to the table or file can include, but are not limited to the CDC Outbound Package Id, Shipping Customer Id, Delivery Type, original Package Size, overriding Package Size, and Employee Id of the worker creating the delivery shipment (this value is not read from the selected CDC Outbound Package record 1270, but can be scanned into the Delivery Shipment Creation program (340)). An exception report of CDC outbound packages, which have had their Package Size overridden, can later be used for making billing adjustments to the package senders of the CDC outbound packages listed on that exception report.

After a CDC outbound package has been added to a delivery shipment in step 1418, the CDC outbound packages can be shipped in bulk, as in step 1420, to the CDC 1190-3. The method can follow the same physical movement from the CDC feed of a CDC package conveyor (47A) all the way to being retrieved from a SBU bin at a CDC 1190-3 by its recipient in step 1150A. With reference to FIG. 13, these steps can be similar to those previously described for the CDC in FIG. 1. Hence, step 1140 can be equivalent to 1140A; step 1142 can be equivalent to step 1142A; step 1144 can be equivalent to step 1144A; step 1148 can be equivalent to step 1148A; and step 1150 can be equivalent to step 1150A. The programs used to reserve SBU bins, make adjustments to delivery shipments, and make SBU configuration adjustments for the packages of a delivery shipment can account for CDC outbound packages in the same way as they account for packages created in a destination RDC 1180-3. The programs used to load packages into SBU bins, notify recipients that packages have been delivered to a CDC 1190-3, and unload packages from SBU bins can process the movement of CDC outbound packages in the same way that they process the movement of packages created in a destination RDC 1180-3, except that a CDC Outbound Package Id can be written to the Package Id field on a Bin Inventory record 1300 instead of a Package Id, and updates can be made to the Status, Notification Date/Time, and Pickup Date/Time on a CDC Outbound Package record 1270 associated with a CDC outbound package instead of the Package 1234, Order Detail 1202, and Order Header 1200 records associated with a package (the programs can update the Status of a CDC Outbound Package record 1270 to the same values to which the Status of an Order Detail record 1202 can be updated). CDC outbound packages which can be added to delivery shipments bound for an LDDH 1192-3 instead of a CDC 1190-3 can be physically moved and logically tracked in the same way as packages created in a destination RDC 1180-3, except that data can be read and updated from CDC Outbound Package records 1270 instead of Order Header 1200, Order Detail 1202, and Package 1234 records. The billing process, step 1138 (FIG. 1), that follows the notification of delivery of ordered items to a CDC 1190-3 or the actual delivery of ordered items to a specific address can be unnecessary after the delivery of CDC outbound packages, because the package sender had already been charged at the time the CDC outbound package was sent. If the original shipping charge for a CDC outbound package was based upon a Package Size that was later overridden by a shipper, the package sender can be billed for additional shipping costs or refunded for an excessive shipping payment. Billing or refunding package senders for differences in shipping costs due to an incorrect estimation of Package Size can be facilitated by using an exception report of CDC outbound packages which have had their Package Size overridden. Following step 1418, CDC outbound packages bound for a CDC 1190-3 can be referred to collectively, along with packages created at a destination RDC 1180-3, as bulk delivered packages, since they will both be treated the same as they are delivered in bulk to a CDC 1190-3 and loaded into SBU bins.

In a further aspect of the invention, RDC returns shipments can be created by grouping item return packages by the retailer returns facilities for which they are bound in step 1410. One or more RDC workers creating RDC returns shipments bound for the returns facilities of retailers within a local market can be stationed at some point along a CDC sort conveyor (42) associated with that local market. The workers can, for example, wear hands-free scanners that can communicate with a workstation, which can run an instance of the RDC Returns Shipment Creation Program (341) of the ePD Delivery Application. A RDC worker can start the RDC Returns Shipment Creation Program (341) on the workstation and can scan their employee id card, before adding item return packages to a RDC returns shipment. Other RDC workers with hands-free scanners communicating with that workstation can scan their employee id cards to sign on to the RDC Returns Shipment Creation Program (341) and can work as a team with the worker who started the RDC Returns Shipment Creation Program (341), to add item return packages to RDC returns shipments. As item return packages move past them on the CDC sort conveyor (42), they can scan the item return labels to pick them for the RDC returns shipments they are creating. If a CDC outbound package gets scanned instead of an item return package, the RDC Returns Shipment Creation Program (341) can, for example, sound an invalid pick tone and display a message on the workstation to indicate that the scanned package should not be picked. When a worker creating RDC returns shipments scans an item return package, the RDC Returns Shipment Creation Program (341) can select an Item Return Header record 1266 using the Item Return Id value from the scanned item return package label. With reference to FIG. 9G, the RDC Returns Shipment Creation program (341) can use the ePD Retailer Id on the selected Item Return Header record 1266 to select a record from a RDC Returns Shipment table 1276 having that ePD Retailer Id and a Status value such as "open". If the RDC Returns Shipment Creation Program (341) is able to select a record 1276 with the ePD Retailer Id of the scanned item return package and a Status such as "open", it can, for example, sound a pick confirmation tone, and display a message to indicate that the item return package should be picked for the RDC returns shipment of the retailer associated with the scanned item return package (the retailer having an ePD Retailer Id embedded in the Item Return Id of the scanned item return package label). The worker can, for example, pick the item return package from the CDC sort conveyor (42), scan the RDC returns shipment label of the RDC returns shipment for the retailer associated with the picked item return package (on a label plate on one of its cargo cages), and place the item return package into one of the cargo cages of that RDC returns shipment. The RDC Returns Shipment Creation Program (341) can validate that the RDC Returns Shipment Id on the scanned RDC returns shipment label matches the RDC Returns Shipment Id of the selected RDC Returns Shipment record 1276. If the RDC Returns Shipment Id on the scanned RDC returns shipment label passes validation, the RDC Returns Shipment Creation Program (341) can update the selected Item Return Header record 1266, for example, as follows: Status can be set to a value such as "RDC returns shipment"; and RDC Returns Shipment Id can be set to the value of the selected RDC Returns Shipment record 1276. The RDC Returns Shipment Creation Program (341) can also compare the Employee Id of the worker who scanned the item return package against the values of the RDC employee id fields (RDC Employee Id #1 through RDC Employee Id #5) on the selected RDC Returns Shipment record 1276 and can add the worker's Employee Id to the first available RDC Employee Id field if it is not already on the record 1276. After making the record updates, the RDC Returns Shipment Creation Program (341) can, for example, sound a confirmation tone and display a message to confirm that the scanned item return package was added to the scanned RDC returns shipment successfully. If the scanned RDC returns shipment label does not pass validation, the RDC Returns Shipment Creation Program (341) can, for example, sound an invalid warning tone, and display a message to alert the worker that a RDC returns shipment label of a different retailer's RDC returns shipment was scanned and to indicate the ePD Retailer Id of the scanned item return package.

In a further aspect of the invention, the instance of the RDC Returns Shipment Creation Program (341) that the workers can be logged into can track and differentiate between the scanning actions of one worker from the scanning actions of another by associating a unique identifier of the scanning device used by each worker with the data scanned by that device. For example, if the first scan registered by the RDC Returns Shipment Creation Program (341) was from a first worker scanning an item return package, the second scan registered by the RDC Returns Shipment Creation Program (341) was from a second worker scanning an item return package, and the third scan registered by the RDC Returns Shipment Creation Program (341) was from the first worker scanning a RDC returns shipment label, the RDC Returns Shipment Creation Program (341) would be able to differentiate between the scans of the two different devices and would validate the third scan against the first scan, since that was the next sequential scan by that scanning device.

If the RDC Returns Shipment Creation Program (341) was unable to find a record with the ePD Retailer Id of the scanned item return package and a Status value such as "open", when the item return package label was scanned, the RDC Returns Shipment Creation Program (341) can, for example, create a new RDC Returns Shipment record 1276, print a RDC returns shipment label, sound a pick confirmation tone, and display a message on the workstation's display monitor indicating that a new RDC returns shipment should be created for the scanned item return package. The new RDC Returns Shipment record 1276 can be created, for example, as follows: RDC Returns Shipment Id can be created by concatenating the RDC Id of the current destination RDC 1180-3+the ePD Retailer Id from the selected Item Return Header record 1266+the current date+a three digit sequential number; Status can be set to a value such as "open"; ePD Shipper Id can be set to the value of the shipper operating the current destination RDC 1180-3; ePD Retailer Id can be set to the value from the selected Item Return Header record 1266; RDC Id can be set to the value of the current destination RDC 1180-3; Temperature Code can be set to a value such as "standard" (non-standard temperature items can be returned via a more direct route to a retailer's returns facility); and RDC Employee Id #1 can be set to the Employee Id of the worker who scanned the item return package (which can be associated with the unique identifier of the scanning device used to scan the item return package).

The RDC returns shipment label printed by the RDC Returns Shipment Creation Program (341) can include, but is not limited to the following information: RDC Returns Shipment Id in both a readable format and a barcode format. The worker who scanned the item return package which initiated the new RDC returns shipment can take the label from the workstation's label printer, affix it to a label plate, place the label plate in the label plate holder of an empty cargo cage, place the scanned item return package into the cargo cage, and scan the new label to add the scanned item return package to the new RDC returns shipment.

Any one of the workers creating RDC returns shipments for the retailers of a particular local market can close a RDC returns shipment, by selecting a program option of the RDC Returns Shipment Creation Program (341), such as the "close shipment" option, and then scanning the RDC returns shipment label of the RDC returns shipment to be closed.

When a program option of the RDC Returns Shipment Creation Program (341) such as the "close shipment" option is selected, the RDC Returns Shipment Creation Program (341) can update the Status of the RDC Returns Shipment record 1276 to a value such as "closed". Because RDC returns shipment can be shipped with other RDC returns shipments or delivery shipments bound for the same local market, a worker can close a RDC returns shipment when it is the size of a full-trailer-load or at any time when it is smaller than the size of a full-trailer-load. A RDC returns shipment can be built on top of a RDC returns shipment conveyor (62), next to the CDC sort conveyor (42) of the local market for which it is bound, or it can be built near that RDC returns shipment conveyor (62) and then positioned on that RDC returns shipment conveyor (62) with other closed RDC returns shipments, once it has been closed. RDC returns shipments can be moved from a RDC returns shipment conveyor (62) to a package conveyor (46A or 46B) in a coordinated manner to position them near one or more delivery shipments from the same local market to create a full-trailer-load.

In another aspect of the invention, RDC returns shipments can be moved through the destination RDC 1180-3 and loaded onto tractor-trailers (200 & 202) leaving the destination RDC 1180-3 for a local market in the same manner as described for (and possibly along side of) delivery shipments containing packages of ordered items and/or CDC outbound packages. Step 1412 shows this shipment of the item return packages to retailer returns facility. One difference in the process of loading a RDC returns shipment onto a tractor-trailer (200 & 202) as compared to a delivery shipment can be that the Delivery Shipment Program (342) can verify and reserve available bin space for the packages and CDC outbound packages of a delivery shipment, but the Delivery Shipment Program (342) does not need to do so for the item return packages of a RDC returns shipment. If a RDC returns shipment label is scanned by a worker running the Delivery Shipment Program (342), the Delivery Shipment Program (342) can select the RDC Returns Shipment record 1276 having the scanned RDC Returns Shipment Id and can update it, for example, as follows: Status can be set to a value such as "reported"; Trailer Loading Employee Id can be set to the value of the employee id card scanned by the worker running the Delivery Shipment Program (342); Trailer Id can be updated to the value of the scanned Trailer Id barcode; and RDC Returns Shipment Loading Date/Time can be set to the current date/time. The Delivery Shipment Program (342) can store the RDC Returns Shipment Id from the scanned RDC returns shipment label to be printed in both a readable description and a barcode format on the Delivery Shipments Report when it is printed. The Delivery Shipment Program (342) can use the ePD Retailer Id on the selected RDC Returns Shipment record 1276 to select the retailer's record from the Retailer table 1246 and can store the ePD Retailer Description, Returns Facility Id, and the address of the retailer's returns facility (Returns Address 1, Returns Address 2, Returns City, Returns State, Returns Zip) from the selected Retailer record 1246 to be printed on the Delivery Shipments Report when it is printed. After a RDC worker scans all the delivery shipments and RDC returns shipments of the full-trailer-load and selects a program option to end the Delivery Shipment Program (342) and print the Delivery Shipments Report, the delivery shipments and RDC returns shipments can be loaded onto the tractor-trailer (200 & 202) as previously described in this disclosure.

In yet a further aspect of the invention, a RDC Returns Shipment Data Transfer Program (343) can run as a service on the destination RDC's 1180-3 server to monitor the RDC Returns Shipment table 1276, searching for records with a Status value such as "reported". The RDC Returns Shipment Data Transfer Program (343) can select RDC Returns Shipment records 1276 having a Status value such as "reported", update the Status of each selected record to a value such as "in-transit", and use the RDC Returns Shipment Id of each selected record 1276 to select Item Return Header records 1266 having that RDC Returns Shipment Id. The RDC Returns Shipment Data Transfer Program (343) can write the selected Item Return Header records 1266 into a new Retailer Returns Header data file, and can use the Item Return Id's of the selected Item Return Header records 1266 to select their associated Item Return Detail records 1268. The RDC Returns Shipment Data Transfer Program (343) can write the selected Item Return Detail records 1268 into a new Retailer Returns Detail data file. The RDC Returns Shipment Data Transfer Program (343) can write the ePD Retailer Id and RDC Returns Shipment Id of each selected RDC Returns Shipment record 1276 and the current date/time to the file header of both data files created for that RDC returns shipment. The RDC Returns Shipment Data Transfer Program (343) can also use the ePD Retailer Id of each selected RDC Returns Shipment record 1276 to select that retailer's record from the Retailer table 1246 and can, for example, use the information in its Connection Script field to connect to the retailer's server and transfer the Retailer Returns Header and Retailer Returns Detail data files from the destination RDC's 11803 server to the retailer's server. A Receive RDC Returns Shipment Data Program (311) of the retailer's instance of the ePD Shipping Application can run as a service on a workstation or server at a retailer's returns facility to read Retailer Returns Header and Retailer Returns Detail data files as they are received and can create Item Return Header 1266 and Item Return Detail 1268 records on the database of the retailer's instance of the ePD Shipping Application. In step 1414, workers at a retailer returns processing facility can receive and process return item packages. One of the workers at a retailer's returns facility can initiate the Receive RDC Returns Shipment Program (313) of the retailer's instance of the ePD Shipping Application on a workstation, can scan their employee id card, and can then scan the RDC returns shipment label on a RDC returns shipment arriving at the returns facility to receive it from a shipper. The Receive RDC Returns Shipment Program (313) can use the RDC Returns Shipment Id to select and update, for example, the Item Return Header records 1266 associated with the received RDC returns shipment, for example, as follows: Status can be set to a value such as "returned"; and Item Return Retailer Receipt Date/Time can be set to the current date/time. After updating the Item Return Header records 1266, the Receive RDC Returns Shipment Program (313) can create a simple RDC Returns Shipment Receipt Confirmation data file containing the RDC Returns Shipment Id of the received RDC returns shipment, the Employee Id value scanned from the retailer worker's employee id card, and the Item Return Retailer Receipt Date/Time. The Receive RDC Returns Shipment Program (313) can use the RDC Id from one of the Item Return Header records 1266 associated with the current RDC returns shipment (each Item Return Header record 1266 associated with the current RDC returns shipment should have the same RDC Id) to send the RDC Returns Shipment Receipt Confirmation data file to the destination RDC 1180-3 from which the RDC returns shipment originated.

Upon receiving a RDC Returns Shipment Receipt Confirmation data file from a retailer's returns facility, a RDC Returns Shipment Update Program (388) of the shipper's instance of the ePD Delivery Application can use the RDC Returns Shipment Id in the data file to select the RDC Returns Shipment record 1276 and all of the Item Return Header records 1266 associated with the RDC returns shipment. The RDC Returns Shipment Update Program (388) can update the selected RDC Returns Shipment record, for example, as follows: Status can be set to a value such as "received"; Retailer Employee Id can be set to the Employee Id in the received data file; and RDC Returns Shipment Arrival Date/Time can be set to the Item Return Retailer Receipt Date/Time in the received data file. The RDC Returns Shipment Update Program (388) can update, for example, the Status to a value such as "returned" on each selected Item Return Header record 1266. The data on the Item Return Header 1266 and Item Return Detail records 1268 with a Status value such as "returned" can be used by a shipper, in step 1416, to bill retailers for delivering item return packages. The Status of the Item Return Header record 1266 can be updated to a value such as "billed" after the billing step is complete. For example, shippers can bill retailers for each item return package or for the total number of items returned by using the data contained in the Item Return Header 1266 and Item Return Detail 1268 records associated with a delivered (returned) item return package.

In another embodiment of the invention, various entities can coordinate with each other to perform each of the different steps within the ePD Delivery Process. For example, a retailer can capture orders; a product fulfillment concern can pick cases of ordered items and prepare them for shipment to an origination RDC; a retailer, shipper, or other organization can transport cases of ordered items to an origination RDC; a separate organization can operate an origination RDC and forward cases of items to a destination RDC operated by another organization; bulk delivered packages can be delivered to CDC's by a shipper; a separate organization can operate a CDC; and yet another organization can bill retailers, customers or recipients for orders delivered to CDC's. Without departing from the spirit of the invention, there can be many different combinations of the various entities being responsible for the different steps within the ePD Delivery Process, from having one organization do everything to having a different organization responsible for each step.

In another aspect of the invention, a shipper can operate CDC's exclusively for the bulk delivered packages it is delivering. The secured backroom area (154) of a CDC may not require the holding cages (134) since all bulk delivered packages which can be left in the backroom area (154) can be for the same shipper, and only the workers of that shipper can have access to that CDC's backroom area (154). Even though only one shipper can be sending packages to that CDC, the tables, data views, and programs that enable the functionality of reserving SBU bins within a CDC can still function to reserve bins for the bulk delivered packages or CDC outbound packages of each delivery shipment in the order in which they are shipped. This can allow a shipper to make delivery shipment adjustments to ensure that a delivery shipment is not sent to a CDC, when that CDC does not have the capacity to accept all of the bulk delivered packages and/or CDC outbound packages of that delivery shipment.

In another embodiment of the invention, a customer order taken by a retailer can be fulfilled from more than one retailer fulfillment site. A retailer (or other equivalent business that can accept and fulfill orders) can accept an order from a customer for various items that it sells. The items to fill that order can be shipped in cases, organized by a common item identifier, from more than one fulfillment site to one or more origination RDC's to fill that order. One or more of the fulfillment sites can be owned and/or operated by the retailer accepting the order, or the fulfillment sites can be owned and/or operated by a manufacturer, another retailer, or another entity with which the retailer has contracted to fulfill its orders. In this embodiment, orders can be captured and recorded in Order Header 1200 and Order Detail records 1202 by the retailer in the same nature as described in the embodiment depicted in FIG. 2, except for the following differences related to the structure and data contained on the Order Header 1200 and Order Detail 1202 tables to enable this embodiment: the ePD Retailer Id field can be included on the Order Detail record 1202 instead of the Order Header record 1200 to allow for more than one ePD Retailer Id to be associated with an order, and an Order Processing Retailer Id field can be included on the Order Header record 1200 to capture the identifier associated with the one retailer having overall responsibility for that order. The ePD Retailer Id can identify the retailer fulfillment site (or other equivalent business' fulfillment site) from which the ordered items of a particular Order Detail record 1202 can be sourced. The Order Processing Retailer Id can identify the retailer, manufacturer, or other entity that can capture a customer's order in an Order Header record 1200 and one or more Order Detail records 1202. After capturing an order, the database of the instance of the ePD Shipping Application being run at each fulfillment site identified by an ePD Retailer Id that is listed on one of the Order Detail records 1202 of an order can be sent a copy of that order's Order Header record 1200 and a copy of each Order Detail record 1202 having the ePD Retailer Id associated with that fulfillment site. The copies of the appropriate Order Header 1200 and Order Detail 1202 records can be sent at the time that the retailer receives the order from the customer or at a later interval via a batch process. After receiving the copies of the Order Header 1200 and Order Detail 1202 records related to an order, a fulfillment site can pick cases of items to meet the orders it receives in the same manner as described in the embodiment depicted by FIG. 2. The cases of ordered items can be sent from each retailer fulfillment site to its associated RDC (depending upon the shipper being used for the order), and depending upon the location of the different retailer fulfillment sites sourcing an order, the items of that order may initially be received into several different origination RDC's. Processing steps consistent with the embodiment described for FIG. 2, can be performed to sort, transport, combine into packages, and deliver packages of the ordered items to a CDC in bulk or to customer-specified address, regardless of from how many retailer fulfillment sites those ordered items originated. The retailer responsible for the entire order can be tracked and billed using the Order Processing Retailer Id on the Order Header record 1200.

In yet another embodiment of the invention, there can be retailers creating bulk delivered packages at their fulfillment sites and shipping those retailer-created bulk delivered packages to a RDC. Retailers can pick items and create bulk delivered packages at their fulfillment sites to fill each customer order. Customer orders can either be picked individually or batch picked and sorted at a packing station to create bulk delivered packages to fill customer orders. A retailer can, for example, print a packing list and a package label for each customer order, place the packing list inside the bulk delivered package, and affix the package label on the outside of the bulk delivered package. The package label can contain a Package Id in barcode format and a RDC Id and CDC Id in readable format. The bulk delivered packages created at the retailer fulfillment site can be shipped to a RDC by the retailer or a shipper on a tractor-trailer or other cargo carrying transport for further processing. Retailer-created bulk delivered packages labeled with a RDC Id different than the RDC which received the bulk delivered packages from the retailer fulfillment site (the origination RDC) can be sorted by RDC Id (in the RDC sort process) at the origination RDC, forwarded to the appropriate destination RDC as part of a RDC shipment, and shipped out of the destination RDC to a CDC or LDDH as part of a delivery shipment. Retailer-created bulk delivered packages labeled with the RDC Id of the origination RDC can pass through the RDC sort at the origination RDC, move into the local market sort, be picked directly from the CDC sort conveyor (42) into a delivery shipment, and be shipped out of the RDC as a bulk delivered package to a CDC or LDDH in one of the local markets served by that RDC. In a further aspect of the invention, the retailer-created bulk delivered packages, that have a CDC Id, which is in the same local market as the retailer fulfillment site in which that bulk delivered package was created, can be grouped by CDC Id and shipped directly to a CDC or LDDH within that local market by the retailer or a shipper. In this embodiment, all other retailer-created bulk delivered packages can be shipped to a RDC. In a further aspect of the invention, the retailer-created bulk delivered packages having any CDC Id can be grouped by CDC Id at a retailer fulfillment site and shipped directly to the CDC or LDDH to which it should be delivered without first being shipped to a RDC.

The invention can further include more than one retailer-created bulk delivered package that can be combined together to create fewer, larger bulk delivered packages. Retailers can create bulk delivered packages at their fulfillment sites and send them on retailer shipments to an origination RDC. The processing at an origination RDC can include sorting the retailer-created bulk delivered packages by RDC Id and forwarding them to their destination RDC in RDC shipments. The processing at a destination RDC can include sorting the retailer-created bulk delivered packages by CDC Id, and then by Customer Id within the group of retailer-created bulk delivered packages organized by CDC Id. Once grouped by Customer Id within a CDC Id, multiple retailer-created bulk delivered packages can be combined into a larger package to be delivered for a package recipient at a CDC or a customer specified address. This embodiment can require an addition level of sorting, but can decrease the number of bulk delivered packages that need to be handled in delivering customer orders.

In a further embodiment of the invention, the programs used to sort cases and create bulk delivered packages at a RDC can function without using Temperature Code. In this embodiment, Temperature Code may not even be tracked on the tables and data views upon which it is tracked in the main embodiment, and the Package Creation Program (330) can create bulk delivered packages by grouping picked items into bulk delivered packages by CDC Id-Customer Id combination, instead of by CDC Id-Customer Id-Temperature Code combination.

Another aspect of the invention can include creating retailer-specific bulk delivered packages at a destination RDC. Retailers can ship cases of ordered items to an origination RDC to create bulk delivered packages at a destination RDC as described in the main embodiment. The receiving, inter-RDC shipping, and sorting processes described in the main embodiment can occur in this embodiment, except that the Package Creation Program (330) can create retailer-specific bulk delivered packages by grouping picked items into packages by CDC Id-Customer Id-Temperature Code-ePD Retailer Id combination, instead of by CDC Id-Customer Id-Temperature Code combination. If Temperature Code is not an active factor used to segregate items into bulk delivered packages for recipients, then CDC Id-Customer Id-ePD Retailer Id combination can be used instead of using CDC Id-Customer Id combination. By adding ePD Retailer Id to the Package Creation Program's (330) criteria for determining whether to direct a worker to pick an item for a bulk delivered package, a different bulk delivered package can be created to hold the items ordered from each retailer, to be delivered to a package recipient at a CDC or customer specified location. Each bulk delivered package can contain ordered items from only one retailer.

In yet a further embodiment of the invention, bulk delivered packages can be sent from more than one RDC to a CDC. This can increase the number of ordered items that can be shipped to a CDC from an origination RDC, rather than being shipped as part of a RDC shipment to a destination RDC, before being shipped to a CDC. By eliminating the need to transport some items on a RDC shipment, this embodiment could lower the overall shipping cost on some orders. Enabling this embodiment can be more complex than the main embodiment described, however, as the Pick List Report Program (310) would need to be able to determine if the shipper's origination RDC is a RDC which delivers to the CDC or LDDH associated with an order, and if it is not, the Pick List Report Program (310) would need to be able to determine which RDC Id, of more than one possible RDC, to write to an Order Header record 1200. To enable this embodiment, a decision table or a set of processing rules could be created for and utilized by the Pick List Report Program (310) to compare one of the possible RDC Id's against the RDC Id of the shipper's origination RDC for that particular retailer fulfillment site. In another aspect of the invention, a shipper can operate a distribution network in which one centralized RDC can be utilized to receive all retailer shipments and CDC reverse shipments and create bulk delivered packages and delivery shipments to be shipped out to all CDC's and LDDH's. This embodiment can be essentially the same as the main embodiment described in this disclosure, except that a shipper operates only one RDC, a RDC sort sub-process is not needed, RDC shipments do not need to be created, and all cases, CDC outbound packages, and item return packages can move directly into the local market sort sub-process at that shipper's one central RDC following receipt. Assigning a RDC Id to orders for a shipper operating only one RDC can also be simplified by having the programs, which assign a RDC Id to the different records that contain a RDC Id, default to the one RDC Id for that shipper.

In a further embodiment, the local market sort step of the ePD delivery process can be bypassed. A RDC can contain only one CDC sort conveyor, which can be located adjacent to all the CDC packing station conveyors (44) in that RDC. Cases of ordered items, CDC outbound packages, and item return packages, having the RDC Id of the RDC in which they are located, can flow from a RDC sort conveyor (18) or a RDC inbound conveyor (34) directly onto one single CDC sort conveyor, which can be located adjacent to all the CDC packing station conveyors (44) within that RDC to allow workers performing the CDC sort to scan and pick those cases and CDC outbound packages onto their CDC packing station conveyors (44). RDC workers creating RDC returns shipments can be grouped by local market or by groups of retailers and stationed along the one CDC sort conveyor at different points to scan and pick item return packages from the one CDC sort conveyor. This can result in a cost savings associated with not performing the local market sort step, but the CDC sort step may be less efficient and more costly.

Other aspects of the invention can include using multiple local market sort conveyors (24) to perform the local market sort step of the ePD delivery process. In this embodiment, a RDC can have more than one local market sort conveyor (not shown as constructed for this embodiment). Cases of ordered items, CDC outbound packages, and item return packages (having the RDC Id of the RDC in which they are located) can flow from the RDC sort conveyor (18) and the RDC inbound conveyor (34) onto one of the multiple local market sort conveyors. Each local market sort conveyor can move the cases and packages past the CDC sort conveyors (42), which can each represent a different local market. CDC sort conveyors (42) can be grouped together around one of the multiple local market sort conveyors randomly, by geographical location, or by some other logic. RDC workers performing the RDC sort for the current RDC would need to be able to determine to which local market sort conveyor to move the cases and packages. This could be accomplished by scanning the case or package label or reading the Local Market Id embedded in the CDC Id printed on the labels of CDC outbound packages and item return packages. A new RDC activity would need to be performed to enable this embodiment, requiring one or more workers to scan and pick cases from the RDC inbound conveyor (34), and to scan and pick or look at the labels on CDC outbound packages and item return packages and pick them onto one of the multiple local market sort conveyors. In another aspect of the invention, when cases, CDC outbound packages, and item return packages can be separated by RDC Id during the RDC sort at their origination RDC, they can be grouped together into shipments specific to the local market sort conveyors of their destination RDC. The RDC Shipment Program (318) can have the ability to facilitate the creation of an RDC shipment for a subset of the local markets served by a RDC.

In a further embodiment of the invention, the RDC Id can be located on the Order Detail records 1202 instead of Order Header records 1200, or alternately, on both records. This embodiment can reduce or eliminate the number of times that programs need to use the Order Id on an Order Detail record 1202 to select the Order Header record 1200 associated with an order to determine the RDC Id of that order.

Further aspects of the invention can include different methods of data transfer that can be utilized to copy or move data between two databases. Data records can be copied or moved from a table in one database to a table, having the same data structure (and in many situations the same name), in another database. The two databases involved in a data transfer can be located on the same server or on a plurality of servers. Different methods of data transfer can be employed within the ePD Delivery Process for transferring data from a table in a database on one server to a table in a database on another server. The data transfer opportunities can include, but are not limited to the programs that copy or move data between the tables of the database on a retailer server and a RDC server, between two different RDC servers, or between a RDC server and a CDC server. The differences in the method of data transfer can include copying data instead of moving data, moving data instead of copying data, and whether a program "pushes" the data to another program (which can be initiated by the program transferring the data) or "pulls" the data from another program (which can be initiated by the program receiving the data). For example, the Retailer Shipment Program (312), running on a retailer server, can establish a connection to the server of the RDC to which a retailer shipment is headed, at the time the retailer shipment is loaded onto an outbound trailer. The Retailer Shipment Program (312) can move the Retailer Shipment record 1212 associated with that retailer shipment to the Retailer Shipment table 1212 in the RDC server's database. In this exemplary embodiment, the Retailer Shipment Program (312) can also select the Case 1208 and Order Detail 1202 records having the Retailer Shipment Id of the retailer shipment and can move those records and the Order Header 1200 records associated with the selected Order Detail records 1202 to the corresponding tables in the database on the RDC server. Thus, prior to the arrival of that retailer shipment, the database of the RDC to which the retailer shipment is being sent would have a Retailer Shipment record 1212 and one or more Case 1208, Order Detail 1202, and Order Header 1200 records associated with that retailer shipment. The Status on those records would reflect that the retailer shipment is still in transit and has not yet been received—the Status field on those records (on the RDC server's database), in the exemplary embodiment, would have the same values that the Status field on those records (on the retailer server's database) would have in the main embodiment. When the retailer shipment is received into the RDC, the Status values of the Retailer Shipment 1212, Case 1208, Order Detail 1202, and Order Header 1200 records can be updated to reflect that the retailer shipment has been received (the values in the Status fields can be set to the same values, in the exemplary embodiment, that those records would have in the Status field, in the main embodiment, after the retailer shipment had been received). Although the method and timing of when the data can be written to the RDC server can be different in this exemplary embodiment, the material result remains the same, so that the records can be in the database of the RDC server with the appropriate values. Since the records were moved instead of copied, the retailer database does not contain a copy of the records.

In still a further embodiment of the invention, different means can be used to transfer data from one database to another including, but not limited to remote data connections and file transfer. A program of an application that can be connected to one database can establish a remote data connection to a different database, on a different server, to copy or move data from or to that database. Different types of remote data connections can be established between the programs and/or databases on a first server and the programs and/or databases on a second server including, but not limited to the following: a dedicated network connection can be continuously available between the two servers; a high-speed or standard-speed direct dial-up connection can be established; and a high-speed or standard-speed connection can be established through an intermediary service provider. In one aspect of the invention, a first program can create and send one or more files containing data from a first database on a first server (or a workstation connected to the first server) to a second server (or a workstation connected to the second server).

A second program can later read the files and write the data contained therein to a second database on the second server to complete the action of copying or moving data from the first database to the second database. The program initiating the creation of the file can be on the first server or the second server. There can also be a separate program or service to initiate the transfer of the files from one server to another, instead of having one program create and send the files. The timing of the file transfer can be immediate (real-time) or scheduled (batch) for a specified future time or at a regular interval. The files can be sent over a private network, a public network, or the internet. Varying file encryption/data encryption standards can be used to protect the data being sent in the files.

In yet another embodiment of the invention, a wireless network architecture can be used at retailer fulfillment sites, RDC's, and/or CDC's to connect workstations to servers, servers to other servers, workstations and/or servers to various types of scanning devices, and workstations and/or servers to automated equipment and other peripheral devices including, but not limited to conveyors, printers, CDC packing stations (45), digital video cameras, electronically locking doors, and SBU's. The type of technology enabling a wireless network at a retailer fulfillment site, RDC, and/or CDC can be radio frequency (RF), home RF, Bluetooth, WAP, and/or any other suitable type of wireless networking technology. An in-building wireless system employing, for example, TDMA, CDMA, AMPS or GSM can be used. One example of using a wireless network architecture can involve using a RF system in a CDC. In this exemplary embodiment, a CDC worker can use a hands-free scanner connected to the CDC server of a CDC via a RF system. The worker can scan their employee id card to log in to the Loading Program (356) and a SBU label on the outside of one of the SBU's. SBU's can have label(s) on their exterior with their SBU Id in barcode format, and scanning the label on a SBU (after having scanned an employee id card) can trigger the same actions that scanning an employee id card, with a scanner that is plugged into a SBU, does in the main embodiment—the Loading Program (356) can move the revolving bins to position the closest available bin in the loading position, unlock the SBU's bin doors, and associate the Employee Id that was previously scanned with any future loading actions performed on that SBU. Those main actions can be in addition to the validation, table updates, and other actions that the Loading Program (356) can perform. The worker can then scan package labels followed by bin door labels as the worker loads bulk delivered packages into that SBU. The Loading Program (356) can function in the same way in response to the scans of a scanning device connected via a wireless network in this embodiment, as it would to the scans of a physically connected scanning device in the main embodiment. The wireless aspect of this exemplary embodiment can allow a CDC worker to load bulk delivered packages into the bins of many SBU's without needing to plug and unplug a network connector in and out of the scanner port of each SBU. The feature of being able to capture a unique identity and associate it with a scanning device can allow a CDC worker to be able to connect to different SBU's and associate the loading actions at each of those SBU's with their Employee Id without having to re-scan their employee id card at each new SBU. These two features can both be enabled as part of an embodiment in which a wireless data architecture is used in a CDC, or each feature can be enabled without the other in other separate embodiments.

In still a further embodiment of the invention, cases, CDC outbound packages, item return packages, and/or bulk delivered packages can be sorted, picked, and/or redirected using automated sorting and picking equipment and programs to move them through a RDC to the places where they can be loaded into RDC shipments, used to create bulk delivered packages, loaded into delivery shipments, or loaded into RDC returns shipments. Automated equipment including optical reading devices mounted near or on conveyors carrying the cases and different types of packages can read barcode or other imprinted formats on the case labels and different package labels to determine if a case or package should be picked. If an automated picking program determines that a case or package should be picked from a conveyor or redirected to another conveyor, based upon the data read from the optical reading device, it can initiate a mechanical device to pick or redirect the case or package from the conveyor. In this embodiment, automated programs and machinery can be used, for example, in place of workers to perform the part of the RDC sort in which cases bound for the current RDC can be picked from the outbound section of the RDC sort conveyor (18) to the local market sort conveyor (24). Another example, in which automated programs and machinery can be used is to replace one or more workers that regulate the flow of cases from the RDC inbound conveyor (34) to the local market sort conveyor (24) by moving the case diverting section of the RDC inbound conveyor (38) at the right times. Automated sorting and picking programs of this nature can also be used to perform the local market sort function and CDC sort function.

In still a further embodiment of the invention, automated sorting programs and equipment can be used to organize delivery shipments and RDC returns shipments into full-trailer-loads. Optical reading equipment to read the label plates containing Delivery Shipment Id's and/or RDC Returns Shipment Id's can provide the data inputs to an automated sorting programs that can move the CDC feed of a CDC package conveyor (47A) and the different independent conveyor sections of the local market feed of a CDC package conveyor (47B) to position different delivery shipments near each other to create a full-trailer-load. Similarly, an automated sorting program can initiate the RDC returns shipment conveyor (62) to move one or more RDC returns shipments into close proximity of one or more delivery shipments on a package conveyor (46A or 46B) to create a full-trailer-load.

In yet another embodiment of the invention, sophisticated automated picking and packing equipment can be used to pick items from cases and redirect them into the open packages in which they should be packed. The automated equipment can be integral part of the physical hardware that makes up a CDC packing station and can function, when directed by the Package Creation Program (330), to insert printed packing lists into bulk delivered packages, close and seal bulk delivered packages, open new bulk delivered packages, and label package bags. In a further aspect of the invention, additional equipment can be added to or changed on a CDC packing station (45) to aid a worker in setting up new bulk delivered packages and in closing and sealing bulk delivered packages, by automating the process of putting a new package bag in a package bag holder or sealing a package bag in a more automated manner. A package bag can be closed and sealed while still in its package bag holder (71 or 72) and the package sealing side of a CDC packing station (FIG. 5) may not need to exist separately from the package creating side of a CDC packing station (FIG. 4).

A further embodiment of the invention can include programs playing brief audio messages instead of sounding tones to convey a more descriptive message. This embodiment can include programs that run in a RDC, CDC, or retailer fulfillment site. The workers using the different programs may wear headsets or ear-bud headphone pieces to ensure that they can differentiate the audio messages intended for them from the ones created by other instances of the same program or other programs, which can be intended for other workers. For example, when a worker performing the local market sort in a RDC scans a case on the CDC sort conveyor (42), at which the worker is stationed, to pick and remove it from the current local market, back to the local market sort conveyor (24), the Local Market Sort Program (326) can play a brief audio message to confirm that a reverse local market sort pick has been processed successfully, such as, "reverse pick confirmed". Any combination of tones, brief audio messages, text messages displayed on workstation display monitors, text messages displayed on scanning devices, and/or indicator lights can be used to alert a worker to a message and relay various messages including, but not limited to warning messages, confirmation messages, error messages, directions, suggestions, and commands.

A further embodiment of the invention can include employing a different amount of validation in the different programs. More validation steps can be added to programs in situations where errors can be more likely, more critical, and/or when the processing required to complete the additional validation does not adversely impact the speed and ease of using that program.

In a further embodiment of the invention, Bin Inventory table records 1300 can exist for every possible bin configuration. There can be an Active Status field on the Bin Inventory table 1300, which can be used to activate and deactivate each record by changing its value from a value such as "inactive" to a value such as "active" and vice versa. As the SBU Configuration Program (352) is run, in this embodiment, the Active Status field on Bin Inventory records 1300 associated with a master bin can be updated to reflect the configuration changes made to that master bin. For example, if a master bin that is divided into two bins, each with a Bin Size of "2", is configured to become one large undivided bin, it will start with two Bin Inventory records 1300 that have an Active Status with a value such as "active"—one of those records having a Configuration Code value such as "12" and the other having a Configuration Code value such as "34". After the configuration adjustment gets made, both of the records which had an Active Status value such as "active" will have an Active Status value such as "inactive". The Active Status of the Bin Inventory record 1300 associated with that master bin that has a Configuration Code such as "1234", can be updated from a value such as "inactive" to a value such as "active". The number of records on the Bin Inventory table 1300 can be much larger than if inactive records were not listed on the table 1300. Configuration adjustment changes can be made more easily, by updating the Active Status field on a few Bin Inventory records 1300 associated with a SBU master bin, instead of creating new Bin Inventory records 1300 and/or deleting existing ones.

In a further embodiment of the invention, each individual case can be scanned to associate it with a retailer shipment, when loading cases into a trailer at a retailer fulfillment site. A Pick List Report does not need to be broken up into pick grouping sections and a worker loading a retailer shipment onto a trailer does not need to scan Pick Grouping Id's as the cases of a retailer shipment are loaded. The worker does need to scan each case as it is loaded onto a trailer to associate it with the retailer shipment. The Retailer Shipment Program (312) can update the Case record 1208 of each case as it is scanned into a retailer shipment by setting its Status to a value such as "on trailer" and writing the Retailer Shipment Id of the current retailer shipment to the Retailer Shipment Id field of the record 1208, instead of updating a group of Case records 1208 having a Pick Grouping Id, as that Pick Grouping Id is scanned on a Pick List Report. The Retailer Shipment Program (312) can also update Order Detail records 1202 with that Retailer Shipment Id and a Status value such as "retailer shipment—back order" or "retailer shipment—new" (depending upon whether its Status was "pick list—back order" or "pick list—new"), for Order Detail records 1202 having the SKU of the scanned case, up to the Quantity of the scanned case.

In still a further embodiment of the invention, a group of cases with sequential Case Id's can be associated with a retailer shipment by scanning the case label of the first and last case in the retailer shipment. Cases can be picked in the sequence in which they can be listed on a Pick List Report and loaded as a retailer shipment in the sequence in which they were picked. In this embodiment, a set of sequential Case Id's can be loaded onto a trailer as a retailer shipment as the worker loading the cases onto the trailer can, for example, scan the case label of the first and last case being loaded, after scanning their employee id card and the trailer label. The Retailer Shipment Program (312) can update the Case record 1208 of the two scanned cases and all of the Case records 1208 listed sequentially in between those two records on the Case table 1208. The Retailer Shipment Program (312) can update the Case records 1208, and can select and update Order Detail records 1202, in this embodiment, consistent with the way in which the Retailer Shipment Program (312) can update Case records 1208 and can select and update Order Detail records 1202 that can be added to a retailer shipment via a scanned Pick Grouping Id in the main embodiment.

In a further embodiment of the invention, cases of ordered items can be labeled as they are received at an origination RDC. The Pick List Report Program (310) can print a Pick List Report that lists the total number of cases of each SKU that should be picked, but does not contain case labels. The Pick List Report Program (310) can create Case records 1208 in the same way as described in the main embodiment. Workers at a retailer fulfillment site can pick the total number of cases needed to fill the orders listed on the Pick List Report and can load them onto one or more trailers as retailer shipments. All the Case records 1208 created by the Pick List Report Program (310) can be sent in a data file or copied through a remote data connection to the database of the origination RDC, to which the retailer shipments containing the cases picked using that Pick List Report are being sent, when the Pick List Report Program (310) is run. Order Detail records 1202 can be selected and sent/copied, so that the total Quantity of all the selected Order Detail records 1202, that have a particular SKU, equals the total Quantity of all the Case records 1208 created by the Pick List Report Program (310), which have that same SKU. The Order Header records 1200 associated with the selected Order Detail records 1202 can also be selected and sent/copied to the RDC database. In this embodiment, Retailer Shipment records 1212 are not created and Case 1208 and Order Detail 1202 records are not updated with a Retailer Shipment Id or a different Status when the picked cases are shipped from the retailer fulfillment site as a retailer shipment. Workers at the RDC, receiving retailer shipments sent from retailer fulfillment sites, can run a program which can print case labels using the Case records 1208 sent/copied from the retailer's database and can update the Status of the copied Case 1208 and Order Detail 1202 records to a value such as "origination RDC". The RDC workers can then label each case as it is received into the origination RDC. The labeled cases can then be processed at the RDC consistent with the description of the main embodiment. This can shift the effort involved in labeling picked cases from workers at a retailer fulfillment site to the workers at an origination RDC, but it may be prone to labeling errors, and it does not provide accurate visibility as to the location of a picked case from the time it is printed on a Pick List Report until the time that it is labeled at the origination RDC.

A further embodiment of the invention can include, labeling cases when they are organized into a retailer shipment at the retailer fulfillment site, instead of when they are picked. The Pick List Report Program (310) can print a Pick List Report containing case labels, but the workers using the report to pick the cases can refrain from labeling cases as they are picked. The cases can be labeled at the shipping dock, after they have been picked, as they are being organized into a retailer shipment. In this embodiment, the Retailer Shipment Program (312) can update Case 1208 and Order Detail 1202 records to associate them with a retailer shipment in a way consistent with the main embodiment, the embodiment in which each case is scanned to associate it with a retailer shipment, or the embodiment in which cases can be associated with a retailer shipment sequentially in between two scanned case records.

In a yet a further embodiment of the invention, the trailers upon which RDC shipments have been loaded can be moved to a RDC inbound receiving dock (31) or from a RDC shipping dock (52) using loading equipment which can be found in an intermodal rail yard. The loading equipment can be located in between the RDC and a rail line adjacent to the RDC. In this embodiment, trailers can be moved from a train to the RDC inbound receiving dock (31) of a RDC, from the RDC inbound receiving dock (31) to the RDC shipping dock (52) of the RDC, and from the RDC shipping dock (52) to a train using loading equipment instead of a drayage vehicle (tractor).

In still a further embodiment of the invention, large conveyors, located outside of a RDC, can be used to move trailers to RDC inbound receiving docks (31), RDC shipping docks (52), and conveyor platforms located along side of a rail line. The conveyor platforms located next to the rail line can serve as loading and unloading points for loading equipment to move the trailers off of and onto a train. The other sections of the large conveyors can be used to move the trailers from the conveyor platforms next to the rail line to conveyor platforms next to the RDC inbound receiving docks (31) of the RDC, from the conveyor platforms next to the RDC inbound receiving docks (31) to conveyor platforms next to the RDC shipping docks (52) of the RDC, and from the conveyor platforms next to the RDC shipping docks (52) to the conveyor platforms next to the rail line.

In a further aspect of the invention, the Package Creation Program (330) can consider ordered items, which can be on RDC shipments heading for the destination RDC in which the program (330) can run, when determining when to close a bulk delivered package that can be in the process of being created. In addition to creating a RDC Shipment Receiving record on the destination RDC database when a RDC shipment is sent from its origination RDC, the RDC Shipment Loading Program (320) can also copy the Case 1208, Order Header 1200, and Order Detail 1202 records, that have the RDC Shipment Id of the RDC shipment being sent, from the origination RDC database to the destination RDC database. The Order Detail 1202 and Case 1208 records can be copied with a Status value such as "RDC shipment" and Order Header record 1200 can be copied with a Status value such as "open", but in this embodiment, the SKU by Customer Order List data view 1230 can be created by selecting fields from Order Detail records 1202 and their associated Order Header records 1200 which have an Order Detail.Status value such as "destination RDC" or "RDC shipment" and an Order Header.RDC Id equal to the value of the current RDC. If items have been picked and packed into a bulk delivered package to meet the item quantities on all of the Order Detail records 1202 having a particular CDC Id-Customer Id-Temperature Code combination and a Status value such as "destination RDC", but there is still at least one Order Detail record 1202 having that CDC Id-Customer Id-Temperature Code combination, a Status value such as "RDC shipment", and an associated Order Header record 1200 with an RDC Id equal to the value of the current RDC, the Package Creation Program (330) can refrain from closing that bulk delivered package.

A further embodiment can include a more automated CDC packing station (45) featuring moving package bag holders that can move the package bag holder in which a worker is being directed to pack a picked item (the highlighted package bag holder) in front of the worker that is creating bulk delivered packages at that CDC packing station (45). The automated CDC packing station (45) can have, for example, large and small package bag holders arranged in a circular structure, which rotates to move the package bag holders.

In a further embodiment, bulk delivered packages can be created in non-bubble wrap bags, boxes, or other suitable containers, in addition to bubble wrap bags. The bags, boxes, or other containers should be pre-sized to fit into the standard SBU bin sizes, however.

In yet another embodiment of the invention, the RDC Returns Shipment Creation Program (341) can allow workers to still work as a team to create RDC returns shipments for the retailers of a local market, even though each worker can be using a different instance of the RDC Returns Shipment Creation Program (341). There can only be one open RDC returns shipment for a retailer, and each worker on the team can add item return packages to any of the open RDC returns shipments. The scanning devices do not need to have unique identifiers and there can be a different display screen (which can include, but is not limited to a program display monitor, small LCD screen mounted to a fixed base, or a small LCD screen built into the scanning device) for each instance of the RDC Returns Shipment Creation Program (341). Each display screen can display the program messages specific to the instance of the RDC Returns Shipment Creation Program (341) associated with that display screen. In a further aspect of the invention, the RDC Returns Shipment Creation Program (341) can feature a Returns Shipment Creation Screen that can look and function similar to the Package Creation Screen—instead of having numbered shapes representing package bag holders, it can have numbered shapes which represent conveyors, upon which cargo cages and single-item return packages can be organized into RDC returns shipments by retailer. A set of conveyors upon which RDC returns shipments can be created can be located in between a CDC sort conveyor (42) and a RDC returns shipment conveyor (62). The set of conveyors can be positioned so that a RDC returns shipment can flow from each one onto the RDC returns shipment conveyor (62). Each instance of the RDC Returns Shipment Creation Program (341) can guide a worker to pick scanned item return packages and can add them to an existing RDC returns shipment on a specific numbered conveyor or create a new RDC returns shipment for item return packages on one of the open numbered conveyors. The RDC Returns Shipment Creation Program (341) can associate a conveyor with the RDC returns shipment located on that conveyor, and workers can scan the RDC returns shipment label of a RDC returns shipment when adding a picked item return package to a RDC returns shipment. Although each worker can be using a separate instance of the RDC Returns Shipment Creation Program (341), workers can work in teams to create the RDC returns shipments, there can only be one open RDC returns shipment for a retailer, and each worker on the team can add item return packages to any of the open RDC returns shipments.

In a further aspect of the invention, the RDC Returns Shipment Creation Program (341) can feature a Returns Shipment Creation Screen, each worker can use a separate instance of the RDC Returns Shipment Creation Program (341), and each worker can create a limited number of separate RDC returns shipments instead of working as a team with other workers to create RDC returns shipments. As a worker scans an item return package, the RDC Returns Shipment Creation Program (341) can check to see if that worker has an open RDC returns shipment for the retailer associated with the scanned item return package. If the worker has an open RDC returns shipment for the retailer associated with the scanned item return package, the RDC Returns Shipment Creation Program (341) can direct the worker to pick the item return package and place it into the RDC returns shipment on the conveyor that it highlights on the Returns Shipment Creation Screen. If the worker does not have an open RDC returns shipment for the retailer associated with the scanned item return package, the RDC Returns Shipment Creation Program (341) can check to see if another worker has a open RDC returns shipment for the retailer associated with the scanned item return package. If another worker has an open RDC returns shipment for that retailer, the RDC Returns Shipment Creation Program (341) can direct the worker not to pick the item return package. If there is not an open RDC returns shipment for that retailer, the RDC Returns Shipment Creation Program (341) can direct the worker to pick the item return package and create a new RDC returns shipment. In a further aspect of the invention, RDC workers can use the RDC Returns Shipment Creation Program (341) to create a limited number of separate RDC returns shipments, but the RDC Returns Shipment Creation Program (341) can allow each worker to create a new RDC returns shipment for a retailer, even if another worker has an open RDC returns shipment for that retailer. The processing step of checking for which retailers other instances of the RDC Returns Shipment Creation Program (341) have an open RDC returns shipment can be eliminated. RDC returns shipments bound for the same retailer can optionally be grouped together, before they are moved to a local market shipping dock (50), when full-trailer-loads of RDC returns shipments and delivery shipments are created. In a further embodiment of the invention, delivery shipments can be loaded onto an outbound trailer and shipped from a RDC without reserving bin space for the bulk delivered packages and CDC outbound packages of that delivery shipment. The Delivery Shipment Program (342) can still print a listing on a Delivery Shipments Report for each delivery shipment loaded onto a trailer, and when a delivery shipment is received into a CDC, the barcode on the Delivery Shipments Report associated with that delivery shipment can be scanned and used by the Loading Guide Report Program (354) to create a Loading Guide Report. CDC workers can use the Loading Guide Report to assist them as they load the bulk delivered packages and CDC outbound packages of a delivery shipment into SBU bins. If there are not enough SBU bins available in the CDC to receive all of the bulk delivered packages and CDC outbound packages of a delivery shipment, the packages that are not able to be loaded into SBU bins can be stored in a holding cage (134) associated with the shipper delivering the delivery shipment.

In still a further embodiment of the invention, the Configuration Adjustments Report Program (344) is not initiated by the Delivery Shipment Program (342) as part of loading a delivery shipment onto a trailer, but it can be run periodically to adjust the number of bins of each bin size to meet the appropriate levels determined by bin usage trend reporting. This can be employed to set the number of bins of each bin size to an optimal level, which can reduce the effort that may be required to make bin configuration adjustments to try to meet the bin space requirements of every delivery shipment sent to a CDC. A bin usage trend report can be created from data snapshots of a CDC's available bin capacity, the number of bulk delivered packages and CDC outbound packages shipped to a CDC in a day, and the number of bulk delivered packages and CDC outbound packages removed from delivery shipments of a CDC, to show the optimal numbers of bins of each bin size for a CDC. The bin usage trend reporting can be run separately for each CDC or across groups of CDC's. The Configuration Adjustments Report Program (344) can use the output from the bin usage trend report, a data view created from the Bin Inventory table of a CDC as a summary of the number of bins of each Bin Size, and the Unreserved Bins data view 1305 to determine the number of bin configuration adjustments to make in a CDC. In one aspect of the invention, a Configuration Adjustments Report can print in a CDC and can be used by a shipper or the entity running a CDC to make bin configuration adjustments in the same manner as described in the main embodiment. If there are not enough SBU bins available in a CDC to receive all of the bulk delivered packages and CDC outbound packages of a delivery shipment, the number of packages of each package size, above the amount which can be reserved for the current delivery shipment, can be removed from the current delivery shipment by the Shipment Adjustments Report Program (345) as described in the main embodiment.

A further embodiment of the invention can include using holding cages (134) or excess secured storage space in the backroom area (154) of a CDC to allow one or more shippers to deliver more bulk delivered packages and CDC outbound packages to a CDC before needing to make delivery shipment adjustments to the delivery shipments it sends to that CDC. The Shipment Adjustments Report Program (345) can be configured to allow a predetermined number or a percentage of bulk delivered packages above that CDC's remaining capacity of available SBU bins to be shipped.

A further embodiment of the invention can include cargo cages which can have retractable wheels. These cargo cages can be received into a CDC onto a dock conveyor and then pushed or pulled through the CDC by one or more CDC workers unloading packages from that cargo cage. The cargo cages can be linked together to form larger groups of bulk delivered packages that can be easily movable throughout a CDC, without the use of mobile putaway conveyor units (143).

In a further embodiment of the invention, package recipients can be notified of the receipt of a bulk delivered package or a CDC outbound package only once. Although the functionality to call/send reminder notifications to a recipient is not available in this embodiment, the New Package Notification Program (358) and the Notification Program (360) can still work together with the Customer table 1256 to notify a package recipient according to their recorded preferences and to prevent them from receiving a separate notification message for each bulk delivered package received, if more than one bulk delivered package is received before the recipient retrieves their bulk delivered packages.

In still a further embodiment of the invention, notification messages can be customized by each shipper to include standard information, such as a description of their package retrieval policies, or situation specific information based upon factors including, but not limited to the time elapsed since the delivery notification of a bulk delivered package, the number of packages currently in a CDC for a package recipient, seasonal-based factors, and CDC location-based factors. A separate table can be used to store different predefined messages that can be selected for use in an electronic notification message depending upon the values of other fields on that table. This can provide shippers with the capability to change the content of notification messages sent to package recipients and can allow them to have several situational notification messages that can be selected and played based upon other factors.

A further embodiment can include sending a notification message to a package sender when a CDC outbound package that the package sender sent has been delivered to a CDC. A package sender can indicate the desire to be notified when the CDC outbound package the sender is sending is delivered—delivered to its destination CDC and loaded into a SBU bin. An indicator field on a CDC Outbound Package record 1270 can be used to track whether a package sender selected this feature and can be used by the New Package Notification Program (358) to create a Notification Queue record 1311 containing a field to indicate that the record is for notifying a package sender and not a package recipient. Upon checking the value of that indicator field when processing Notification Queue records 1311, the Notification Program (360) can initiate the Auto-call Program (362) and/or the Auto-e-mail Program (364) to contact the package sender. After one or more messages are sent to the package sender successfully, in accordance with the package sender's notification preferences, the Notification Program (360) can delete the package sender's record from the Notification Queue 1311. A different message can be played for notifying a package sender than a package recipient. If a customer is both a package sender and a package recipient at the same time, the customer can have more than one record on the Notification Queue table 1311, and the customer can be contacted separately with each type of message. A package sender notification message can include the package recipient's name, and a package sender can receive a distinct message for each CDC outbound package the package sender sends, regardless of when those packages are delivered. The Notification Program (360) can be configured to treat Notification Queue records 1311 for package senders with the same priority as Notification Queue records 1311 for package recipients, or they can be treated with a different priority.

In a further embodiment of the invention, a CDC can have separate returns processing entry points (148) for each shipper accepting item return packages and/or CDC outbound packages at that CDC. This can result in customers/recipients naturally segregating item return packages and/or CDC outbound packages by shipper when they send an item return or a CDC outbound package, allowing for the CDC workers of each shipper to more easily identify item return packages and CDC outbound packages marked for their shipping organization when creating CDC reverse shipments.

In a further embodiment of the invention, an ePD customer access card can be used at a SBU along with an entered PIN to retrieve a bulk delivered package instead of entering a Quick Code and PIN on the SBU keypad (244).

In still a further embodiment of the invention, a Customer Id and PIN can be entered on a SBU keypad (244) to retrieve a bulk delivered package instead of entering a Quick Code and PIN on the SBU keypad (244). In a further embodiment, shippers can bill the customers placing orders, instead of the retailers accepting those orders. The amount billed can be based upon factors including, but not limited to a flat shipping fee per order, a fee based upon the number of items in an order, a fee based upon the weight of an order, a fee based upon the value of an order, a fee based upon package size, a fee based upon the number of packages in an order, location-based storage rates, and seasonal-based storage rates.

In still a further embodiment, the entity operating a CDC can charge retailers, shippers, or customers a storage fee for each package or order delivered based upon factors including, but not limited to the number of SBU bins used to hold the packages of an order, the size of each SBU bin used to hold each package, the amount of time that a package is in a SBU bin after the package recipient was notified of delivery, a flat storage charge per order, a storage charge based upon the value of an order, a flat storage charge per package depending upon package size, location-based storage rates, and seasonal-based storage rates.

Yet another embodiment can include retailers creating temperature-controlled bulk delivered packages at their fulfillment sites for regional distribution to CDC's and LDDH's in the local markets served by a RDC. The retailers can create bulk delivered packages that require refrigeration or sub-freezing temperatures using a Retailer Package Creation Program (315) or a modified version of their own order fulfillment software. Each bulk delivered package created at a retailer fulfillment site can have an associated Package record (which can be of the same data structure as described in the main embodiment), a packing list, and a package label (which can be of the same format as described in the main embodiment). The temperature-controlled bulk delivered packages can be shipped to a shipper's RDC in cargo cages or any other suitable container on a temperature controlled tractor-trailer or other cargo carrying vehicle. The retailer shipment containing temperature-controlled bulk delivered packages can arrive at a RDC and can be unloaded from a trailer conveyor (204) to a temperature-controlled receiving dock in the same way that retailer shipments of cases can be unloaded from trailers and moved into a RDC in the main embodiment. The Package 1234, Order Header 1200, and Order Detail 1202 records associated with the temperature-controlled bulk delivered packages can be copied from the retailer's database to the database on the RDC server using a method similar to the one used to copy Case 1208, Order Header 1200, and Order Detail 1202 records associated with a retailer shipment of cases. After the cargo cages or other containers filled with the temperature-controlled bulk delivered packages of the temperature-controlled retailer shipment are moved onto a temperature-controlled receiving dock in the RDC, RDC workers can empty the cargo cages and/or other suitable containers filled with the temperature-controlled bulk delivered packages onto the temperature-controlled local market sort conveyor. RDC workers performing the temperature-controlled local market sort can pick temperature-controlled bulk delivered packages from the temperature-controlled local market sort conveyor and place them on the temperature-controlled CDC sort conveyors at which they can be stationed by reading the Local Market Id embedded in the CDC Id printed on the package label or scanning the barcode on the package label using a program similar to the Local Market Sort Program (326) that is able to process scanned Package Id barcodes and direct a worker to pick or ignore temperature-controlled bulk delivered packages for the local market of the temperature-controlled CDC conveyor at which that worker is stationed. RDC workers creating temperature-controlled delivery shipments for a particular CDC or LDDH can scan and pick temperature-controlled bulk delivered packages from the temperature-controlled CDC sort conveyor at which they are stationed and can place them into a temperature-controlled delivery shipment. The entire area where temperature-controlled bulk delivered packages can be received, sorted, and added to temperature-controlled delivery shipments can be located in a temperature-controlled area within a RDC, or at least the location in which parts of that process occur can be located in a temperature-controlled area of the RDC. Temperature-controlled delivery shipments can be loaded onto temperature-controlled tractor-trailers (or similar vehicles), organized by local market, and shipped from the RDC to one or more CDC's or LDDH's in a local market. CDC workers meeting a temperature-controlled vehicle carrying temperature-controlled delivery shipments at a CDC 1190-1 can unload the temperature-controlled delivery shipment and immediately move through the CDC 1190-1 to load the temperature-controlled bulk delivered packages into the bins of SBU's located in a temperature-controlled area of the CDC.

In a further aspect of the invention, retailer-created temperature-controlled bulk delivered packages, shipped to a RDC for regional distribution to CDC's and LDDH's in the local markets served by that RDC, can be received into and moved through a RDC using the same conveyors and programs that can be used to move cases, bulk delivered packages, and CDC outbound packages through the RDC. The temperature-controlled retailer shipments can be received onto a RDC inbound receiving dock conveyor (32) and moved into the local market sort process. The retailer-created temperature-controlled bulk delivered packages can be labeled with color-coded labels or a label with a marking to indicate that the package is a retailer-created temperature-controlled bulk delivered package and not a standard temperature bulk delivered package, CDC outbound package or an item return package, to allow RDC workers to give first priority to temperature-controlled bulk delivered packages as they can be moved through the RDC. Temperature-controlled bulk delivered packages can be identified and picked from the local market sort conveyor (24) without being scanned (similar to CDC outbound packages and item return packages). The Delivery Shipment Creation Program (340) can determine that a scanned temperature-controlled bulk delivered package is different from a bulk delivered package by checking the Temperature Code on its Package record 1234 and can direct a worker to segregate the two types of bulk delivered packages into different delivery shipments. RDC workers can organize full-trailer-loads of temperature-controlled delivery shipments and load them onto temperature-controlled trailers.

In a further aspect of the invention, the retailer-created temperature-controlled bulk delivered packages can be shipped to a RDC which can be specialized to process retailer-created temperature-controlled packages for regional distribution to CDC's and LDDH's in the local markets served by that specialized RDC. This embodiment is essentially the same as the previous one, except that the entire RDC facility can be specialized to only process retailer-created temperature-controlled packages.

A further aspect of the invention can include retailers sending cases of temperature-controlled items to a RDC, where they can be processed using the same infrastructure that is used to process standard-temperature cases to create temperature-controlled bulk delivered packages for regional distribution to CDC's and LDDH's in the local markets served by that RDC. The cases of temperature-controlled items can be received onto a RDC inbound receiving dock conveyor (32) and moved into the local market sort. Cases of temperature-controlled items can, for example, be labeled with a different color label or marked in some way to indicate that they contain temperature-controlled items. RDC workers performing the local market sort and the CDC sort can give a higher priority to cases of temperature-controlled items to move them through the RDC faster. Items can be picked from cases containing temperature-controlled items to create temperature-controlled bulk delivered packages. Temperature-controlled bulk delivered packages can be added to temperature-controlled delivery shipments and can be shipped to CDC's or LDDH's on temperature-controlled vehicles.

In yet still a further aspect of the invention, cases of temperature-controlled items can be shipped to a RDC specialized to process temperature-controlled items, for regional distribution to CDC's and LDDH's in the local markets served by that specialized RDC. Here, the entire specialized RDC facility only processes temperature-controlled items.

In a further aspect of the invention, cases of temperature-controlled items can be shipped to a RDC to be processed for national or multi-national distribution. Here, cases of standard-temperature items and cases of temperature-controlled items can be mixed together as they enter the different sorting steps throughout the RDC (RDC sort, local market sort, CDC sort, and package conveyor sort). The RDC Shipment Program (318) validating whether a scanned case should be added to a RDC shipment, can check that the Temperature Code of a case matches the Temperature Code of a RDC shipment as well as checking that its RDC Id matches the RDC Id of the RDC shipment. Temperature-controlled RDC shipments can be sent from one RDC to another on temperature-controlled trailers or vehicles in accordance with the same process as standard-temperature RDC shipments. Although cases of standard-temperature items and cases of temperature-controlled items can be mixed together, RDC workers performing the local market sort and CDC sort can, for example, recognize cases of temperature-controlled items by a different color or marking on their case label and can move them through the RDC with a higher priority. The Package Creation Program (330) can be designed to create separate bulk delivered packages for items of different Temperature Codes and temperature-controlled bulk delivered packages can be added to separate temperature-controlled delivery shipments which can be organized together and sent out to CDC's or LDDH's in a local market. A further aspect of the invention can include the use of specialized RDC facilities that only handle temperature-controlled items to be processed for national or multi-national distribution.

It should be readily understood that the transporting of trailers filled with cases of items from a retailer fulfillment site to a RDC can be achieved by using, for example, a tractor-trailer, a locomotive, an airplane, a ship (whether local or an ocean vessel) depending upon where the two sites can be located and the cost and timing of each transportation method. The aforementioned transportation methods, or any combination thereof, can also be used to transport trailers filled with RDC shipments between two different RDC's, trailers filled with delivery shipments from a RDC to CDC's or LDDH's, trailers filled with RDC returns shipments from a RDC to retailer returns facilities, or trailers filled with CDC reverse shipments from CDC's to a RDC. Use of airplanes to transport the different types of shipments can be especially useful in providing an expedited delivery service to deliver packages to CDC's or customer specified addresses faster. Use of ocean vessels may be especially economical to transport the different types of shipments between RDC's located in different countries. In one aspect of the invention, retailer shipments, RDC shipments, delivery shipments, RDC returns shipments, and/or CDC reverse shipments can be further transported on a vehicle, which is not a trailer, but has carrying capacity sufficient to hold cargo. This can include, but is not limited to, utility vans, cargo vans, flat beds, and pickups. In a further aspect of the invention, the trailers or other vehicles used to transport retailer shipments, RDC shipments, delivery shipments, RDC returns shipments, and/or CDC reverse shipments, may not be equipped with trailer conveyors and can require manual or mechanized labor for handling cargo. For example, the cases, cargo cages, single-item bulk delivered packages can be moved into and out of the trailers or other vehicles by hand or by using conventional cargo moving equipment, such as a fork lift.

In still a further embodiment of the invention, discounts or penalties can be offered to recipients and/or customers to provide an incentive to retrieve bulk delivered packages from a CDC as soon as possible. A shipper's standard package retrieval policy can include a reasonable grace period of time that a package recipient has to retrieve their bulk delivered packages from a CDC before incurring a penalty. The time that a bulk delivered package remains in a SBU bin at a CDC after a package recipient has been notified that a package has been delivered can be measured against a grace period by a shipper using the information on the Bin Inventory table 1300. Various penalties can be calculated if one or more bulk delivered packages remain in a CDC after the package recipient has been notified of delivery, including, but not limited to the following: a flat charge to cover all bulk delivered packages in the CDC each time at least one bulk delivered package is left in a CDC over the grace period; a charge per package; a charge per package, per day; a charge per package, depending upon package size; a charge per package, per day, depending upon package size; a charge per order; and a charge per order, per day. Incentives can also be offered to package recipients for retrieving bulk delivered packages prior to the end of the grace period, such as a discount on future shipping costs. Incentives can also be calculated as a flat discount or can be based upon the same per package, per day, per order factors that a shipper may use to calculate a penalty. The net balance of penalty charges and incentive discounts can be tracked for a recipient or customer, by each shipper, in an account balance field. A shipper can apply a recipient's/customer's net account balance into the shipping cost of that recipient's/customer's next ePD delivery or traditional delivery order when the recipient/customer selects the shipper from the retailer's web site. A shipper's standard package retrieval policy can be communicated in a notification message to a package recipient, as well as specific information related to the package recipient's package retrieval situation. For example, a reminder notification message can inform a package recipient that the recipient will be charged a fee on at least one of their packages if the recipient does not retrieve their packages by the end of the current day. A shipper may vary the penalties and incentives they offer at different seasonal times or by CDC location.

In a further embodiment of the invention, portable temporary SBU's located, for example, on trailers in a parking lot of the CDC or another suitable location can be used to increase the bin capacity of a CDC to meet seasonal peak demands. The portable temporary SBU's can be transported to a CDC location on a tractor-trailer. The trailers containing the additional SBU's can be detached from their tractors and parked near the CDC. The sides of the trailers can, for example, roll up or be removed to allow workers and recipients to access the SBU's, which can sit back to back facing out through each open side of the trailer. The SBU's can be connected to the CDC server and to power sources inside the CDC by a protected cable connection running from the CDC to the trailer. Temporary platforms with ramps and/or stairs can be positioned next to the trailers containing additional SBU's to allow customers to access the SBU's. A large tent or awning can be temporarily constructed over groups of the trailers containing the additional SBU's to provide shelter to protect the SBU's and recipients and workers accessing the SBU's from adverse weather conditions. One or more temporary scaled down versions of entrance stations without electronic locking doors can be set up near the groups of trailers containing the additional SBU's to allow recipients to determine in which SBU's their bulk delivered packages can be located and to receive the Quick Code needed to access their bulk delivered packages. Records can be added to the Bin Inventory 1300 and SBU Settings 1314 tables for the additional SBU's temporarily added to the CDC (the added records can later be deleted if the additional SBU's are later removed from the CDC). Alternatively, additional SBU's can be moved on tractor-trailers and then unloaded from the trailers and moved onto platforms or onto the ground in the CDC parking lot or a nearby area. In a further aspect of the invention, additional temporary CDC locations can be added as needed in local markets to meet seasonal demands. A suitable commercial location can be rented and SBU's can be moved into that commercial location along with the hardware for one or more entrance stations or scaled down versions of entrance stations without electronic locking doors. A CDC processing server can also be moved into the location and can be configured for the SBU's that were moved into the location. A temporary CDC location can operate in the same manner as a permanent CDC location.

While exemplary systems and methods embodying the present invention are shown by way of example, it should be understood that the invention is not limited to these embodiments. Modifications can be made by those skilled in the art, particularly in light of the foregoing teachings. For example, each of the elements of the aforementioned embodiments may be utilized alone or in combination with elements of the other embodiments.

What is claimed is:

1. A method for efficiently delivering packages in bulk for recipients comprising:

transporting containers of items organized by item identifier to a distribution center;

creating a package at said distribution center containing at least one item ordered for a recipient, by reorganizing said transported items by an identifier of a destination centralized pickup location and at least one of an identifier of said recipient and an identifier which is linked to said recipient;

associating an identifier of said package with said identifier of a destination centralized pickup location;

grouping a plurality of said packages for a plurality of recipients for delivery to said destination centralized pickup location based on said association of said package identifier and said destination centralized pickup location identifier;

delivering said grouped packages in bulk to said destination centralized pickup location;

randomly selecting a storage locker bin from a system of storage locker bins at said destination centralized pickup location;

loading each delivered package into a respective randomly selected storage locker bin; and associating said package identifier of said loaded delivered package with an identifier of said randomly selected storage locker bin.

2. The method according to claim 1, further comprising sorting at an origination distribution center items received from at least one retailer delivered to said origination distribution center, said items destined for a plurality of said recipients, said items organized by item identifier, wherein said step of creating a package occurs at a destination distribution center after said sorted items have been transported to said destination distribution center from said origination distribution center.

3. The method according to claim 2, wherein the step of sorting said received items at said origination distribution center further comprises:

identifying said received items to a destination centralized pickup location;

identifying said received items to said destination distribution center; and sorting and grouping said identified received items by said identified destination distribution center, said identified received items organized by item identifier.

4. The method according to claim 2, further comprising consolidating more than one of said items destined for a specific recipient, said more than one item originating from at least one retailer.

5. The method according to claim 4, further comprising receiving said items associated with at least one order from least one fulfillment location.

6. The method according to claim 1, wherein the step of randomly loading said bulk delivered package into a system of storage locker bins further comprises:

capturing electronically an identifier for said bulk delivered package; and associating said electronically captured identifier of said bulk delivered package with an electronically captured identifier of one of said storage locker bins within said system of storage locker bins.

7. The method according to claim 6, further comprising, retrieving said bulk delivered package created for said specific recipient from a storage locker bin, said retrieving step including authenticating an identity of said recipient prior to at least one of revealing an identity of said storage locker bin and providing access to said storage locker bin.

8. The method according to claim 1, further comprising:

creating a returns package comprising at least one item from at least one of a bulk delivered package retrieved by a recipient and a package delivered to a customer specified address, said returns package destined for a retailer associated with said as least one item; and delivering in bulk sorted and grouped returns packages to a returns facility of said associated retailer.

9. The method according to claim 8, further comprising submitting said returns package pickup at a destination centralized pickup location.

10. The method according to claim 1, wherein the step of randomly loading said bulk delivered package into said system of storage locker bins comprises automatically triggering the dispatch of an electronic notification to said recipient of said bulk delivered package, said electronic notification having at least an identifier of said destination centralized pickup location.

11. The method according to claim 10, wherein said step of automatically triggering the dispatch of said electronic notification further comprises recording information necessary for billing at least one of a customer who ordered an item of said bulk delivered package, said recipient and a retailer, said information including at least one of an order identifier, an ordering customer identifier, a recipient identifier, a customer identifier, a package identifier, a delivery date, a delivery time, a delivery notification date, a delivery notification time, a retrieval date and a retrieval time.

12. The method according to claim 10, wherein said electronic notification to said recipient comprises, at least one of a facsimile, an email, a telephone call, and a page.

13. The method according to claim 1, further comprising retrieval of said bulk delivered package by said recipient through self-service.

14. The method according to claim 1, wherein the step of loading said bulk delivered packages randomly into said system of storage locker bins further comprises loading a bulk delivered package into any unoccupied storage locker bin within said system of storage locker bins, said unoccupied storage locker bin, having dimensions large enough to accept said bulk delivered package, said system of storage locker bins being configurable.

15. The method according to claim 1, further comprising controlling a temperature within said bins of said system of storage locker bins by locating said bins in a temperature controlled environment.

16. The method according to claim 1, wherein said step of delivering said packages in bulk to said destination centralized pickup location further comprises accommodating delivery of said packages in bulk to said destination centralized pickup location from a plurality of different shippers.

17. The method according to claim 1, wherein said step of loading said bulk delivered packages randomly into said system of storage locker bins further comprises accommodating loading of said bulk delivered package into said system of storage locker bins from a plurality of different shippers.

18. The method according to claim 1, further comprising:

creating a bulk delivered customer distribution center (CDC) outbound package consisting of at least one item destined for a recipient at one of a specified destination centralized pickup location and a specified address, submitting said bulk delivered CDC outbound package for pickup at a destination centralized pickup location; and delivering a plurality of said CDC outbound packages in bulk to one of said specified destination centralized pickup location and a local distribution hub.

19. The method according to claim 1, wherein the step of grouping a plurality of packages for a plurality of recipients for delivery to said destination centralized pickup location is accomplished within the step of creating a package at said distribution center as comprised:

sorting items organized by item identifier to a packing station associated with said destination centralized pickup location; and picking items identified for a specific recipient from said items organized by item identifier at said packing station associated with said destination centralized pickup location to create a package far said specific recipient.

20. The method according to claim 1, further comprising sorting at an origination distribution center items received from at least one retailer delivered to said origination distribution center, said items destined for a plurality of said recipients, said items organized by item identifier, wherein said step of creating a package occurs at said origination distribution center, said origination distribution center also serving as a destination distribution center.

21. The method according to claim 20, further comprising consolidating more than one of said items destined for a specific recipient, said more than one item originating from at least one retailer.

22. The method according to claim 21, further comprising receiving said items associated with at least one order from at least one fulfillment location.

23. A method for efficient bulk package delivery for recipients comprising:
   delivering said packages in bulk for a plurality of recipients in a single delivery stop to a destination centralized pickup location, and delivering at least one item destined for a recipient;
   loading said bulk delivered packages randomly into an automated system of storage locker bins;
   creating a returns package comprising at least one item from at least one of a hulk delivered package retrieved by a recipient and a package delivered to a customer specified address, said returns package destined for a retailer associated with said at least one item;
   identifying a returns facility identifier and a returns local market identifier for said returns package based upon an identifier of said retailer;
   identifying a distribution center identifier associated with said returns local market identifier;
   submitting said returns package for pickup at a destination centralized pickup location;
   transporting said submitted returns package from said destination centralized pickup location of said returns package submission to a destination distribution center associated with said destination centralized pickup location of said returns package submission;
   sorting and grouping at said associated destination distribution center a plurality of transported returns packages by said identified distribution center identifier associated with said returns local market identifier for bulk delivery to an origination distribution center associated with said identified distribution center identifier;
   transporting said sorted and grouped returns packages from said associated destination distribution center to said associated origination distribution center;
   sorting at said associated origination distribution center said transported returns packages by said identified returns local market identifier of each said returns package;
   sorting and grouping at said associated origination distribution center said sorted returns package by said identified returns facility identifier of said sorted returns package for bulk delivery to a returns facility associated with said associated returns facility identifier; and
   delivering in bulk said sorted and grouped returns packages to said associated returns facility.

24. A system for efficient bulk package delivery for recipients, the system comprising:
   package creation means located at a distribution center for creating a package containing at least one item ordered for a recipient, the package creation means creating a package by reorganizing items transported to the distribution center originally organized by item identifier, the package being organized by an identifier of a destination centralized pickup location and at least one of an identifier of a recipient and an identifier which is linked to said recipient;
   associating means for associating an identifier of a created package with the identifier of a destination centralized pickup location;
   grouping means for grouping a plurality of packages intended for a plurality of recipients for delivery to said destination centralized pickup location based on said association of said package identifier and said destination centralized pickup location identifier;
   delivery means for delivering said grouped packages in bulk in a single delivery stop to said destination centralized pickup location;
   a system of storage locker bins at said destination centralized pickup location, from which a storage locker but is randomly selectable;
   means for loading each delivered package into a respective randomly selected storage locker bit; and
   associating means for associating the package identifier of the loaded delivered package with an identifier of the randomly selected storage locker bin.

25. The system according to claim 24, further comprising means for sorting at an origination distribution center, items received from at least one retailer delivered to said origination distribution center, said items destined for a plurality of said recipients, and said items organized by item identifier, wherein said package creation occurs at a destination distribution center after said sorted items have been transported to said destination distribution center from said origination distribution center.

26. The system according to claim 25, wherein said means for sorting said received items at said origination distribution center, location further comprises:
   identification means for identifying said received items to a destination centralized pickup location;
   identification means for identifying said received items to a destination distribution center; and
   means for sorting and grouping said identified received items by said identified destination distribution center, said identified received items organized by item identifier.

27. The system according to claim 25, further comprising consolidation means for consolidating more than one of said items destined for a specific recipient, said more than one of said items originating from at least one retailer.

28. The system according to claim 27, further comprising means for receiving said items associated with at least one order from at least one fulfillment location.

29. The system according to claim 24, further comprising:
   means for creating a returns package consisting of at least one item from at least one of a bulk delivered package retrieved by a recipient and a package delivered to a customer specified address, said returns package destined for a retailer associated with said at least one item; and
   delivery means for delivering in bulk, a plurality of sorted and grouped returns packages to a returns facility of said associated retailer.

30. The system according to claim 29, further comprising means for submitting said returns package for pickup at a destination centralized pickup location.

31. The system according to claim 24, further comprising means for randomly loading said bulk delivered package into said system of storage locker bins, wherein said random loading means comprises:
   electronics for electronically capturing an identifier for said bulk delivered package; and
   means for associating said electronically captured identifier of said bulk delivered package with an electronically captured identifier of one of said storage locker bins within said automated system of storage locker bins.

32. The system according to claim 31, further comprising, retrieval means for retrieving maid bulk delivered package created for said specific recipient from a storage locker bin, said retrieval means having a computing means for authenticating an identity of said recipient prior to at least one of revealing an identity of said storage locker bin and providing access to said storage locker bin.

33. The system according to claim 24, wherein said means for randomly loading said bulk delivered package into said system of storage locker bins comprises electronic circuitry and software for automatically triggering the dispatch of an electronic notification to said recipient of said bulk delivered package, said electronic notification having at least an identifier of said destination centralized pickup location.

34. The system according to claim 33, wherein said electronic circuitry and software for automatically triggering the dispatch of said electronic notification further comprises circuitry and associated software for recording information necessary for billing at least one of a customer who ordered an item of said bulk delivered package, said recipient and a retailer, said information including at least one of an order identifier, an ordering customer identifier, a recipient identifier, a customer identifier, a package identifier, a delivery date, a delivery time, a delivery notification date, a delivery notification time, a retrieval date and a retrieval time.

35. The system according to claim 33, wherein said electronic notification to said recipient comprises at least one of a facsimile, an email, a telephone call, and a page.

36. The system according to claim 24, further comprising retrieval means for retrieval of said bulk delivered package by said recipient through self-service.

37. The system according to claim 24, wherein said means for loading said bulk delivered package randomly into said system of storage locker bins further comprises means for loading said bulk delivered package into any unoccupied storage locker bin within said system of storage locker bins, said unoccupied storage locker bins having dimensions large enough to accept said bulk delivered package, said system of storage locker bins being configurable.

38. The system according to claim 24, wherein said delivery means for delivering said package in bulk to said destination centralized pickup location further comprises means for accommodating delivery of said package in bulk to said destination centralized pickup location from a plurality of different shippers.

39. The system according to claim 24, wherein said means for loading said bulk delivered package randomly into said automated system of storage locker bins further comprises means for accommodating loading of said bulk delivered package into said automated system of storage locker bins from a plurality of different shippers.

40. The system according to claim 24, further comprising:
   means for creating bulk delivered customer distribution center (CDC) outbound package consisting of a least one item destined for a recipient at one of a specified destination centralized pickup location and a specified address;
   means for submitting said bulk delivered CDC outbound package for pickup at a destination centralized pickup location; and
   delivery means for delivering said CDC outbound package in bulk to one of said specified destination centralized pickup location and a destination local distribution hub.

41. The system according to claim 24, further comprising means for grouping a plurality of packages plurality of recipients for delivery to said destination centralized pickup location, as further comprised within the package creation means at said distribution center:
   sorting means for sorting items organized by item identifier to a packing station associated with said destination centralized pickup location;
   identifying means at said packing station for identifying items for a specific recipient from said sorted items organized by item identifier; and
   picking means for picking said identified items for a specific recipient from said items organized by item identifier at said packing station to create a package for said specific recipient.

42. The system according to claim 24, further comprising means for sorting at an origination distribution center, items received from at least one retailer delivered to said origination distribution center, said items destined for a plurality of said recipients, and said items organized by item identifier, wherein said package creation occurs at said origination distribution center, said origination distribution center also serving as a destination distribution center.

43. The system according to claim 42, further comprising consolidation means for consolidating more than one of said items destined for a specific recipient, said more than one item originating from at least one retailer.

44. The system according to claim 43, further comprising means for receiving said items associated with at least one order from at least one fulfillment location.

45. A system for efficient bulk package delivery for recipients, the system comprising:
   delivery means for delivering said packages in bulk for a plurality of recipients in a single delivery stop to a destination centralized pickup location and for delivery of at least one item destined for a recipient;
   a means for randomly loading said bulk delivered packages into an automated system of storage locker bins;
   means for creating a returns package comprising at least one item from at least one of a bulk delivered package retrieved by a recipient and a package delivered to a customer specified address, said returns package destined for a retailer associated with said at least one item
   identification means for identifying a returns facility identifier and a returns local market identifier for said returns package based upon an identifier of said retailer,
   identification means for identifying a distribution center identifier associated with said returns local market identifier;
   means for submitting said returns package for pickup at a destination centralized pickup location;
   transportation means for transporting said submitted returns package from said destination centralized pickup location of said returns package submission to a destination distribution center associated with said destination centralized pickup location of said returns package submission;

means for sorting and grouping at said associated destination distribution center said transported returns package by said identified distribution center identifier associated with said returns local marker identifier for bulk delivery to an origination distribution center associated with said identified distribution center identifier;

transportation means for transporting said sorted and grouped returns package from said associated destination distribution center to said associated origination distribution center;

means for sorting at said associated origination distribution center said transported returns package by said identified returns local market identifier of said returns package;

means for sorting and grouping at said associated origination distribution center said sorted returns package by said identified returns facility identifier of said sorted returns package for bulk delivery to a returns facility associated with said associated returns facility identifier; and delivery means for delivering in bulk said sorted and grouped returns package to said associated returns facility.

* * * * *